(12) United States Patent
Chen et al.

(10) Patent No.: US 12,122,974 B2
(45) Date of Patent: Oct. 22, 2024

(54) ORGANOPHOSPHORUS COMPOUND, AND PREPARATION PROCESS AND USE THEREOF

(71) Applicants:CHINA PETROLEUM & CHEMICAL CORPORATION, Beijing (CN); RESEARCH INSTITUTE OF PETROLEUM PROCESSING, SINOPEC, Beijing (CN)

(72) Inventors: Xiaowei Chen, Beijing (CN); Kecheng Wei, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 399 days.

(21) Appl. No.: 17/309,053

(22) PCT Filed: Oct. 16, 2019

(86) PCT No.: PCT/CN2019/111407
§ 371 (c)(1),
(2) Date: Apr. 16, 2021

(87) PCT Pub. No.: WO2020/078368
PCT Pub. Date: Apr. 23, 2020

(65) Prior Publication Data
US 2021/0395633 A1    Dec. 23, 2021

(30) Foreign Application Priority Data
Oct. 16, 2018   (CN) .......................... 201811201069.5

(51) Int. Cl.
*C10M 137/16*   (2006.01)
*C07F 9/655*    (2006.01)
(Continued)

(52) U.S. Cl.
CPC ....... *C10M 137/16* (2013.01); *C07F 9/65505* (2013.01); *C10M 137/14* (2013.01);
(Continued)

(58) Field of Classification Search
CPC ........... C10N 2030/06; C10N 2050/10; C10M 137/16; C10M 135/04; C10M 137/04;
(Continued)

(56) References Cited

U.S. PATENT DOCUMENTS 2,385,713 A    9/1945  Kosolapoff
3,239,464 A    3/1966  Matson et al.
(Continued)

FOREIGN PATENT DOCUMENTS

CN    101724492 B    12/2012
CN    102260572 B    6/2013
(Continued)

OTHER PUBLICATIONS

Lomonaco, Diego et al.; "Thermal studies of new biodiesel antioxidants synthesized from a natural occurring phenolic lipid"; FUEJ; vol. 97; 2021; pp. 552-559.
(Continued)

*Primary Examiner* — Vishal V Vasisth
(74) *Attorney, Agent, or Firm* — NKL Law; Allen Xue

(57) ABSTRACT

An organophosphorus compound has a structure represented by the general formula (I):
(Continued)

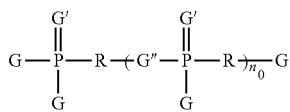

(I)

The functional groups are defined in the description. The organophosphorus compound has prominent bearing capacity and excellent antiwear and antifriction performances, and can be used as an extreme pressure antiwear additive and used in lubricating oil and lubricating grease.

12 Claims, 4 Drawing Sheets

(51) Int. Cl.
| | | |
|---|---|---|
| *C10M 137/14* | (2006.01) | |
| *C10M 169/04* | (2006.01) | |
| C10N 30/06 | (2006.01) | |
| C10N 50/10 | (2006.01) | |

(52) U.S. Cl.
CPC .... *C10M 169/04* (2013.01); *C10M 2203/003* (2013.01); *C10M 2223/065* (2013.01); *C10M 2223/08* (2013.01); *C10N 2030/06* (2013.01); *C10N 2050/10* (2013.01)

(58) Field of Classification Search
CPC ............ C10M 137/105; C10M 137/14; C10M 169/04; C10M 2203/003; C10M 2223/04; C10M 2223/06; C10M 2223/065; C10M 2223/08; C07D 333/00; C07D 333/16; C07D 333/24; C07F 9/4021; C07F 9/65505; C07F 9/65586; C07F 9/24; C07F 9/242; C07F 9/2458; C07F 9/4084; C07F 9/6553; C07F 9/655309; C07F 9/6561
See application file for complete search history.

(56) References Cited

U.S. PATENT DOCUMENTS

| | | | |
|---|---|---|---|
| 4,144,247 | A | 3/1979 | Jayne |
| 5,387,353 | A | 2/1995 | Nader |

FOREIGN PATENT DOCUMENTS

| | | | |
|---|---|---|---|
| CN | 106317109 | A | 1/2017 |
| CN | 108373484 | A | 8/2018 |
| GB | 1070314 | A | 6/1967 |
| JP | H0827170 | A | 1/1996 |
| JP | H08193090 | A | 7/1996 |

OTHER PUBLICATIONS

Ecochard, Yvan et al.; "Cardanol and Eugenol Based Flame retardant Epoxy Monomers for Thermostable Networks"; Molecules; vol. 24, No. 1818, 2019; pp. 1-21.
Dizdar, Senad; "Wear transition of a lubricated sliding steel contact as a function of surface texture anisotropy and formation of boundary layers", Wear, vol. 237, No. 2, Feb. 1, 2000, pp. 205-210, ISSN: 0043-1648.
De Sousa Rios, Maria Alexsandra et al.; "Cashew Nut Shell Liquid: A Versatile Raw Material Utilized for Syntheses of Phosphorus Compounds"; Energy Fuels; vol. 23; 2009; pp. 5432-5437.
Nader, Bassam S; "U.S. Pat. No. 5,387,353A—Lubricity additives for high temperature lubricants"; Database STN; Jan. 1, 1995; XP055927756, retrieved from ACS Database accession No. 1995: 420562.
Watanabe, M. et al.; A Facile synthesis of Benzo[b]furan Derivatives Including Naturally Occurring Neolignans via Regioselective Lithiation of ortho-Cresols Using the Bis (dimethyl lamino) phosphoryl Group as a Direction Group; Chem. Pharm. Bull., vol. 39, No. 1; Jan. 31, 1991; pp. 41-48.
Watanabe, M. et al.; A Facile synthesis of Benzo[b]furan Derivatives Including Naturally Occurring Neolignans via Regioselective Lithiation of ortho-Cresols Using the Bis (dimethyl lamino) phosphoryl Group as a Direction Group; Chem. Pharm. Bull., vol. 39, No. 1, Jan. 31, 1991, pp. 41-48, and see figures 2-5.
Watanabe, Mitsuaki. et al.; A Facile synthesis of Benzo[b]furan Derivatives Including Naturally Occurring Neolignans via Regioselective Lithiation of ortho-Cresols Using the Bis (dimethyl lamino) phosphoryl Group as a Directing Group; Chem. Pharm. Bull., vol. 39, No. 1, Jan. 31, 1991, pp. 41-48, and see figures 2-5.

ORGANOPHOSPHORUS COMPOUND, AND PREPARATION PROCESS AND USE THEREOF

This application is a 371 of PCT/CN2019/111407, filed Oct. 16, 2019.

TECHNICAL FIELD

The present invention relates to an organophosphorus compound, especially relates to an organophosphorus compound applicable for the extreme pressure antiwear additive, a preparation process and use thereof; the present invention also relates to a lubricating oil/lubricating grease containing the organophosphorus compound.

BACKGROUND TECHNOLOGY

In the prior art, it is well known that lubrication is generally divided into fluid lubrication and boundary lubrication, and an extreme pressure antiwear additive is an essential additive in a boundary lubrication state.

An extreme pressure antiwear additive is usually added into an oil product, and the extreme pressure antiwear additive can be adsorbed on a metal surface or react with a metal surface to form an adsorption film or a reaction film to prevent scratching, seizure and even fusion welding of the metal surface, so that the lubricity and the antiwear properties of the oil product can be improved. The prior extreme pressure antiwear additive mainly comprises a sulfur-containing extreme pressure antiwear additive, a chlorine-containing extreme pressure antiwear additive, a phosphorus-containing extreme pressure antiwear additive, a nitrogen-containing extreme pressure antiwear additive, a metal salt extreme pressure antiwear additive, a boron-containing extreme pressure antiwear additive and the like. Among them, sulfur-phosphorus extreme pressure antiwear agents containing both sulfur and phosphorus are widely used because of their characteristics of high bearing capacity, good compatibility, good multiple effects and the like.

Among the phosphorus-containing extreme pressure antiwear additives, the extreme pressure antiwear additives widely used in the field of lubricating oil at present include tricresyl phosphate (T306), ammonium thiophosphate salt (T307), thiophosphate ester (IRGALUBE 353), ammonium phosphate salt (IRGALUBE 349) and the like, but their antiwear and antifriction performances are still unsatisfactory.

CN106317109A discloses a thiophosphate type extreme pressure antiwear additive, which is used as a hydraulic oil or lubricating oil additive and shows better antirust performance and better antiwear performance, thermal stability, filterability and hydrolytic stability, but its antiwear and antifriction performances are not superior to those of the extreme pressure antiwear additives in the prior art.

CN102260572B discloses a phosphorus-nitrogen extreme pressure antiwear additive, which has better antioxygen, antirust, anticorrosion performances and extreme pressure antiwear performance, can be used as a multifunctional additive for hydraulic oil, gear oil and various industrial lubricating greases, but is only used as a supplement of a sulfur-phosphorus composite extreme pressure antiwear additive.

CN101724492B discloses a zinc dithiophosphate extreme pressure antiwear additive, which has the better bearing capacity, antioxidation stability and antiwear performance compared with T405, but the compared T405 additive belongs to an oiliness agent and does not have the bearing capacity and the antiwear performance of the extreme pressure antiwear additive, so that the real antiwear and antifriction performances and the bearing capacity of the zinc dithiophosphate extreme pressure antiwear additive cannot be measured. In addition, this invention is an organic metal salt, which is not in accordance with the development trend of no ashing of lubricating oil additives.

Cardanol is a main component of cashew nut shell oil, is a natural phenolic compound, is an important agricultural by-product in cashew nut production, and is wide in source and huge in reserve. Using this kind of natural compound with rich sources and low cost as raw material to synthesize the friction modifier having a better performance than the prior product conforms to the green chemistry requirement and the sustainable development strategic requirements, and meanwhile the extreme pressure antiwear additive with more excellent performance can be provided.

Therefore, there is an urgent need in the prior art for an extreme pressure antiwear additive that has more excellent extreme pressure antiwear performance than the existing extreme pressure antiwear additive. In addition, if the above-mentioned cardanol can be used as starting material to synthesize extreme pressure antiwear additives, it will undoubtedly improve the environmental friendliness produced by the extreme pressure antiwear additives.

SUMMARY OF THE INVENTION

The inventors of the present invention have conducted intensive studies and found that the use of the organophosphorus compound with a specific structure of the present invention can provide extremely excellent extreme pressure antiwear performance, thus completed the present invention. In addition, the inventors of the present invention have found that the extreme pressure antiwear additive of the present invention can be synthesized by using cardanol as starting material, thereby the effective utilization of cardanol as agricultural by-product can be achieved.

The present invention provides an organophosphorus compound, a preparation process and use thereof, and a lubricating oil/lubricating grease containing the organophosphorus compound.

Specifically, the present invention provides an organophosphorus compound, which has a structure as represented by the general formula (I):

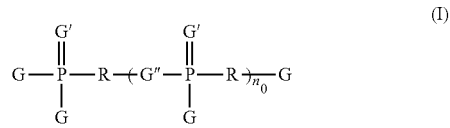

(I)

In the general formula (I), groups G are, identical to or different from each other, each independently selected from H, $C_1$-$C_{30}$ linear or branched alkyl, $C_1$-$C_{30}$ linear or branched alkoxyl, $C_6$-$C_{20}$ aryl, $C_1$-$C_{20}$ linear or branched alkyl $C_6$-$C_{20}$ aryl, a group represented by the formula (II) and a group represented by the formula (III) (preferably each independently selected from H, $C_1$-$C_{10}$ linear or branched alkyl, $C_1$-$C_{10}$ linear or branched alkoxyl, $C_6$-$C_{10}$ aryl, $C_1$-$C_{14}$ alkyl phenyl, a group represented by the formula (II) and a group represented by the formula (III)), wherein at least one G is a group represented by the formula (II);

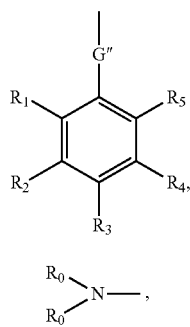

(II)

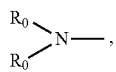

(III)

In the general formula (II), groups $R_1$, $R_2$, $R_3$, $R_4$ and $R_5$ are, identical to or different from each other, each independently selected from H, $C_1$-$C_{20}$ linear or branched alkyl, $C_1$-$C_{20}$ linear or branched alkoxyl, a group represented by the formula (II-I), a group represented by the formula (II-II) and a group represented by the formula (II-III), at least one group of groups $R_1$, $R_2$, $R_3$, $R_4$ and $R_5$ is selected from a group represented by the formula (II-I), a group represented by the formula (II-II) and a group represented by the formula (II-III);

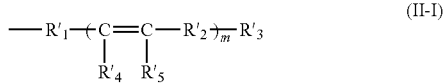

(II-I)

In the general formula (II-I), group $R_1'$ is selected from single bond and $C_1$-$C_{20}$ linear or branched alkylene (preferably selected from single bond and $C_1$-$C_4$ linear or branched alkylene); groups $R_2'$ in m repeating units are, identical to or different from each other, each independently selected from single bond and $C_1$-$C_{20}$ linear or branched alkylene (preferably each independently selected from single bond and $C_1$-$C_4$ linear or branched alkylene); group $R_3'$ is selected from hydrogen and $C_1$-$C_{20}$ linear or branched alkyl (preferably selected from hydrogen and $C_1$-$C_4$ linear or branched alkyl); groups $R_4'$ in m repeating units are, identical to or different from each other, each independently selected from hydrogen and $C_1$-$C_{20}$ linear or branched alkyl (preferably each independently selected from hydrogen and $C_1$-$C_4$ linear or branched alkyl); groups $R_5'$ in m repeating units are, identical to or different from each other, each independently selected from hydrogen and $C_1$-$C_{20}$ linear or branched alkyl (preferably each independently selected from hydrogen and $C_1$-$C_4$ linear or branched alkyl); m is an integral number (preferably an integral number of 0-10, more preferably a positive integral number of 1-3);

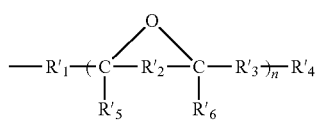

(II-II)

In the general formula (II-II), group $R_1'$ is selected from single bond and $C_1$-$C_{20}$ linear or branched alkylene (preferably selected from single bond and $C_1$-$C_4$ linear or branched alkylene); groups $R_2'$ in n repeating units are, identical to or different from each other, each independently selected from single bond and $C_1$-$C_{20}$ linear or branched alkylene (preferably each independently selected from single bond and $C_1$-$C_4$ linear or branched alkylene); groups $R_3'$ in n repeating units are, identical to or different from each other, each independently selected from single bond and $C_1$-$C_{20}$ linear or branched alkylene (preferably each independently selected from single bond and $C_1$-$C_4$ linear or branched alkylene); group $R_4'$ is selected from hydrogen and $C_1$-$C_{20}$ linear or branched alkyl (preferably selected from hydrogen and $C_1$-$C_4$ linear or branched alkyl); groups $R_5'$ in n repeating units are, identical to or different from each other, each independently selected from hydrogen and $C_1$-$C_{20}$ linear or branched alkyl (preferably each independently selected from hydrogen and $C_1$-$C_4$ linear or branched alkyl); groups $R_6'$ in n repeating units are, identical to or different from each other, each independently selected from hydrogen and $C_1$-$C_{20}$ linear or branched alkyl (preferably each independently selected from hydrogen and $C_1$-$C_4$ linear or branched alkyl); n is a positive integral number (preferably a positive integral number of 1-10, more preferably a positive integral number of 1-3);

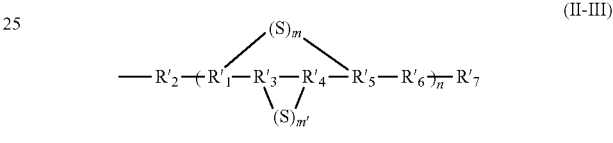

(II-III)

In the general formula (II-III), group $R_1'$ is selected from single bond and $C_1$-$C_{20}$ linear or branched alkylene (preferably selected from single bond and $C_1$-$C_4$ linear or branched alkylene); groups $R_2'$ in n repeating units are, identical to or different from each other, each independently divalent, tervalent or tetravalent $C_1$-$C_{20}$ linear or branched alkyl (preferably each independently divalent, tervalent or tetravalent $C_1$-$C_4$ linear or branched alkyl); groups $R_3'$ in n repeating units are, identical to or different from each other, each independently selected from single bond and divalent or tervalent $C_1$-$C_{20}$ linear or branched alkyl (preferably each independently selected from single bond and divalent or tervalent $C_1$-$C_4$ linear or branched alkyl); groups $R_4'$ in n repeating units are, identical to or different from each other, each independently selected from single bond and divalent or tervalent $C_1$-$C_{20}$ linear or branched alkyl (preferably each independently selected from single bond and divalent or tervalent $C_1$-$C_4$ linear or branched alkyl); groups $R_5'$ in n repeating units are, identical to or different from each other, each independently divalent, tervalent or tetravalent $C_1$-$C_{20}$ linear or branched alkyl (preferably each independently divalent, tervalent or tetravalent $C_1$-$C_4$ linear or branched alkyl); groups $R_6'$ in n repeating units are, identical to or different from each other, each independently selected from single bond and $C_1$-$C_{20}$ linear or branched alkylene (preferably each independently selected from single bond and $C_1$-$C_4$ linear or branched alkylene); group $R_7'$ is selected from hydrogen and $C_1$-$C_{20}$ linear or branched alkyl (preferably selected from hydrogen and $C_1$-$C_4$ linear or branched alkyl); n is an integral number of 1-10 (preferably an integral number of 1-3); the numbers m in n repeating units are, identical to or different from each other, each independently selected from an integral number of 0-10 (preferably an integral number of 0-5); the numbers m' in n repeating units are, identical to or different from each other, each independently selected from an integral number of 0-10 (preferably an integral number of 0-5); in each repeating unit of the formula (II-III), when m is greater than 0, the linking group formed by m sulfur atoms is bonded to groups $R_2'$ and $R_5'$; when m' is greater than 0, the linking group formed by m' sulfur atoms is bonded to groups $R_3'$ and $R_4'$; in each repeating unit of the formula (II-III), when group $R_3'$ is a single bond, the end of the linking group formed by m' sulfur atoms, that is connected to group $R_3'$, is bonded to group $R_2'$, when group $R_4'$ is a single bond, the end of the linking group formed by m' sulfur atoms, that is connected to group $R_4'$, is bonded to group $R_5'$;

In the general formula (III), groups $R_0$ are each independently selected from H, $C_6$-$C_{20}$ aryl, $C_1$-$C_{20}$ linear or branched alkyl $C_6$-$C_{20}$ aryl and $C_1$-$C_{30}$ linear or branched alkyl (preferably each independently selected from phenyl, $C_1$-$C_{14}$ alkyl phenyl and $C_1$-$C_{20}$ linear or branched alkyl); Groups G' present in the general formula (I) are, identical to or different from each other, each independently selected from O, S and $NR_0'$ or the absence (the absence of group G' means that P is a tervalent P atom), wherein $R_0'$ is selected from H, $C_6$-$C_{20}$ aryl, $C_1$-$C_{20}$ linear or branched alkyl $C_6$-$C_{20}$ aryl and $C_1$-$C_{30}$ linear or branched alkyl (preferably selected from phenyl, $C_1$-$C_{14}$ alkyl phenyl and $C_1$-$C_{20}$ linear or branched alkyl); Groups G" present in the general formula (I) and the general formula (II) are, identical to or different from each other, each independently selected from single bond, O, S and $NR_0'$, wherein $R_0'$ is selected from H, $C_6$-$C_{20}$ aryl, $C_1$-$C_{20}$ linear or branched alkyl $C_6$-$C_{20}$ aryl and $C_1$-$C_{30}$ linear or branched alkyl (preferably selected from phenyl, $C_1$-$C_{14}$ alkyl phenyl and $C_1$-$C_{20}$ linear or branched alkyl);

In the general formula (I), groups R are independently selected from single bond, $C_1$-$C_{20}$ linear or branched alkylene and $C_6$-$C_{20}$ arylene (preferably selected from single bond, $C_1$-$C_{10}$ linear or branched alkylene, $C_6$-$C_{10}$ arylene);

$n_0$ in the general formula (I) is an integral number of 0-10, preferably an integral number of 0-5, more preferably 0, 1, 2, 3 or 4.

According to the present invention, preferably, in the general formula (II), groups $R_1$, $R_3$ and $R_5$ are each independently selected from H and $C_1$-$C_4$ linear or branched alkyl; groups $R_2$ and $R_4$ are each independently selected from H, $C_1$-$C_{20}$ linear or branched alkyl, a group represented by the formula (II-I), a group represented by the formula (II-II) and a group represented by the formula (II-III), wherein at least one group is selected from a group represented by the formula (II-I), a group represented by the formula (II-II) and a group represented by the formula (II-III).

According to the present invention, preferably, in the general formula (II), groups $R_1$, $R_3$ and $R_5$ are each independently selected from H, methyl, ethyl, propyl, isopropyl, n-butyl, isobutyl and tert-butyl; one group of groups $R_2$ and $R_q$ is a group represented by the formula (II-I), a group represented by the formula (II-II) or a group represented by the formula (II-III), the other one is H.

According to the present invention, preferably, the group represented by the formula (II-I) has a total carbon number of 2-30, preferably 6-20, more preferably 10-18; the group represented by the formula (II-II) has a total carbon number of 2-30, preferably 6-20, more preferably 10-18; the group represented by the formula (II-III) has a total carbon number of 2-30, preferably 6-20, more preferably 10-18.

The organophosphorus compound of the present invention can be selected from the following specific compounds or a mixture thereof in any proportion:

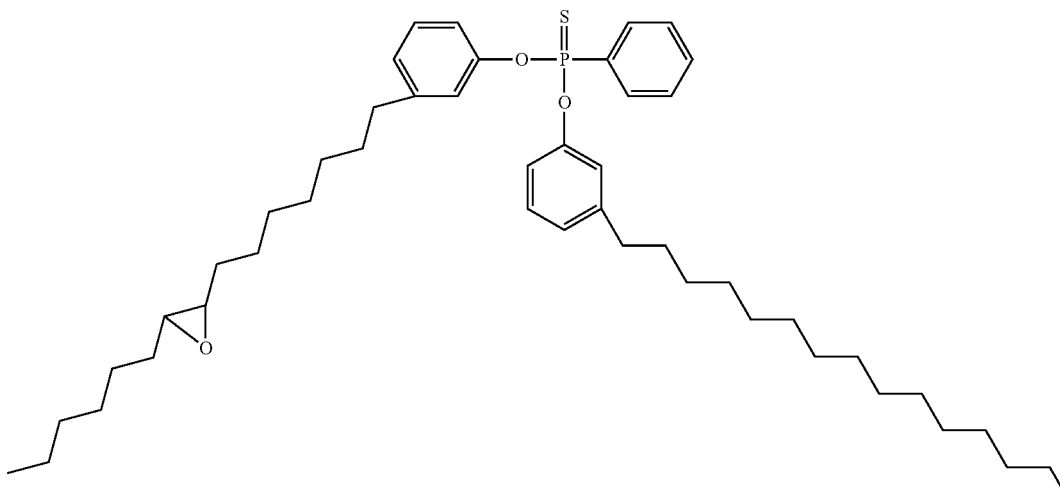

-continued
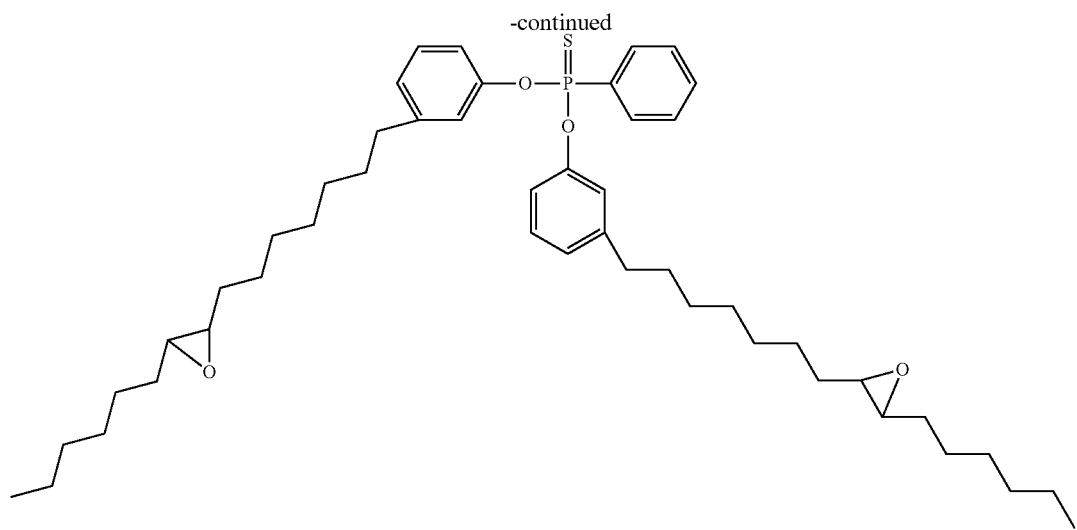
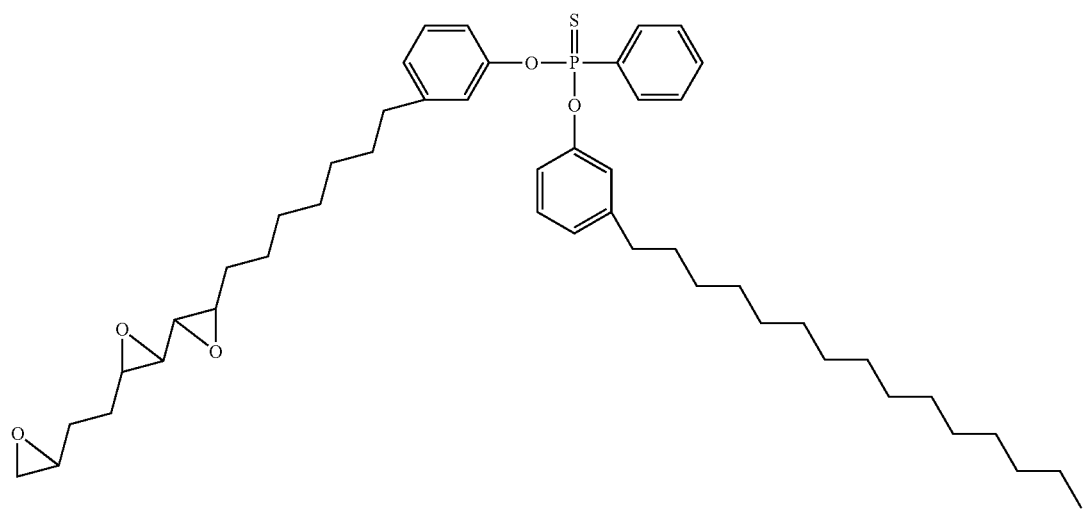
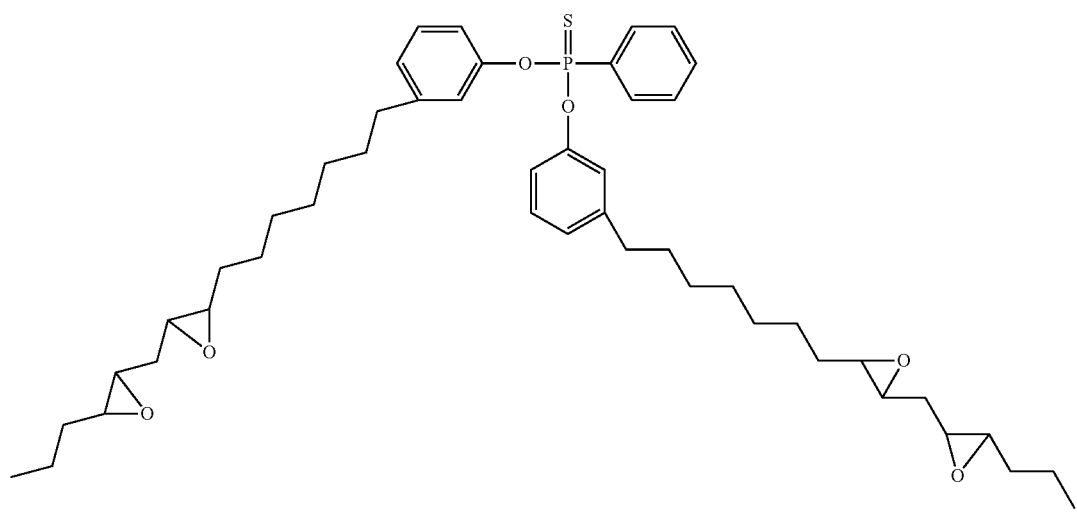

-continued
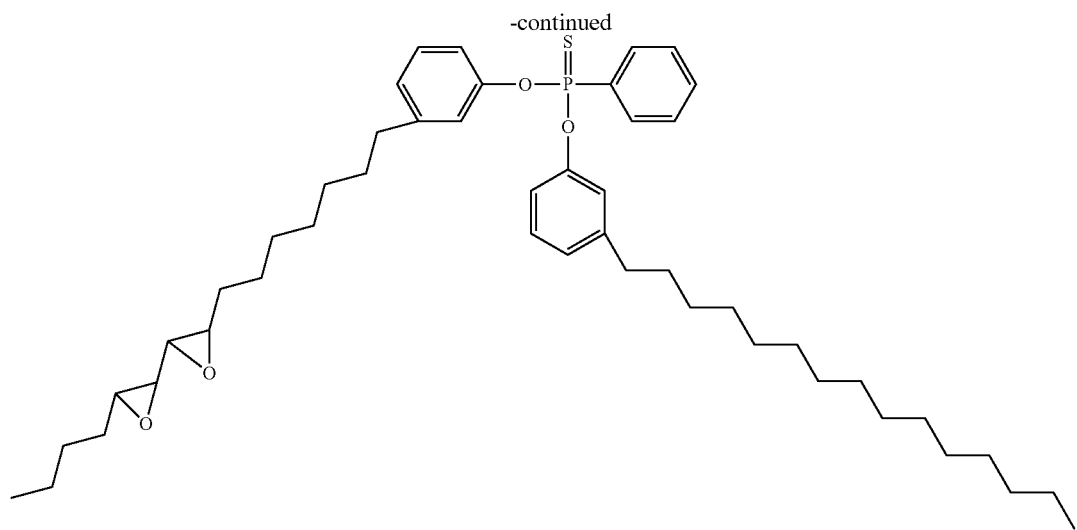
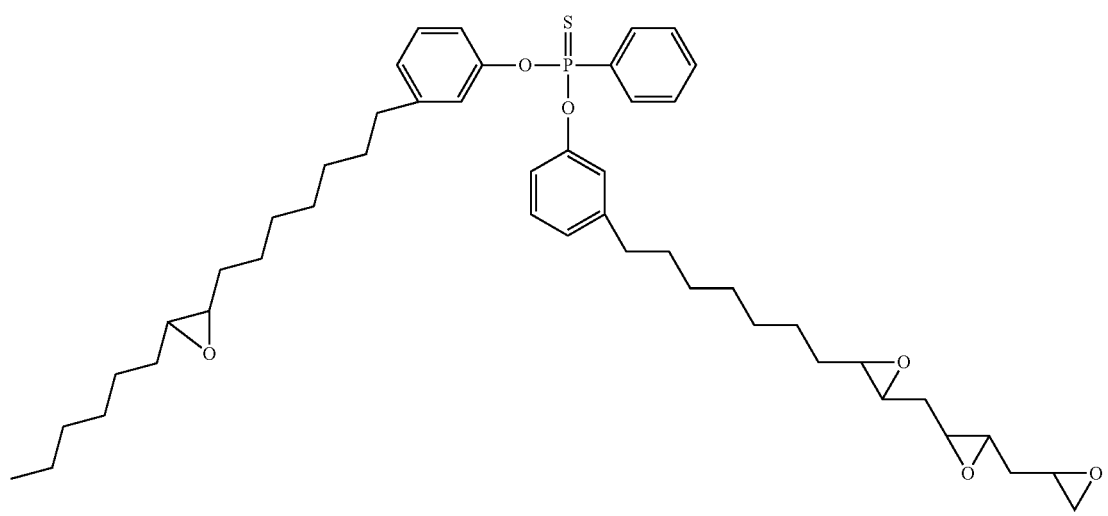
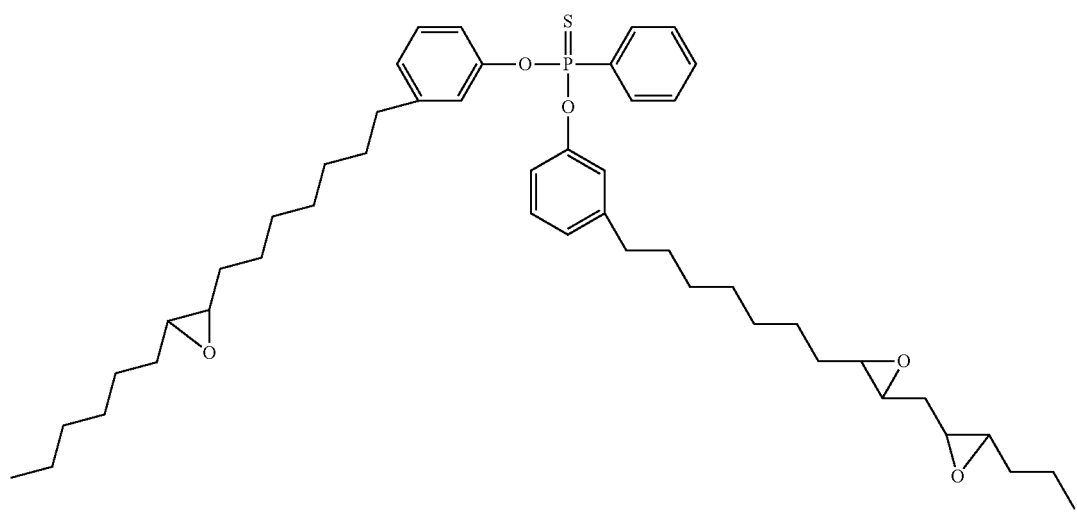

-continued
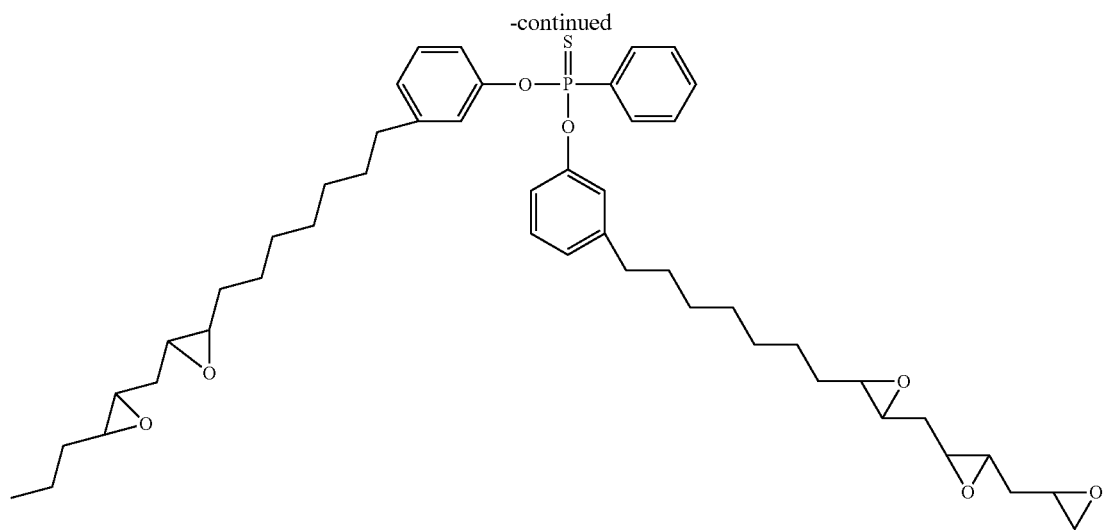
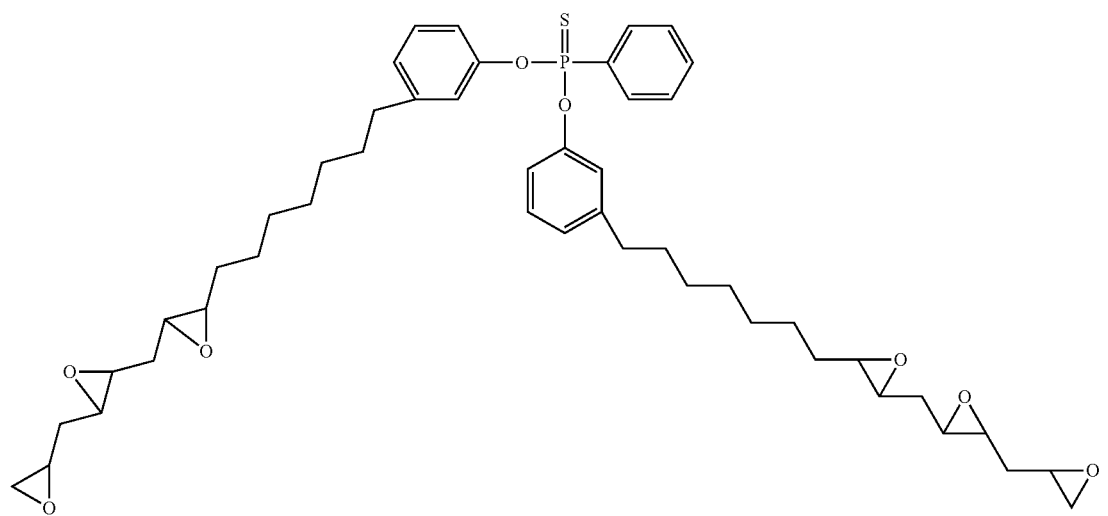
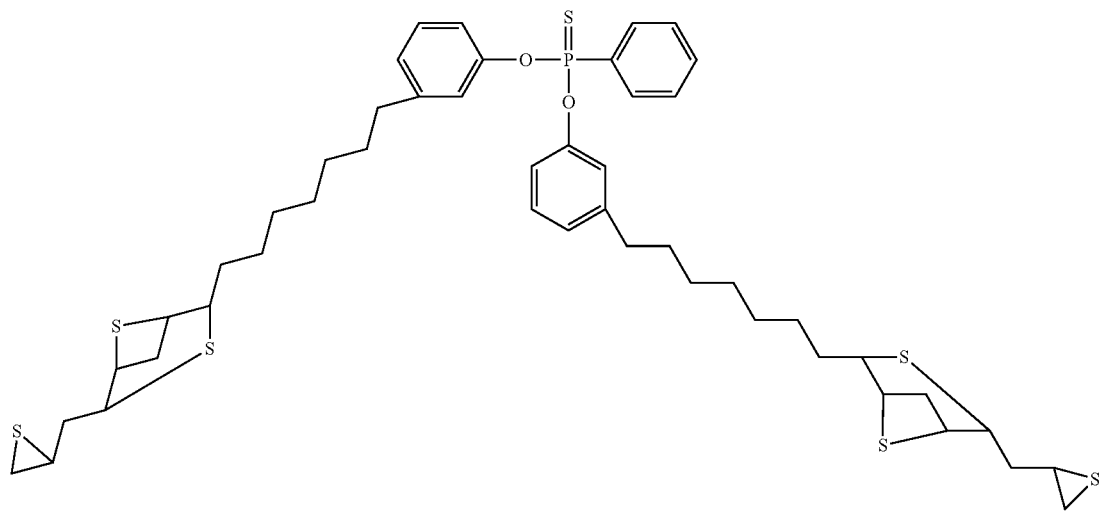

-continued
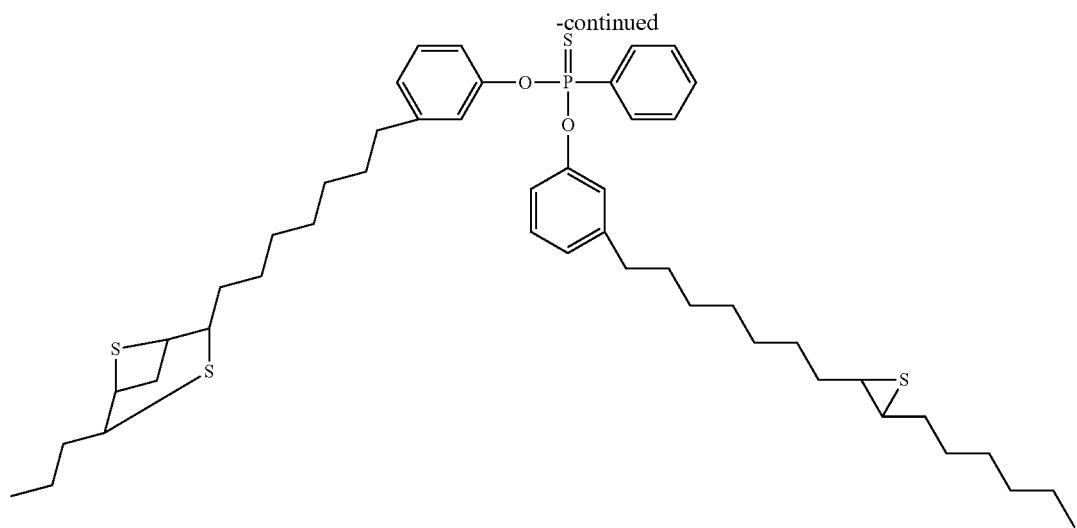
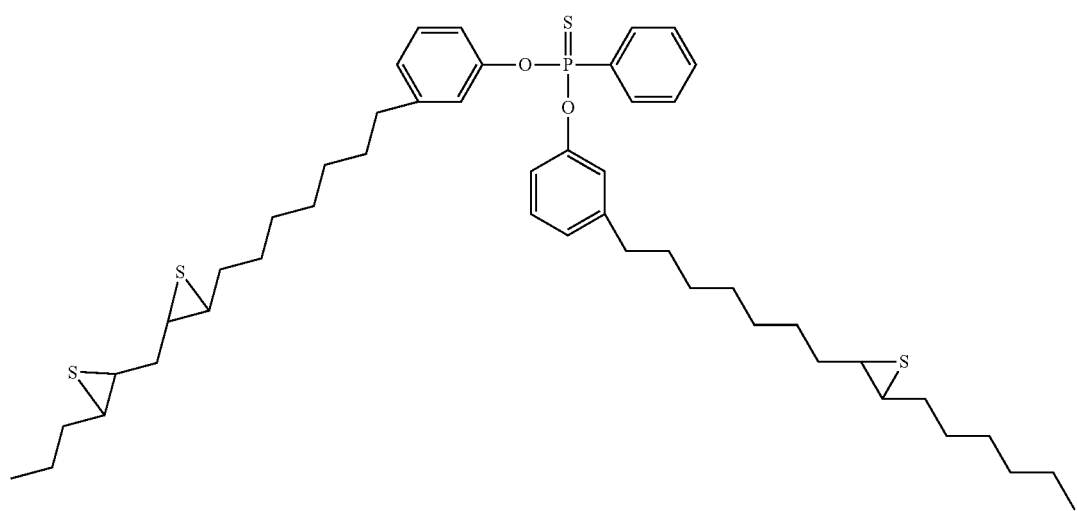
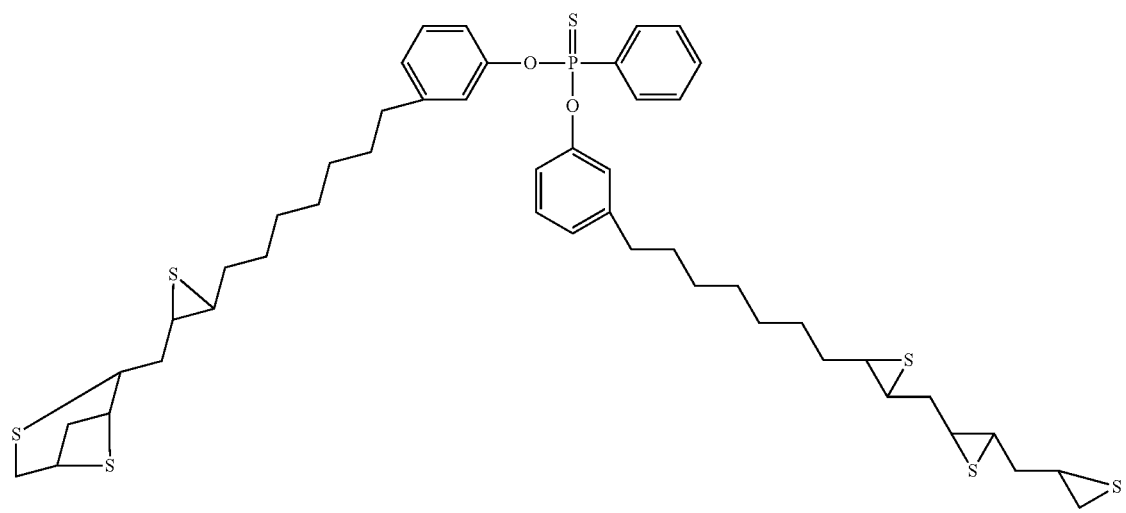

-continued
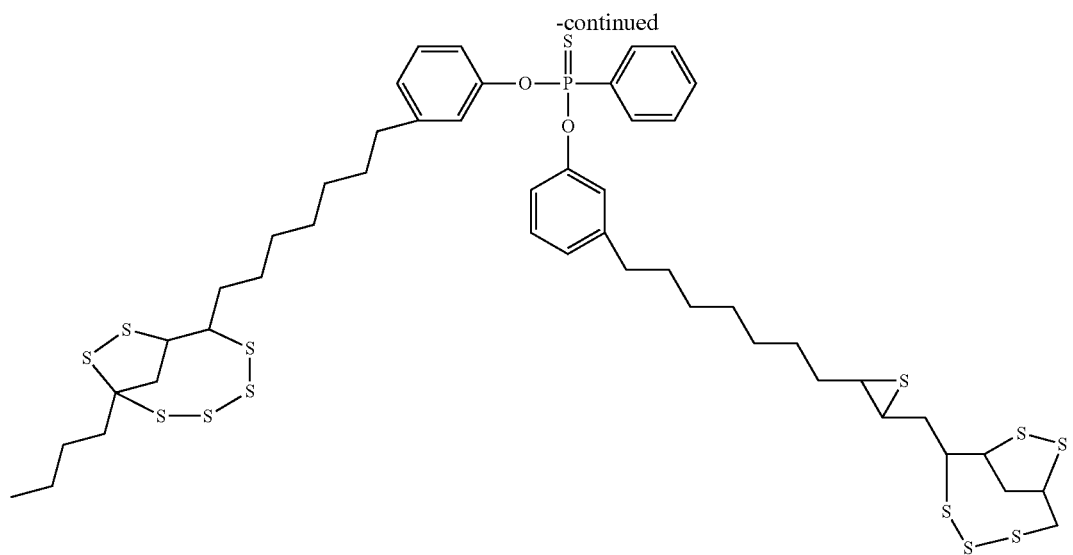
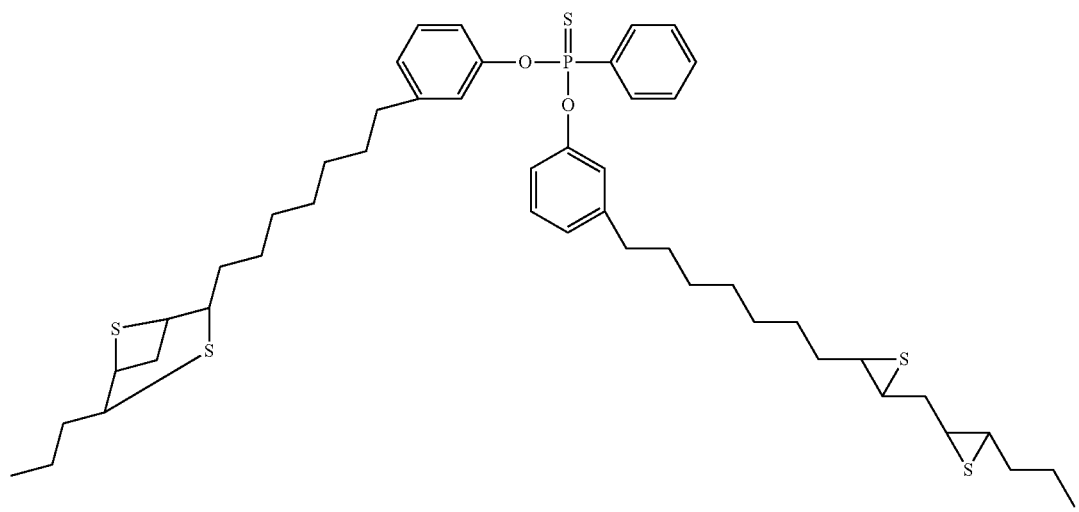
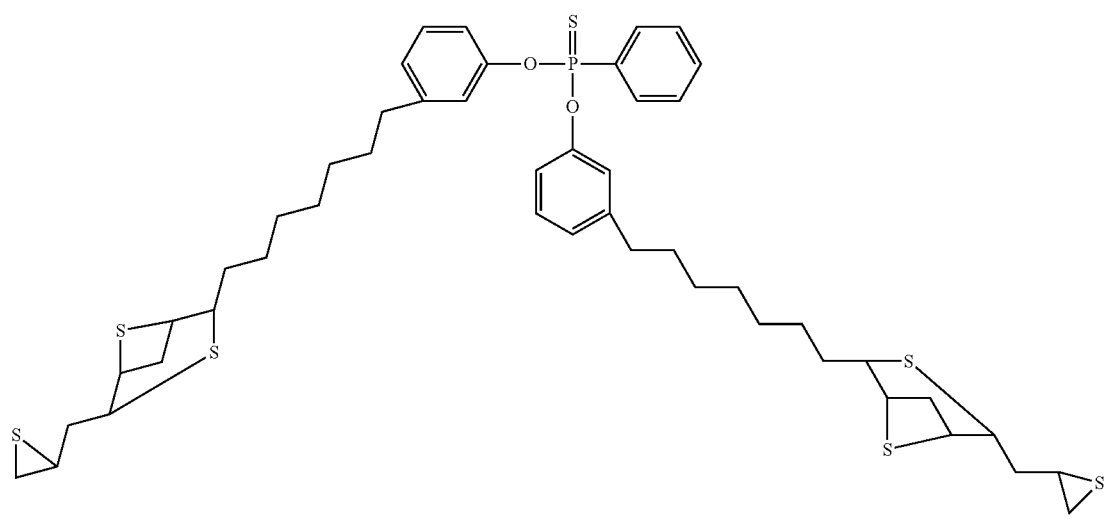

-continued
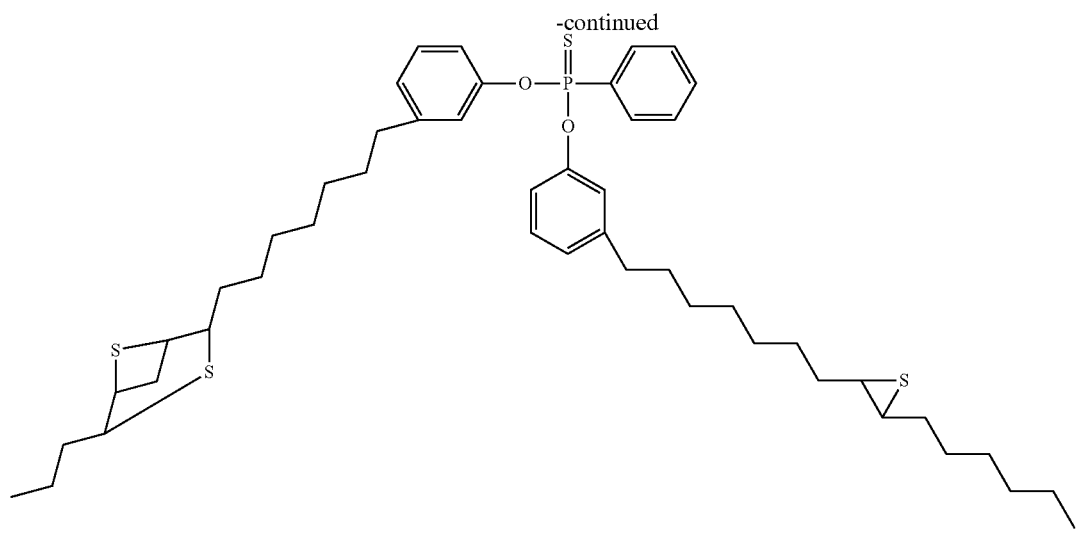
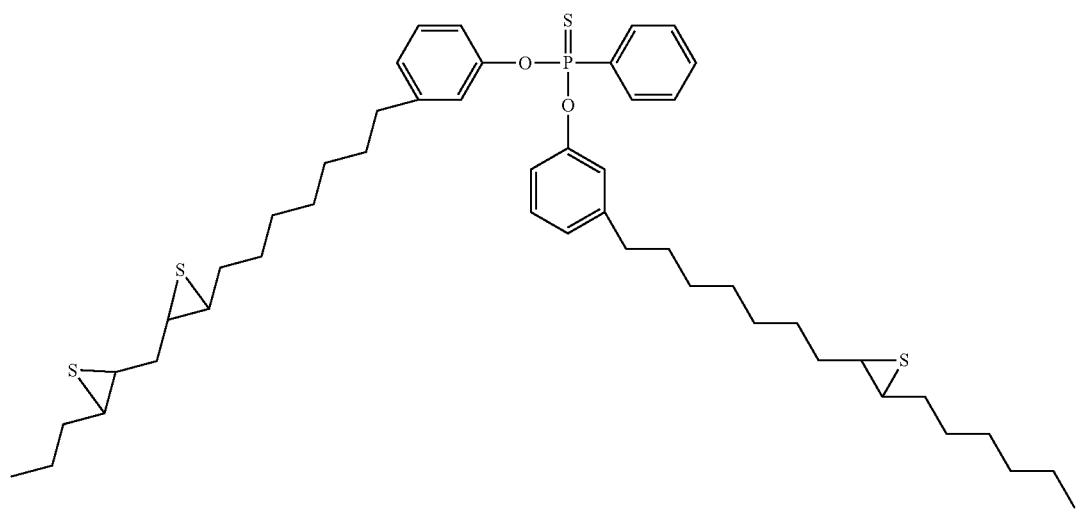
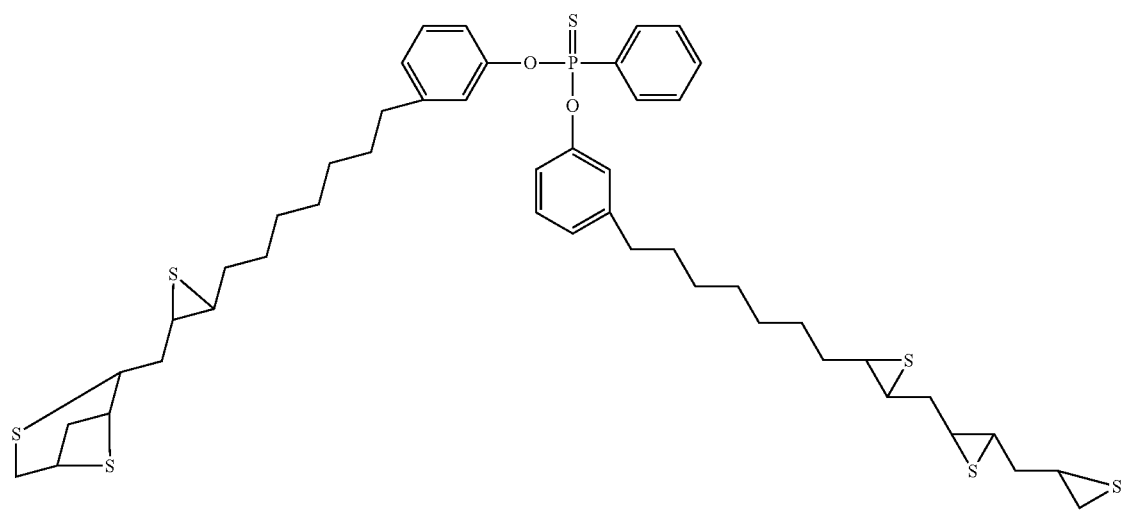

-continued
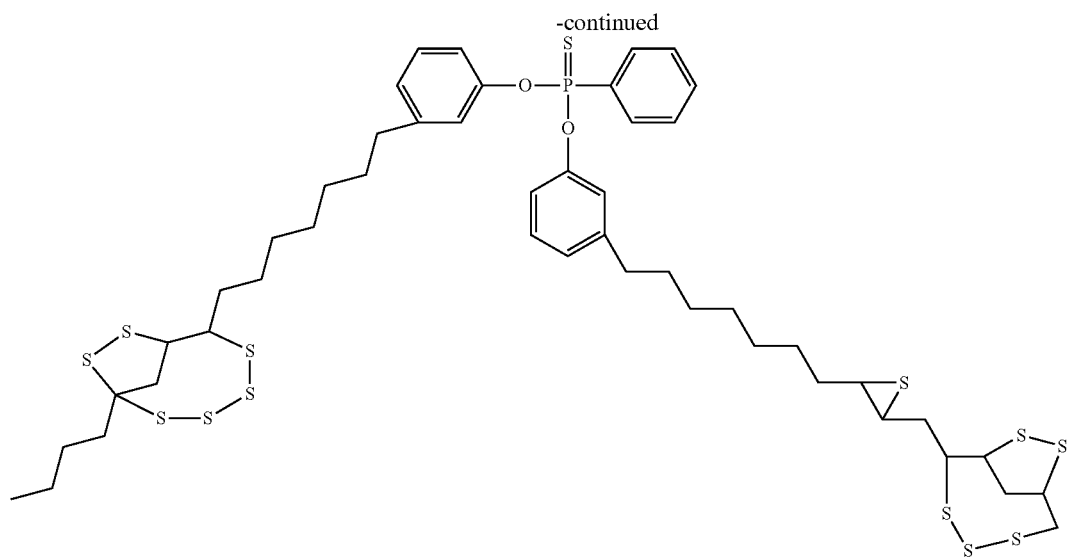
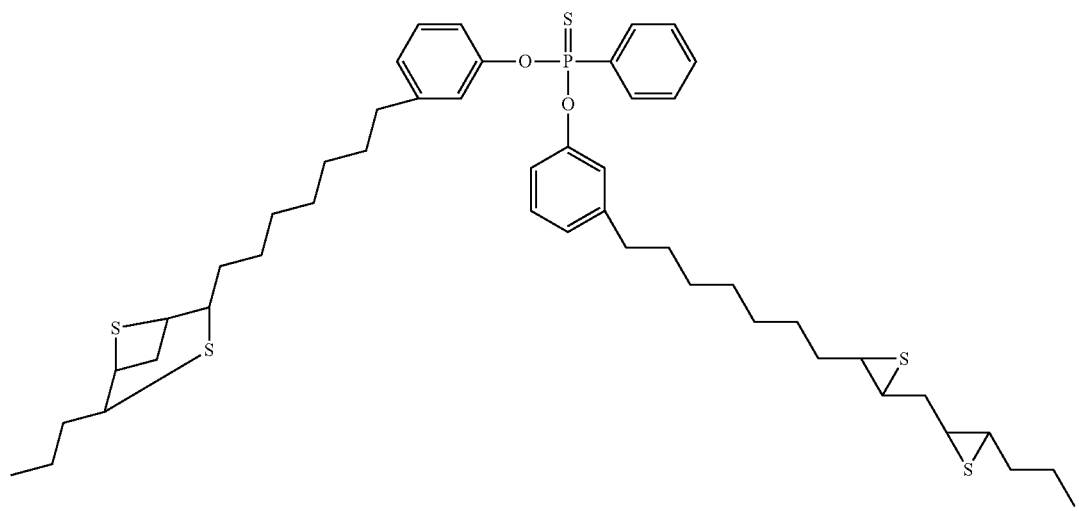
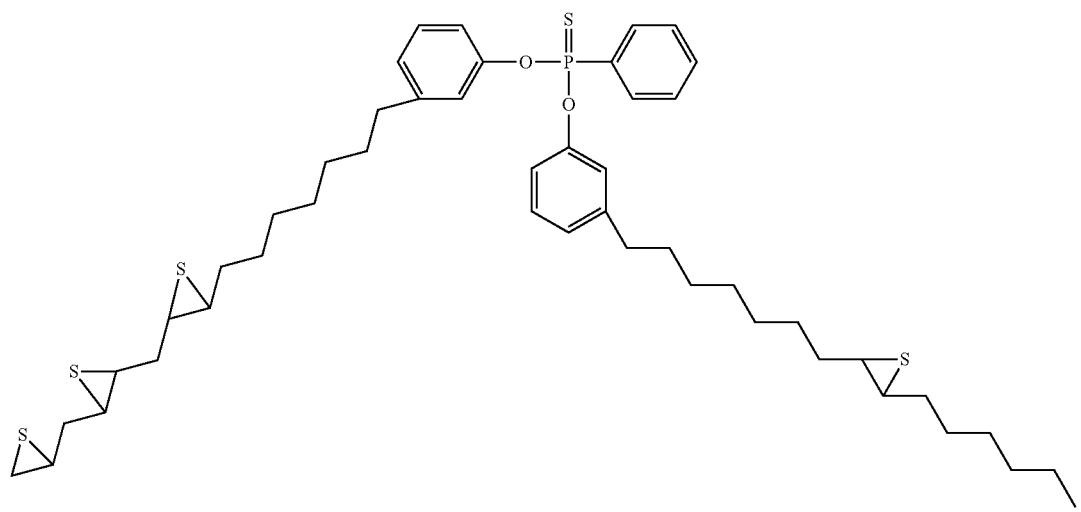

-continued
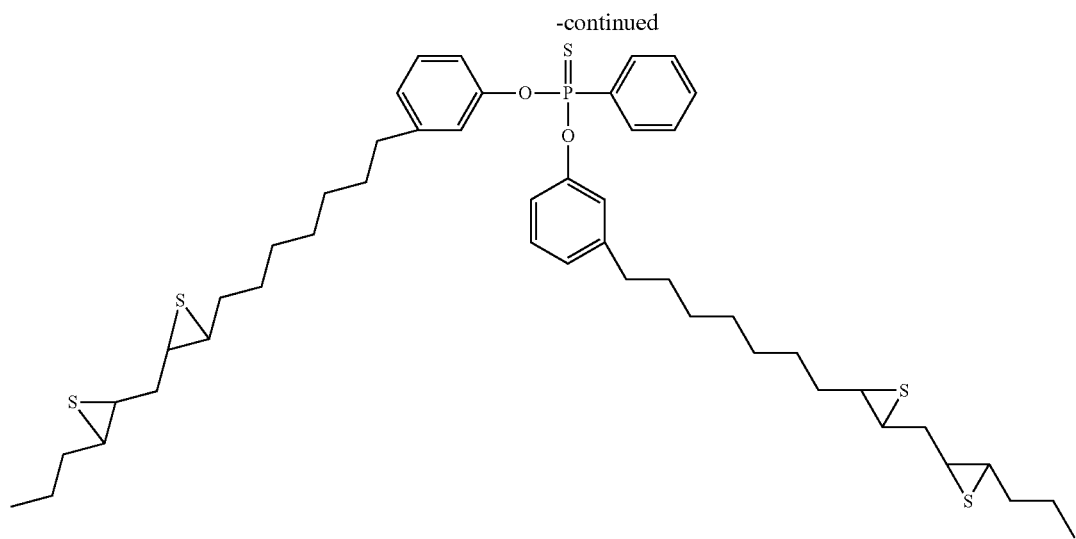
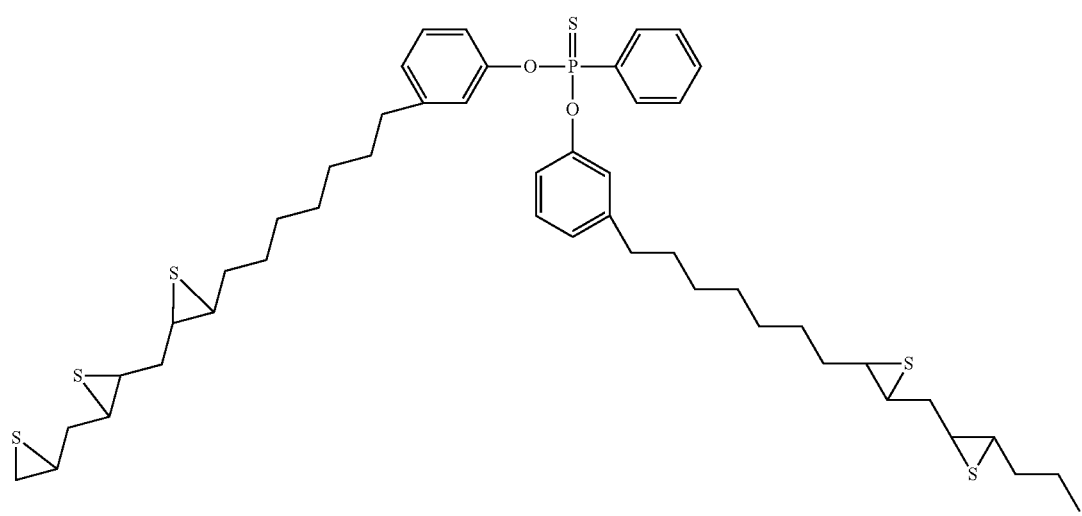
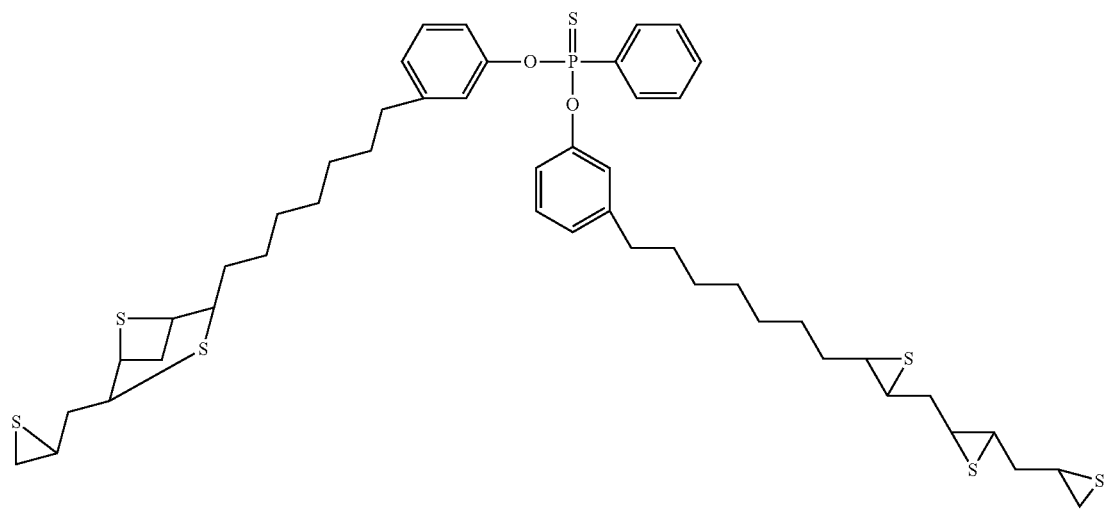

-continued
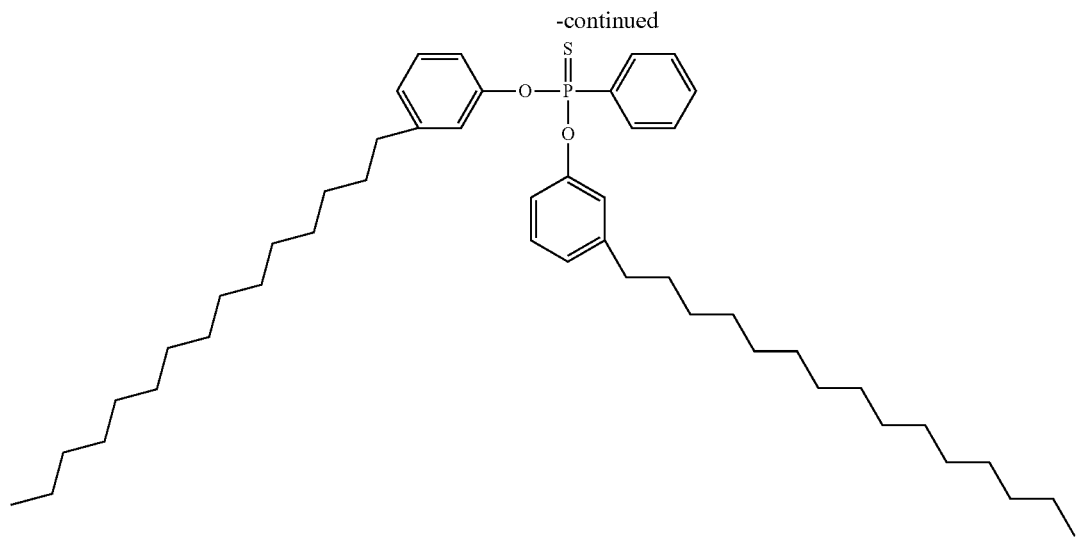
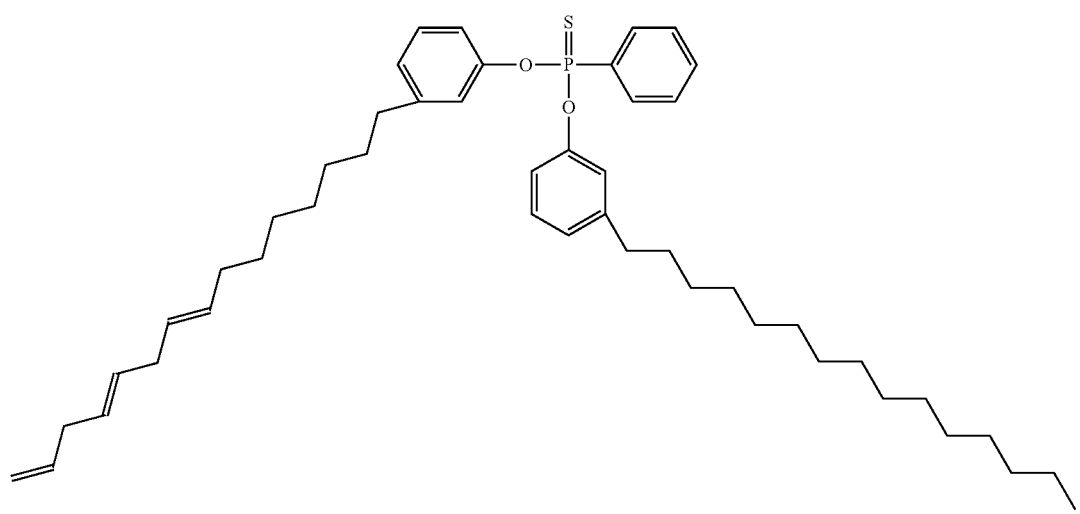
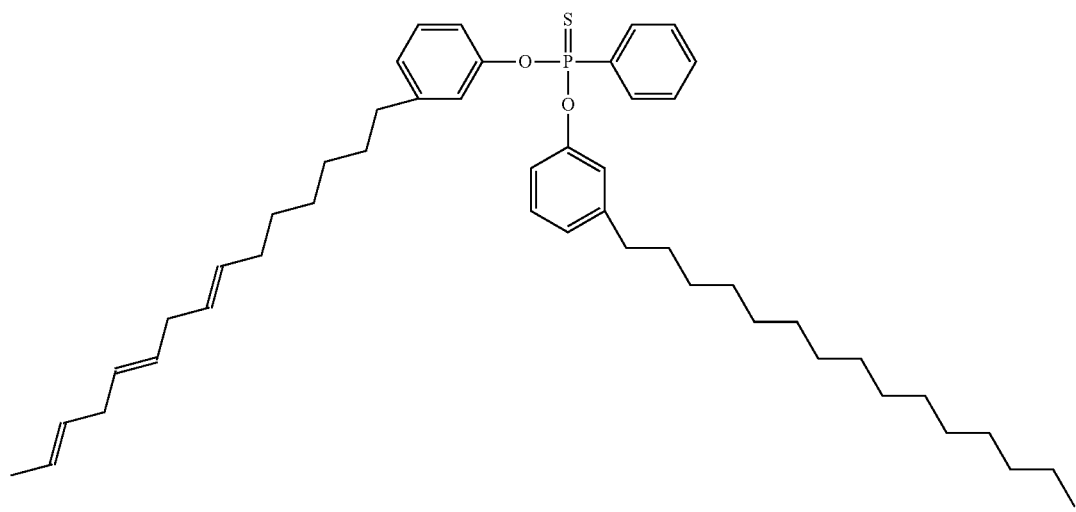

-continued
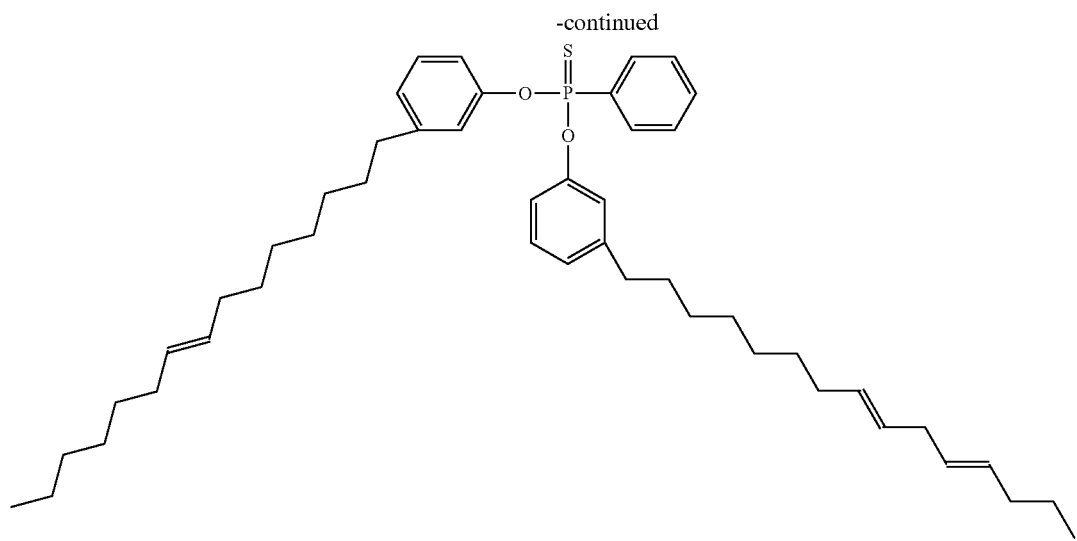
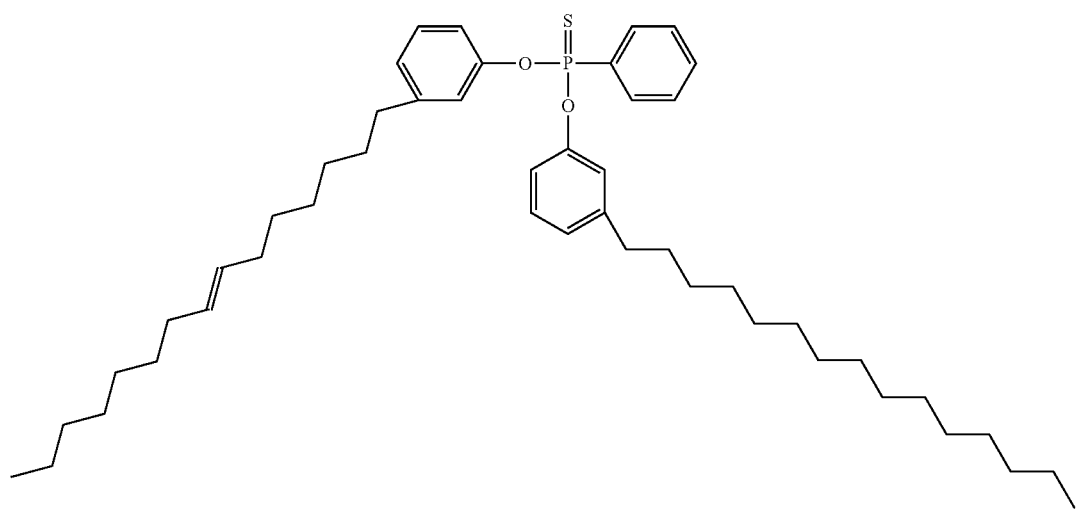
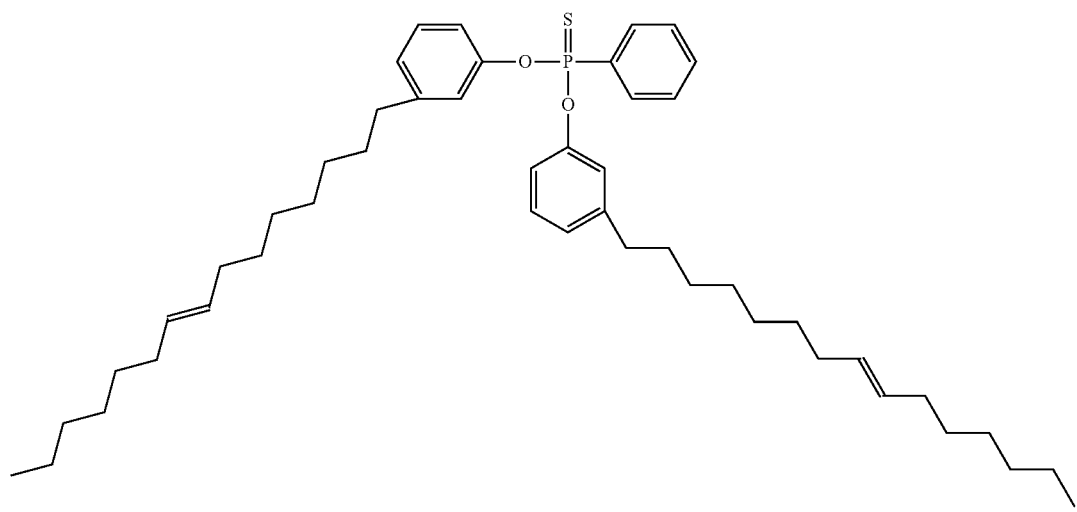

-continued
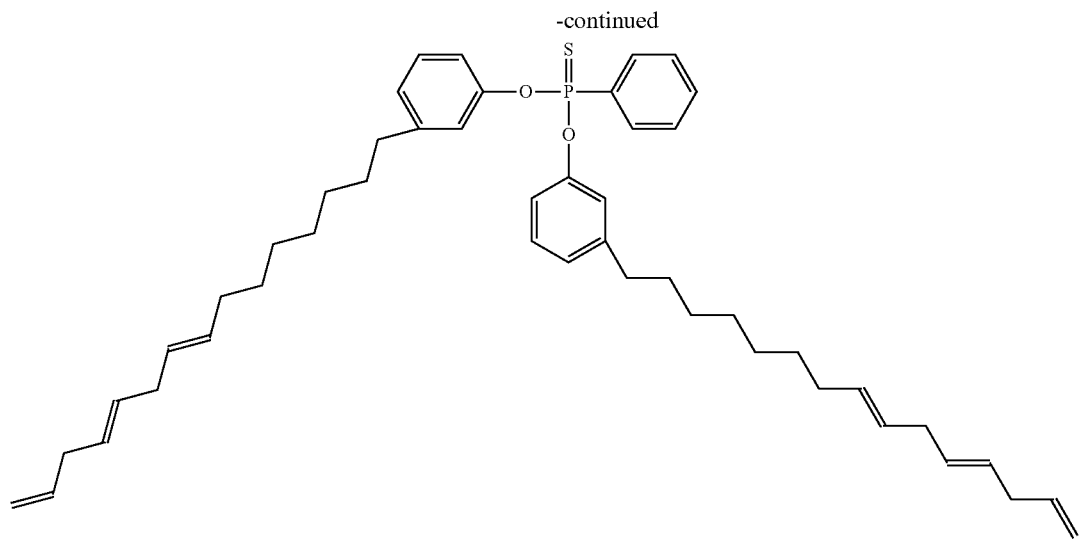
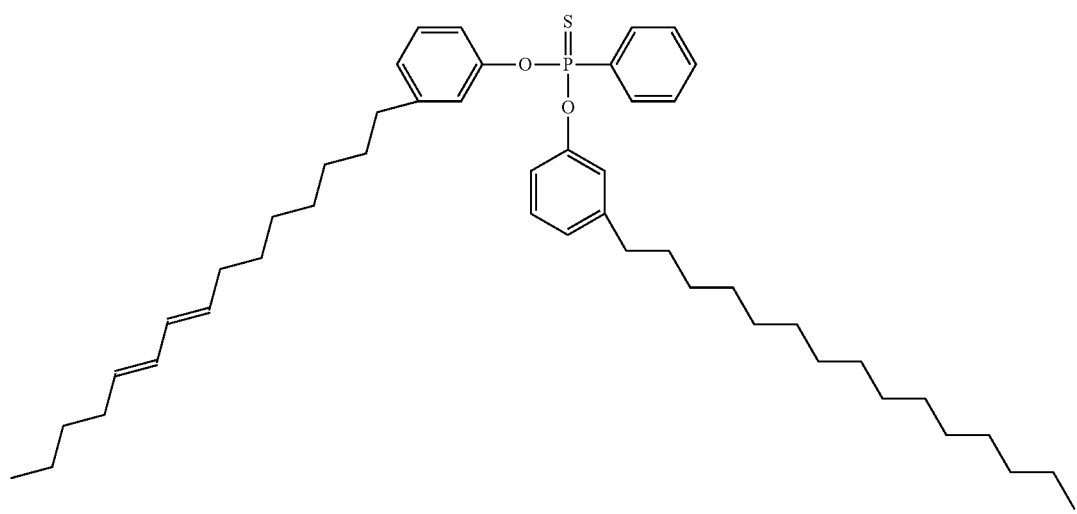
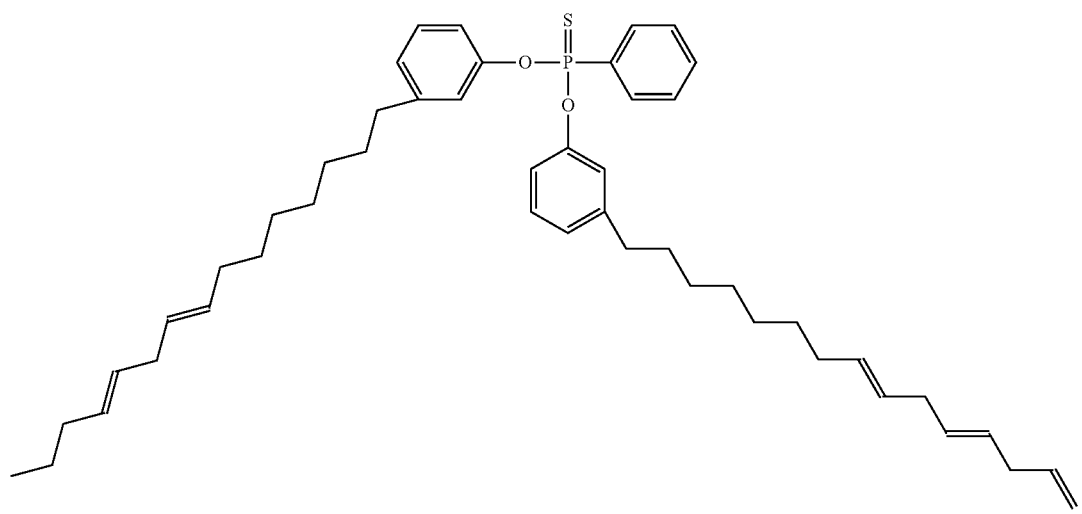

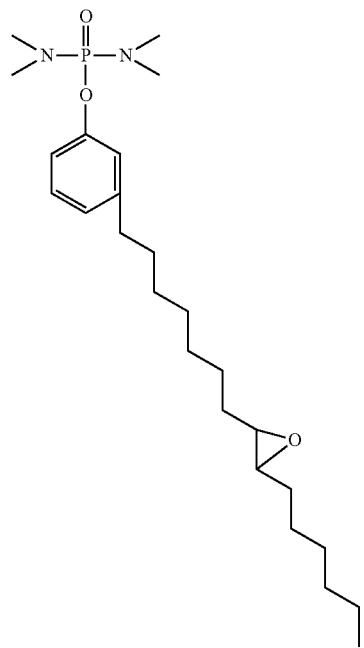
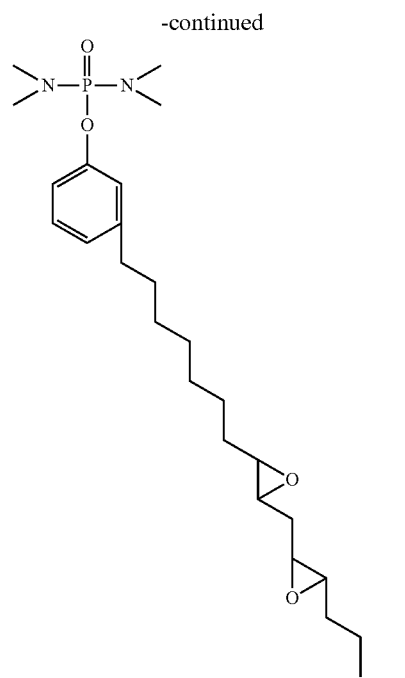
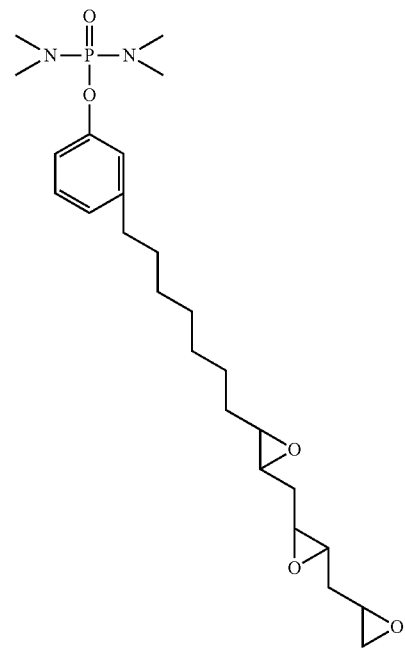
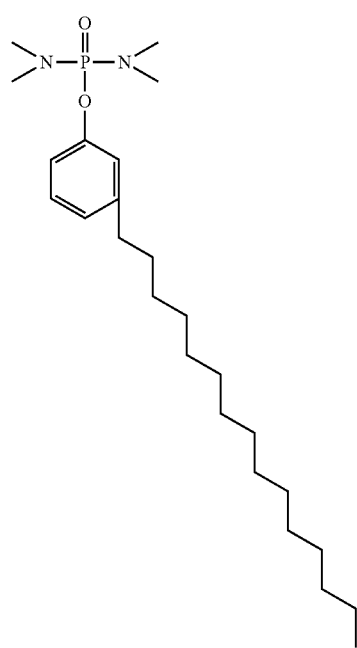 [SMILES: CCCCCCCCCCCCCCCc1cccc(OP(=O)(N(C)C)N(C)C)c1]

31
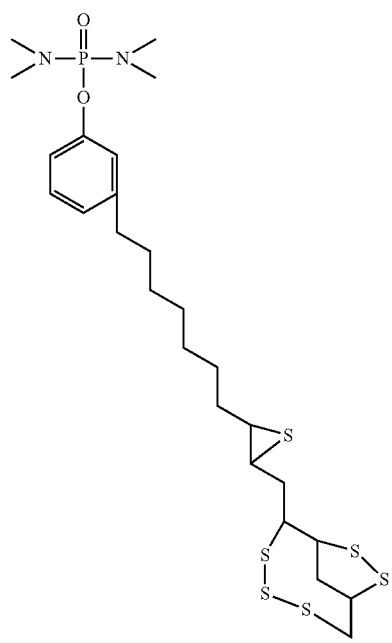
32
-continued
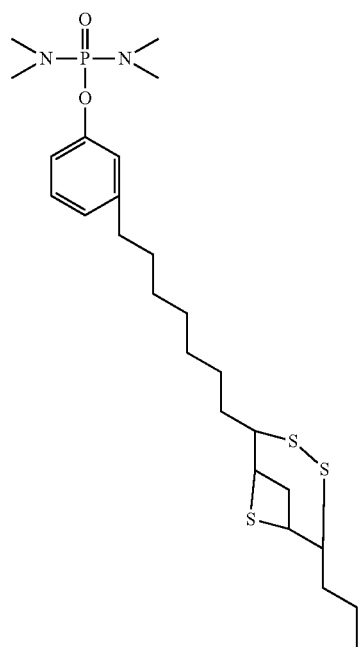
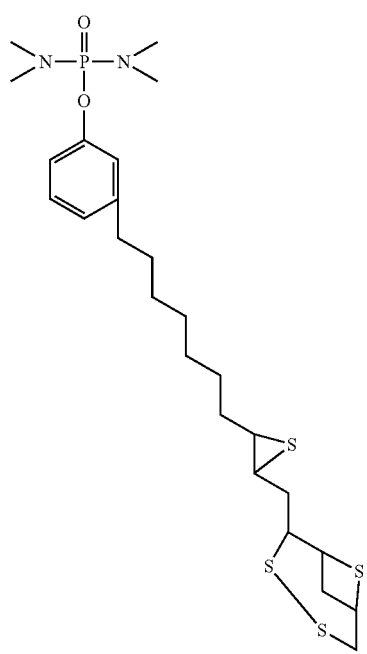
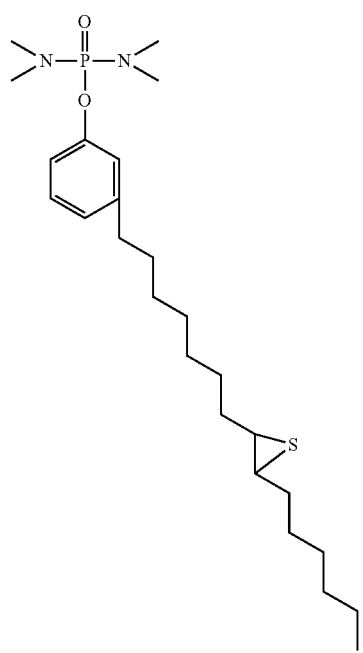

33
-continued
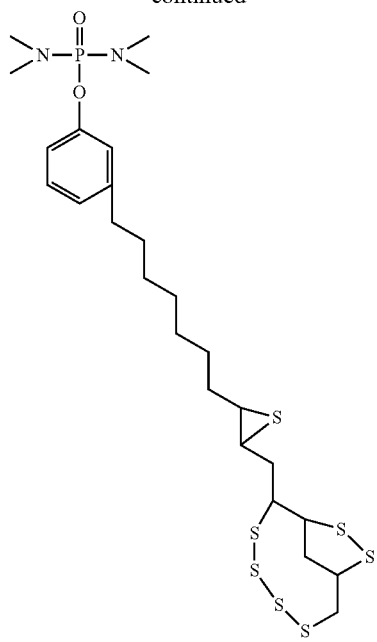
34
-continued
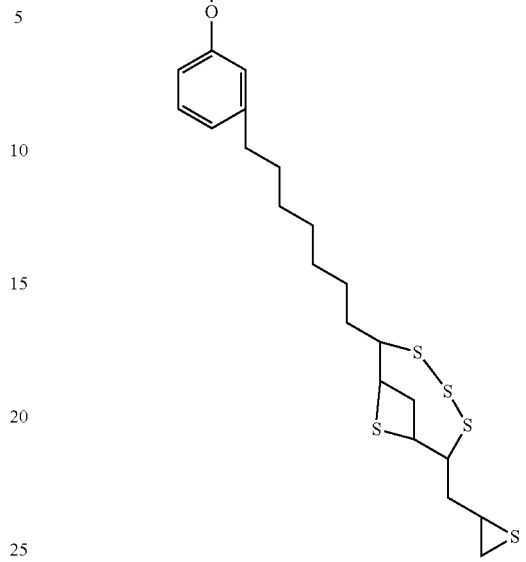
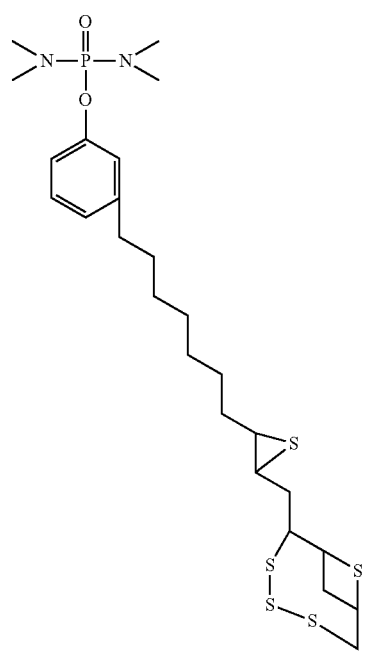
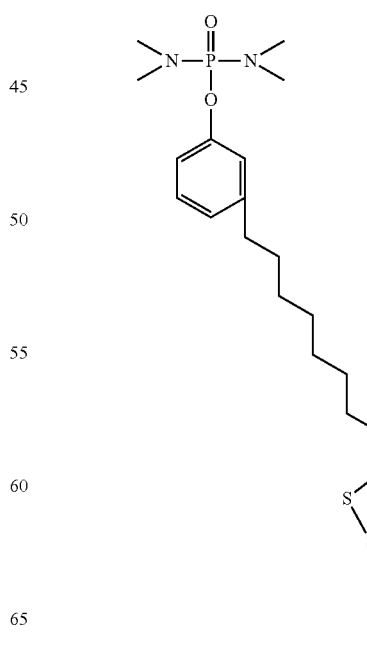

35
-continued
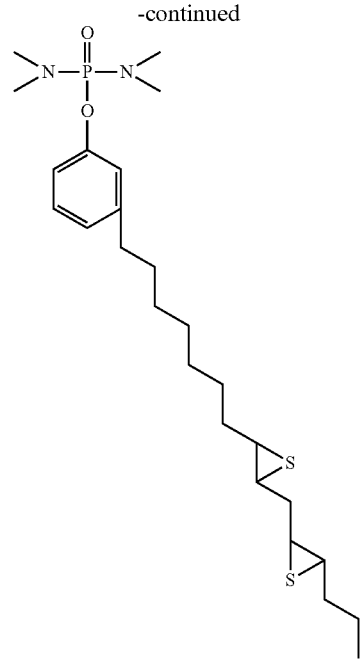
36
-continued
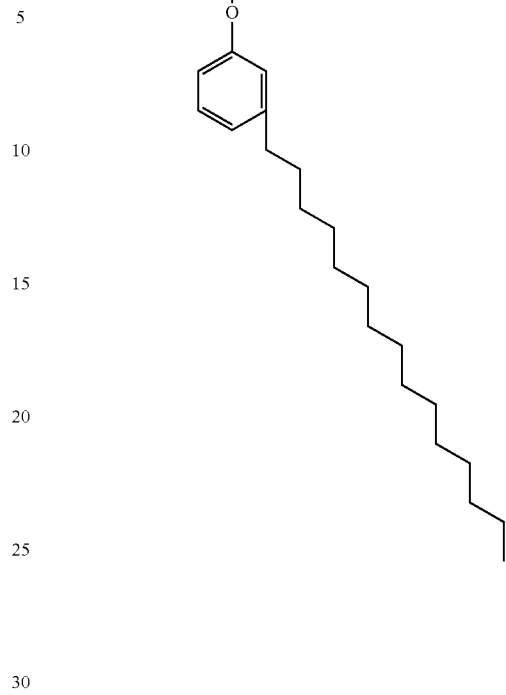
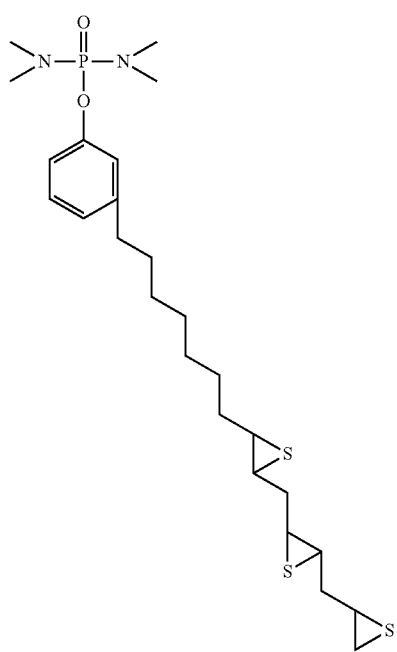

37
-continued
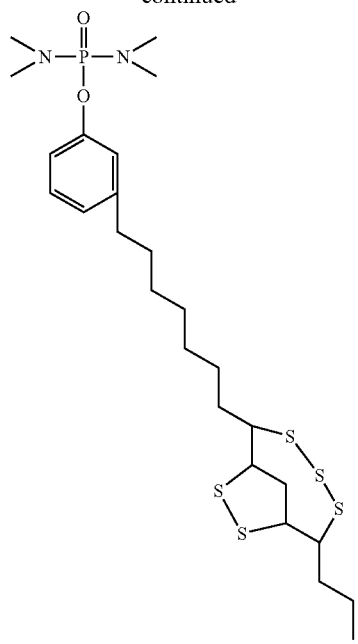
38
-continued
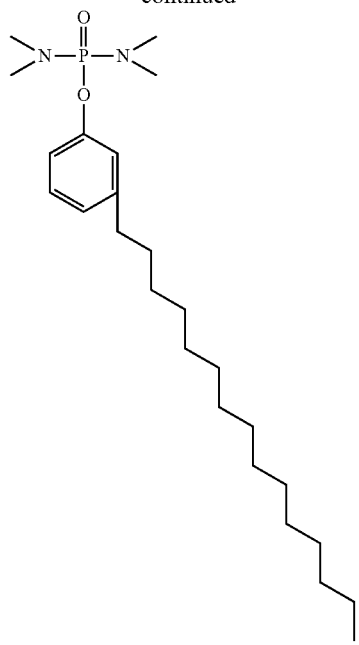
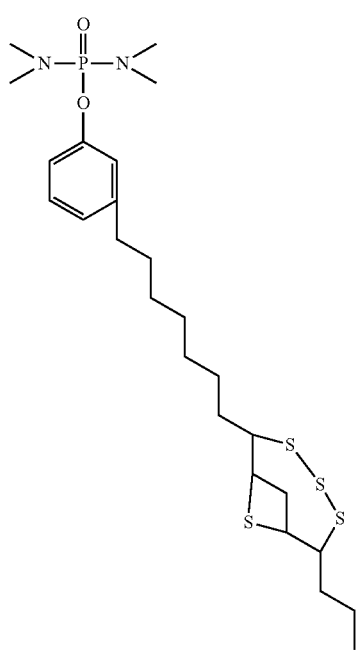
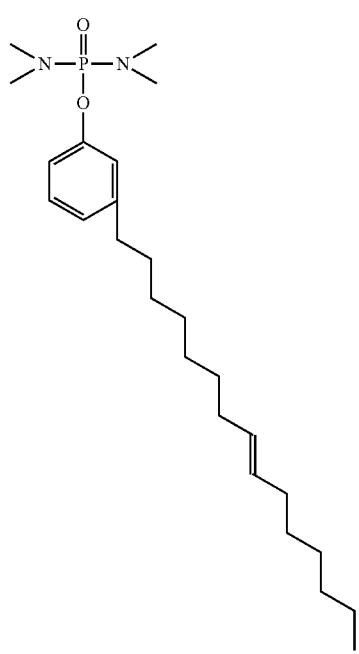

-continued

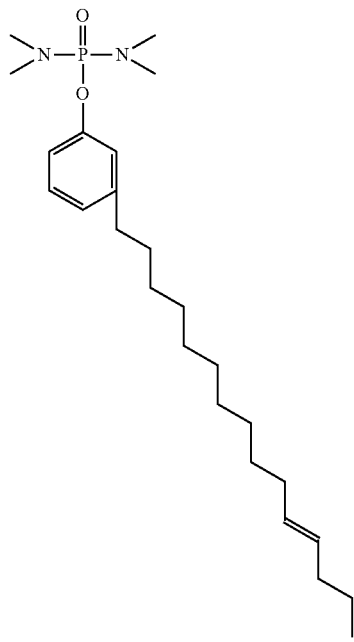

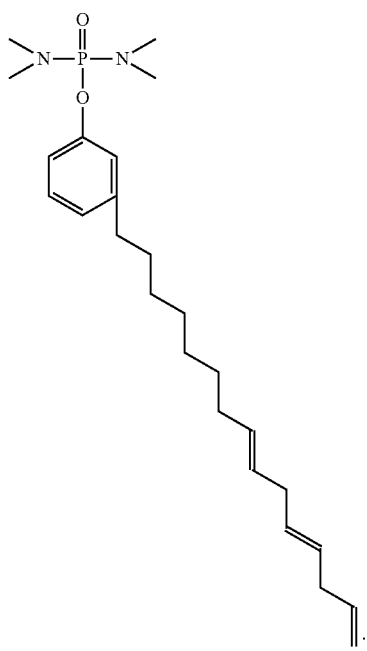

The present invention provides a process for preparing an organophosphorus compound, which comprises the following steps:

Step A of subjecting a phenol compound represented by the general formula (X) to an epoxidation reaction or a sulfurization reaction or an optional hydrogenation reaction; and Step B of reacting the product obtained in step A with a phosphorous compound represented by the general formula (X');

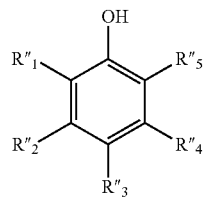

In the general formula (X), groups $R_1''$, $R_2''$, $R_3''$, $R_4''$ and $R_5''$ are, identical to or different from each other, each independently selected from H, $C_1$-$C_{20}$ linear or branched alkyl, $C_1$-$C_{20}$ linear or branched alkoxyl and a group represented by the general formula (Y), wherein at least one group is a group represented by the general formula (Y);

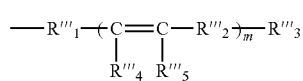

Wherein group $R_1'''$ is selected from single bond and $C_1$-$C_{20}$ linear or branched alkylene (preferably selected from single bond and $C_1$-$C_4$ linear or branched alkylene); groups $R_2'''$ in m repeating units are, identical to or different from each other, each independently selected from single bond and $C_1$-$C_{20}$ linear or branched alkylene (preferably each independently selected from single bond and $C_1$-$C_4$ linear or branched alkylene); group $R_3'''$ is selected from hydrogen and $C_1$-$C_{20}$ linear or branched alkyl (preferably selected from hydrogen and $C_1$-$C_4$ linear or branched alkyl); groups $R_4'''$ in m repeating units are, identical to or different from each other, each independently selected from hydrogen and $C_1$-$C_{20}$ linear or branched alkyl (preferably each independently selected from hydrogen and $C_1$-$C_4$ linear or branched alkyl); groups $R_5'''$ in m repeating units are, identical to or different from each other, each independently selected from hydrogen and $C_1$-$C_{20}$ linear or branched alkyl (preferably each independently selected from hydrogen and $C_1$-$C_4$ linear or branched alkyl); m is a positive integral number (preferably a positive integral number of 1-10, more preferably a positive integral number of 1-3);

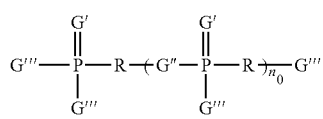

Groups G' present in the general formula (X') are, identical to or different from each other, each independently selected from O, S and $NR_0'$ or absence (the absence of group G' means that P is a tervalent P atom), wherein $R_0'$ is selected from H, $C_6$-$C_{20}$ aryl, $C_1$-$C_{20}$ linear or branched alkyl $C_6$-$C_{20}$ aryl and $C_1$-$C_{30}$ linear or branched alkyl (preferably selected from phenyl, $C_1$-$C_{14}$ alkyl phenyl and $C_1$-$C_{20}$ linear or branched alkyl);

Groups G" present in the general formula (X') are, identical to or different from each other, each independently selected from single bond, O, S and $NR_0'$, wherein $R_0'$ is selected from H, $C_6$-$C_{20}$ aryl, $C_1$-$C_{20}$ linear or branched alkyl $C_6$-$C_{20}$ aryl and $C_1$-$C_{30}$ linear or branched alkyl (preferably selected from phenyl, $C_1$-$C_{14}$ alkyl phenyl and $C_1$-$C_{20}$ linear or branched alkyl);

Groups R in the general formula (X') are independently selected from single bond, $C_1$-$C_{20}$ linear or branched alkylene and $C_6$-$C_{20}$ arylene (preferably selected from single bond, $C_1$-$C_{10}$ linear or branched alkylene, $C_6$-$C_{10}$ arylene);

Groups G''' present in the general formula (X') are, identical to or different from each other, each independently selected from A, —N($R_0'$)$_2$ and $R_Z$; wherein group $R_Z$ is each independently selected from H, $C_1$-$C_{30}$ linear or branched alkyl, $C_1$-$C_{30}$ linear or branched alkoxyl, $C_6$-$C_{20}$ aryl, $C_1$-$C_{20}$ linear or branched alkyl $C_6$-$C_{20}$ aryl (preferably each independently selected from H, $C_1$-$C_{10}$ linear or branched alkyl, $C_1$-$C_{10}$ linear or branched alkoxyl, $C_6$-$C_{10}$ aryl, $C_1$-$C_4$ alkyl phenyl), groups $R_0'$ are each independently selected from H, $C_6$-$C_{20}$ aryl, $C_1$-$C_{20}$ linear or branched alkyl $C_6$-$C_{20}$ aryl and $C_1$-$C_{30}$ linear or branched alkyl (preferably each independently selected from phenyl, $C_1$-$C_{14}$ alkyl phenyl and $C_1$-$C_{20}$ linear or branched alkyl), wherein groups A are each independently selected from F, Cl, Br, I and OH (preferably each independently selected from Cl and Br), wherein at least one group G''' is A;

In the general formula (X'), $n_0$ is an integral number of 0-10, preferably an integral number of 0-5, more preferably 0, 1, 2, 3 or 4.

According to the preparation process of the present invention, in the general formula (X), preferably, groups $R_1''$, $R_3''$ and $R_5''$ are, identical to or different from each other, each independently selected from hydrogen and $C_1$-$C_4$ linear or branched alkyl; groups $R_2''$ and $R_4''$ are, identical to or different from each other, each independently selected from hydrogen, $C_1$-$C_{20}$ linear or branched alkyl and a group represented by the general formula (Y), wherein at least one group is a group represented by the general formula (Y).

According to the preparation process of the present invention, in the general formula (X), further preferably, groups $R_1''$, $R_3''$ and $R_5''$ are, identical to or different from each other, each independently selected from H, methyl, ethyl, propyl, isopropyl, n-butyl, isobutyl and tert-butyl; one group of groups $R_2''$ and $R_4''$ is selected from a group represented by the general formula (Y), the other group is selected from hydrogen.

According to the preparation process of the present invention, the phosphorous compound represented by the general formula (X') is preferably selected from a thiophosphorylating agent and/or a phosphorus-nitridizing agent.

According to the preparation process of the present invention, preferably, the thiophosphorylating agent has a structure as represented by the formula (Z):

(Z)

Wherein $R_Z$ is selected from H, $C_1$-$C_{30}$ linear or branched alkyl, $C_1$-$C_{30}$ linear or branched alkoxyl, $C_6$-$C_{20}$ aryl, $C_1$-$C_{20}$ linear or branched alkyl $C_6$-$C_{20}$ aryl (preferably each independently selected from H, $C_1$-$C_{10}$ linear or branched alkyl, $C_1$-$C_{10}$ linear or branched alkoxyl, $C_6$-$C_{10}$ aryl, $C_1$-$C_{14}$ alkyl phenyl); groups A are each independently selected from F, Cl, Br, I and OH (preferably each independently selected from Cl and Br). According to the prepara- tion process of the present invention, preferably, the phosphorus-nitridizing agent has a structure as represented by the formula (Z'):

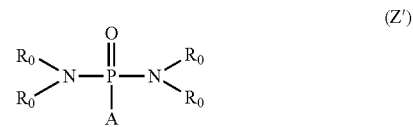

(Z')

Wherein groups $R_0$ are each independently selected from H, $C_6$-$C_{20}$ aryl, $C_1$-$C_{20}$ linear or branched alkyl $C_6$-$C_{20}$ aryl and $C_1$-$C_{30}$ linear or branched alkyl (preferably each independently selected from phenyl, $C_1$-$C_{14}$ alkyl phenyl and $C_1$-$C_{20}$ linear or branched alkyl); group A is each independently selected from F, Cl, Br, I, H and OH (preferably each independently selected from Cl and Br).

According to the preparation process of the present invention, either step A of subjecting the phenol compound represented by the general formula (X) to an epoxidation reaction or a sulfurization reaction or an optional hydrogenation reaction is first performed, and step B of reacting the product of step A with the phosphorous compound represented by the general formula (X') is then performed; or step B of reacting the phenol compound represented by the general formula (X) with the phosphorous compound represented by the general formula (X') is first performed, and step A of subjecting the product of step B to an epoxidation reaction or a sulfurization reaction or an optional hydrogenation reaction is then performed.

Namely, in the present invention, the phenol compound represented by the general formula (X) or the product of the above-mentioned step B may be subjected to an epoxidation reaction, or subjected to a sulfurization reaction, or subjected to an optional hydrogenation reaction. The present invention may include at least one of the above-mentioned reactions. If the optional hydrogenation reaction is included, the hydrogenation reaction will be performed, or the hydrogenation reaction will not be performed, i.e., here the preparation process of the present invention only includes step B.

According to the preparation process of the present invention, the epoxidation reaction is to react a phenol compound represented by the general formula (X) or a product obtained from step B of reacting a phenol compound represented by the general formula (X) with a phosphorous compound represented by the general formula (X') (hereinafter, sometimes also abbreviated as the product of step B) with an epoxidizing agent. The epoxidation reaction is an electrophilic addition reaction of an epoxidizing agent and a carbon-carbon double bond (olefinic bond) to generate an epoxy group. When there is one carbon-carbon double bond in the molecule, a single epoxy group is generated, and when there are two or more carbon-carbon double bonds in the molecule, a single epoxy group and/or two or more epoxy groups can be generated depending on the reaction conditions, the molar ratio of the reactants, and the like, in this case, the generated epoxide can be a mixture of epoxides having the single epoxy group located at different positions, or a mixture of epoxides having different numbers of epoxy groups in the molecule, or a mixture of the above two.

According to the preparation process of the present invention, the sulfurization comprises a step of reacting a phenol compound represented by the general formula (X) or a product obtained from step B of reacting a phenol compound represented by the general formula (X) with a phosphorous compound represented by the general formula (X') (hereinafter, sometimes also abbreviated as the product of step B) with a sulfurizing agent. The epoxidation reaction is an electrophilic addition reaction of a sulfurizing agent and a carbon-carbon double bond (olefinic bond) to generate a thia cyclic group. When there is one carbon-carbon double bond in the molecule, a single sulfur ring group is generated, and when there are two or more carbon-carbon double bonds in the molecule, a single sulfur ring group and/or two or more sulfur ring groups can be generated depending on the reaction conditions, the molar ratio of the reactants, and the like. In this case, the generated cyclic sulfide can be a mixture of cyclic sulfides having the single sulfur ring group located at different positions, or a mixture of cyclic sulfides having different numbers of sulfur ring groups in the molecule, or a mixture of the above two. According to the preparation process of the present invention, the hydrogenation reaction step is an optional step, namely the hydrogenation reaction will be performed, or alternatively the hydrogenation reaction will not be performed. In the case that the hydrogenation reaction is performed, the carbon-carbon double bond in a phenol compound represented by the general formula (X) or a product obtained from step B of reacting a phenol compound represented by the general formula (X) with a phosphorous compound represented by the general formula (X') is hydrogenated, which can be a partial hydrogenation, or alternatively a full hydrogenation. According to the preparation process of the present invention, in case that the hydrogenation reaction step is not performed, the preparation process of the present invention may only comprise step B, namely, the reaction of the phenol compound represented by the general formula (X) with the phosphorous compound represented by the general formula (X').

According to the preparation process of the present invention, preferably, the phosphorous compound represented by the general formula (X') is selected from a thiophosphorylating agent and/or a phosphorus-nitridizing agent. Either step A of subjecting the phenol compound represented by the general formula (X) to an epoxidation reaction or a sulfurization reaction or an optional hydrogenation reaction is first performed, and step B of subjecting the product of step A and a thiophosphorylating agent and/or a phosphorus-nitridizing agent to the thiophosphorylation reaction and/or the phosphorus-nitridation reaction is then performed, or step B of subjecting the phenol compound represented by the general formula (X) and a thiophosphorylating agent and/or a phosphorus-nitridizing agent to the thiophosphorylation reaction and/or the phosphorus-nitridation reaction is first performed, step A of subjecting the product of step B to an epoxidation reaction or a sulfurization reaction or an optional hydrogenation reaction is then performed.

The phenol compound represented by the general formula (X) of the present invention is preferably derived from cardanol in the cashew nut shell liquid as the natural plant product, which has a structure of:

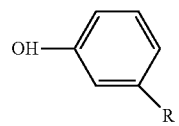

Wherein, R is $C_{15}H_{(31+x)}$, x is 0, −2, −4 or −6. In an embodiment of the present invention, the long chain of R is free of unsaturated double bond. In an embodiment of the present invention, the long chain of R contains one unsaturated double bond. In an embodiment of the present invention, the long chain of R contains two unsaturated double bonds. In an embodiment of the present invention, the long chain of R contains three unsaturated double bonds.

The organophosphorus compound of the present invention can be used as extreme pressure antiwear additive. The organophosphorus compound of the present invention can be used in lubricating oil and lubricating grease. The lubricating oil of the present invention comprises a base oil and the above organophosphorus compound of the present invention. The lubricating grease of the present invention comprises a base oil and the above organophosphorus compound of the present invention.

Invention Effect

The process for preparing the organophosphorus compound of the present invention is simple and easy to be operated, and has high product yield with high purity. In addition, cardanol can be used as raw material in the present invention, and it is a green raw material and easy to be obtained.

In addition, the organophosphorus compound with a specific structure of the present invention has prominent bearing capacity and excellent antiwear and antifriction performances.

DETAILED DESCRIPTION

Figure 1:
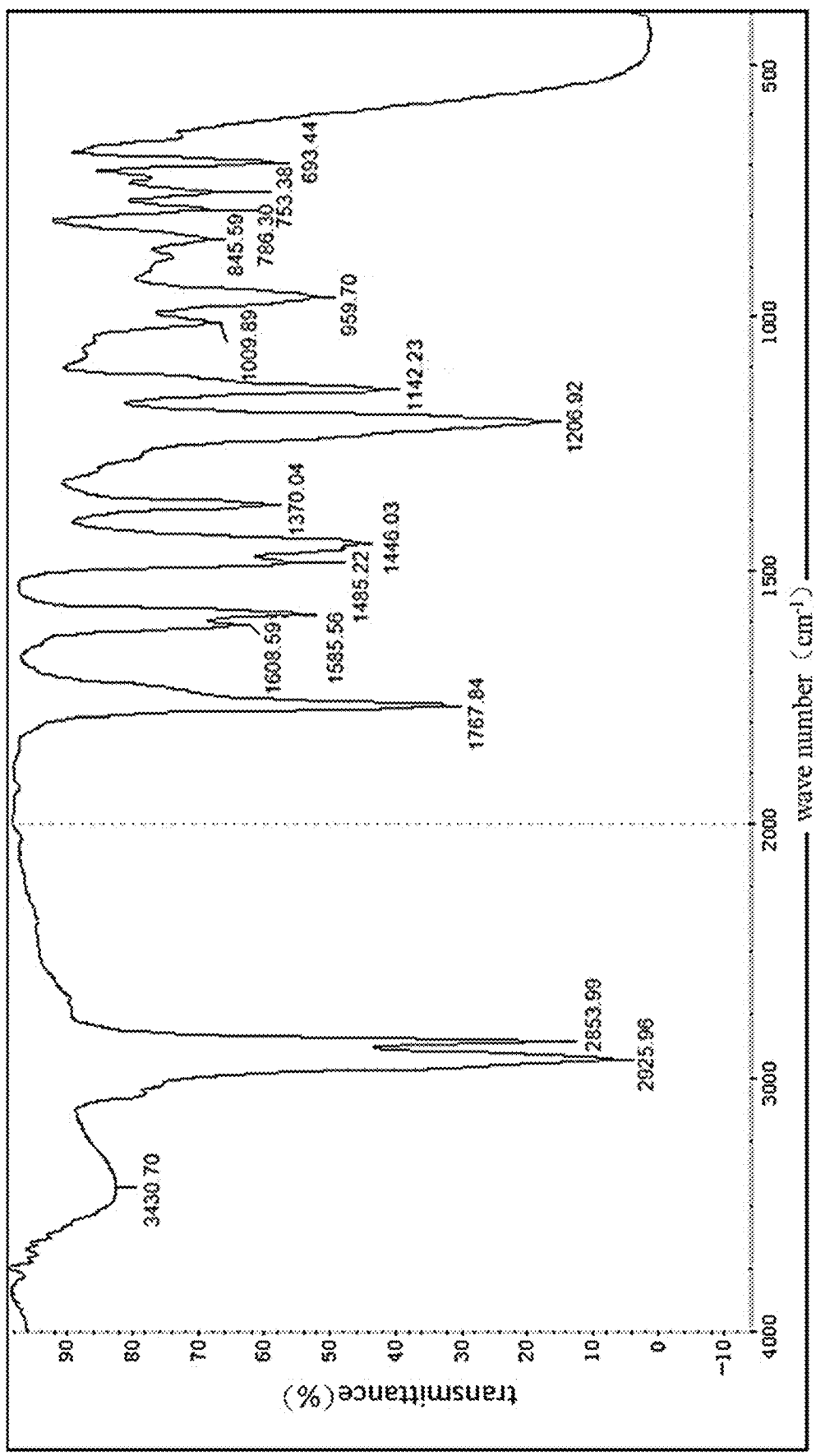
FIG. 1 is the infrared spectrum of the product of Example 1-3.

Hereinafter, the present invention is further illustrated in combination with the examples, but is not limited thereby. That is, the scope of the present invention is not to be limited by these specific embodiments, but rather by the claims appended hereto.

All publications, patent applications, patents, and other references mentioned in this specification are herein incorporated by reference in their entirety. Unless defined otherwise, all technical and scientific terms used herein have the same meanings as commonly understood by those skilled in the art to which this invention belongs. In case of conflict, the present specification, including definitions, will control.

When the specification derives a material, a substance, a process, a step, a device, an element and the like with the expression such as "known to those skilled in the art", "well known in the art", "prior art", or a synonym thereof, it is intended that the objects derived by such a prefix encompasses those having been conventionally used in the art at the time of filing this application, but also includes those which may not be so commonly used at the present time, but will become known in the art as being suitable for a similar purpose.

In the context of this specification, except for what is explicitly stated, any item or matter not mentioned is directly applicable to those known in the art without any changes.

Moreover, any of the embodiments described herein can be freely combined with one or more other embodiments described herein, and the resulting technical solutions or technical ideas are regarded as part of the original disclosure or the original record of the present invention, and should not be regarded as new content that has not been disclosed or anticipated in this specification, unless those skilled in the art believe that the combination is obviously unreasonable.

In the absence of an explicit indication, all percentages, parts, ratios and the like mentioned in this specification are based on the weight, unless the basis on the weight is not consistent with the conventional knowledge of those skilled in the art.

In practicing or testing the present invention, methods and materials similar or equivalent to those described herein can be used, but applicable methods and materials have been described herein.

In this specification, the term "single bond" is sometimes used in the definition of a group. The so-called "single bond" means that the group does not exist. For example, assuming the structural formula -CH$_2$-A-CH$_3$, where group A is defined to be selected from single bond and methyl. In view of this, if A is a single bond, it means that group A does not exist, and the structural formula is correspondingly simplified to —CH$_2$—CH$_3$.

In the context of the present specification, the expression "number+valence+group" or similar terms refers to a group obtained by removing an amount represented by the number of hydrogen atoms from a basic structure (chain, ring or combination thereof and the like) to which the group corresponds, and preferably refers to a group obtained by removing an amount represented by the number of hydrogen atoms attached to the carbon atoms contained in the structure (preferably saturated carbon atoms and/or different carbon atoms). For example, "trivalent linear or branched alkyl" refers to a group obtained by removing three hydrogen atoms from the linear or branched alkane (namely the basic structure to which the linear or branched alkyl corresponds), and "divalent linear or branched heteroalkyl" then refers to a group obtained by removing two hydrogen atoms from the linear or branched hetero alkane (preferably removing the hydrogen atoms attached to the carbon atoms contained in the hetero alkane, or further, removing the hydrogen atoms attached to different carbon atoms).

For example, divalent propyl can be

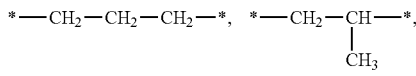

trivalent propyl can be

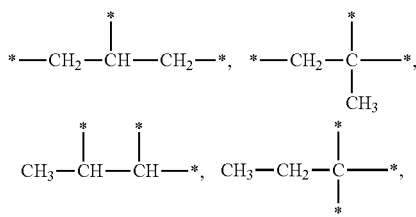

tetravalent propyl can be

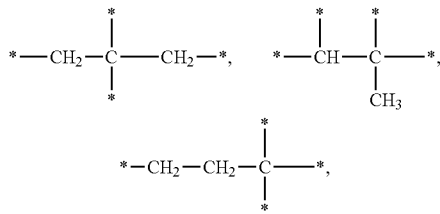

wherein * represents the attachment end that can be bonded to the other moiety in this group.

In the context of the present invention, the linear or branched hydrocarbyl can be a linear or branched alkyl, or a linear or branched alkenyl containing one or more (for example 1-5, 1-4, 1-3, 1-2) carbon-carbon double bonds, or a linear or branched alkynyl containing one or more (for example 1-5, 1-4, 1-3, 1-2) carbon-carbon triple bonds, or a linear or branched hydrocarbyl containing one or more (for example 1-5, 1-4, 1-3, 1-2) carbon-carbon double bonds and carbon-carbon triple bond.

In the context of the present specification, the alkyl group represents a group obtained by removing one hydrogen atom from the alkane without violating the valence, and preferably a group obtained by removing one hydrogen atom attached to one terminal carbon atom from the alkane. In the present invention, the alkyl can be $C_1$-$C_{300}$ linear or branched alkyl, $C_1$-$C_{30}$ linear or branched alkyl, $C_1$-$C_{20}$ linear or branched alkyl, $C_1$-$C_{10}$ linear or branched alkyl, $C_1$-$C_6$ linear or branched alkyl, $C_1$-$C_4$ linear or branched alkyl. As the specific examples of these alkyl groups, methyl, ethyl, propyl, isopropyl, butyl, sec-butyl, tert-butyl, pentyl, isopentyl, hexyl, heptyl, octyl, nonyl, decyl, undecyl, dodecyl, tridecyl, tetradecyl, pentadecyl, hexadecyl and isomers thereof, and the like can be enumerated, but not limited thereto.

In the context of the present specification, the alkylene group represents a group obtained by removing two hydrogen atoms from the alkane without violating the valence, and preferably a group obtained by removing each one hydrogen atom attached to two different carbon atoms, and more preferably a group obtained by removing each one hydrogen atom attached to two terminal carbon atoms from the alkane. In the present invention, the alkylene can be $C_1$-$C_{20}$ linear or branched alkylene, $C_1$-$C_{10}$ linear or branched alkylene, $C_1$-$C_6$ linear or branched alkylene, $C_1$-$C_4$ linear or branched alkylene, $C_1$-$C_3$ linear or branched alkylene. As the specific example of these alkyl groups, the groups obtained by further removing one hydrogen atom from the groups of the specific examples of the above-mentioned alkyl group can be enumerated, but not limited thereto. In the context of the present specification, the aryl group means a group obtained by removing one hydrogen atom from the aromatic hydrocarbon without violating the valence. The aryl of the present invention can be $C_6$-$C_{20}$ aryl, $C_6$-$C_{16}$ aryl, $C_6$-$C_{10}$ aryl. As the specific examples of these aryl groups, phenyl, biphenyl, naphthyl, fluorenyl, phenanthryl, anthryl, and the like can be enumerated, but not limited thereto.

In the context of the present specification, the arylene group means a group obtained by removing two hydrogen atoms from the aromatic hydrocarbon without violating the valence. The arylene of the present invention can be $C_6$-$C_{20}$ arylene, $C_6$-$C_{16}$ arylene, $C_6$-$C_{10}$ arylene. As the specific example of these arylene groups, phenylene, biphenylene, naphthylidene, fluorenylidene, phenanthrylene, anthrylene, and the like, may be enumerated, but not limited thereto.

In the context of the present specification, the alkylaryl (arylalkyl) group means a group obtained by removing one hydrogen atom from the alkyl aromatic hydrocarbon without violating the valence. It can be a group obtained by removing one hydrogen atom from the aryl moiety of the alkyl aromatic hydrocarbon, therefore an alkyl aryl group can be formed (namely the attachment to the other moiety is via the alkyl group); or a group obtained by removing one hydrogen atom from the alkyl moiety of the alkyl aromatic hydrocarbon, therefore an aryl alkyl group can be formed (namely the attachment to the other moiety is via the aryl group). That is, the alkylaryl group of the present invention may be an alkyl aryl---* or an aryl alkyl---* (where * represents an attachment end in this group that can be bonded to the other group). Preferred is a group obtained by removing one hydrogen atom from the alkyl moiety of the aryl alkane. Among others, the alkyl moiety may be a straight chain alkyl group. In the present invention, the alkylaryl group may be a group obtained by substituting any of the above-mentioned aryl groups for any of the above-mentioned alkyl groups, or may be a group obtained by substituting any of the above-mentioned alkyl groups for any of the above-mentioned aryl groups. At this time, the carbon atom number of the alkyl group and the carbon atom number of the aryl group are each independently represented. For example, $C_1$-$C_{20}$ linear or branched alkyl $C_6$-$C_{10}$ aryl represents a group formed by the bonding of $C_1$-$C_{20}$ linear or branched alkyl and $C_6$-$C_{10}$ aryl, $C_1$-$C_{14}$ linear or branched alkyl phenyl represents a group formed by the bonding of $C_1$-$C_{14}$ linear or branched alkyl and phenyl. As the specific example of the alkylaryl group, benzyl, phenylethyl, phenylpropyl, dimethylphenyl, naphthylmethyl, naphthylethyl and the like can be enumerated, but not limited thereto.

In the context of the present specification, the alkylarylene (arylenealkyl) group means a group obtained by removing two hydrogen atoms from the alkyl aromatic hydrocarbon without violating the valence. Preferred is a group formed by removing each one hydrogen atom attached to two different carbon atoms, more preferably a group formed by removing each one hydrogen atom attached to two carbon atoms from the alkyl moiety of the aryl alkane. In the present invention, the alkylenearyl group can be a group obtained by further removing one hydrogen atom from the above-mentioned alkylaryl (arylalkyl) group. As the specific example of these alkylenearyl groups, the groups such as phenylenemethyl, phenyleneethyl, phenylenepropyl can be enumerated, but not limited thereto.

In the context of the present specification, the alkyloxy represents a group obtained by the bonding of the above-mentioned alkyl moiety and "—O—". In the present invention, the alkyloxy can be $C_1$-$C_{30}$ linear or branched alkoxyl, $C_1$-$C_{20}$ linear or branched alkoxyl, $C_1$-$C_{10}$ linear or branched alkoxyl, $C_1$-$C_6$ linear or branched alkoxyl, $C_1$-$C_4$ linear or branched alkoxyl. As the specific examples of these alkyloxy groups, methyloxy, ethyloxy, propyloxy, isopropyloxy, butyloxy, sec-butyloxy, tert-butyloxy, pentyloxy, isopentyloxy, hexyloxy, heptyloxy, octyloxy, nonyloxy, decyloxy, undecyloxy, dodecyloxy, tridecyloxy, tetradecyloxy, pentadecyloxy, hexadecyloxy and isomers thereof can be enumerated, but not limited thereto.

The integral number of the present invention may be an integer of 0 or more, and it may also be an integral number of 0-30, specifically, it may be 0, 1, 2, 3, 4, 5, 6, 7, 8, 9, 10, 11, 12, 13, 14, 15, 16, 17, 18, 19, or 20; preferably 0, 1, 2, 3, 4, 5, 6, 7, 8, 9, or 10; more preferably 0, 1, 2, 3, 4, or 5.

[Organophosphorus Compound]

The present invention provides an organophosphorus compound, which has a structure as represented by the general formula (I):

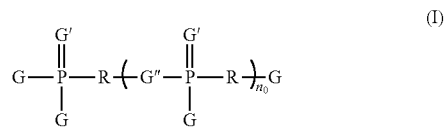

In the general formula (I), groups G are, identical to or different from each other, each independently selected from H, $C_1$-$C_{30}$ linear or branched alkyl, $C_1$-$C_{30}$ linear or branched alkoxyl, $C_6$-$C_{20}$ aryl, $C_1$-$C_{20}$ linear or branched alkyl $C_6$-$C_{20}$ aryl, a group represented by the formula (II) and a group represented by the formula (III), wherein at least one G is a group represented by the formula (II);

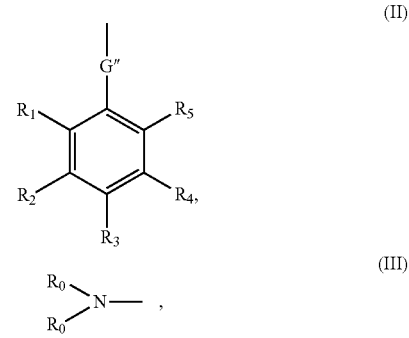

In the general formula (II), groups $R_1$, $R_2$, $R_3$, $R_4$ and $R_5$ are, identical to or different from each other, each independently selected from H, $C_1$-$C_{20}$ linear or branched alkyl, $C_1$-$C_{20}$ linear or branched alkoxyl, a group represented by the formula (II-I), a group represented by the formula (II-II) and a group represented by the formula (II-III), at least one group of groups $R_1$, $R_2$, $R_3$, $R_4$ and $R_5$ is selected from a group represented by the formula (II-I), a group represented by the formula (II-II) and a group represented by the formula (II-III);

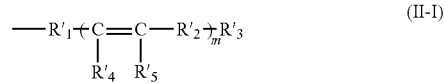

In the general formula (II-I), group $R_1'$ is selected from single bond and $C_1$-$C_{20}$ linear or branched alkylene; groups $R_2'$ in m repeating units are, identical to or different from each other, each independently selected from single bond and $C_1$-$C_{20}$ linear or branched alkylene; group $R_3'$ is selected from hydrogen and $C_1$-$C_{20}$ linear or branched alkyl; groups $R_4'$ in m repeating units are, identical to or different from each other, each independently selected from hydrogen and $C_1$-$C_2$ (linear or branched alkyl; groups $R_5'$ in m repeating units are, identical to or different from each other, each independently selected from hydrogen and $C_1$-$C_{20}$ linear or branched alkyl; m is an integral number;

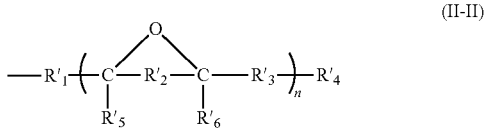

(II-II)

In the general formula (II-II), group $R_1'$ is selected from single bond and $C_1$-$C_{20}$ linear or branched alkylene; groups $R_2'$ in n repeating units are, identical to or different from each other, each independently selected from single bond and $C_1$-$C_{20}$ linear or branched alkylene; groups $R_3'$ in n repeating units are, identical to or different from each other, each independently selected from single bond and $C_1$-$C_{20}$ linear or branched alkylene; group $R_4'$ is selected from hydrogen and $C_1$-$C_{20}$ linear or branched alkyl; groups $R_5'$ in n repeating units are, identical to or different from each other, each independently selected from hydrogen and $C_1$-$C_{20}$ linear or branched alkyl; groups $R_6'$ in n repeating units are, identical to or different from each other, each independently selected from

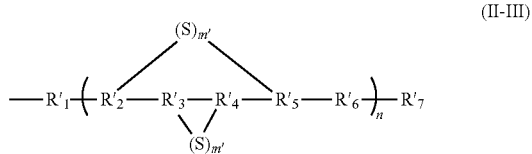

(II-III)

In the general formula (II-III), group $R_1'$ is selected from single bond and $C_1$-$C_{20}$ linear or branched alkylene; groups $R_2'$ in n repeating units are, identical to or different from each other, each independently divalent, tervalent or tetravalent $C_1$-$C_{20}$ linear or branched alkyl; groups $R_3'$ in n repeating units are, identical to or different from each other, each independently selected from single bond and divalent or tervalent $C_1$-$C_{20}$ linear or branched alkyl; groups $R_4'$ in n repeating units are, identical to or different from each other, each independently selected from single bond and divalent or tervalent $C_1$-$C_{20}$ linear or branched alkyl; groups $R_5'$ in n repeating units are, identical to or different from each other, each independently divalent, tervalent or tetravalent $C_1$-$C_{20}$ linear or branched alkyl; groups $R_6'$ in n repeating units are, identical to or different from each other, each independently selected from single bond and $C_1$-$C_{20}$ linear or branched alkylene; group $R_7'$ is selected from hydrogen and $C_1$-$C_{20}$ linear or branched alkyl; n is an integral number of 1-10; the numbers m in n repeating units are, identical to or different from each other, each independently selected from an integral number of 0-10; the numbers m' in n repeating units are, identical to or different from each other, each independently selected from an integral number of 0-10; in each repeating unit of the formula (II-III), when m is greater than 0, the linking group formed by m sulfur atoms is bonded to groups $R_2'$ and $R_5'$; when m' is greater than 0, the linking group formed by m' sulfur atoms is bonded to groups $R_3'$ and $R_4'$; in each repeating unit of the formula (II-III), when group $R_3'$ is a single bond, the end of the linking group formed by m' sulfur atoms, that is connected to group $R_3$, is bonded to group $R_2'$, when group $R_4'$ is a single bond, the end of the linking group formed by m' sulfur atoms, that is connected to group $R_4'$, is bonded to group $R_5'$;

In the general formula (III), groups $R_0$ are each independently selected from H, $C_6$-$C_{20}$ aryl, $C_1$-$C_{20}$ linear or branched alkyl $C_6$-$C_{20}$ aryl and $C_1$-$C_{30}$ linear or branched alkyl;

Groups G' present in the general formula (I) are, identical to or different from each other, each independently selected from O, S and $NR_0'$ or the absence (the absence of group G' means that P is a tervalent P atom), wherein $R_0'$ is selected from H, $C_6$-$C_{20}$ aryl, $C_1$-$C_{20}$ linear or branched alkyl $C_6$-$C_{20}$ aryl and $C_1$-$C_{30}$ linear or branched alkyl;

Groups G" present in the general formula (I) and the general formula (II) are, identical to or different from each other, each independently selected from single bond, O, S and $NR_0'$, wherein $R_0'$ is selected from H, $C_6$-$C_{20}$ aryl, $C_1$-$C_{20}$ linear or branched alkyl $C_6$-$C_{20}$ aryl and $C_1$-$C_{30}$ linear or branched alkyl;

In the general formula (I), groups R are independently selected from single bond, $C_1$-$C_{20}$ linear or branched alkylene and $C_6$-$C_{20}$ arylene;

$n_0$ in the general formula (I) is an integral number of 0-10.

In an embodiment of the present invention, groups G are preferably each independently selected from H, $C_1$-$C_{10}$ linear or branched alkyl, $C_1$-$C_{10}$ linear or branched alkoxyl, $C_6$-$C_{10}$ aryl, $C_1$-$C_{14}$ alkyl phenyl, a group represented by the formula (II) and a group represented by the formula (III).

In an embodiment of the present invention, in the general formula (II-I), groups $R_1'$ and $R_2'$ are preferably selected from single bond and $C_1$-$C_4$ linear or branched alkylene. In an embodiment of the present invention, in the general formula (II-I), groups $R_3'$, $R_4'$ and $R_5'$ are preferably selected from H and $C_1$-$C_4$ linear or branched alkyl. In an embodiment of the present invention, in the general formula (II-I), m is preferably 0, 1, 2, 3, 4, 5, 6, 7, 8, 9, and 10.

In an embodiment of the present invention, in the general formula (II-II), groups $R_1'$, $R_2'$ and $R_3'$ are preferably selected from single bond and $C_1$-$C_4$ linear or branched alkylene. In an embodiment of the present invention, in the general formula (II-II), groups $R_4'$, $R_5'$ and $R_6'$ are preferably selected from H and $C_1$-$C_4$ linear or branched alkyl. In an embodiment of the present invention, in the general formula (II-II), n is preferably 1, 2, 3, 4, 5, 6, 7, 8, 9, and 10.

In an embodiment of the present invention, in the general formula (II-III), groups $R_1'$ and $R_6'$ are preferably selected from single bond and $C_1$-$C_4$ linear or branched alkylene. In an embodiment of the present invention, in the general formula (II-III), groups $R_2'$ and $R_5'$ are preferably each independently divalent, tervalent or tetravalent $C_1$-$C_4$ linear or branched alkyl. In an embodiment of the present invention, in the general formula (II-III), groups $R_3'$ and $R_4'$ are preferably each independently selected from single bond and divalent or tervalent $C_1$-$C_4$ linear or branched alkyl. In an embodiment of the present invention, in the general formula (II-III), group $R_7'$ is preferably selected from H and $C_1$-$C_4$ linear or branched alkyl. In an embodiment of the present invention, in the general formula (II-III), n is preferably an integral number of 1-3. In an embodiment of the present invention, in the general formula (II-III), m is preferably an integral number of 0-5. In an embodiment of the present invention, in the general formula (II-III), m' is preferably an integral number of 0-5.

In an embodiment of the present invention, in the general formula (III), groups $R_0$ are preferably each independently selected from phenyl, $C_1$-$C_{14}$ alkyl phenyl and $C_1$-$C_{20}$ linear or branched alkyl.

In an embodiment of the present invention, in the general formula (I), G' is absent, here, P is a tervalent P. In an embodiment of the present invention, in the general formula (I), $R_0'$ is preferably selected from phenyl, $C_1$-$C_{14}$ alkyl phenyl and $C_1$-$C_{20}$ linear or branched alkyl.

In an embodiment of the present invention, in the general formula (I) and the general formula (II), groups G" are preferably selected from phenyl, $C_1$-$C_{14}$ alkyl phenyl and $C_1$-$C_{20}$ linear or branched alkyl.

In an embodiment of the present invention, in the general formula (I), group R is preferably selected from single bond, $C_1$-$C_{10}$ linear or branched alkylene, $C_6$-$C_{10}$ arylene.

In an embodiment of the present invention, in the general formula (I), no is preferably an integral number of 0-5, more preferably 0, 1, 2, 3 or 4.

In an embodiment of the present invention, in the general formula (II), groups $R_1$, $R_3$ and $R_5$ are each independently selected from H and $C_1$-$C_4$ linear or branched alkyl. In an embodiment of the present invention, in the general formula (II), groups $R_1$, $R_3$ and $R_5$ are each independently selected from H, methyl, ethyl, propyl, isopropyl, n-butyl, isobutyl and tert-butyl.

In an embodiment of the present invention, in the general formula (II), groups $R_2$ and $R_4$ are each independently selected from H, $C_1$-$C_{20}$ linear or branched alkyl, a group represented by the formula (II-I), a group represented by the formula (II-II) and a group represented by the formula (II-III), wherein at least one group is selected from a group represented by the formula (II-I), a group represented by the formula (II-II) and a group represented by the formula (II-III). In an embodiment of the present invention, in the general formula (II), one group of groups $R_2$ and $R_4$ is a group represented by the formula (II-I), a group represented by the formula (II-II) or a group represented by the formula (II-III), the other one is H.

In an embodiment of the present invention, the group represented by the formula (II-I) has a total carbon number of 2-30, preferably 6-20, more preferably 10-18. In an embodiment of the present invention, the group represented by the formula (II-II) has a total carbon number of 2-30, preferably 6-20, more preferably 10-18. In an embodiment of the present invention, the group represented by the formula (II-III) has a total carbon number of 2-30, preferably 6-20, more preferably 10-18. According to the present invention, in each repeating unit of the formula (II-III), when m is greater than 0, the linking group formed by m sulfur atoms is bonded to groups $R_2'$ and $R_5'$; when m' is greater than 0, the linking group formed by m' sulfur atoms is bonded to groups $R_3'$ and $R_4'$; in each repeating unit of the formula (II-III), when group $R_3'$ is a single bond, the end of the linking group formed by m' sulfur atoms, that is connected to group $R_3'$, is bonded to group $R_2'$, when group $R_4'$ is a single bond, the end of the linking group formed by m' sulfur atoms, that is connected to group $R_4'$, is bonded to group $R_5'$. According to the present invention, in each repeating unit of the formula (II-III), when m is 0, no sulfur atom is bonded to groups $R_2'$ and $R_5'$; when m' is 0, no sulfur atom is bonded to groups $R_3'$ and $R_4'$. In each repeating unit of the formula (II-III), when group $R_3'$ is not single bond, and m' is greater than 0, the linking group formed by m' sulfur atoms is bonded to group $R_3'$; when group $R_4'$ is not single bond, and m' is greater than 0, the linking group formed by m' sulfur atoms is bonded to group $R_4'$.

According to the present invention, in each repeating unit of the formula (TI-III), the groups (S)m, (S)m', $R_2'$, $R_3'$, $R_4'$ and $R_5'$ conform to the Bonding Rule.

In an embodiment of the present invention, m sulfur atoms being bonded to groups $R_2'$ and $R_5'$ means that the end sulfur atom of the linking group formed by m sulfur atoms (or only one sulfur atom present) is bonded to groups $R_2'$ and $R_5'$ (when m is 1, only one sulfur atom is present, here this sulfur atom is bonded to groups $R_2'$ and $R_5'$); m' sulfur atoms being bonded to groups $R_3'$ and $R_4'$ means that the end sulfur atom of the linking group formed by m' sulfur atoms (or only one sulfur atom present) is bonded to groups $R_3'$ and $R_4'$ (when m' is 1, only one sulfur atom is present, here this sulfur atom is bonded to groups $R_3'$ and $R_4'$).

In an embodiment of the present invention, in each repeating unit of the formula (II-III), in case that groups $R_2'$, $R_3'$, $R_4'$ and $R_5'$ are bonded to each other, a covalent bond can be formed with any conjunction end of groups $R_2'$, $R_3'$, $R_4'$ and $R_5'$. In an embodiment of the present invention, in each repeating unit of the formula (II-III), in case that groups (S)m or (S)m' and $R_2'$, $R_3'$, $R_4'$ and $R_5'$ are bonded to each other, a covalent bond can be formed with any conjunction end of groups $R_2'$, $R_3$, $R_4'$ and $R_5'$.

In an embodiment of the present invention, in each repeating unit of the formula (II-III), when groups $R_3'$ and $R_4'$ are not single bond, and m' is greater than 0, the linking group formed by m' sulfur atoms is bonded to groups $R_3'$ and $R_4'$, $R_3'$ and $R_4'$ are each independently selected from tervalent $C_1$-$C_{20}$ linear or branched alkyl (preferably each independently selected from tervalent $C_1$-$C_4$ linear or branched alkyl); when groups $R_3'$ and $R_4'$ are not single bond, and m' is 0, no sulfur atom is bonded to groups $R_3'$ and $R_4'$, $R_3'$ and $R_4'$ are each independently selected from divalent $C_1$-$C_{20}$ linear or branched alkyl (preferably each independently selected from divalent $C_1$-$C_4$ linear or branched alkyl).

In an embodiment of the present invention, in each repeating unit of the formula (II-III), when groups $R_3'$ and $R_4'$ are not single bond, and m is greater than 0, $R_2'$ and $R_5'$ are each independently selected from tervalent $C_1$-$C_{20}$ linear or branched alkyl (preferably each independently selected from tervalent $C_1$-$C_4$ linear or branched alkyl); when groups $R_3'$ and $R_4'$ are not single bond, and m is 0, $R_2'$ and $R_5'$ are each independently selected from divalent $C_1$-$C_{20}$ linear or branched alkyl (preferably each independently selected from divalent $C_1$-$C_4$ linear or branched alkyl).

In an embodiment of the present invention, in each repeating unit of the formula (II-III), when group $R_3'$ is single bond, $R_4'$ is not single bond, and m' is greater than 0, the linking group formed by m' sulfur atoms are bonded to group $R_2'$ and $R_4'$, $R_4'$ is selected from tervalent $C_1$-$C_{20}$ linear or branched alkyl (preferably each independently selected from tervalent $C_1$-$C_4$ linear or branched alkyl); when group $R_3'$ is single bond, $R_4'$ is not single bond, and m' is 0, no sulfur atom is bonded to groups $R_3'$ and $R_4'$, $R_4'$ is selected from divalent $C_1$-$C_{20}$ linear or branched alkyl (preferably each independently selected from divalent $C_1$-$C_4$ linear or branched alkyl). In an embodiment of the present invention, in each repeating unit of the formula (II-III), when group $R_3'$ is single bond, $R_4'$ is not single bond, in is greater than 0, and m' is greater than 0, $R_2'$ is selected from tetravalent $C_1$-$C_{20}$ linear or branched alkyl (preferably selected from tetravalent $C_1$-$C_4$ linear or branched alkyl), $R_5'$ is selected from tervalent $C_1$-$C_{20}$ linear or branched alkyl (preferably selected from tervalent $C_1$-$C_4$ linear or branched alkyl); when group $R_3'$ is single bond, $R_4'$ is not single bond, m is 0, m' is greater than XX, $R_2'$ is selected from tervalent $C_1$-$C_{20}$ linear or branched alkyl (preferably selected from tervalent $C_1$-$C_4$ linear or branched alkyl), $R_5'$ is selected from divalent $C_1$-$C_{20}$ linear or branched alkyl (preferably selected from divalent $C_1$-$C_4$ linear or branched alkyl).

In an embodiment of the present invention, in each repeating unit of the formula (II-III), when group $R_3'$ is not single bond, $R_4'$ is single bond, and m' is greater than 0, the linking group formed by m' sulfur atoms is bonded to groups $R_3'$ and $R_5'$, $R_3'$ is selected from tervalent $C_1$-$C_{20}$ linear or branched alkyl (preferably each independently selected from tervalent $C_1$-$C_4$ linear or branched alkyl); when group $R_3'$ is not single bond, $R_4'$ is single bond, and m' is 0, no sulfur atom is bonded to groups $R_3'$ and $R_4'$, $R_3'$ is selected from divalent $C_1$-$C_{20}$ linear or branched alkyl (preferably each independently selected from divalent $C_1$-$C_4$ linear or branched alkyl).

In an embodiment of the present invention, in each repeating unit of the formula (II-III), when group $R_3'$ is not single bond, $R_4'$ is single bond, n is greater than 0, and m' is greater than 0, $R_2'$ is selected from tervalent $C_1$-$C_{20}$ linear or branched alkyl (preferably selected from tervalent $C_1$-$C_4$ linear or branched alkyl), $R_5'$ is selected from tetravalent $C_1$-$C_{20}$ linear or branched alkyl (preferably selected from tetravalent $C_1$-$C_4$ linear or branched alkyl); when group $R_3'$ is not single bond, $R_4'$ is single bond, m is 0, and m' is greater than 0, $R_2'$ is selected from divalent $C_1$-$C_{20}$ linear or branched alkyl (preferably selected from divalent $C_1$-$C_4$ linear or branched alkyl), $R_5'$ is selected from tervalent $C_1$-$C_{20}$ linear or branched alkyl (preferably selected from tervalent $C_1$-$C_4$ linear or branched alkyl).

In an embodiment of the present invention, in each repeating unit of the formula (II-III), when groups $R_3'$ and $R_4'$ are both single bond, and m' is greater than 0, the linking group formed by m' sulfur atoms is bonded to groups $R_2'$ and $R_5'$, here when m is greater than 0, $R_2'$ and $R_5'$ are each independently selected from tetravalent $C_1$-$C_{20}$ linear or branched alkyl (preferably each independently selected from tetravalent $C_1$-$C_4$ linear or branched alkyl), here when m is 0, $R_2'$ and $R_5'$ are each independently selected from tervalent $C_1$-$C_{20}$ linear or branched alkyl (preferably each independently selected from tervalent $C_1$-$C_4$ linear or branched alkyl).

In an embodiment of the present invention, in each repeating unit of the formula (II-III), when groups $R_3'$ and $R_4'$ are both single bond, m' is 0, and m is greater than 0, $R_2'$ and $R_5'$ are each independently selected from tervalent $C_1$-$C_{20}$ linear or branched alkyl (preferably each independently selected from tervalent $C_1$-$C_4$ linear or branched alkyl); when groups $R_3'$ and $R_4'$ are both single bond, m' is 0, and m is 0, $R_2'$ and $R_5'$ are each independently selected from divalent $C_1$-$C_{20}$ linear or branched alkyl (preferably each independently selected from divalent $C_1$-$C_4$ linear or branched alkyl).

According to the present invention, in each repeating unit of the formula (II-III), for example, the structures that can be formed comprise, but are not limited thereto:

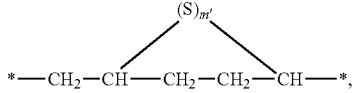

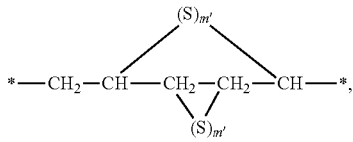

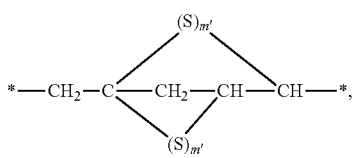

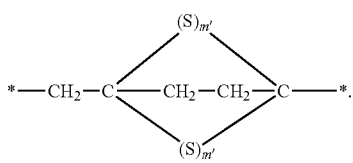

In an embodiment of the present invention, the organophosphorus compound of the present invention is at least one compound selected from the following compounds:

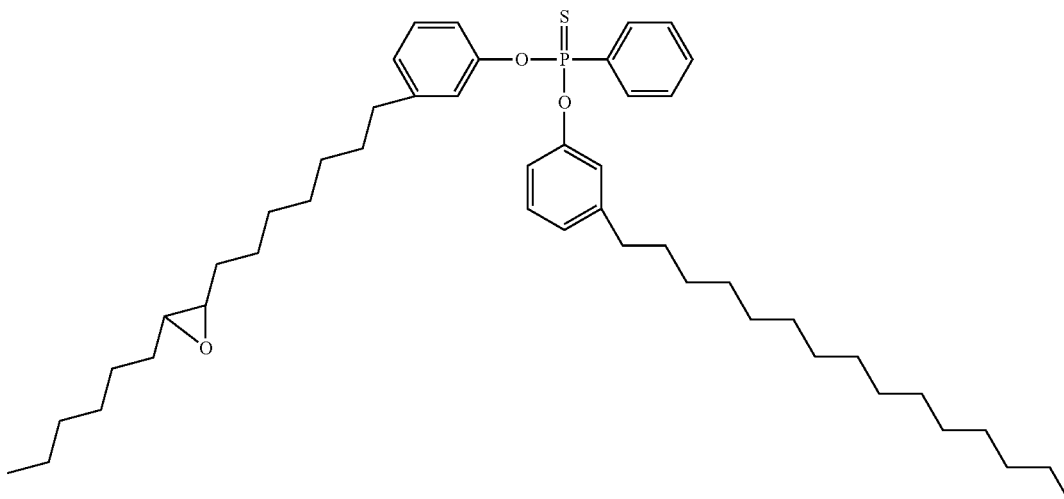

-continued
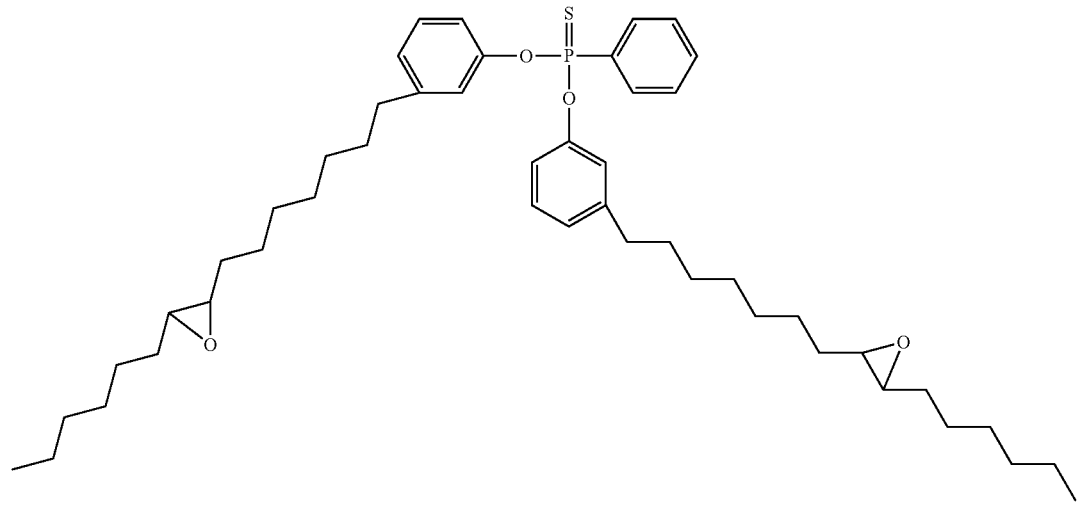
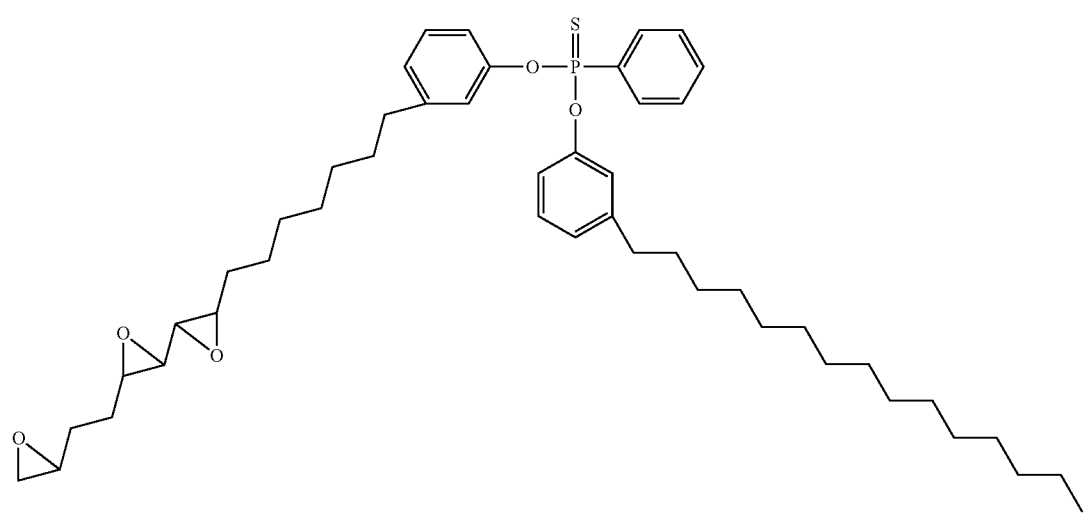
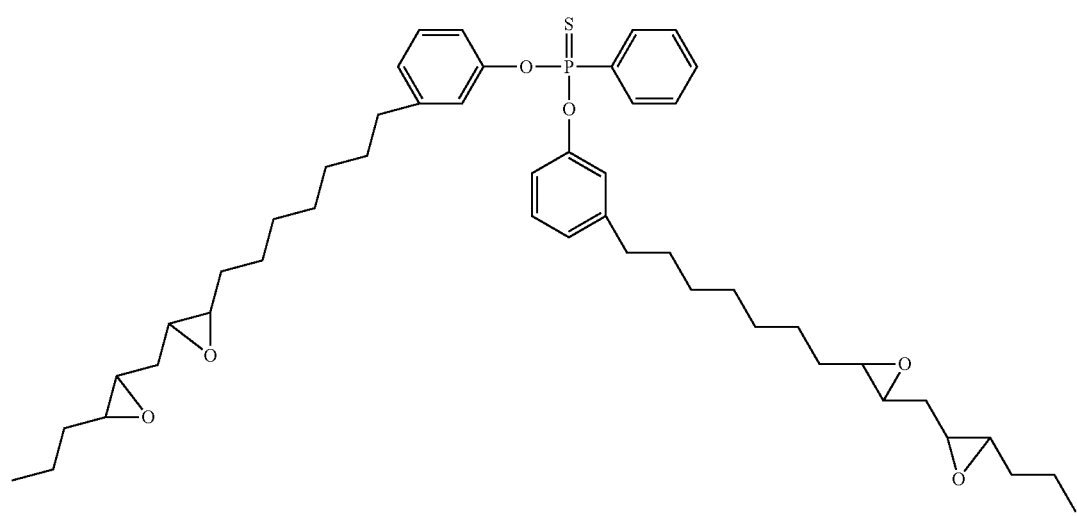

-continued
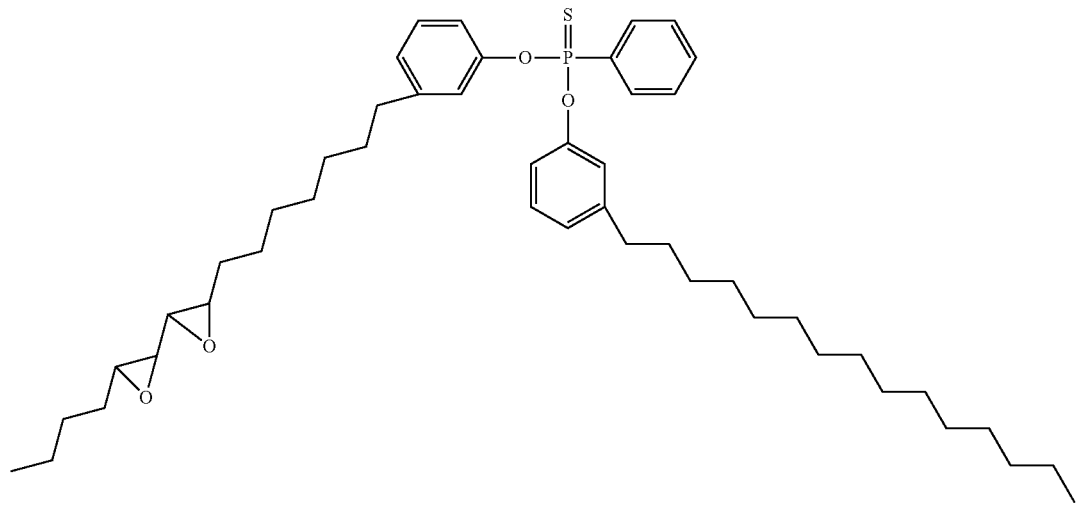
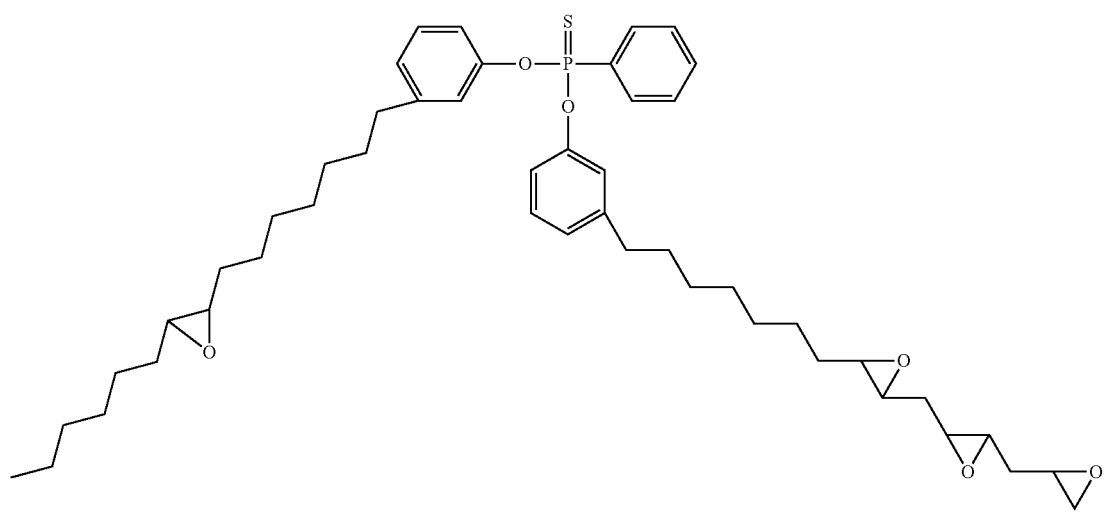
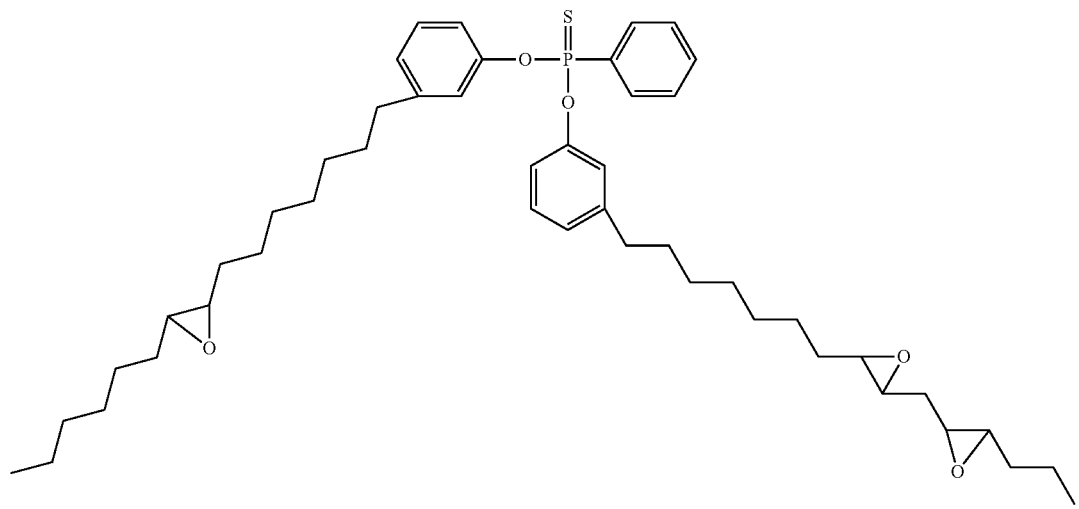

-continued
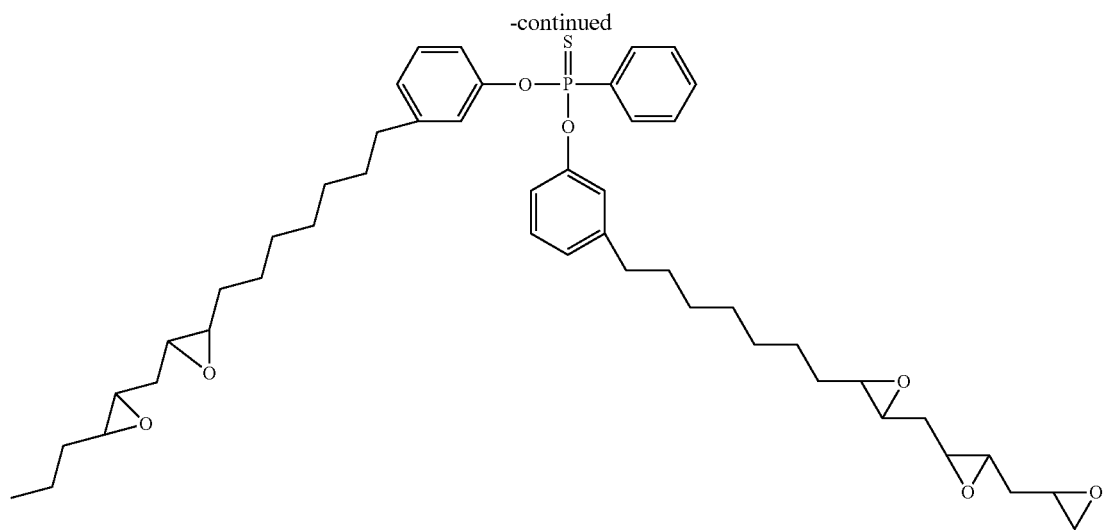
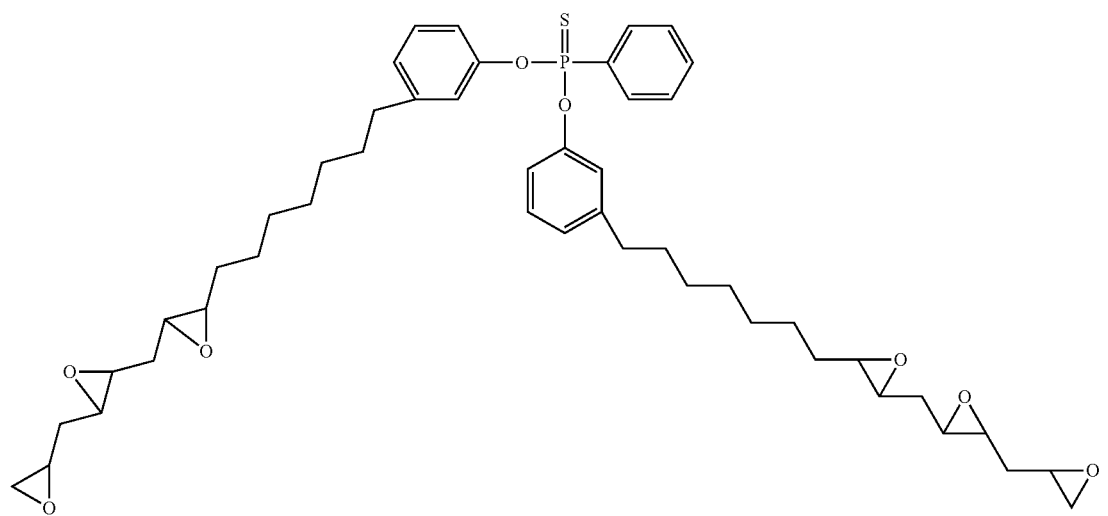
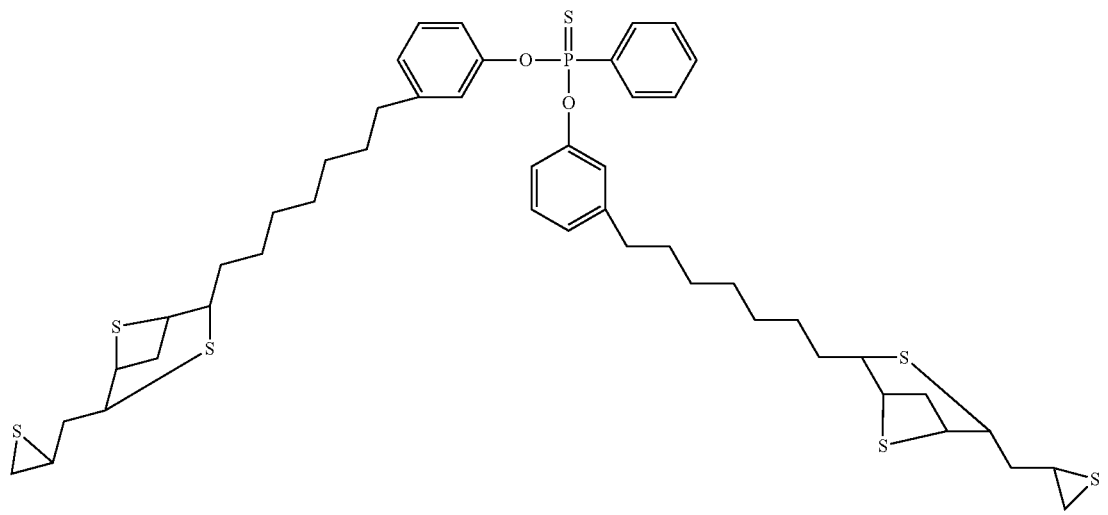

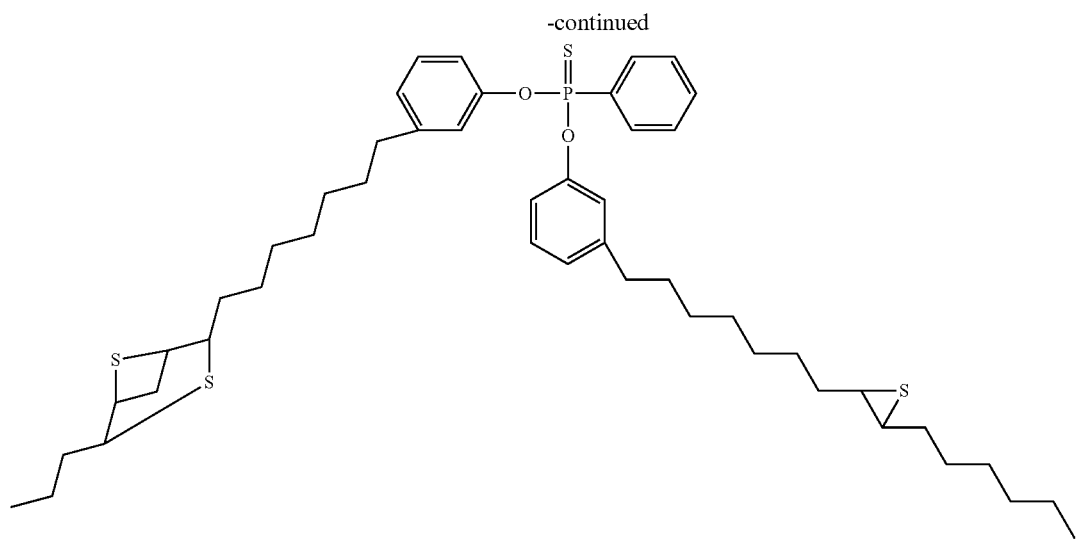
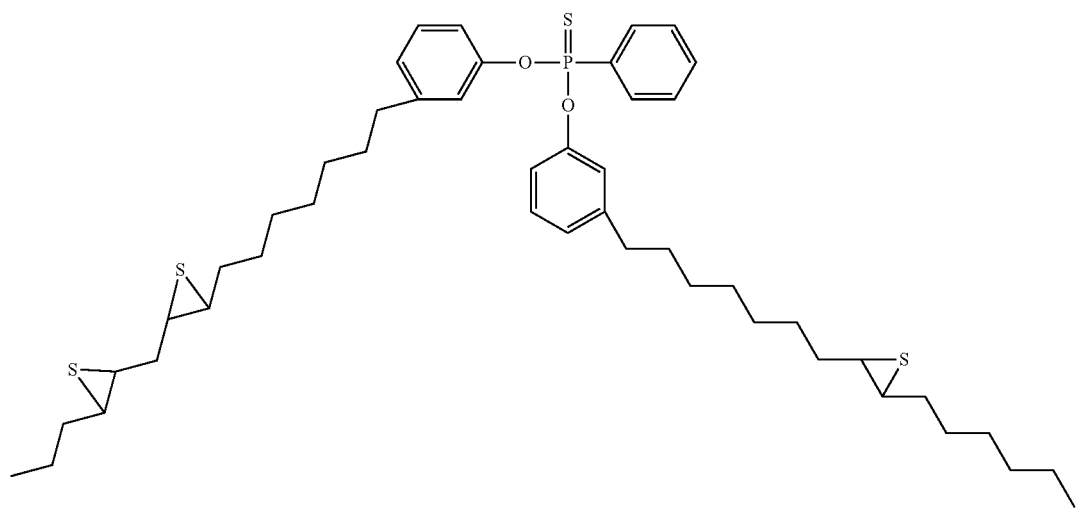
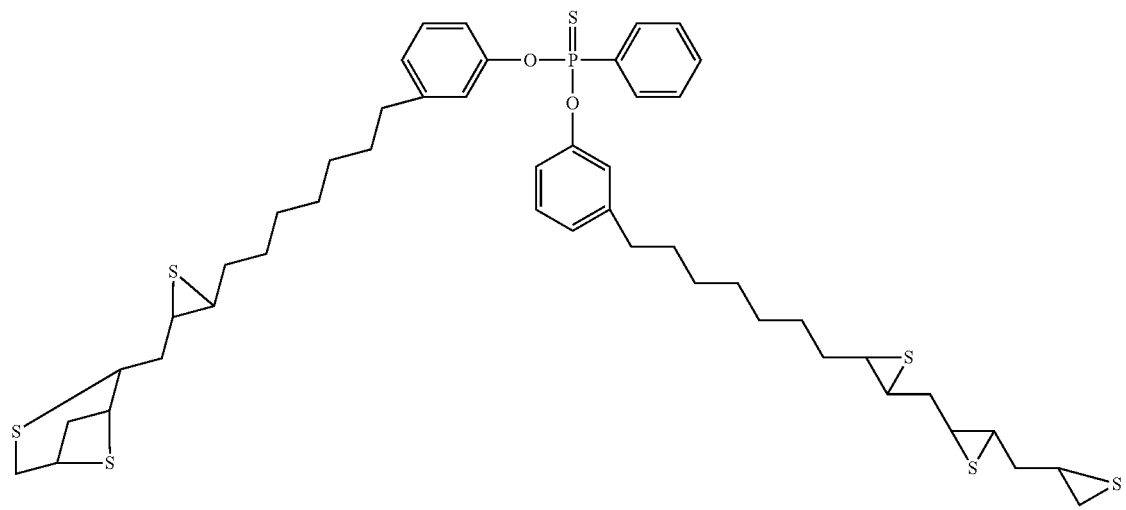

-continued
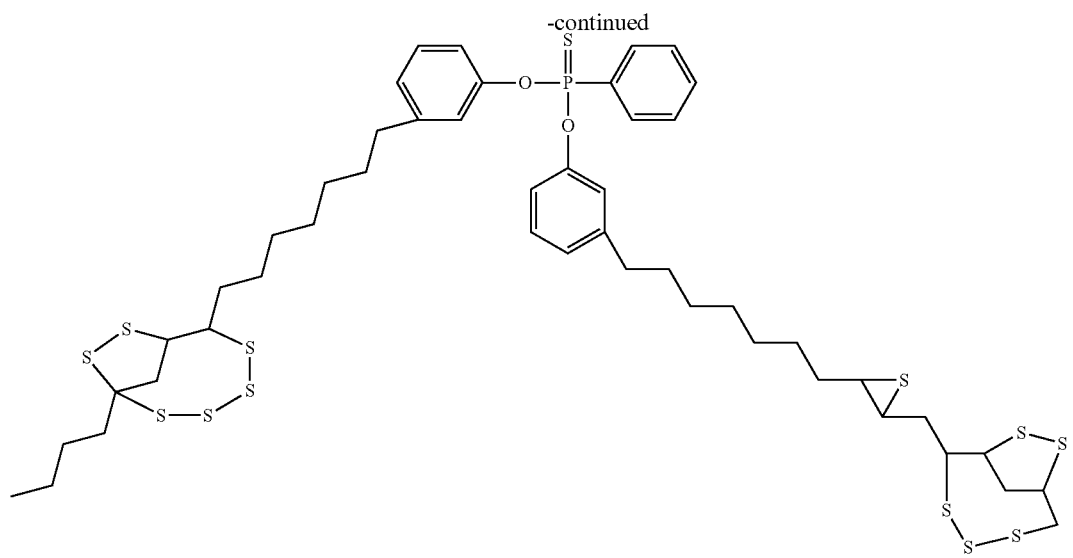
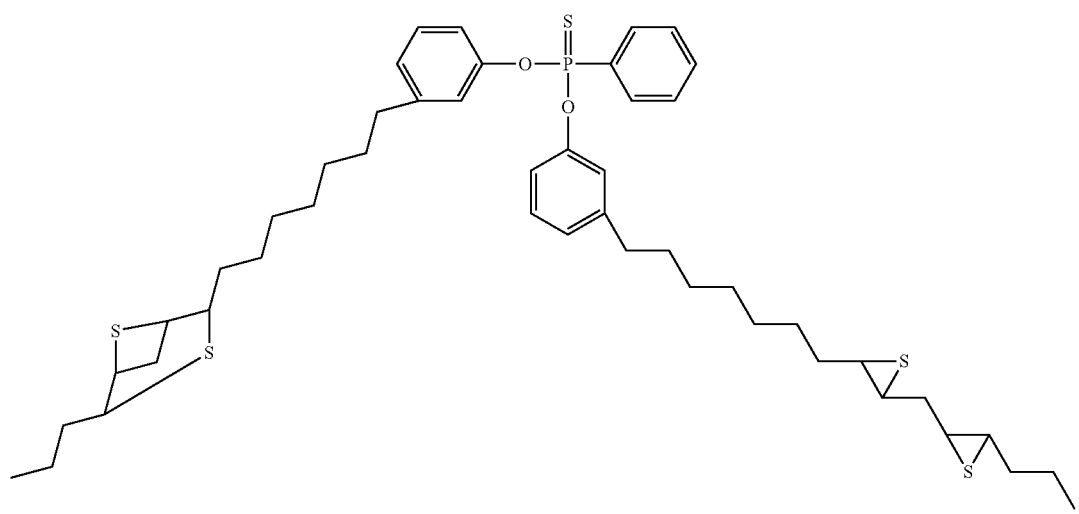
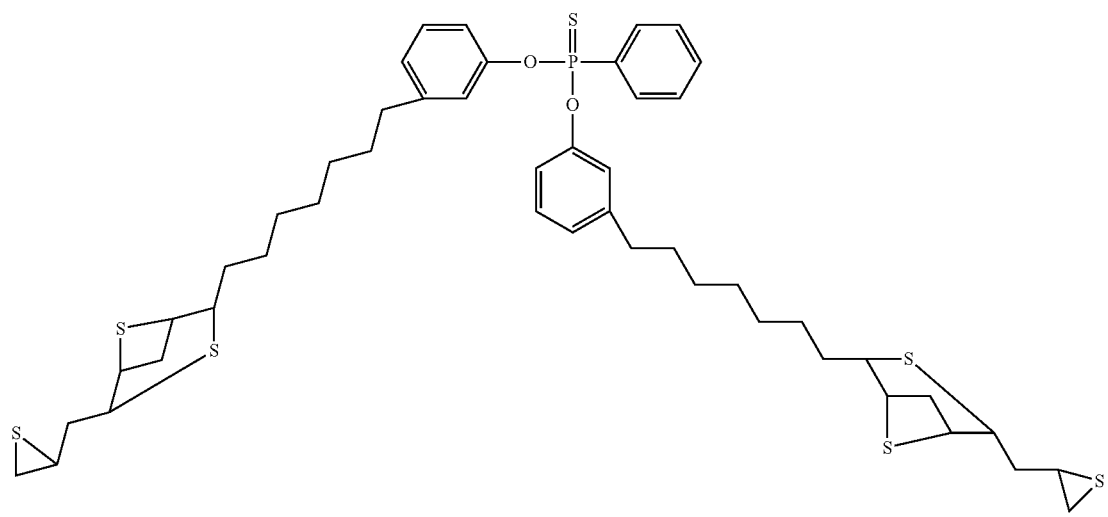

-continued
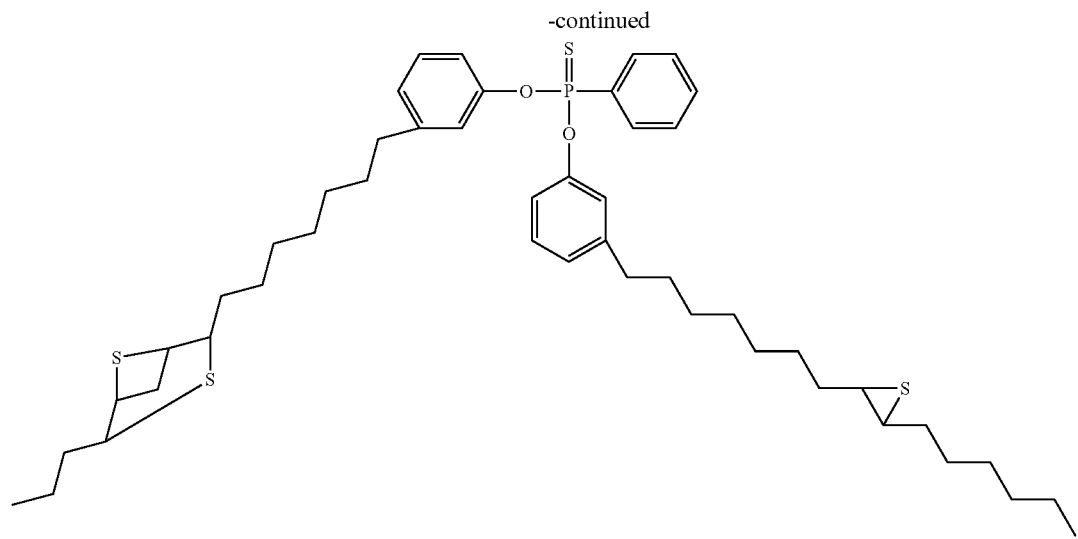
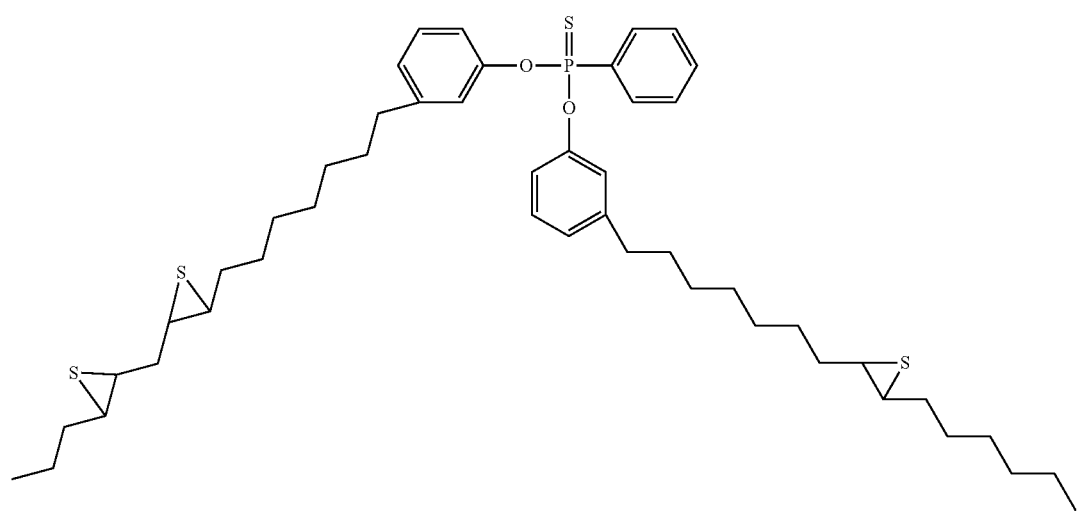
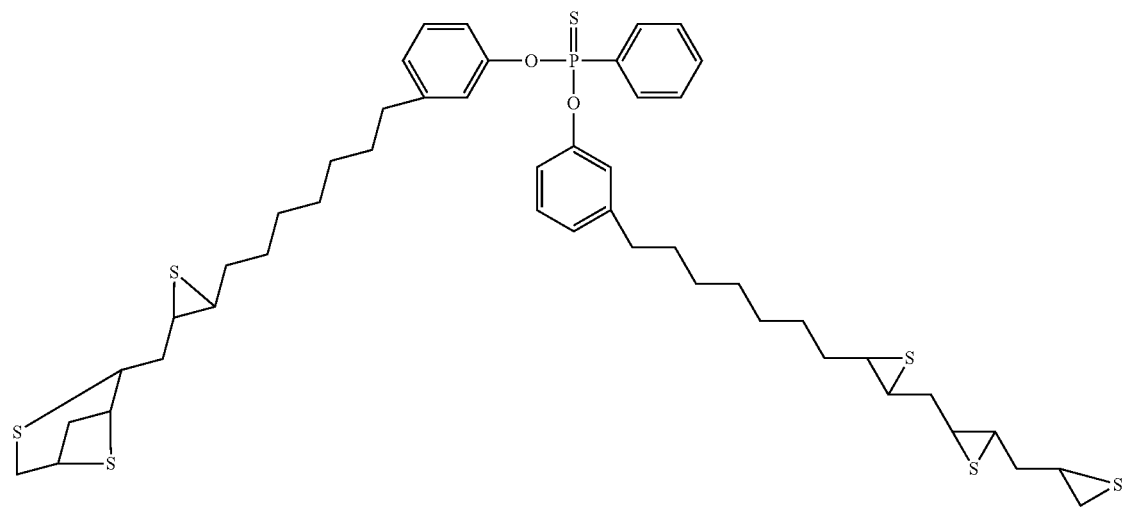

-continued
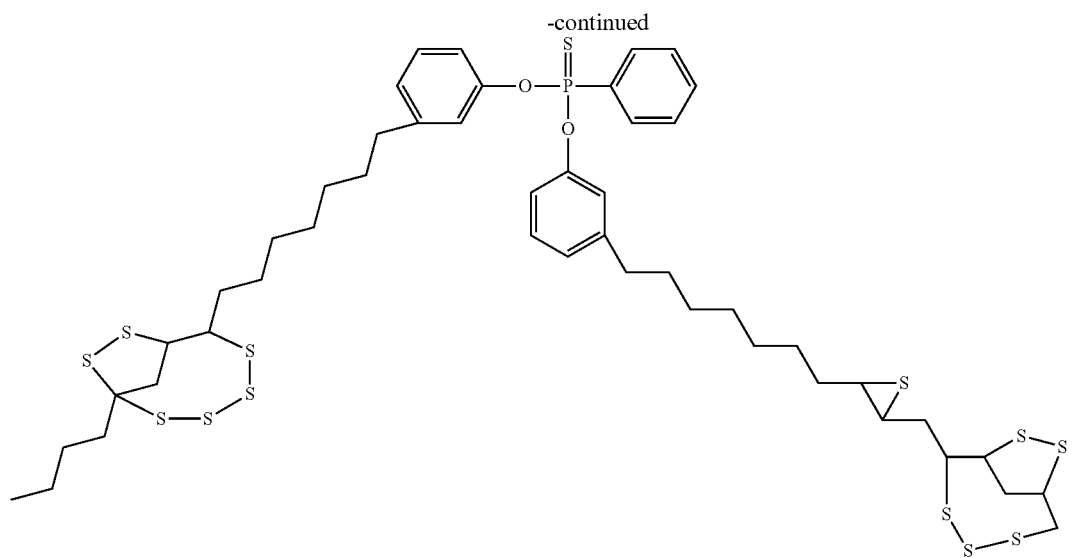
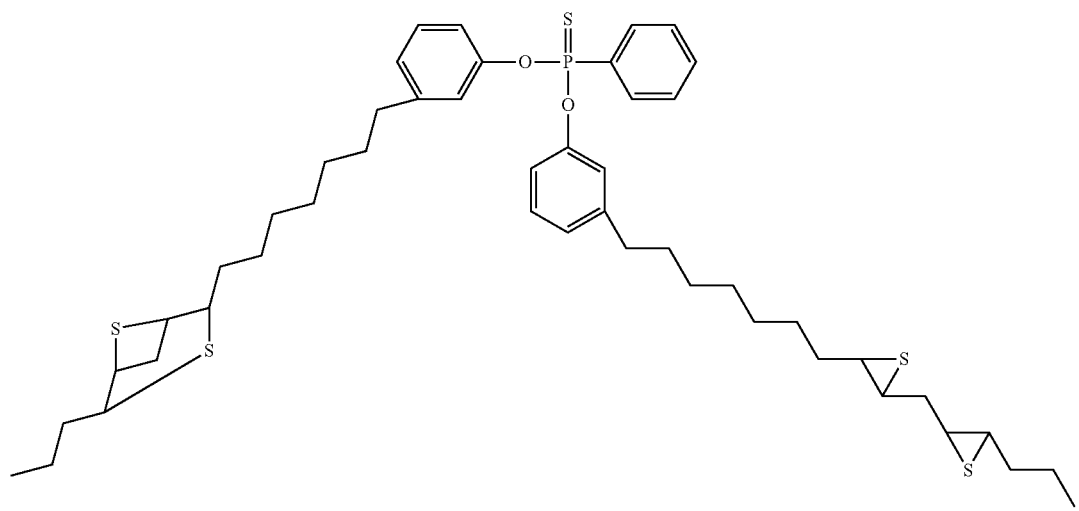
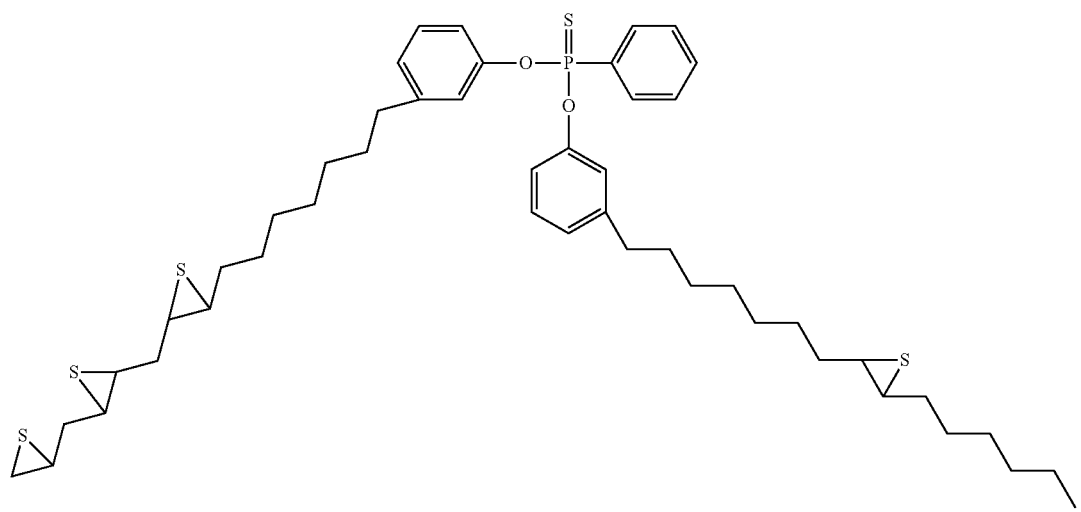

-continued
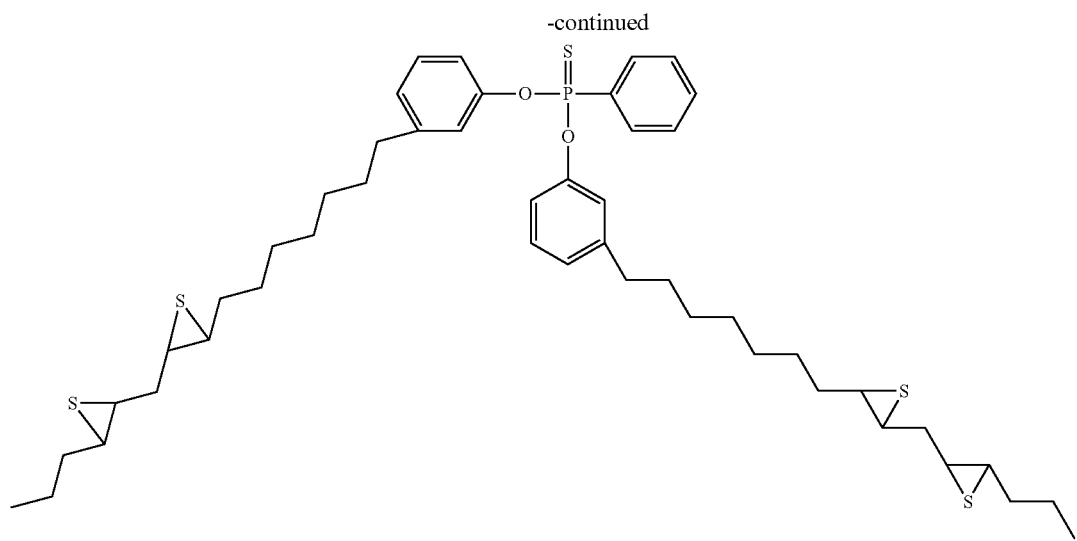
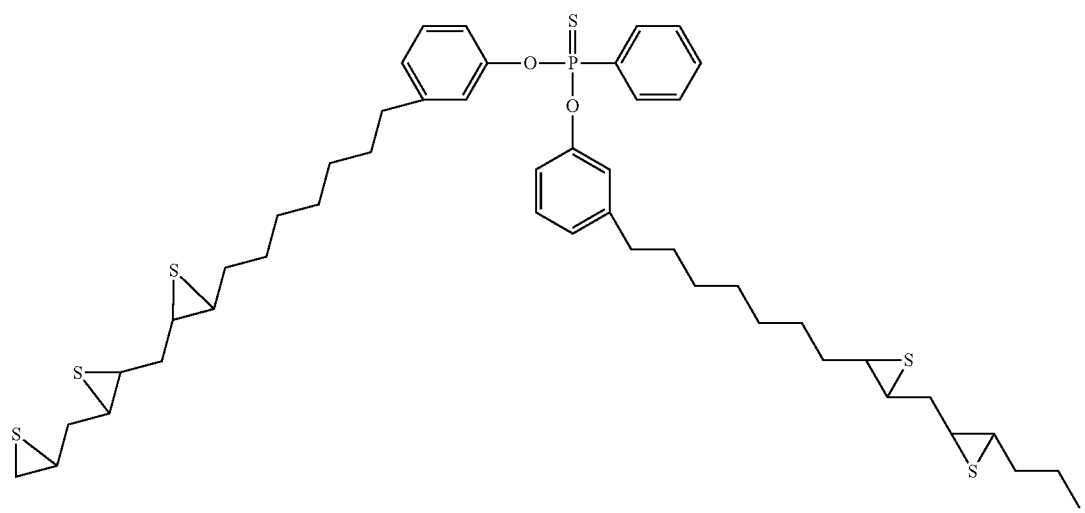
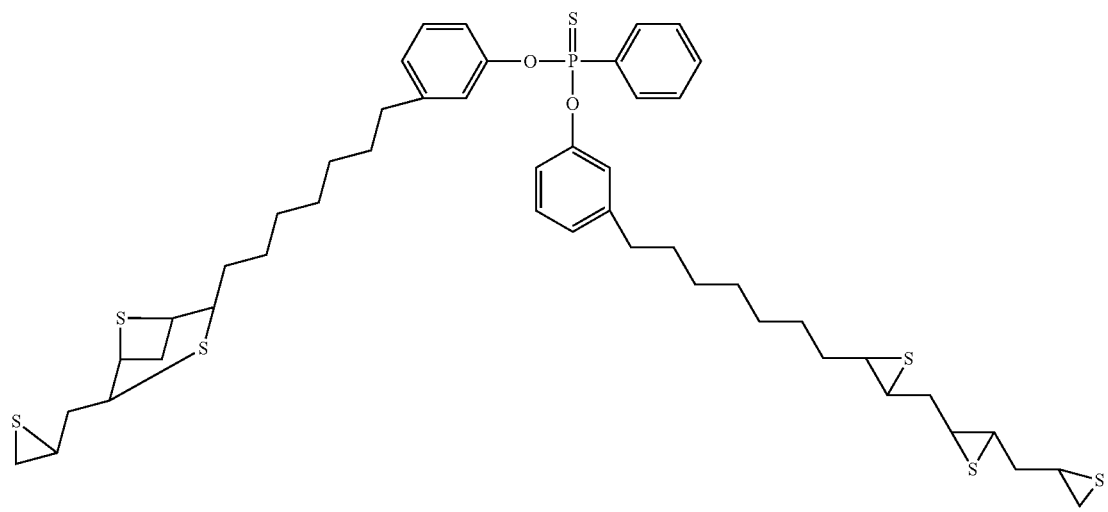

-continued
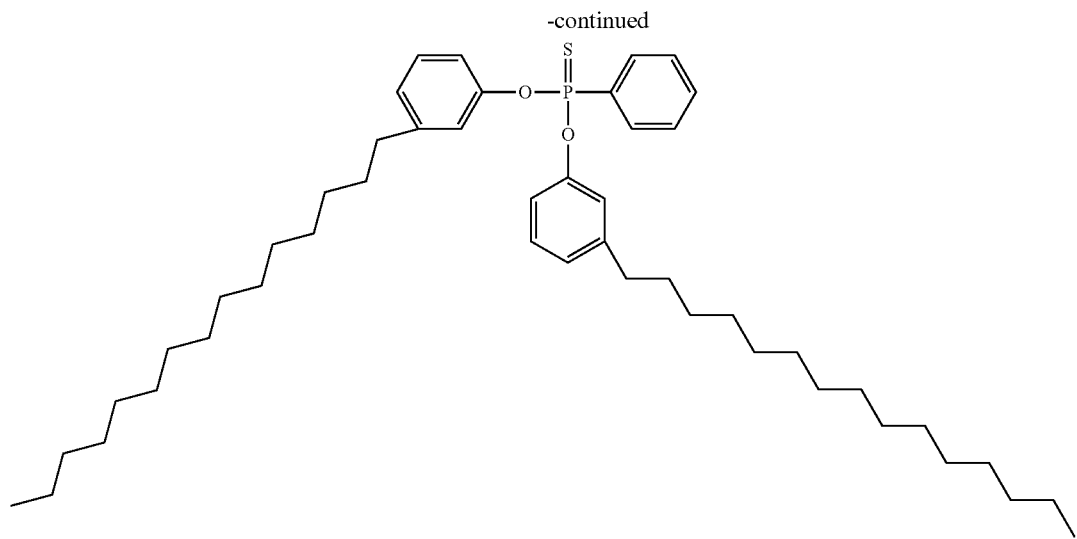
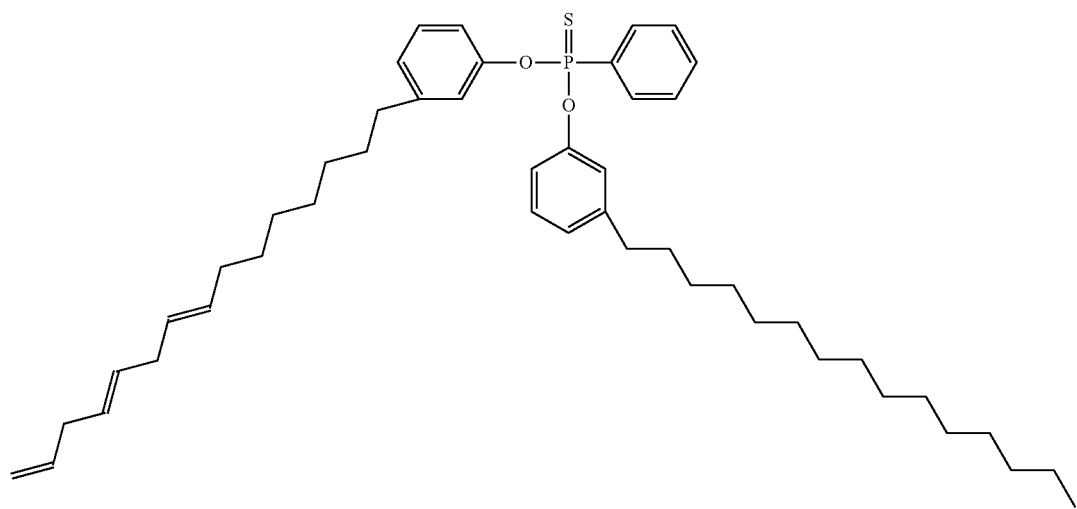
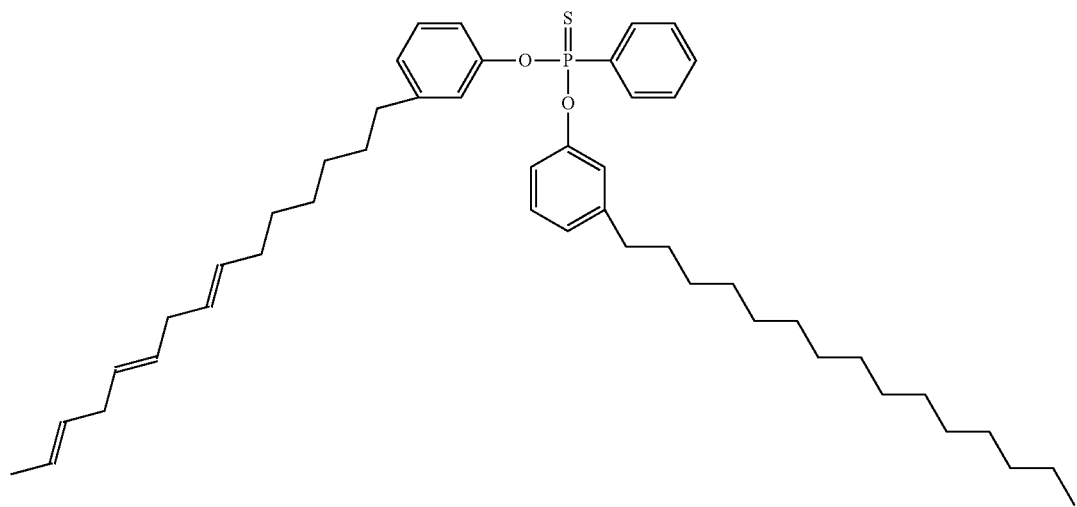

-continued
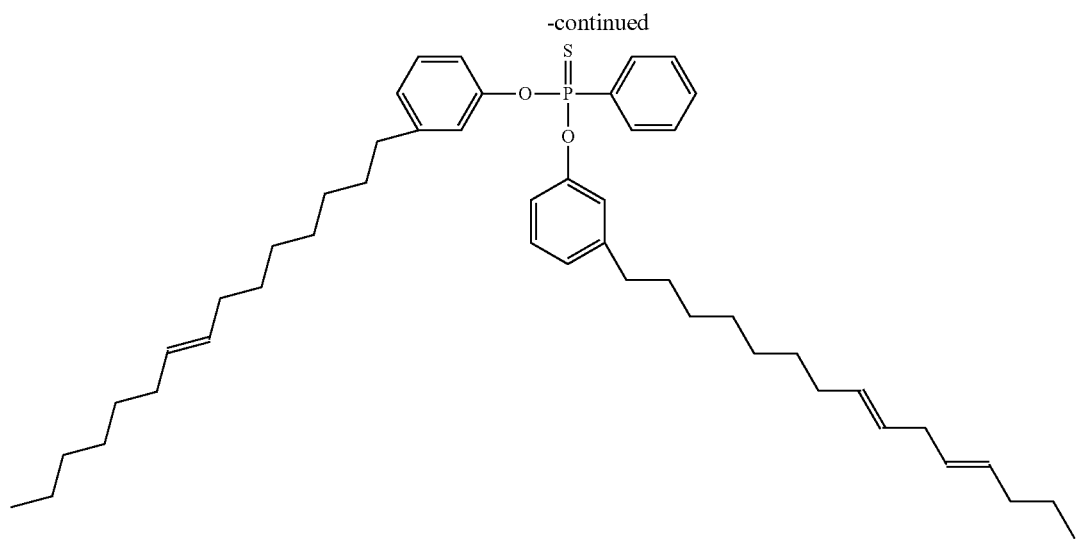
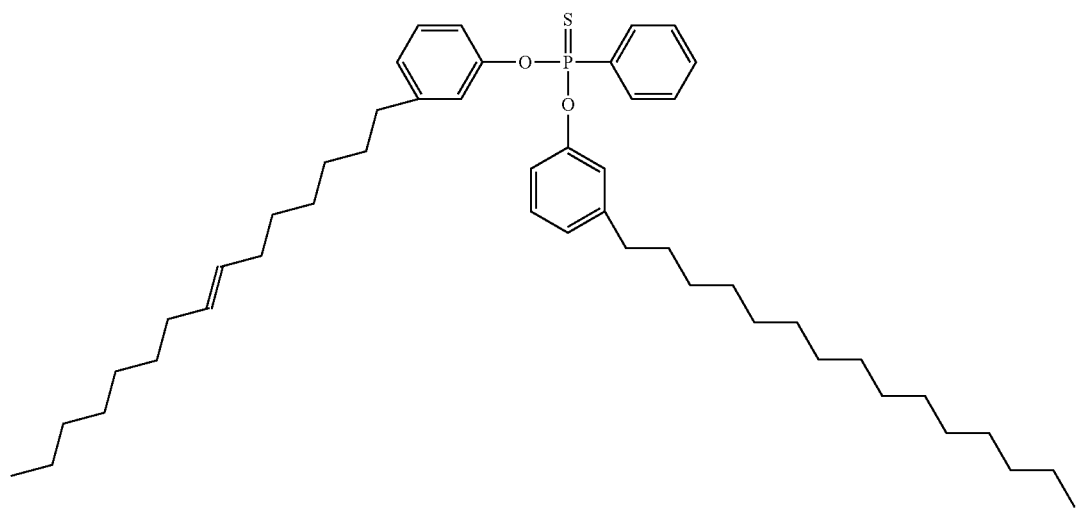
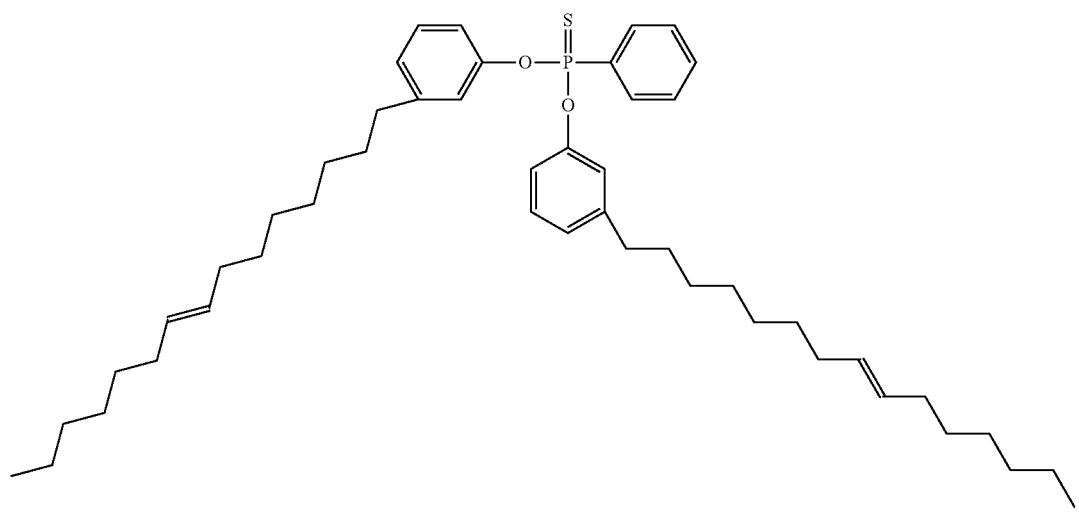

-continued
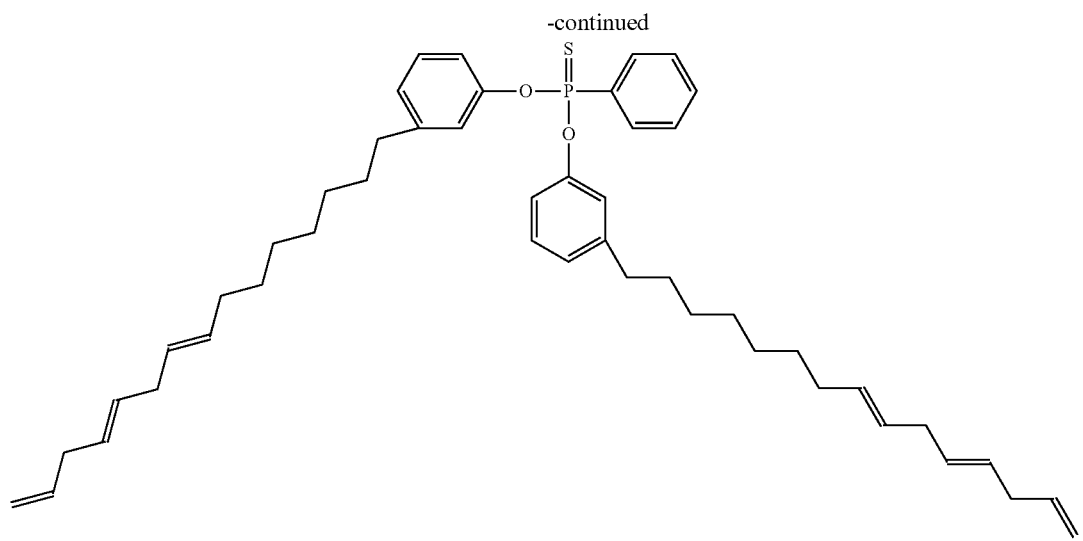
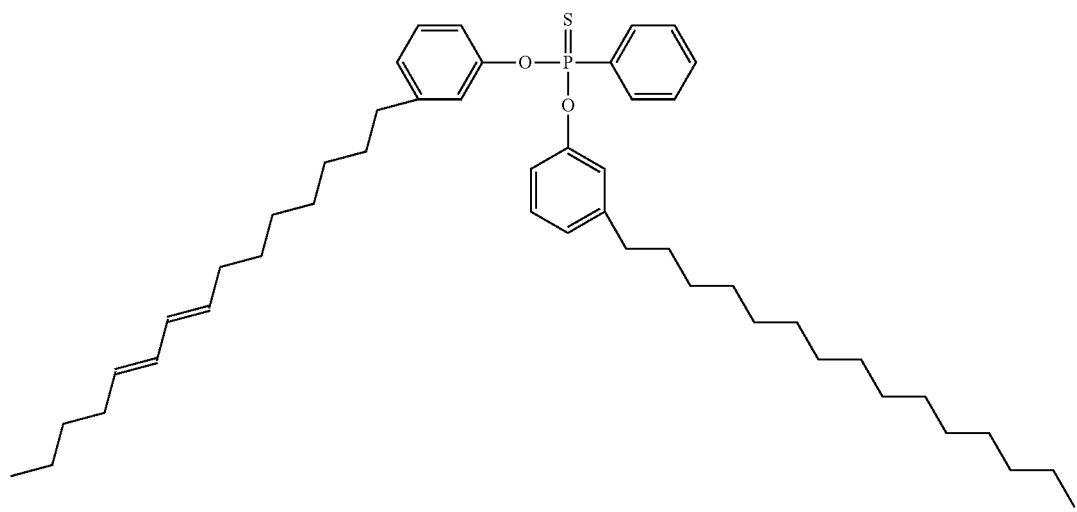
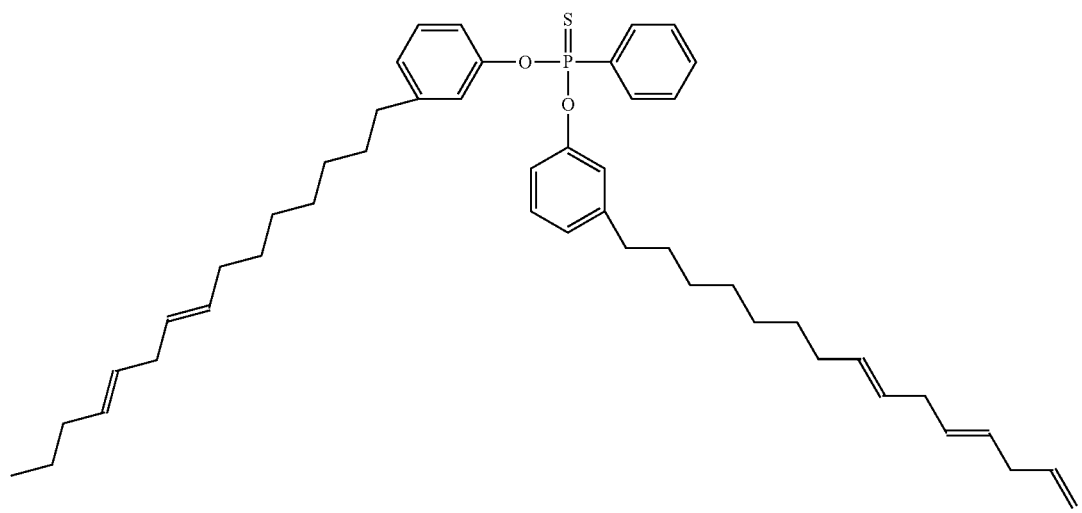

77
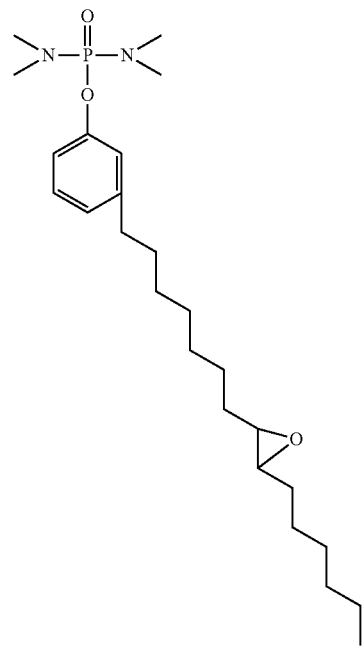
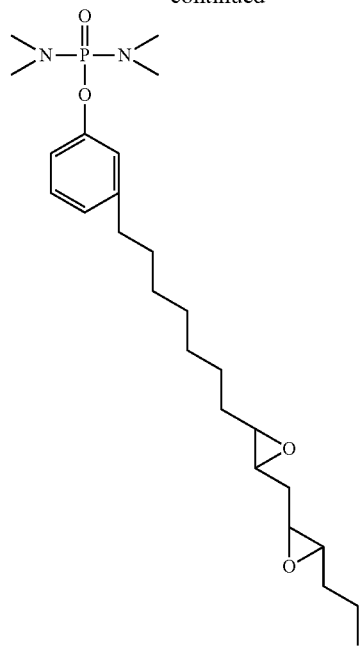
-continued
78
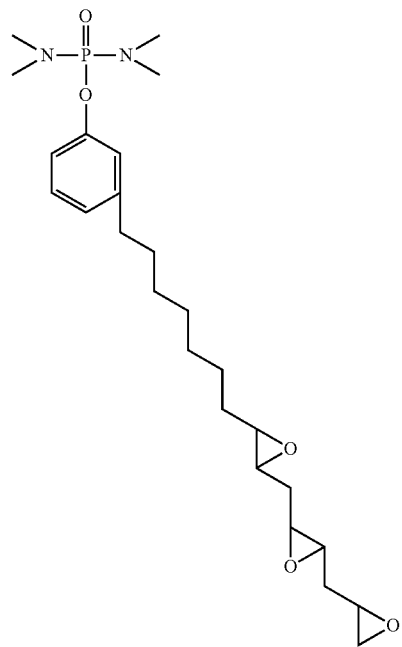
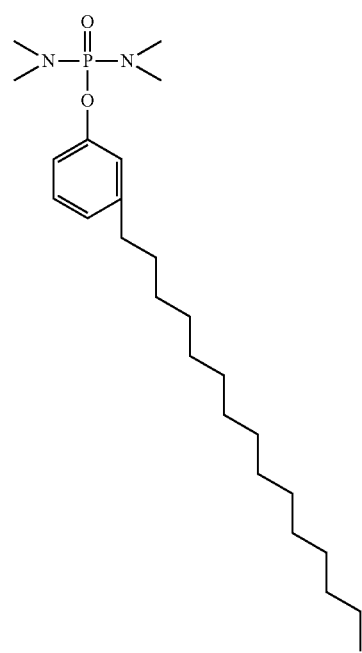

-continued
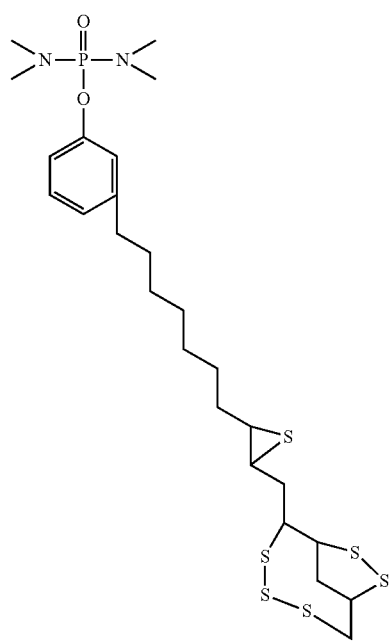
79
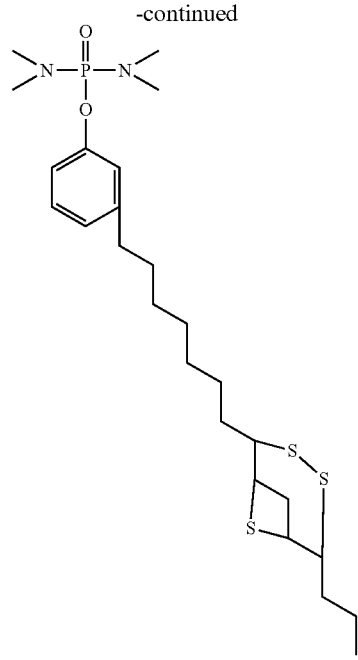
80

81
-continued
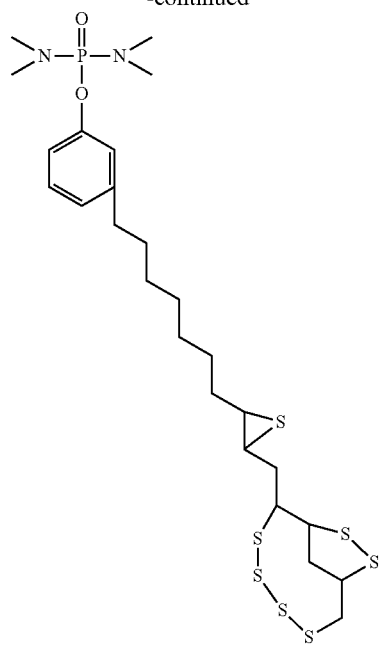
82
-continued
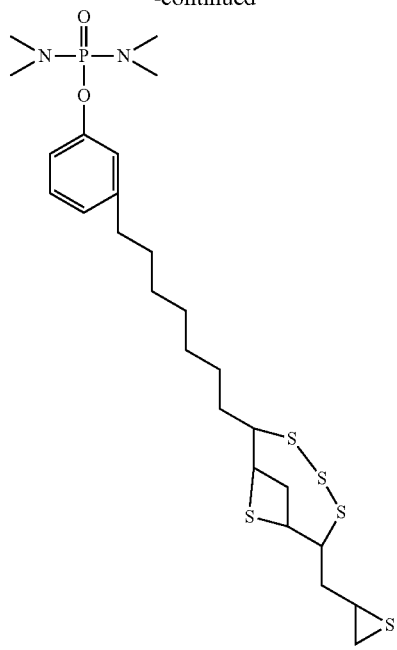
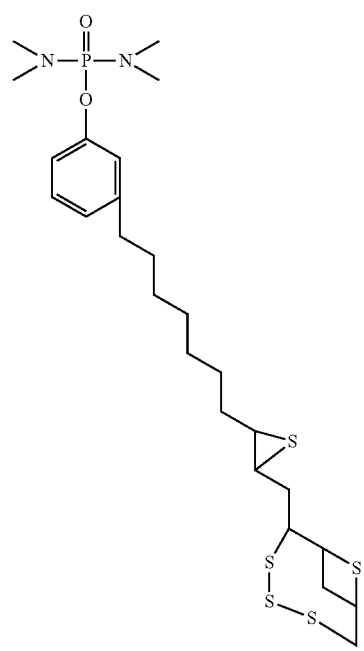
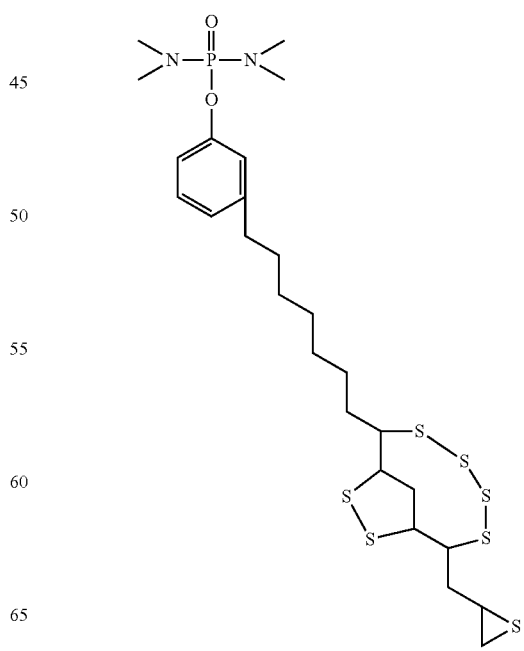

83
-continued
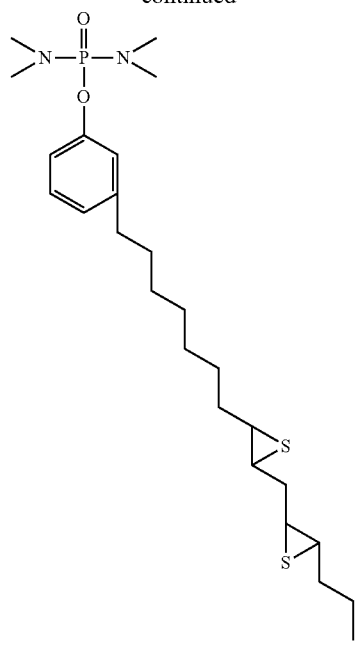
84
-continued
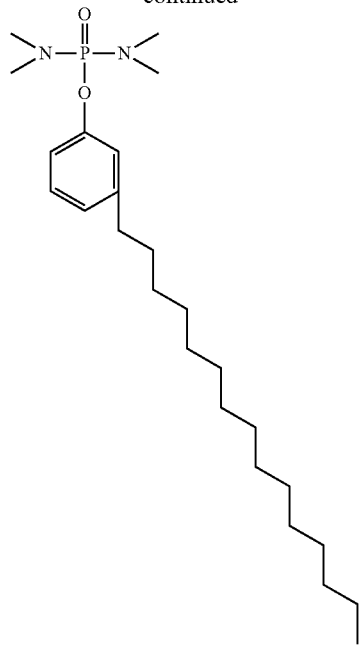
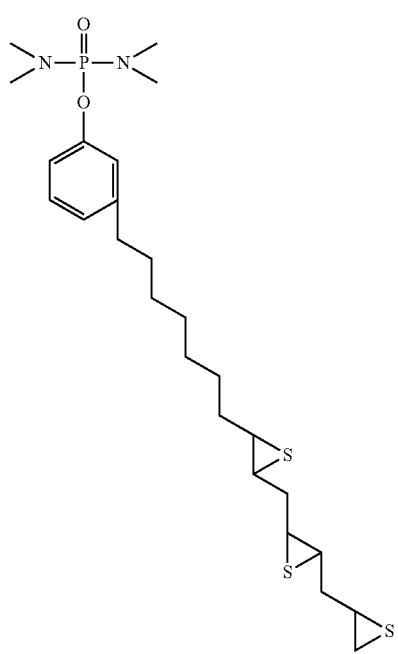
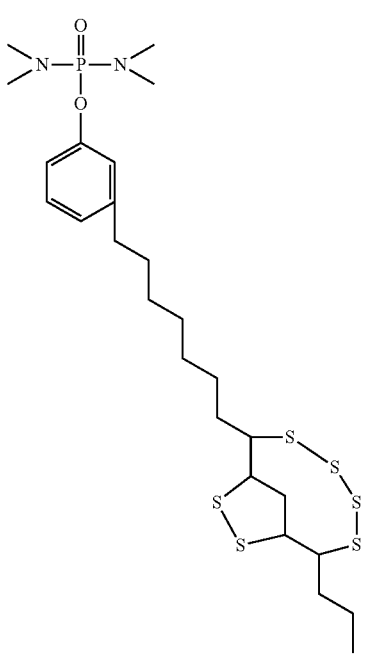

85
-continued
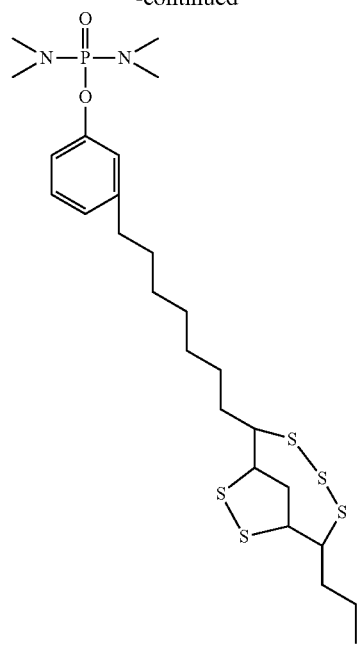
86
-continued
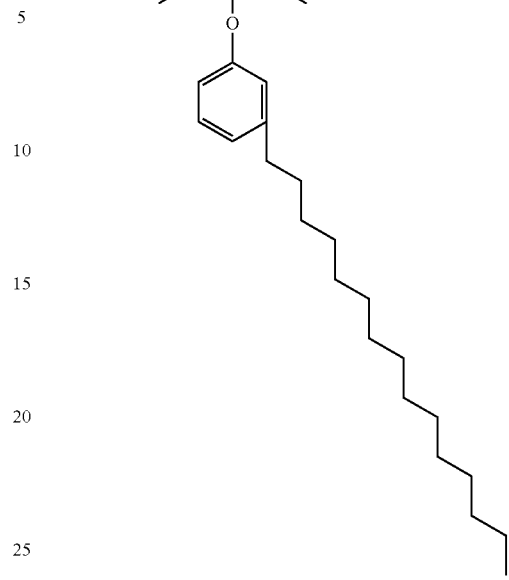
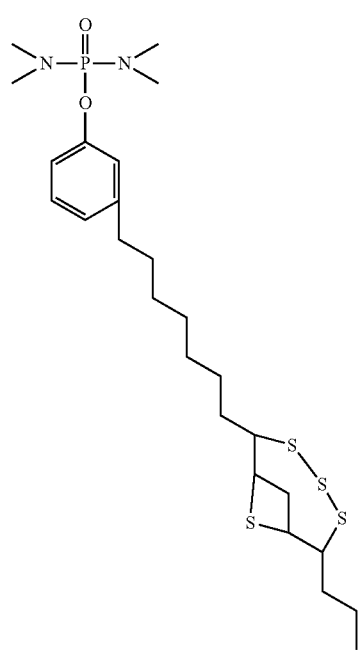
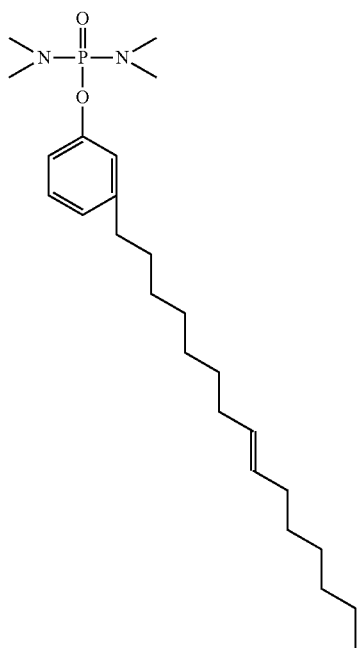 [SMILES: CCCCCCCCCCCCCCCc1cccc(OP(=O)(N(C)C)N(C)C)c1]

-continued

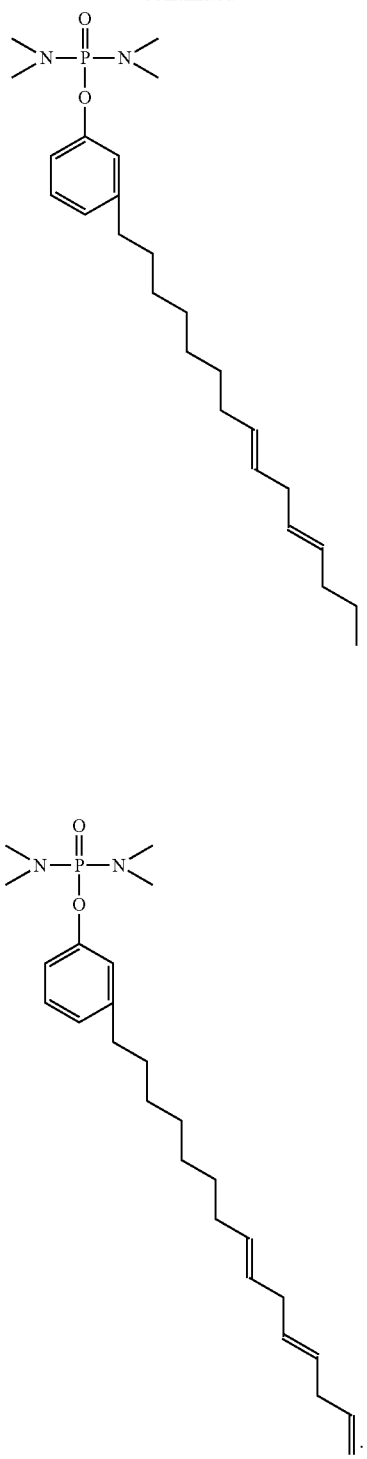

The organophosphorus compound of the present invention can be a single organophosphorus compound, or a mixture of multiple organophosphorus compounds conforming to the above general formula (I) in any proportion. In this case, whether the single compound or the mixture of compounds are contained within the scope of the present invention. In an embodiment of the present invention. the phosphonate ester compound has a structure as represented by the general formula (I):

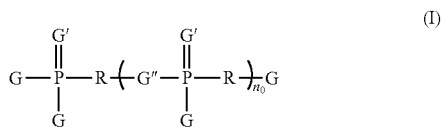

In the general formula (I), groups G are, identical to or different from each other, each independently selected from H, $C_1$-$C_{10}$ linear or branched alkyl, $C_1$-$C_{10}$ linear or branched alkoxyl, $C_6$-$C_{10}$ aryl, a group represented by the formula (II), a group represented by the formula (III), wherein at least one G is selected from a group represented by the formula (II);

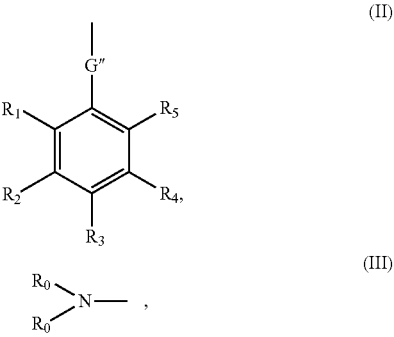

In the general formula (II), groups $R_1$, $R_2$, $R_3$, $R_4$ and $R_5$ are, identical to or different from each other, each independently selected from H, $C_1$-$C_{20}$ linear or branched alkyl, $C_1$-$C_{20}$ linear or branched alkoxyl, a group represented by the formula (II-I), a group represented by the formula (II-II) and a group represented by the formula (II-III), at least one group of groups $R_1$, $R_2$, $R_3$, $R_4$ and $R_5$ is a group represented by the formula (II-I), a group represented by the formula (II-II) or a group represented by the formula (II-III);

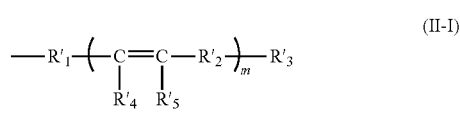

In the general formula (II-I), group $R_1'$ is selected from single bond, $C_{1-20}$ linear or branched alkylene (preferably selected from single bond and $C_{1-4}$ linear or branched alkylene); groups $R_2'$ in m repeating units are, identical to or different from each other, each independently selected from single bond, $C_{1-20}$ linear or branched alkylene (preferably each independently selected from single bond, $C_{1-4}$ linear or branched alkylene); group $R_3'$ is selected from hydrogen, $C_{1-20}$ linear or branched alkyl (preferably selected from hydrogen, $C_{1-4}$ linear or branched alkyl); groups $R_4'$ in m repeating units are, identical to or different from each other, each independently selected from hydrogen, $C_{1-20}$ linear or branched alkyl (preferably each independently selected from hydrogen, $C_{1-4}$ linear or branched alkyl); groups $R_5'$ in m repeating units are, identical to or different from each other, each independently selected from hydrogen, $C_{1-20}$ linear or branched alkyl (preferably each independently selected from hydrogen, $C_{1-4}$ linear or branched alkyl); m is a positive integral number (preferably a positive integral number of 0-10, more preferably a positive integral number of 1-3);

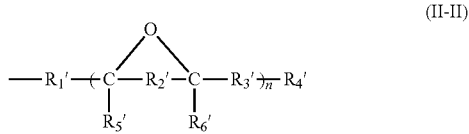
(II-II)

In the general formula (II-II), group $R_1'$ is selected from single bond, $C_{1-20}$ linear or branched alkylene (preferably selected from single bond and $C_{1-4}$ linear or branched alkylene); groups $R_2'$ in n repeating units are, identical to or different from each other, each independently selected from single bond, $C_{1-20}$ linear or branched alkylene (preferably each independently selected from single bond, $C_{1-4}$ linear or branched alkylene); groups $R_3'$ in n repeating units are, identical to or different from each other, each independently selected from single bond, $C_{1-20}$ linear or branched alkylene (preferably each independently selected from single bond, $C_{1-4}$ linear or branched alkylene); group $R_4'$ is selected from hydrogen, $C_{1-20}$ linear or branched alkyl (preferably selected from hydrogen, $C_{1-4}$ linear or branched alkyl); groups $R_5'$ in n repeating units are, identical to or different from each other, each independently selected from hydrogen, $C_{1-20}$ linear or branched alkyl (preferably each independently selected from hydrogen, $C_{1-4}$ linear or branched alkyl); groups $R_6'$ in n repeating units are, identical to or different from each other, each independently selected from hydrogen, $C_{1-20}$ linear or branched alkyl (preferably each independently selected from hydrogen, $C_{1-4}$ linear or branched alkyl); n is a positive integer (preferably a positive integral number of 1-10, more preferably a positive integral number of 1-3);

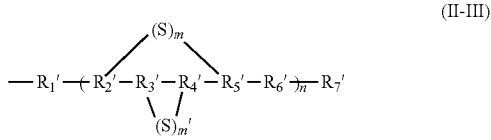
(II-III)

In the general formula (II-III), group $R_1'$ is selected from single bond, $C_{1-20}$ linear or branched alkylene (preferably selected from single bond and $C_{1-4}$ linear or branched alkylene); groups $R_2'$ in n repeating units are, identical to or different from each other, each independently selected from divalent, tervalent or tetravalent $C_{1-20}$ linear or branched alkyl (preferably each independently selected from divalent, tervalent or tetravalent C1-4 linear or branched alkyl); groups $R_3'$ in n repeating units are, identical to or different from each other, each independently selected from single bond, divalent or tervalent $C_{1-20}$ linear or branched alkyl (preferably each independently selected from single bond, divalent or tervalent $C_{1-4}$ linear or branched alkyl); groups $R_4'$ in n repeating units are, identical to or different from each other, each independently selected from single bond, divalent or tervalent $C_{1-20}$ linear or branched alkyl (preferably each independently selected from single bond, divalent or tervalent $C_{1-4}$ linear or branched alkyl); groups $R_5'$ in n repeating units are, identical to or different from each other, each independently selected from divalent, tervalent or tetravalent $C_{1-20}$ linear or branched alkyl (preferably each independently selected from divalent, tervalent or tetravalent $C_{1-4}$ linear or branched alkyl); groups $R_6'$ in n repeating units are, identical to or different from each other, each independently selected from single bond, $C_{1-20}$ linear or branched alkylene (preferably each independently selected from single bond, $C_{1-4}$ linear or branched alkylene); group $R_7'$ is selected from hydrogen, $C_{1-20}$ linear or branched alkyl (preferably selected from hydrogen, $C_{1-4}$ linear or branched alkyl); n is an integral number of 1-10 (preferably an integral number of 1-3); the numbers m in n repeating units are, identical to or different from each other, each independently selected from an integral number of 0-10 (preferably an integral number of 0-5); the numbers m' in n repeating units are, identical to or different from each other, each independently selected from an integral number of 0-10 (preferably an integral number of 0-5); in each repeating unit of the formula (II-III), when m is greater than 0, m sulfur atoms are bonded to groups $R_2'$ and $R_5'$; when m' is greater than 0, m' sulfur atoms are bonded to groups $R_3'$ and $R_4'$; in each repeating unit of the formula (II-III), when group $R_3'$ is a single bond, m' sulfur atoms are bonded to group $R_2'$, when group $R_4'$ is a single bond, m' sulfur atoms are bonded to group $R_5'$; In the general formula (III), groups $R_0$ are selected from H, $C_6$-$C_{20}$ aryl, $C_1$-$C_{30}$ linear or branched alkyl (preferably phenyl, $C_1$-$C_{14}$ alkyl phenyl, $C_1$-$C_{20}$ linear or branched alkyl);

Groups G' present in the general formula (I) are, identical to or different from each other, each independently selected from O, S, $NR_0'$ or the absence (the absence of group G' refers to P corresponding to said group is a tervalent P atom), wherein $R_0'$ is selected from H, $C_6$-$C_{20}$ aryl, $C_1$-$C_{30}$ linear or branched alkyl (preferably phenyl, $C_1$-$C_{14}$ alkyl phenyl, $C_1$-$C_{20}$ linear or branched alkyl);

Groups G" present in the general formula (I) and the general formula (II) are, identical to or different from each other, each independently selected from single bond, O, S, $NR_0'$, wherein $R_0'$ is selected from H, $C_6$-$C_{20}$ aryl, $C_1$-$C_{30}$ linear or branched alkyl, $C_1$-$C_{30}$ linear or branched alkoxyl (preferably phenyl, $C_1$-$C_{14}$ alkyl phenyl, $C_1$-$C_{20}$ linear or branched alkyl);

Groups R in the general formula (I) are each independently selected from single bond, $C_1$-$C_{20}$ linear or branched alkylene, $C_6$-$C_{20}$ arylene;

$n_0$ in the general formula (I) is an integral number of 0-10, preferably an integral number of 0-5, more preferably 0, 1, 2, 3 or 4.

[Process for Preparing an Organophosphorus Compound]

The present invention provides a process for preparing an organophosphorus compound, comprising the following steps:

Step A of subjecting a phenol compound represented by the general formula (X) to an epoxidation reaction or a sulfurization reaction or an optional hydrogenation reaction; and Step B of reacting the product obtained in step A with a phosphorous compound represented by the general formula (X');

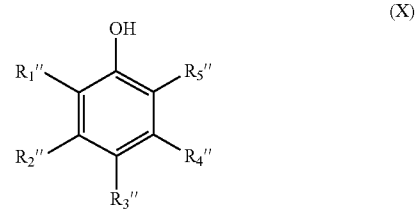
(X)

In the general formula (X), groups $R_1"$, $R_2"$, $R_3"$, $R_4"$ and $R_5"$ are, identical to or different from each other, each independently selected from H, $C_1$-$C_{20}$ linear or branched alkyl, $C_1$-$C_{20}$ linear or branched alkoxyl and a group represented by the general formula (Y), wherein at least one group is a group represented by the general formula (Y);

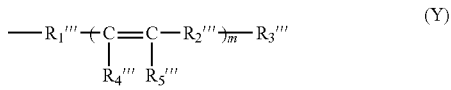
(Y)

Wherein group $R_1'''$ is selected from single bond and $C_1$-$C_{20}$ linear or branched alkylene; groups $R_2'''$ in m repeating units are, identical to or different from each other, each independently selected from single bond and $C_1$-$C_{20}$ linear or branched alkylene; group $R_3'''$ is selected from hydrogen and $C_1$-$C_{20}$ linear or branched alkyl; groups $R_4'''$ in m repeating units are, identical to or different from each other, each independently selected from hydrogen and $C_1$-$C_{20}$ linear or branched alkyl; groups $R_5'''$ in m repeating units are, identical to or different from each other, each independently selected from hydrogen and $C_1$-$C_{20}$ linear or branched alkyl; m is a positive integer;

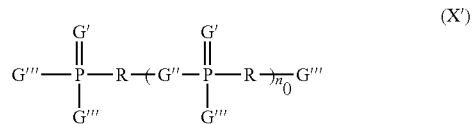
(X')

Groups G' present in the general formula (X') are, identical to or different from each other, each independently selected from O, S and $NR_0'$ or the absence, wherein $R_0'$ is selected from H, $C_6$-$C_{20}$ aryl, $C_1$-$C_{20}$ linear or branched alkyl $C_6$-$C_{20}$ aryl and $C_1$-$C_{30}$ linear or branched alkyl;

Groups G" present in the general formula (X') are, identical to or different from each other, each independently selected from single bond, O, S and $NR_0'$, wherein $R_0'$ is selected from H, $C_6$-$C_{20}$ aryl, $C_1$-$C_{20}$ linear or branched alkyl $C_6$-$C_{20}$ aryl and $C_1$-$C_{30}$ linear or branched alkyl;

Groups R in the general formula (X') are independently selected from single bond, $C_1$-$C_{20}$ linear or branched alkylene and $C_6$-$C_{20}$ arylene;

Groups G''' present in the general formula (X') are, identical to or different from each other, each independently selected from A, $-N(R_0')_2$ and $R_Z$; wherein group $R_Z$ is each independently selected from H, $C_1$-$C_{30}$ linear or branched alkyl, $C_1$-$C_{30}$ linear or branched alkoxyl, $C_6$-$C_{20}$ aryl, $C_1$-$C_{20}$ linear or branched alkyl $C_6$-$C_{20}$ aryl, groups $R_0'$ are each independently selected from H, $C_6$-$C_{20}$ aryl, $C_1$-$C_{20}$ linear or branched alkyl $C_6$-$C_{20}$ aryl and $C_1$-$C_{30}$ linear or branched alkyl, wherein groups A are each independently selected from F, Cl, Br, I and OH, wherein at least one group G''' is A;

In the general formula (X'), $n_0$ is an integral number of 0-10.

In an embodiment of the present invention, the phenol compound represented by the general formula (X) according to the present invention is preferably derived from cardanol in the cashew nut shell liquid as natural plant product, and has a structure as shown below:

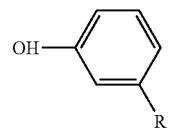

Wherein, R is $C_{15}H_{(31+x)}$, x is 0, −2, −4 or −6. In an embodiment of the present invention, the long chain of R being $C_{15}H_{(31+x)}$ is free of unsaturated double bond. In an embodiment of the present invention, the long chain of R being $C_{15}H_{(31+x)}$ contains one unsaturated double bond. In an embodiment of the present invention, the long chain of R being $C_{15}H_{(31+x)}$ contains two unsaturated double bonds. In an embodiment of the present invention, the long chain of R being $C_{15}H_{(31+x)}$ contains three unsaturated double bonds. In an embodiment of the present invention, the long chain of R being $C_{15}H_{(31+x)}$ is a carbon chain containing 15 carbon atoms and 0-3 olefinic bonds, wherein the olefinic bond(s) may appear at 8-position, 11-position and 14-position respectively.

In an embodiment of the present invention, in the formula (Y), $R_1'''$ and $R_2'''$ are preferably each independently selected from single bond and $C_1$-$C_4$ linear or branched alkylene. In an embodiment of the present invention, in the formula (Y), $R_3'''$, $R_4'''$ and $R_5'''$ are preferably each independently selected from hydrogen and $C_1$-$C_4$ linear or branched alkyl.

In an embodiment of the present invention, in the formula (Y), m is preferably a positive integral number of 1-10, more preferably a positive integral number of 1-3.

In an embodiment of the present invention, in the formula (X'), G' is absent, namely P is a tervalent P atom.

In an embodiment of the present invention, in the formula (X'), $R_0'$ in group G', group G" and group G''' is preferably selected from phenyl, $C_1$-$C_{14}$ alkyl phenyl and $C_1$-$C_{20}$ linear or branched alkyl.

In an embodiment of the present invention, in the formula (X'), group R is preferably selected from single bond, $C_1$-$C_{10}$ linear or branched alkylene, $C_6$-$C_{10}$ arylene.

In an embodiment of the present invention, in the formula (X'), Rz in group G''' is preferably each independently selected from H, $C_1$-$C_{10}$ linear or branched alkyl, $C_1$-$C_{10}$ linear or branched alkoxyl, $C_6$-$C_{10}$ aryl, $C_1$-$C_{14}$ alkyl phenyl.

In an embodiment of the present invention, in the formula (X'), A is preferably each independently selected from Cl and Br.

In an embodiment of the present invention, in the formula (X'), $n_0$ is preferably an integral number of 0-5, more preferably 0, 1, 2, 3 or 4.

In an embodiment of the present invention, in the general formula (X), groups $R_1''$, $R_3''$ and $R_5''$ are, identical to or different from each other, each independently selected from hydrogen and $C_1$-$C_4$ linear or branched alkyl. In an embodiment of the present invention, in the general formula (X), groups $R_1''$, $R_3''$ and $R_5''$ are, identical to or different from each other, each independently selected from H, methyl, ethyl, propyl, isopropyl, n-butyl, isobutyl and tert-butyl.

In an embodiment of the present invention, in the general formula (X), groups $R_2''$ and $R_4''$ are, identical to or different from each other, each independently selected from hydrogen, $C_1$-$C_{20}$ linear or branched alkyl and the group represented by the general formula (Y), wherein at least one group is the group represented by the general formula (Y). In an embodiment of the present invention, in the general formula (X), one group of groups $R_2''$ and $R_4''$ is selected from a group represented by the general formula (Y), the other group is selected from hydrogen.

In an embodiment of the present invention, the phosphorous compound represented by the general formula (X') is selected from a thiophosphorylating agent and/or a phosphorus-nitridizing agent.

In an embodiment of the present invention, the thiophosphorylating agent has a structure as shown by the formula (Z):

Wherein Rz is selected from H, $C_1$-$C_{30}$ linear or branched alkyl, $C_1$-$C_{30}$ linear or branched alkoxyl, $C_6$-$C_{20}$ aryl, $C_1$-$C_{20}$ linear or branched alkyl $C_6$-$C_{20}$ aryl (preferably each independently selected from H, $C_1$-$C_{10}$ linear or branched alkyl, $C_1$-$C_{10}$ linear or branched alkoxyl, $C_6$-$C_{10}$ aryl, $C_1$-$C_{14}$ alkyl phenyl); groups A are each independently selected from F, Cl, Br, I and OH (preferably each independently selected from Cl and Br).

In an embodiment of the present invention, the thiophosphorylating agent can be selected from one or more of thiophosphoryl chloride, thiophosphonic dichloride, $C_1$-$C_{30}$ linear or branched alkyl thiophosphonic dichloride, $C_1$-$C_{20}$ linear or branched alkyl phenyl thiophosphonic dichloride and phenyl thiophosphonic dichloride (preferably phenyl thiophosphonic dichloride).

In an embodiment of the present invention, the phosphorus-nitridizing agent has a structure as shown by the formula (Z'):

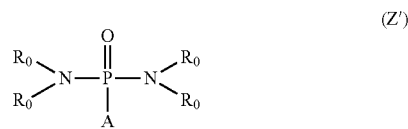

Wherein groups $R_0$ are each independently selected from H, $C_6$-$C_{20}$ aryl, $C_1$-$C_{20}$ linear or branched alkyl $C_6$-$C_{20}$ aryl and $C_1$-$C_{30}$ linear or branched alkyl (preferably each independently selected from phenyl, $C_1$-$C_{14}$ alkyl phenyl and $C_1$-$C_{20}$ linear or branched alkyl); group A is each independently selected from F, Cl, Br, I, H and OH (preferably each independently selected from Cl and Br).

In an embodiment of the present invention, the phosphorus-nitridizing agent can be selected from one or more of amino phosphoryl chloride, $C_1$-$C_{10}$ alkylaminophosphoryl chloride, $C_1$-$C_{20}$ linear or branched alkyl phenylamino phosphoryl chloride and phenylamino phosphoryl chloride, preferably $C_1$-$C_{10}$ alkylaminophosphoryl chloride.

According to the preparation process of the present invention, either step A of subjecting the phenol compound represented by the general formula (X) to an epoxidation reaction or a sulfurization reaction or an optional hydrogenation reaction is first performed, and step B of reacting the product of step A with the phosphorous compound represented by the general formula (X') is then performed; or step B of reacting the phenol compound represented by the general formula (X) with the phosphorous compound represented by the general formula (X') is first performed, and step A of subjecting the product of step B to an epoxidation reaction or a sulfurization reaction or an optional hydrogenation reaction is then performed.

Namely, in the present invention, the phenol compound represented by the general formula (X) or the product of the above-mentioned step B may be subjected to an epoxidation reaction, or subjected to a sulfurization reaction, or subjected to an optional hydrogenation reaction. The present invention may include at least one of the above-mentioned reactions. If the optional hydrogenation reaction is included, the hydrogenation reaction will be performed, or the hydrogenation reaction will not be performed, i.e., here the preparation process of the present invention only includes step B.

According to the preparation process of the present invention, the epoxidation reaction is to react a phenol compound represented by the general formula (X) or a product obtained from step B of reacting a phenol compound represented by the general formula (X) with a phosphorous compound represented by the general formula (X') (hereinafter, sometimes also abbreviated as the product of step B) with an epoxidizing agent. The epoxidation reaction is an electrophilic addition reaction of an epoxidizing agent with a carbon-carbon double bond (olefinic bond) to generate an epoxy group. When there is one carbon-carbon double bond in the molecule, a single epoxy group is generated, and when there are two or more carbon-carbon double bonds in the molecule, a single epoxy group and/or two or more epoxy groups can be generated depending on the reaction conditions, the molar ratio of the reactants, and the like, in this case, the generated epoxide can be a mixture of epoxides having the single epoxy group located at different positions, or a mixture of epoxides having different numbers of epoxy groups in the molecule, or a mixture of the above two.

According to the preparation process of the present invention, the used epoxidizing agent can be those epoxidizing agents useful for the epoxidation reaction well known in the art. The epoxidizing agent is preferably a peroxide, for example can be selected from one or more of hydrogen peroxide, peroxyformic acid, peroxyacetic acid, peroxysulfonic acid, m-chloro peroxybenzoic acid, tert-butyl hydroperoxide, tert-butyl peroxyacetate, methyl ethyl ketone peroxide, dibenzoyl peroxide and cyclohexanone peroxide.

According to the preparation process of the present invention, in the epoxidation reaction, the reaction mole ratio of the phenol compound represented by the general formula (X) or the product of step B to the epoxidizing agent, depending on the number of the epoxy group(s) to be generated, is preferably 1:1-10, more preferably 1:2-5. The conditions of the epoxidation reaction can be those epoxidation conditions well known in the art, for example the reaction temperature is 0° C.-100° C., preferably 10° C.-80° C. Usually, the longer the reaction time is, the higher the conversion is, and under the overall consideration of the reaction conversion and the reaction economy, the reaction time is generally 0.5-10 hours, preferably 3-5 hours.

According to the preparation process of the present invention, in the epoxidation reaction, a catalyst is optionally but preferably added. The catalyst useful for the epoxidation reaction well known in the art can be used as the catalyst, and the catalyst is preferably an inorganic acid, for example can be selected from one or more of sulfuric acid, hydrochloric acid, phosphoric acid, nitric acid, a heteropoly acid and a solid acid. The mass of the catalyst is not particularly limited, and usually is 0.01%-3%, preferably 0.2%-0.6% by mass of the phenol compound represented by the general formula (X) or the product of step B.

According to the preparation process of the present invention, after the completion of the epoxidation reaction, the reaction product may be subjected to a purification treatment by using the method well known in the art, the method of the purification treatment comprises one or more of water washing, distillation, filtration, drying, and recrystallization methods, without particular limitation. After an inorganic acid catalyst has been added in the epoxidation reaction, the method of the purification treatment can comprise one or more of alkali washing, water washing, distillation, filtration, drying, and recrystallization methods.

According to the preparation process of the present invention, the sulfurization comprises a step of reacting a phenol compound represented by the general formula (X) or a product obtained from step B of reacting a phenol compound represented by the general formula (X) with a phosphorous compound represented by the general formula (X') (hereinafter, sometimes also abbreviated as the product of step B) with a sulfurizing agent. The epoxidation reaction is an electrophilic addition reaction of a sulfurizing agent with a carbon-carbon double bond (olefinic bond) to generate a thia cyclic group. When there is one carbon-carbon double bond in the molecule, a single sulfur ring group is generated, and when there are two or more carbon-carbon double bonds in the molecule, a single sulfur ring group and/or two or more sulfur ring groups can be generated depending on the reaction conditions, the molar ratio of the reactants, and the like. In this case, the generated cyclic sulfide can be a mixture of cyclic sulfides having the single sulfur ring group located at different positions, or a mixture of cyclic sulfides having different numbers of sulfur ring groups in the molecule, or a mixture of the above two. According to the preparation process of the present invention, a sulfurizing agent well known in the art and useful in the thia cyclization reaction can be used as the sulfurizing agent. The sulfurizing agent is preferably an inorganic sulfurizing agent and/or an organic sulfurizing agent, the inorganic sulfurizing agent can be selected from one or more of sulphur, $Na_2S$, $K_2S$, ZnS, $H_2S$ and SCI; the organic sulfurizing agent can be selected from one or more of ditertbutyl polysulfide (DBPS), dimethyl disulphide (DMDS), dimethyl sulfide (DMS), ethyl mercaptan (EM), n-butyl mercaptan (NBM) and tertnonyl polysulfide (TNPS); the sulfurizing agent is more preferably one or more of sulphur, $Na_2S$ and thiol.

According to the preparation process of the present invention, in the sulfurization reaction, the reaction molar ratio of the phenol compound represented by the general formula (X) or the product of step B to the sulfurizing agent, depending on the number of the sulfur ring group(s) to be generated, is preferably 1:1-6, more preferably 1:2-4. The sulfurization reaction conditions can be those sulfurization conditions well known in the art, for example the reaction temperature is 100° C.-240° C., preferably 140° C.-190° C. Usually, the longer the reaction time is, the higher the conversion is, and under the overall consideration of the reaction conversion and the reaction economy, the reaction time is generally 0.5-10 hours, preferably 3-5 hours.

According to the preparation process of the present invention, in the sulfurization reaction, a catalyst is optionally but preferably added. The catalyst useful for the sulfurization reaction well known in the art can be used as the catalyst, and the catalyst is preferably selected from $C_1$-$C_6$ organic amine and an inorganic base, for example can be selected from one or more of methylamine, dimethylamine, ethylamine, diethylamine, propylamine, dipropyl amine, tripropyl amine, butylamine, amylamine, hexylamine, ammonia water, sodium hydroxide, potassium hydroxide, zinc hydroxide, sodium oxide, potassium oxide, zinc oxide, sodium carbonate, potassium carbonate and zinc carbonate. The mass of the catalyst is not particularly limited, and usually is 0.01%-10%, preferably 0.1%-5% by mass of the phenol compound represented by the general formula (X) or the product of step B.

According to the preparation process of the present invention, after the completion of the sulfurization reaction, the reaction product may be subjected to a purification treatment by using the method well known in the art, the method of the purification treatment comprises one or more of water washing, distillation, filtration, drying, and recrystallization methods, without particular limitation. After an organic amine and/or inorganic base catalyst is added to the sulfurization reaction, the refining treatment method may comprise one or more of acid washing, water washing, distillating, filtering, drying and recrystallization method.

According to the preparation process of the present invention, the hydrogenation reaction step is an optional step, namely the hydrogenation reaction will be performed, or alternatively the hydrogenation reaction will not be performed. In the case that the hydrogenation reaction is performed, the carbon-carbon double bond in a phenol compound represented by the general formula (X) or a product obtained from step B of reacting a phenol compound represented by the general formula (X) with a phosphorous compound represented by the general formula (X') is hydrogenated, which can be a partial hydrogenation, or alternatively a full hydrogenation.

According to the preparation process of the present invention, in case that the hydrogenation reaction step is not performed, the preparation process of the present invention may only comprise step B, namely, the reaction of the phenol compound represented by the general formula (X) with the phosphorous compound represented by the general formula (X').

According to the preparation process of the present invention, as the technological conditions of the optional hydrogenation reaction step, the hydrogenation reaction conditions well known in the art can be used, and preferably hydrogen pressure: 1.0-6.0 MPa (preferably 3.0-4.0 MPa), temperature: 60° C.-260° C. (preferably 180° C.-220° C.), and time: 0.5-10 hours (preferably 3-5 hours). Preferably, a hydrogenation catalyst is added during the hydrogenation reaction. The hydrogenation catalyst can be a hydrogenation catalyst well known in the art without particular limitation. The hydrogenation catalyst is preferably a transition metal or a catalyst of transition metal-loaded support, and for example can be selected from palladium carbon catalyst, and Raney's nickel. The addition amount of the hydrogenation catalyst is preferably 0.1%-10%, more preferably 0.5%-5% by the mass of the phenol compound represented by the general formula (X) or the product of step B.

According to the preparation process of the present invention, the conditions of reacting the phenol compound represented by the general formula (X) or the product of step A obtained from subjecting the phenol compound represented by the general formula (X) to the epoxidation reaction or the sulfurization reaction or the optional hydrogenation reaction (hereinafter sometimes also referred to as the product of step A) with the phosphorous compound represented by the general formula (X') comprise: the molar ratio of the phosphorous compound represented by the general formula (X') to the phenol compound represented by the general formula (X) or the product of step A is 1:1-10 (preferably 1:1-5); the reaction temperature is 50° C.-150° C. (preferably 60° C.-100° C.). In general, the longer the reaction time is, the higher the conversion is, usually the reaction time is 0.5h-10h (preferably 3h-5h).

According to the preparation process of the present invention, in the reaction of the phenol compound represented by the general formula (X) or the product of step A with the phosphorous compound represented by the general formula (X'), a catalyst is optionally but preferably added. The catalyst is preferably $C_1$-$C_{10}$ organic amine and inorganic ammonium, for example can be one or more selected from methylamine, dimethylamine, trimethylamine, ethylamine, diethylamine, triethylamine, propylamine, dipropylamine, tripropylamine, butylamine, dibutylamine and ammonia. The addition amount of the catalyst is preferably 0.1%-60%, more preferably 10%-40% by the mass of the phenol compound represented by the general formula (X) or the product of step A.

In the reaction of the phenol compound represented by the general formula (X) or the product of step A and phosphorous compound represented by the general formula (X'), a solvent is optionally but preferably added. Said solvent is preferably one or more of toluene, xylene, petroleum ether and cyclohexane, for example can be selected from toluene and/or xylene. The used amount of said solvent is 50%-500% (preferably 100%-300%) by the mass of the phenol compound represented by the general formula (X) or the product of step A. After the completion of the reaction, the purification can be performed with the method well known in the art, the catalyst and the solvent can be removed by one or more of the methods comprising acid washing, water washing, distillating, filtering, drying and recrystallization without particular limitation.

According to the preparation process of the present invention, preferably, the phosphorous compound represented by the general formula (X') is selected from a thiophosphorylating agent and/or a phosphorus-nitridizing agent. Either step A of subjecting the phenol compound represented by the general formula (X) to an epoxidation reaction or a sulfurization reaction or an optional hydrogenation reaction is first performed, and step B of subjecting the product of step A and a thiophosphorylating agent and/or a phosphorus-nitridizing agent to the thiophosphorylation reaction and/or the phosphorus-nitridation reaction is then performed, or step B of subjecting the phenol compound represented by the general formula (X) and a thiophosphorylating agent and/or a phosphorus-nitridizing agent to the thiophosphorylation reaction and/or the phosphorus-nitridation reaction is first performed, step A of subjecting the product of step B to an epoxidation reaction or a sulfurization reaction or an optional hydrogenation reaction is then performed.

According to the preparation process of the present invention, preferably, as the conditions of reacting the phenol compound represented by the general formula (X) or the product of step A obtained from subjecting the phenol compound represented by the general formula (X) to the epoxidation reaction or the sulfurization reaction or the optional hydrogenation reaction (hereinafter sometimes also referred to as the product of step A) with the thiophosphorylating agent, the conditions of the phosphorylation reaction well known in the art can be used, for example, the reaction conditions can comprise: the molar ratio of the thiophosphorylating agent to the phenol compound represented by the general formula (X) or the product of step A is 1:1-10 (preferably 1:1-5); the reaction temperature is 50° C.-150° C. (preferably 60° C.-100° C.); in general, the longer the reaction time is, the higher the conversion is, usually the reaction time is 0.5h-10h (preferably 3h-5h).

In the thiophosphorylation reaction, a catalyst is optionally but preferably added. The catalyst is preferably $C_1$-$C_{10}$ organic amine and inorganic ammonium, for example can be one or more selected from methylamine, dimethylamine, trimethylamine, ethylamine, diethylamine, triethylamine, propylamine, dipropyl amine, tripropyl amine, butylamine, dibutylamine and ammonia. The addition amount of the catalyst is preferably 0.1%-60%, more preferably 10%-40% by the mass of the phenol compound represented by the general formula (X) or the product of step A.

In the reaction of the phenol compound represented by the general formula (X) or the product of step A and the thiophosphorylating agent, a solvent is optionally but preferably added. Said solvent is preferably one or more of toluene, xylene, petroleum ether and cyclohexane, for example can be selected from toluene and/or xylene. The used amount of said solvent is 50%-500% (preferably 100%-300%) by the mass of the phenol compound represented by the general formula (X) or the product of step A. The catalyst and the solvent can be removed by one or more of the methods comprising acid washing, water washing, distillating, filtering, drying and recrystallization without particular limitation.

According to the preparation process of the present invention, after the completion of the thiophosphorylation reaction, the reaction product may be subjected to a purification treatment by using the method well known in the art, the method of the purification treatment comprises one or more of water washing, distillating, filtering, drying and recrystallization method without particular limitation.

According to the preparation process of the present invention, preferably, as the conditions of the phosphorus-nitridation reaction of the phenol compound represented by the general formula (X) or the product of step A obtained from subjecting the phenol compound represented by the general formula (X) to the epoxidation reaction or the sulfurization reaction or the optional hydrogenation reaction (hereinafter sometimes also referred to as the product of step A) and the phosphorus-nitridizing agent, the conditions of the phosphorylation reaction well known in the art can be used, for example, the reaction conditions may comprise: the molar ratio of the phosphorus-nitridizing agent to the phenol compound represented by the general formula (X) or a sulfurization product thereof is 1:1-10 (preferably 1:1-3); the reaction temperature is 50° C.-150° C. (preferably 60° C.-100° C.); in general, the longer the reaction time is, the higher the conversion is, usually the reaction time is 0.5h-10h (preferably 3h-5h).

In the reaction of the phenol compound represented by the general formula (X) or the product of step A and the phosphorus-nitridizing agent, a catalyst is optionally but preferably added. The catalyst is preferably $C_1$-$C_{10}$ organic amine and inorganic ammonium, for example can be one or more selected from methylamine, dimethylamine, trimethylamine, ethylamine, diethylamine, triethylamine, propylamine, dipropyl amine, tripropyl amine, butylamine, dibutylamine and ammonia. The addition amount of the catalyst is preferably 0.1%-60%, more preferably 10%-40% by the mass of the phenol compound represented by the general formula (X) or the product of step A.

In the reaction of the phenol compound represented by the general formula (X) or the product of step A and phosphorus-nitridizing agent, a solvent is optionally but preferably added. Said solvent is preferably one or more of toluene, xylene, petroleum ether and cyclohexane, for example can be selected from toluene and/or xylene. The used amount of said solvent is 50%-500% (preferably 100%-300%) by the mass of the phenol compound represented by the general formula (X) or the product of step A. The catalyst and the solvent can be removed by one or more of the methods comprising acid washing, water washing, distillating, filtering, drying and recrystallization without particular limitation.

According to the preparation process of the present invention, after the completion of the reaction of the phenol compound represented by the general formula (X) or the product of step A and the phosphorus-nitridizing agent, the reaction product may be subjected to a purification treatment by using the method well known in the art, the method of the purification treatment comprises one or more of water washing, distillating, filtering, drying and recrystallization method without particular limitation.

In an embodiment of the present invention, process for preparing the phosphonate ester compound, comprising step A of subjecting the phenol compound represented by the general formula (X) to an epoxidation reaction or a sulfurization reaction or an optional hydrogenation reaction, step B of reacting with the phosphorous compound represented by the general formula (X');

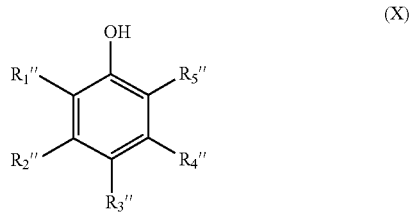

(X)

In the general formula (X), groups $R_1''$, $R_2''$, $R_3''$, $R_4''$ and $R_5''$ are, identical to or different from each other, each independently selected from H, $C_1$-$C_{20}$ linear or branched alkyl and a group represented by the general formula (Y), wherein at least one group is selected from a group represented by the general formula (Y);

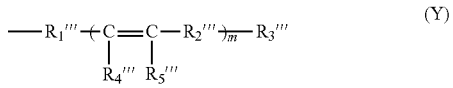

(Y)

Wherein group $R_1'''$ is selected from single bond, $C_{1-20}$ linear or branched alkylene (preferably selected from single bond and $C_{1-4}$ linear or branched alkylene); groups $R_2'''$ in m repeating units are, identical to or different from each other, each independently selected from single bond, $C_{1-20}$ linear or branched alkylene (preferably each independently selected from single bond, $C_{1-4}$ linear or branched alkylene); group $R_3'''$ is selected from hydrogen, $C_{1-20}$ linear or branched alkyl (preferably selected from hydrogen, $C_{1-4}$ linear or branched alkyl); groups $R_4'''$ in m repeating units are, identical to or different from each other, each independently selected from hydrogen, $C_{1-20}$ linear or branched alkyl (preferably each independently selected from hydrogen, $C_{1-4}$ linear or branched alkyl); groups $R_5'''$ in m repeating units are, identical to or different from each other, each independently selected from hydrogen, $C_{1-20}$ linear or branched alkyl (preferably each independently selected from hydrogen, $C_{1-4}$ linear or branched alkyl); m is a positive integer (preferably a positive integral number of 1-10, more preferably a positive integral number of 1-3);

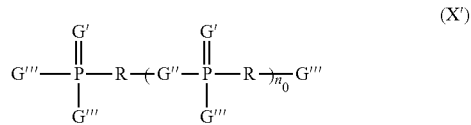

(X')

Groups G' present in the general formula (X') are, identical to or different from each other, each independently selected from O, S, $NR_0'$ or the absence (the absence of group G' refers to P corresponding to said group is a tervalent P atom), wherein $R_0'$ is selected from H, $C_6$-$C_{20}$ aryl, $C_1$-$C_{30}$ linear or branched alkyl (preferably phenyl, $C_1$-$C_{14}$ alkyl phenyl, $C_1$-$C_{20}$ linear or branched alkyl);

Groups G" present in the general formula (X') are, identical to or different from each other, each independently selected from single bond, O, S, $NR_0'$, wherein $R_0'$ is selected from H, $C_6$-$C_{20}$ aryl, $C_1$-$C_{30}$ linear or branched alkyl, $C_1$-$C_{30}$ linear or branched alkoxyl (preferably phenyl, $C_1$-$C_{14}$ alkyl phenyl, $C_1$-$C_{20}$ linear or branched alkyl);

Groups R in the general formula (X') are each independently selected from single bond, $C_1$-$C_{20}$ linear or branched alkylene, $C_6$-$C_{20}$ arylene (preferably single bond, $C_1$-$C_{10}$ linear or branched alkylene, phenylene, $C_6$-$C_{10}$ arylene);

Groups G''' present in the general formula (X') are, identical to or different from each other, each independently selected from —OA, —SA, —N($R_0'$)$_2$ and $R_0'$, wherein groups $R_0'$ are each independently selected from H, $C_6$-$C_{20}$ aryl, $C_1$-$C_{30}$ linear or branched alkyl (preferably phenyl, $C_1$-$C_{14}$ alkyl phenyl, $C_1$-$C_{20}$ linear or branched alkyl), wherein groups A are selected from F, Cl, Br, I, OH (preferably Cl, Br);

In the general formula (X'), $n_0$ is an integral number of 0-10, preferably an integral number of 0-5, more preferably 0, 1, 2, 3 or 4.

According to the present invention, in the process for preparing the organophosphorus compound, the reaction product can be either an organophosphorus compound of single structure or a mixture of organophosphorus compounds containing a plurality of structures. These reaction products are all contemplated by the present invention, and the diversity in their occurrence forms does not affect the achievement of the effects of the present invention. Therefore, these reaction products are collectively referred to as the organophosphorus compound of the present invention without distinction in the context of the present specification. Especially, with respect to the cardanol, in the carbon chain as R of the cardanol being of 15 carbon atoms, the olefinic bond(s) may appear at 8-position, 11-position and 14-position respectively, and the proportions of saturated and unsaturated cardanols in the cardanol are respectively: about 41% of the cardanol having three olefinic bonds, about 22% of the cardanol having two olefinic bonds, about 34% of the cardanol having one olefinic bond, and the balance of the saturated cardanol. In view of this, according to the present invention, there is no absolute necessity to further purify the reaction products or to further separate an organophosphorus compound having a specific structure from these reaction products. Of course, sometimes such purification or separation is preferable for further improvement of the intended effect of the present invention, but is not essential to the present invention. Nevertheless, as the purification or separation method, for example, the purification or separation of the reaction product by a method such as washing, filtering, distillating, recrystallization, column chromatography, and preparative chromatography can be enumerated.

According to the present invention, in the process for producing the organophosphorus compound, after said reaction step is completed, volatile substances such as solvents which may be present are removed from the reaction mixture obtained in the step by a known conventional separation method (such as evaporation), and then the reaction product from said step can be obtained.

Hereinafter, a preferred organic phosphorus compound according to the present invention and a preparation process thereof will be described. It should be pointed out that the preferred organophosphorus compound and the preparation process thereof are only the specifically enumerated embodiments of the present invention, and do not limit the present invention.

First Embodiment

According to the first embodiment of the present invention, preferably, the organophosphorus compound has a structure as represented by the general formula (I-1):

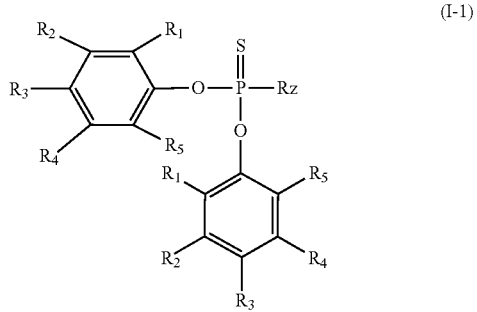

(I-1)

In the general formula (I-1), group $R_Z$ is selected from H, $C_1$-$C_{30}$ linear or branched alkyl, $C_1$-$C_{30}$ linear or branched alkoxyl, $C_6$-$C_{20}$ aryl, $C_1$-$C_{20}$ linear or branched alkyl $C_6$-$C_{20}$ aryl (preferably each independently selected from H, $C_1$-$C_{10}$ linear or branched alkyl, $C_1$-$C_{10}$ linear or branched alkoxyl, $C_6$-$C_{10}$ aryl, $C_1$-$C_{14}$ alkyl phenyl); groups $R_1$, $R_2$, $R_3$, $R_4$ and $R_5$ are, identical to or different from each other, each independently selected from H, $C_1$-$C_{20}$ linear or branched alkyl, $C_1$-$C_{20}$ linear or branched alkoxyl and a group represented by the formula (II-II), at least one group of groups $R_1$, $R_2$, $R_3$, $R_4$ and $R_5$ is a group represented by the formula (II-II);

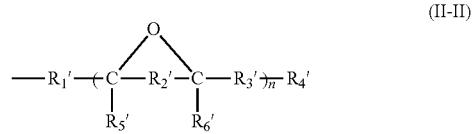

(II-II)

In the general formula (II-II), group $R_1'$ is selected from single bond, $C_1$-$C_{20}$ linear or branched alkylene (preferably selected from single bond and $C_1$-$C_4$ linear or branched alkylene); groups $R_2'$ in n repeating units are, identical to or different from each other, each independently selected from single bond, $C_1$-$C_{20}$ linear or branched alkylene (preferably each independently selected from single bond, $C_1$-$C_4$ linear or branched alkylene); groups $R_3'$ in n repeating units are, identical to or different from each other, each independently selected from single bond, $C_1$-$C_{20}$ linear or branched alkylene (preferably each independently selected from single bond, $C_1$-$C_4$ linear or branched alkylene); group $R_4'$ is selected from hydrogen, $C_1$-$C_{20}$ linear or branched alkyl (preferably selected from hydrogen, $C_1$-$C_4$ linear or branched alkyl); groups $R_5'$ in n repeating units are, identical to or different from each other, each independently selected from hydrogen, $C_1$-$C_{20}$ linear or branched alkyl (preferably each independently selected from hydrogen, $C_1$-$C_4$ linear or branched alkyl); groups $R_6'$ in n repeating units are, identical to or different from each other, each independently selected from hydrogen, $C_1$-$C_{20}$ linear or branched alkyl (preferably each independently selected from hydrogen, $C_1$-$C_4$ linear or branched alkyl); n is a positive integral number (preferably a positive integral number of 1-10, more preferably a positive integral number of 1-3).

According to the first embodiment of the present invention, preferably, in the general formula (I-1), groups $R_1$ and $R_5$ are each independently selected from H, $C_1$-$C_4$ linear or branched alkyl; groups $R_2$ and $R_4$ are each independently selected from hydrogen, $C_1$-$C_{20}$ linear or branched alkyl and a group represented by the formula (II-II), wherein at least one group is a group represented by the general formula (II-II); groups $R_3$ are each independently selected from H and $C_1$-$C_{20}$ linear or branched alkyl.

According to the first embodiment of the present invention, preferably, in the general formula (I-1), groups $R_1$ and $R_5$ are each independently selected from H, methyl, ethyl, propyl, isopropyl, n-butyl, isobutyl and tert-butyl; at least one group of groups $R_2$ and $R_4$ is a group represented by the formula (II-II), groups $R_3$ are each independently selected from H and $C_1$-$C_{20}$ linear or branched alkyl.

According to the first embodiment of the present invention, preferably, in the general formula (I-1), groups $R_1$ and $R_5$ are each independently selected from H, methyl, ethyl, propyl, isopropyl, n-butyl, isobutyl and tert-butyl; at least one group in groups $R_2$ is a group represented by the formula (II-II), at least one group in groups $R_4$ is a group represented by the formula (II-II), groups $R_3$ are each independently selected from H and $C_1$-$C_{20}$ linear or branched alkyl.

According to the first embodiment of the present invention, preferably, in the general formula (I-1), groups $R_1$ and $R_5$ are each independently selected from H, methyl, ethyl, propyl, isopropyl, n-butyl, isobutyl and tert-butyl; one group of groups $R_2$ and $R_4$ attached to the same benzene ring is a group represented by the formula (II-II), the other one is H; groups $R_3$ are each independently selected from H and $C_1$-$C_{20}$ linear or branched alkyl. According to the first embodiment of the present invention, the organophosphorus compound represented by the formula (I-1) of the present invention can be prepared by the following preparation process, the preparation process comprises a step of subjecting a phenol compound represented by the general formula (X) to the epoxidation reaction, and a step of subjecting to the thiophosphorylation reaction together with a thiophosphorylating agent represented by the formula (Z). The order for these two reaction steps is not limited. According to the first embodiment of the present invention, in the general formula (X), preferably, groups $R_1''$ and $R_5''$ are, identical to or different from each other, each independently selected from hydrogen, $C_1$-$C_4$ linear or branched alkyl; groups $R_3''$ are each independently selected from H and $C_1$-$C_{20}$ linear or branched alkyl; groups $R_2''$ and $R_4''$ are, identical to or different from each other, each independently selected from hydrogen, $C_1$-$C_{20}$ linear or branched alkyl and a group represented by the general formula (Y), wherein at least one group is selected from a group represented by the general formula (Y).

According to the first embodiment of the present invention, in the general formula (X), further preferably, groups $R_1''$ and $R_5''$ are, identical to or different from each other, each independently selected from hydrogen, $C_1$-$C_4$ linear or branched alkyl; groups $R_3''$ are each independently selected from H and $C_1$-$C_{20}$ linear or branched alkyl; one group of groups $R_2''$ and $R_4''$ is a group represented by the general formula (Y), the other group is hydrogen.

Second Embodiment

According to the second embodiment of the present invention, preferably, the organophosphorus compound has a structure as represented by the general formula (I-2):

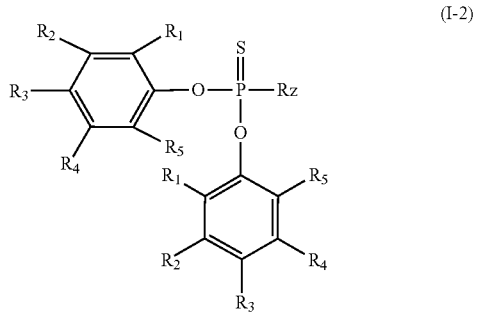

(I-2)

In the general formula (I-2), group $R_Z$ is selected from H, $C_1$-$C_{30}$ linear or branched alkyl, $C_1$-$C_{30}$ linear or branched alkoxyl, $C_6$-$C_{20}$ aryl, $C_1$-$C_{20}$ linear or branched alkyl $C_6$-$C_{20}$ aryl (preferably each independently selected from H, $C_1$-$C_{10}$ linear or branched alkyl, $C_1$-$C_{10}$ linear or branched alkoxyl, $C_6$-$C_{10}$ aryl, $C_1$-$C_4$ alkyl phenyl); groups $R_1$, $R_2$, $R_3$, $R_4$ and $R_5$ are, identical to or different from each other, each independently selected from H, $C_1$-$C_{20}$ linear or branched alkyl, $C_1$-$C_{20}$ linear or branched alkoxyl and a group represented by the formula (II-III), at least one group of groups $R_1$, $R_2$, $R_3$, $R_4$ and $R_5$ is a group represented by the formula (II-III);

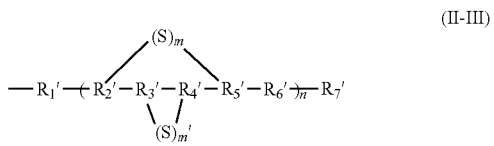

(II-III)

In the general formula (II-III), group $R_1'$ is selected from single bond, $C_1$-$C_{20}$ linear or branched alkylene (preferably selected from single bond and $C_1$-$C_4$ linear or branched alkylene); groups $R_2'$ in n repeating units are, identical to or different from each other, each independently selected from divalent, tervalent or tetravalent $C_1$-$C_{20}$ linear or branched alkyl (preferably each independently selected from divalent, tervalent or tetravalent $C_1$-$C_4$ linear or branched alkyl); groups $R_3'$ in n repeating units are, identical to or different from each other, each independently selected from single bond, divalent or tervalent $C_1$-$C_{20}$ linear or branched alkyl (preferably each independently selected from single bond, divalent or tervalent $C_1$-$C_4$ linear or branched alkyl); groups $R_4'$ in n repeating units are, identical to or different from each other, each independently selected from single bond, divalent or tervalent $C_1$-$C_{20}$ linear or branched alkyl (preferably each independently selected from single bond, divalent or tervalent $C_1$-$C_4$ linear or branched alkyl); groups $R_5'$ in n repeating units are, identical to or different from each other, each independently selected from divalent, tervalent or tetravalent $C_1$-$C_{20}$ linear or branched alkyl (preferably each independently selected from divalent, tervalent or tetravalent $C_1$-$C_4$ linear or branched alkyl); groups $R_6'$ in n repeating units are, identical to or different from each other, each independently selected from single bond, $C_1$-$C_{20}$ linear or branched alkylene (preferably each independently selected from single bond, $C_1$-$C_4$ linear or branched alkylene); group $R_7'$ is selected from hydrogen, $C_1$-$C_{20}$ linear or branched alkyl (preferably selected from hydrogen, $C_1$-$C_4$ linear or branched alkyl); n is an integral number of 1-10 (preferably an integral number of 1-3); the numbers m in n repeating units are, identical to or different from each other, each independently selected from an integral number of 0-10 (preferably an integral number of 0-5); the numbers m' in n repeating units are, identical to or different from each other, each independently selected from an integral number of 0-10 (preferably an integral number of 0-5); in each repeating unit of the formula (II-III), when m is greater than 0, m sulfur atoms are bonded to groups $R_2'$ and $R_5'''$ when m' is greater than 0, m' sulfur atoms are bonded to groups $R_3'$ and $R_4'$; in each repeating unit of the formula (II-III), when group $R_3'$ is a single bond, m' sulfur atoms are bonded to group $R_2'$, when group $R_4'$ is a single bond, m' sulfur atoms are bonded to group $R_5'$.

According to the second embodiment of the present invention, preferably, in the general formula (I-2), groups $R_1$, $R_3$ and $R_5$ are, identical to or different from each other, each independently selected from hydrogen, $C_1$-$C_4$ linear or branched alkyl; groups $R_2$ and $R_4$ are, identical to or different from each other, each independently selected from hydrogen, $C_1$-$C_{20}$ linear or branched alkyl and a group represented by the general formula (II-III), wherein at least one group is a group represented by the general formula (II-III).

According to the second embodiment of the present invention, preferably, in the general formula (I-2), groups $R_1$, $R_3$ and $R_5$ are, identical to or different from each other, each independently selected from hydrogen, $C_1$-$C_4$ linear or branched alkyl; at least one of groups $R_2$ and $R_4$ is a group represented by the general formula (II-III).

According to the second embodiment of the present invention, further preferably, in the general formula (I-2), groups $R_1$, $R_3$ and $R_5$ are, identical to or different from each other, each independently selected from hydrogen, $C_1$-$C_4$ linear or branched alkyl; one group of groups $R_2$ and $R_4$ attached to the same benzene ring is selected from a group represented by the general formula (II-III), the other group is selected from hydrogen.

According to the second embodiment of the present invention, the organophosphorus compound represented by the formula (I-2) of the present invention can be prepared by the following preparation process, wherein the preparation process comprises a step of subjecting the phenol compound represented by the general formula (X) to the sulfurization reaction, and a step of subjecting to the thiophosphorylation reaction together with a thiophosphorylating agent represented by the formula (Z). The order for these two reaction steps is not limited.

According to the second embodiment of the present invention, in the general formula (X), groups $R_1''$, $R_3''$ and $R_5''$ are, identical to or different from each other, each independently selected from hydrogen, $C_1$-$C_4$ linear or branched alkyl; groups $R_2''$ and $R_4''$ are, identical to or different from each other, each independently selected from hydrogen, $C_1$-$C_{20}$ linear or branched alkyl and a group represented by the general formula (Y), wherein at least one group is a group represented by the general formula (Y).

According to the second embodiment of the present invention, further preferably, in the general formula (X), groups $R_1''$, $R_3''$ and $R_5''$ are, identical to or different from each other, each independently selected from hydrogen, $C_1$-$C_4$ linear or branched alkyl; one group of groups $R_2''$ and $R_4''$ is a group represented by the general formula (Y), the other group is hydrogen.

Third Embodiment

According to the third embodiment of the present invention, preferably, the organophosphorus compound has a structure as represented by the general formula (I-3):

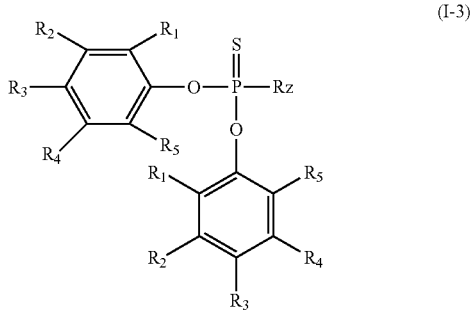

In the general formula (I-3), group $R_Z$ is selected from H, $C_1$-$C_{30}$ linear or branched alkyl, $C_1$-$C_{30}$ linear or branched alkoxyl, $C_6$-$C_{20}$ aryl, $C_1$-$C_{20}$ linear or branched alkyl $C_6$-$C_{20}$ aryl (preferably each independently selected from H, $C_1$-$C_{10}$ linear or branched alkyl, $C_1$-$C_{10}$ linear or branched alkoxyl, $C_6$-$C_{10}$ aryl, $C_1$-$C_{14}$ alkyl phenyl); groups $R_1$, $R_2$, $R_3$, $R_4$ and $R_5$ are, identical to or different from each other, each independently selected from H, $C_1$-$C_{20}$ linear or branched alkyl, $C_1$-$C_{20}$ linear or branched alkoxyl and a group represented by the formula (II-I), at least one group of groups $R_1$, $R_2$, $R_3$, $R_4$ and $R_5$ is a group represented by the formula (II-I);

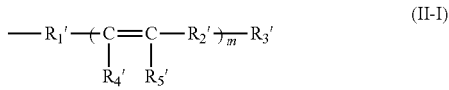

In the general formula (II-I), group $R_1'$ is selected from single bond, $C_1$-$C_{20}$ linear or branched alkylene (preferably selected from single bond and $C_1$-$C_4$ linear or branched alkylene); groups $R_2'$ in m repeating units are, identical to or different from each other, each independently selected from single bond, $C_1$-$C_{20}$ linear or branched alkylene (preferably each independently selected from single bond, $C_1$-$C_4$ linear or branched alkylene); group $R_3'$ is selected from hydrogen, $C_1$-$C_{20}$ linear or branched alkyl (preferably selected from hydrogen, $C_1$-$C_4$ linear or branched alkyl); groups $R_4'$ in m repeating units are, identical to or different from each other, each independently selected from hydrogen, $C_1$-$C_{20}$ linear or branched alkyl (preferably each independently selected from hydrogen, $C_1$-$C_4$ linear or branched alkyl); groups $R_5'$ in m repeating units are, identical to or different from each other, each independently selected from hydrogen, $C_1$-$C_{20}$ linear or branched alkyl (preferably each independently selected from hydrogen, $C_1$-$C_4$ linear or branched alkyl); n is an integral number (preferably an integral number of 0-10, more preferably a positive integral number of 1-3).

According to the third embodiment of the present invention, preferably, in the general formula (I-3), groups $R_1$ and $R_5$ are each independently selected from H, $C_1$-$C_4$ linear or branched alkyl; groups $R_2$ and $R_4$ are each independently selected from hydrogen, $C_1$-$C_{20}$ linear or branched alkyl and a group represented by the formula (II-I), wherein at least one group is a group represented by the general formula (II-I); groups $R_3$ are each independently selected from H and $C_1$-$C_{20}$ linear or branched alkyl.

According to the third embodiment of the present invention, preferably, in the general formula (I-3), groups $R_1$ and $R_5$ are each independently selected from H, methyl, ethyl, propyl, isopropyl, n-butyl, isobutyl and tert-butyl; at least one group of groups $R_2$ and $R_4$ is a group represented by the formula (II-I); groups $R_3$ are each independently selected from H and $C_1$-$C_{20}$ linear or branched alkyl.

According to the third embodiment of the present invention, preferably, in the general formula (I-3), groups $R_1$ and $R_5$ are each independently selected from H, methyl, ethyl, propyl, isopropyl, n-butyl, isobutyl and tert-butyl; at least one group of groups $R_2$ is a group represented by the formula (II-1), at least one group of groups $R_4$ is a group represented by the formula (II-I), groups $R_3$ are each independently selected from H and $C_1$-$C_{20}$ linear or branched alkyl.

According to the third embodiment of the present invention, preferably, in the general formula (I-3), groups $R_1$ and $R_5$ are each independently selected from H, methyl, ethyl, propyl, isopropyl, n-butyl, isobutyl and tert-butyl; one group of groups $R_2$ and $R_4$ attached to the same benzene ring is a group represented by the formula (II-I), the other group is H; groups $R_3$ are each independently selected from H and $C_1$-$C_{20}$ linear or branched alkyl.

According to the third embodiment of the present invention, preferably, an organophosphorus compound represented by the formula (I-3) of the present invention can be prepared by the following preparation process, wherein the preparation process comprises a step of reacting a phenol compound represented by the general formula (X) with a thiophosphorylating agent represented by the formula (Z) and an optional step of hydrogenation reaction. The order for these two reaction steps is not limited.

According to the third embodiment of the present invention, in the general formula (X), preferably, groups $R_1''$ and $R_5''$ are, identical to or different from each other, each independently selected from hydrogen, $C_1$-$C_4$ linear or branched alkyl; group $R_3''$ is each independently selected from H and $C_1$-$C_{20}$ linear or branched alkyl; groups $R_2''$ and $R_4''$ are, identical to or different from each other, each independently selected from hydrogen, $C_1$-$C_{20}$ linear or branched alkyl and the group represented by the general formula (Y), wherein at least one group is selected from a group represented by the general formula (Y).

According to the third embodiment of the present invention, in the general formula (X), further preferably, groups $R_1''$ and $R_5''$ are, identical to or different from each other, each independently selected from hydrogen, $C_1$-$C_4$ linear or branched alkyl; group $R_3''$ is each independently selected from H and $C_1$-$C_{20}$ linear or branched alkyl; one group of groups $R_2''$ and $R_4''$ is a group represented by the general formula (Y), the other group is hydrogen.

Fourth Embodiment

According to the fourth embodiment of the present invention, preferably, the organophosphorus compound has a structure as represented by the general formula (I-4):

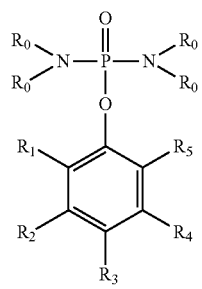

(I-4)

In the general formula (I-4), groups $R_0$ are each independently selected from H, $C_6$-$C_{20}$ aryl, $C_1$-$C_{20}$ linear or branched alkyl $C_6$-$C_{20}$ aryl and $C_1$-$C_{30}$ linear or branched alkyl (preferably each independently selected from phenyl, $C_1$-$C_{14}$ alkyl phenyl and $C_1$-$C_{20}$ linear or branched alkyl); groups $R_1$, $R_2$, $R_3$, $R_4$ and $R_5$ are, identical to or different from each other, each independently selected from H, $C_1$-$C_{20}$ linear chain, $C_1$-$C_{20}$ linear or branched alkoxyl or branched alkyl and a group represented by the formula (II-II), at least one group of groups $R_1$, $R_2$, $R_3$, $R_4$ and $R_5$ is a group represented by the formula (II-II);

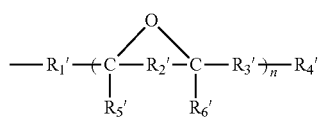

(II-II)

In the general formula (II-II), group $R_1'$ is selected from single bond, $C_1$-$C_{20}$ linear or branched alkylene (preferably selected from single bond and $C_1$-$C_4$ linear or branched alkylene); groups $R_2'$ in n repeating units are, identical to or different from each other, each independently selected from single bond, $C_1$-$C_{20}$ linear or branched alkylene (preferably each independently selected from single bond, $C_1$-$C_4$ linear or branched alkylene); groups $R_3'$ in n repeating units are, identical to or different from each other, each independently selected from single bond, $C_1$-$C_{20}$ linear or branched alkylene (preferably each independently selected from single bond, $C_1$-$C_4$ linear or branched alkylene); group $R_4'$ is selected from hydrogen, $C_1$-$C_{20}$ linear or branched alkyl (preferably selected from hydrogen, $C_1$-$C_4$ linear or branched alkyl); groups $R_5'$ in n repeating units are, identical to or different from each other, each independently selected from hydrogen, $C_1$-$C_{20}$ linear or branched alkyl (preferably each independently selected from hydrogen, $C_1$-$C_4$ linear or branched alkyl); groups $R_6'$ in n repeating units are, identical to or different from each other, each independently selected from hydrogen, $C_1$-$C_{20}$ linear or branched alkyl (preferably each independently selected from hydrogen, $C_1$-$C_4$ linear or branched alkyl); n is a positive integral number (preferably a positive integral number of 1-10, preferably a positive integral number of 1-3).

According to the fourth embodiment of the present invention, preferably, in the general formula (I-4), groups $R_1$, $R_3$ and $R_5$ are each independently selected from H, $C_1$-$C_4$ linear or branched alkyl; groups $R_2$ and $R_4$ are each independently selected from H, $C_1$-$C_{20}$ linear or branched alkyl and a group represented by the formula (II-II), wherein at least one group is a group represented by the formula (II-II).

According to the fourth embodiment of the present invention, preferably, in the general formula (I-4), groups $R_1$, $R_3$ and $R_5$ are, identical to or different from each other, each independently selected from hydrogen, $C_1$-$C_4$ linear or branched alkyl; at least one of groups $R_2$ and $R_4$ is a group represented by the general formula (II-II).

According to the fourth embodiment of the present invention, preferably, in the general formula (I-4), groups $R_1$, $R_3$ and $R_5$ are each independently selected from H, methyl, ethyl, propyl, isopropyl, n-butyl, isobutyl and tert-butyl; one group of groups $R_2$ and RA is a group represented by the formula (II-II), the other group is H.

According to the fourth embodiment of the present invention, preferably, in the general formula (I), the group as represented by the formula (II-II) has a total carbon number of 2-30, preferably 6-20, more preferably 10-18.

According to the fourth embodiment of the present invention, preferably, the organophosphorus compound represented by the formula (I-4) can be prepared by the following preparation process, wherein the preparation process comprises step of subjecting a phenol compound represented by the general formula (X) to the epoxidation reaction, and step of subjecting to the reaction with a phosphorus-nitridizing agent represented by the formula (Z'). The order for these two reaction steps is not limited.

According to the fourth embodiment of the present invention, in the general formula (X), groups $R_1''$, $R_3''$ and $R_5''$ are, identical to or different from each other, each independently selected from hydrogen and $C_1$-$C_4$ linear or branched alkyl; groups $R_2''$ and $R_4''$ are, identical to or different from each other, each independently selected from hydrogen, $C_1$-$C_{20}$ linear or branched alkyl and the group represented by the general formula (Y), wherein at least one group is the group represented by the general formula (Y).

According to the fourth embodiment of the present invention, further preferably, in the general formula (X), groups $R_1''$, $R_3''$ and $R_5''$ are, identical to or different from each other, each independently selected from hydrogen, $C_1$-$C_4$ linear or branched alkyl; one group of groups $R_2''$ and $R_4''$ is a group represented by the general formula (Y), the other group is hydrogen.

Fifth Embodiment

According to the fifth embodiment of the present invention, preferably, the organophosphorus compound has a structure as represented by the general formula (I-5):

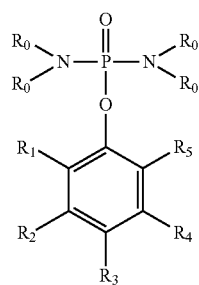

(I-5)

In the general formula (I-5), groups R (are each independently selected from H, $C_6$-$C_{20}$ aryl, $C_1$-$C_{20}$ linear or branched alkyl $C_6$-$C_{20}$ aryl and $C_1$-$C_{30}$ linear or branched alkyl (preferably each independently selected from phenyl, $C_1$-$C_{14}$ alkyl phenyl and $C_1$-$C_{20}$ linear or branched alkyl); groups $R_1$, $R_2$, $R_3$, $R_4$ and $R_5$ are, identical to or different from each other, each independently selected from H, $C_1$-$C_{20}$ linear or branched alkyl, $C_1$-$C_{20}$ linear or branched alkoxyl and a group represented by the formula (II-III), at least one group of groups $R_1$, $R_2$, $R_3$, $R_4$ and $R_5$ is a group represented by the formula (II-III);

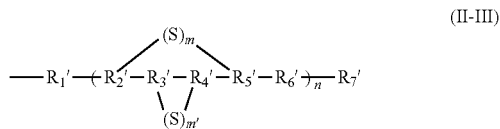

(II-III)

In the general formula (II-III), group $R_1'$ is selected from single bond, $C_1$-$C_{20}$ linear or branched alkylene (preferably selected from single bond and $C_1$-$C_4$ linear or branched alkylene); groups $R_2'$ in n repeating units are, identical to or different from each other, each independently selected from divalent, tervalent or tetravalent $C_1$-$C_{20}$ linear or branched alkyl (preferably each independently selected from divalent, tervalent or tetravalent $C_1$-$C_4$ linear or branched alkyl); groups $R_3'$ in n repeating units are, identical to or different from each other, each independently selected from single bond, divalent or tervalent $C_1$-$C_{20}$ linear or branched alkyl (preferably each independently selected from single bond, divalent or tervalent $C_1$-$C_4$ linear or branched alkyl); groups $R_4'$ in n repeating units are, identical to or different from each other, each independently selected from single bond, divalent or tervalent $C_1$-$C_{20}$ linear or branched alkyl (preferably each independently selected from single bond, divalent or tervalent $C_1$-$C_4$ linear or branched alkyl); groups $R_5'$ in n repeating units are, identical to or different from each other, each independently selected from divalent, tervalent or tetravalent $C_1$-$C_{20}$ linear or branched alkyl (preferably each independently selected from divalent, tervalent or tetravalent $C_1$-$C_4$ linear or branched alkyl); groups $R_6'$ in n repeating units are, identical to or different from each other, each independently selected from single bond, $C_1$-$C_{20}$ linear or branched alkylene (preferably each independently selected from single bond, $C_1$-$C_4$ linear or branched alkylene); group $R_7'$ is selected from hydrogen, $C_1$-$C_{20}$ linear or branched alkyl (preferably selected from hydrogen, $C_1$-$C_4$ linear or branched alkyl); n is an integral number of 1-10 (preferably an integral number of 1-3); the numbers m in n repeating units are, identical to or different from each other, each independently selected from an integral number of 0-10 (preferably an integral number of 1-5); the numbers m' in n repeating units are, identical to or different from each other, each independently selected from an integral number of 0-10 (preferably an integral number of 0-5); in each repeating unit of the formula (II-III), when m is greater than 0, m sulfur atoms are bonded to groups $R_2'$ and $R_5'$; when m' is greater than 0, m' sulfur atoms are bonded to groups $R_3'$ and $R_4'$; in each repeating unit of the formula (II-III), when group $R_3'$ is a single bond, m' sulfur atoms are bonded to group $R_2'$, when group $R_4'$ is a single bond, m' sulfur atoms are bonded to group $R_5'$.

According to the fifth embodiment of the present invention, preferably, in the general formula (I-5), groups $R_1$, $R_3$ and $R_5$ are each independently selected from H, $C_1$-$C_4$ linear or branched alkyl; groups $R_2$ and $R_4$, identical to or different from each other, are each independently selected from H, $C_1$-$C_{20}$ linear or branched alkyl and a group represented by the formula (II-III), wherein at least one group is a group represented by the formula (II-III).

According to the fifth embodiment of the present invention, preferably, in the general formula (I-5), groups $R_1$, $R_3$ and $R_5$ are, identical to or different from each other, each independently selected from hydrogen, $C_1$-$C_4$ linear or branched alkyl; at least one of groups $R_2$ and $R_4$ is a group represented by the general formula (II-III).

According to the fifth embodiment of the present invention, preferably, in the general formula (I-5), groups $R_1$, $R_3$ and $R_5$ are each independently selected from H1, methyl, ethyl, propyl, isopropyl, n-butyl, isobutyl and tert-butyl; one group of groups $R_2$ and $R_4$ is a group represented by the formula (II-III), the other group is H.

According to the fifth embodiment of the present invention, preferably, in the general formula (I-5), the group shown in the formula (II-III) has a total carbon number of 2-30, preferably 6-20, more preferably 10-18.

According to the fifth embodiment of the present invention, preferably, the organophosphorus compound represented by the formula (I-5) can be prepared by the following process for preparing an organophosphorus compound, wherein the preparation process comprises a step of subjecting the phenol compound represented by the general formula (X) to the sulfurization reaction, and a step of subjecting to the reaction with a phosphorus-nitridizing agent represented by the formula (Z'). The order for these two reaction steps is not limited.

According to the fifth embodiment of the present invention, in the general formula (X), groups $R_1''$, $R_3''$ and $R_5''$ are, identical to or different from each other, each independently selected from hydrogen and $C_1$-$C_4$ linear or branched alkyl; groups $R_2''$ and $R_4''$ are, identical to or different from each other, each independently selected from hydrogen, $C_1$-$C_{20}$ linear or branched alkyl and the group represented by the general formula (Y), wherein at least one group is the group represented by the general formula (Y).

According to the fifth embodiment of the present invention, further preferably, in the general formula (X), groups $R_1''$, $R_3''$ and $R_5''$ are, identical to or different from each other, each independently selected from hydrogen, $C_1$-$C_4$ linear or branched alkyl; one group of groups $R_2''$ and $R_4''$ is a group represented by the general formula (Y), the other group is hydrogen.

The Sixth Embodiment

According to the sixth embodiment of the present invention, preferably, the organophosphorus compound has a structure as represented by the general formula (I-6):

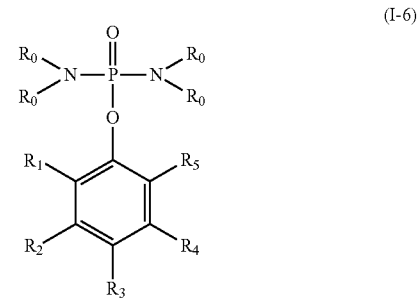

(I-6)

In the general formula (I-6), groups $R_0$ are each independently selected from H, $C_6$-$C_{20}$ aryl, $C_1$-$C_{20}$ linear or branched alkyl $C_6$-$C_{20}$ aryl and $C_1$-$C_{30}$ linear or branched alkyl (preferably each independently selected from phenyl, $C_1$-$C_{14}$ alkyl phenyl and $C_1$-$C_{20}$ linear or branched alkyl); each groups $R_1$, $R_2$, $R_3$, $R_4$ and $R_5$ are, identical to or different from each other, each independently selected from H, $C_1$-$C_{20}$ linear or branched alkyl, $C_1$-$C_{20}$ linear or branched alkoxyl and a group represented by the formula (II-I), at least one group of groups $R_1$, $R_2$, $R_3$, $R_4$ and $R_5$ is a group represented by the formula (II-I);

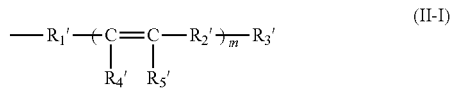

(II-I)

In the general formula (II-I), group $R_1'$ is selected from single bond, $C_1$-$C_{20}$ linear or branched alkylene (preferably selected from single bond and $C_1$-$C_4$ linear or branched alkylene); groups $R_2'$ in m repeating units are, identical to or different from each other, each independently selected from single bond, $C_1$-$C_{20}$ linear or branched alkylene (preferably each independently selected from single bond, $C_1$-$C_4$ linear or branched alkylene); group $R_3'$ is selected from hydrogen, $C_1$-$C_{20}$ linear or branched alkyl (preferably selected from hydrogen, $C_1$-$C_4$ linear or branched alkyl); groups $R_4'$ in m repeating units are, identical to or different from each other, each independently selected from hydrogen, $C_1$-$C_{20}$ linear or branched alkyl (preferably each independently selected from hydrogen, $C_1$-$C_4$ linear or branched alkyl); groups $R_5'$ in m repeating units are, identical to or different from each other, each independently selected from hydrogen, $C_1$-$C_{20}$ linear or branched alkyl (preferably each independently selected from hydrogen, $C_1$-$C_4$ linear or branched alkyl); m is an integral number (preferably an integral number of 0-10, more preferably a positive integral number of 1-3).

According to the sixth embodiment of the present invention, preferably, in the general formula (I-6), groups $R_1$, $R_3$ and $R_5$ are each independently selected from H, $C_1$-$C_4$ linear or branched alkyl; groups $R_2$ and $R_4$ are each independently selected from H, $C_1$-$C_{20}$ linear or branched alkyl and a group represented by the formula (II-I), wherein at least one group is a group represented by the formula (II-1).

According to the sixth embodiment of the present invention, preferably, in the general formula (I-6), groups $R_1$, $R_3$ and $R_5$ are, identical to or different from each other, each independently selected from hydrogen, $C_1$-$C_4$ linear or branched alkyl; at least one of groups $R_2$ and $R_4$ is a group represented by the general formula (II-I).

According to the sixth embodiment of the present invention, preferably, in the general formula (I-6), groups $R_1$, $R_3$ and $R_5$ are each independently selected from H, methyl, ethyl, propyl, isopropyl, n-butyl, isobutyl and tert-butyl; one group of groups $R_2$ and $R_4$ is a group represented by the formula (II-I), the other group is H.

According to the sixth embodiment of the present invention, preferably, in the general formula (I), the group represented by the formula (II-I) has a total carbon number of 2-30, preferably 6-20, more preferably 10-18.

According to the sixth embodiment of the present invention, preferably, the organophosphorus compound represented by the formula (I-6) can be prepared by the following process for preparing an organophosphorus compound, wherein the preparation process comprises a step of reacting a phenol compound represented by the general formula (X) with a phosphorus-nitridizing agent represented by the formula (Z') and an optional step of hydrogenation reaction. The order for these two reaction steps is not limited.

According to the sixth embodiment of the present invention, in the general formula (X), groups $R_1''$, $R_3''$ and $R_5''$ are, identical to or different from each other, each independently selected from hydrogen and $C_1$-$C_4$ linear or branched alkyl; groups $R_2''$ and $R_4''$ are, identical to or different from each other, each independently selected from hydrogen, $C_1$-$C_{20}$ linear or branched alkyl and the group represented by the general formula (Y), wherein at least one group is the group represented by the general formula (Y).

According to the sixth embodiment of the present invention, further preferably, in the general formula (X), groups $R_1''$, $R_3''$ and $R_5''$ are, identical to or different from each other, each independently selected from hydrogen, $C_1$-$C_4$ linear or branched alkyl; one group of groups $R_2''$ and $R_4''$ is a group represented by the general formula (Y), the other group is hydrogen.

[Lubricating Oil/Lubricating Grease]

The organophosphorus compound of the present invention can be used as extreme pressure antiwear additive.

The organophosphorus compound of the present invention can be used in lubricating oil and lubricating grease.

The lubricating oil of the present invention comprises a base oil and the above-mentioned organophosphorus compound of the present invention. ☆ The lubricating grease of the present invention comprises a base oil and the above-mentioned organophosphorus compound of the present invention.

In the present invention, the base oil of the lubricating oil is not particularly limited, and mineral oil, synthetic oil, or a mixture of mineral oil and synthetic oil can be used. The viscosity index of the base oil is preferably 122 or more, more preferably 123 or more, and further preferably 125 or more.

As the mineral oil, the following can be enumerated: paraffin-based mineral oils, intermediate-based mineral oils, and naphthene-based mineral oils obtained by a conventional refining process such as solvent refining or hydrogenation refining; wax (gas-to-liquid wax) produced by the F-T process or the like, wax-isomerized oil produced by isomerizing wax such as mineral oil-based wax; and the like.

As the synthetic oil, the following can be enumerated: hydrocarbon-based synthetic oils, ether-based synthetic oils and the like. As the hydrocarbon-based synthetic oil, the following can be enumerated: alkylbenzene, alkylnaphthalene and the like. As the ether-based synthetic oil, the following can be enumerated: polyoxyalkyleneglycol, polyphenylether and the like.

Among them, from the viewpoint of improving fuel economy and low-temperature startability of the engine, preferred is at least one selected from mineral oils and synthetic oils in Groups 3-5 of API (American Petroleum Institute) base oil categories.

The base oil (A) may be a single system using one of the above-mentioned mineral oils and synthetic oils, or may be a mixed system such as a base oil obtained by mixing two or more mineral oils, a base oil obtained by mixing two or more synthetic oils, and a base oil obtained by mixing each one or two or more of mineral oils and synthetic oils.

In the present invention, the base oil of the lubricating grease is not particularly limited, and mineral oil-based or synthetic oil-based base oils usually for producing the lubricating grease can be enumerated. They may be used alone or in mixture.

As the mineral oil-base oil, the base oil can be obtained by refining through the appropriate combination of vacuum distillation, solvent deasphalting, solvent extraction, hydrocracking, solvent dewaxing, sulfuric acid washing, clay refining, hydrogenation refining and the like. Furthermore, as the synthetic oil-based base oil, poly-alpha-olefin (PAO)-based base oil, other hydrocarbon-based base oil, ester-based base oil, alkyldiphenylether-based base oil, polyalkylene glycol-based base oil (PAG), alkylbenzene-based base oil and the like can be enumerated.

[Use]

The organophosphorus compound of the present invention can be used as extreme pressure antiwear additive. The organophosphorus compound of the present invention can be used as the extreme pressure antiwear additive of the lubricating oil/lubricating grease.

EXAMPLES

Hereinafter, the present invention will be specifically explained through examples. However, the examples are merely to further illustrate one of the embodiments of the present invention, and the present invention is not limited to these examples.

The raw materials used in the examples are all conventional commercially available products, some of which are listed as follows:

Cardanol, Shanghai Wujing Chemical Technology Co., Ltd., industrial product
Concentrated sulphuric acid, Sinopharm Chemical Reagent Co., Ltd., analytically pure
Hydrogen peroxide (30%), Sinopharm Chemical Reagent Co., Ltd., analytically pure
Formic acid, Sinopharm Chemical Reagent Co., Ltd., analytically pure
Sodium bicarbonate, Sinopharm Chemical Reagent Co., Ltd., analytically pure
Phenylthiophosphonic dichloride, Sinopharm Chemical Reagent Co., Ltd., analytically pure
Palladium carbon catalyst (metal palladium loaded on active carbon), Shaanxi Ruike New Material Co., Ltd., palladium content=5%.
Bis(dimethylamino)chlorophosphoric acid, Sinopharm Chemical Reagent Co., Ltd., analytically pure
Dibutyl phosphite, Sinopharm Chemical Reagent Co., Ltd., chemically pure
N,N-dibutenylmethylenebenzotriazole, Bailingwei Reagent Company, chemically pure
Triethylamine, Sinopharm Chemical Reagent Co., Ltd., analytically pure
Toluene, Sinopharm Chemical Reagent Co., Ltd., analytically pure
Petroleum ether, Sinopharm Chemical Reagent Co., Ltd., analytically pure
Sulphur powder, Sinopharm Chemical Reagent Co., Ltd., analytically pure
Extreme pressure antiwear additive T306 (tricresyl phosphate), Xingpu Company, Research Institute of Petroleum Processing, industrial product
Extreme pressure antiwear additive T307 (thiophosphoric acid ammonium salt), Xingpu Company, Research Institute of Petroleum Processing, industrial product
Extreme pressure antiwear additive IRGALUBE 353 (thiophosphate ester), Afton Chemical Corporation, industrial product
Extreme pressure antiwear additive IRGALUBE 349 (phosphoric acid ammonium salt), Afton Chemical Corporation, industrial product The purity of the product was analyzed by gas chromatography, and the analysis conditions: the temperature of the vaporization chamber was 320° C., the column temperature was 280° C., and the programmed temperature rise was 10° C./min.

Example 1-1 Preparation of Epoxidized Cardanol 100 g cardanol, 8 g formic acid, 0.3 g sulfuric acid, 200 g hydrogen peroxide were added to a three-necked flask equipped with mechanical stirring, reflux condenser and temperature controller, stirred, and heated. The reaction temperature was maintained at 70° C. and the reaction was performed for 3 hours. After the completion of the reaction, the temperature was reduced to produce a red brown transparent liquid. The reaction product was filtered and caustic-washed with 5% KOH solution, and then washed with distilled water to neutrality. The organic phase was distilled under reduced pressure at 100 Pa and 150° C. for 1h to remove water and unreacted raw materials to produce 91.4 g orange red transparent liquid. The product conversion rate was 96.2%, and the purity of the epoxidized cardanol with the gas chromatography analysis was greater than 98%.

Example 1-2 Preparation of Phenylthiophosphonic Acid Diepoxidized Cardanol Ester 22 g epoxidized cardanol obtained from Example 1-1, 4 g triethylamine and 20 g toluene were added to a reaction flask, heated and stirred. 7.5 g phenylthiophosphonic dichloride was added. The reaction temperature was maintained at 70° C., and the reaction was performed for 5 hours. After the completion of the reaction, the temperature was reduced to produce a red brown transparent liquid. The reaction product was washed with distilled water to neutrality. The organic phase was distilled under reduced pressure at 100 Pa and 150° C. for 1h to remove water and solvent to produce 27.6 g brown yellow transparent liquid. The reaction conversion rate was 93.6%.

Example 1-3 Preparation of Phenylthiophosphonic Acid Diepoxidized Cardanol Ester 22 g epoxidized cardanol obtained from Example 1-1, 8 g triethylamine and 50 g toluene were added to a reaction flask, heated and stirred. 5 g phenylthiophosphonic dichloride was added. The reaction temperature was maintained at 90° C., and the reaction was performed for 4 hours. After the completion of the reaction, the temperature was reduced to produce a red brown transparent liquid. The reaction product was washed with distilled water to neutrality. The organic phase was distilled under reduced pressure at 100 Pa and 150° C. for 1h to remove water and solvent to produce 25.6 g brown yellow transparent liquid. The reaction conversion rate was 95.1%. The prepared product was subjected to the infrared spectrum analysis. The spectrum was shown in FIG. 1, and the analysis result was shown in Table 1-1.

TABLE 1

Infrared analysis result of the product of Example 1-3

| characteristic absorption peak/cm$^{-1}$ | absorption peak attribution |
|---|---|
| 2925.96, 2853.99 | Stretching vibration of C—H in CH3 and CH2 |

TABLE 1-continued

Infrared analysis result of the product of Example 1-3

| characteristic absorption peak/cm$^{-1}$ | absorption peak attribution |
|---|---|
| 1608.96, 1585.56, 1485.22 | Stretching vibration of benzene ring skeleton |
| 1206.92 | Stretching vibration of C—O—P |
| 1142.23 | Stretching vibration of O—C |
| 959.7 | Stretching vibration of O—P |
| 845.59 | Stretching vibration of O—C—O |
| 753.38, 693.44 | Stretching vibration of P=S |

Example 1-4 Preparation of Phenylthiophosphonic Acid Diepoxidized Cardanol Ester 22 g epoxidized cardanol obtained from Example 1-1, 8 g triethylamine and 60 g toluene were added to a reaction flask, heated and stirred. 3.5 g phenylthiophosphonic dichloride was added. The reaction temperature was maintained at 80° C., and the reaction was performed for 5 hours. After the completion of the reaction, the temperature was reduced to produce a red brown transparent liquid. The reaction product was washed with distilled water to neutrality. The organic phase was distilled under reduced pressure at 100 Pa and 150° C. for 1h to remove water and solvent to produce 24.2 g brown yellow transparent liquid. The reaction conversion rate was 94.8%.

Comparative Example 1-1

Under the nitrogen gas protection, 70.8 g bis(2-ethylhexyl)dithiophosphoric acid and 7.08 g paratoluenesulfonic acid were poured into a flask. The flask was placed in a thermostated water bath (temperature controlled at 100° C.), and the stirring was initiated. A total amount of 31.2 g of itaconic acid methyl ester was added dropwise in 1.5 hours. Under the nitrogen gas protection, the reaction was performed for 8 hours with the continuous stirring. After the completion of the reaction, the reaction was extracted with 10% sodium bicarbonate solution and petroleum ether. The oil phase was dried, filtered and finally distilled under reduced pressure to produce diisooctyl dithiophosphoric acid-2-methyl-succinic acid dimethyl ester.

Example 1-5

The products of Examples 1-2, 1-3 and 1-4, T306, T307, IRGALUBE 353, IRGALUBE 349 and the product of Comparative Example 1-1 were dissolved in the mineral oil 150SN respectively to formulate the compositions having a mass fraction of 0.5%. These compositions were subjected to the antiwear performance test. The testing device was an SRV vibration and friction testing machine. The test conditions were: 100N, 200N, 300N, frequency 50 Hz, amplitude 1 mm, 30° C., 1h. The test results were shown in Table 1-2.

TABLE 1-2

| Antiwear additive in the composition | Ex. 1-2 | Ex. 1-3 | Ex. 1-4 | T306 | T307 | IRGALUBE 353 | IRGALUBE 349 | Comp. Ex. 1-1 |
|---|---|---|---|---|---|---|---|---|
| 100 N Friction coefficient f D, mm | 0.128 0.39 | 0.129 0.40 | 0.127 0.38 | 0.129 0.41 | 0.136 0.38 | 0.128 0.41 | 0.139 0.41 | 0.132 0.42 |
| 200 N Friction coefficient f D, mm | 0.111 0.45 | 0.108 0.46 | 0.110 0.43 | 0.113 0.52 | 0.117 0.45 | 0.109 0.51 | 0.124 0.49 | 0.115 0.51 |
| 300 N Friction coefficient f D, mm | 0.103 0.51 | 0.106 0.50 | 0.108 0.52 | 0.109 0.56 | 0.108 0.52 | 0.105 0.58 | 0.121 0.52 | 0.108 0.53 |
| extreme pressure/N | 1700 | 1850 | 1900 | 900 | 900 | 1800 | 1300 | 1400 |

It can be seen from Table 1-2 that the sulfurized thiophosphonate ester of the present invention had outstanding antiwear, anti-friction and extreme pressure properties compared with the extreme pressure antiwear additives having no structure of the present invention.

Example 2-1 Preparation of Sulfurized Cardanol 62 g cardanol (about 0.2 mol) and 12.8 g sulphur powder (0.4 mol) were put in a 250 ml three-necked reaction flask, stirred, and heated. The reaction temperature was maintained at 190° C. and the reaction was performed for 3 hours. After the completion of the reaction, the temperature was reduced followed by the filtration to produce 66.8 g dark red brown thick liquid, namely the sulfurized cardanol. The product conversion rate was 89.3%.

Example 2-2 Preparation of Phenylthiophosphonic Acid Dicardanol Ester 20 g cardanol, 4 g triethylamine and 20 g toluene were added to a reaction flask, heated and stirred. 7.5 g phenylthiophosphonic dichloride was added. The reaction temperature was maintained at 70° C., and the reaction was performed for 5 hours. After the completion of the reaction, the temperature was reduced to produce a red brown transparent liquid. The reaction product was washed with distilled water to neutrality. The organic phase was distilled under reduced pressure at 100 Pa and 150° C. for 1h to remove water and solvent to produce 26.1 g brown yellow transparent liquid. The reaction conversion rate was 94.8%.

Figure 2:
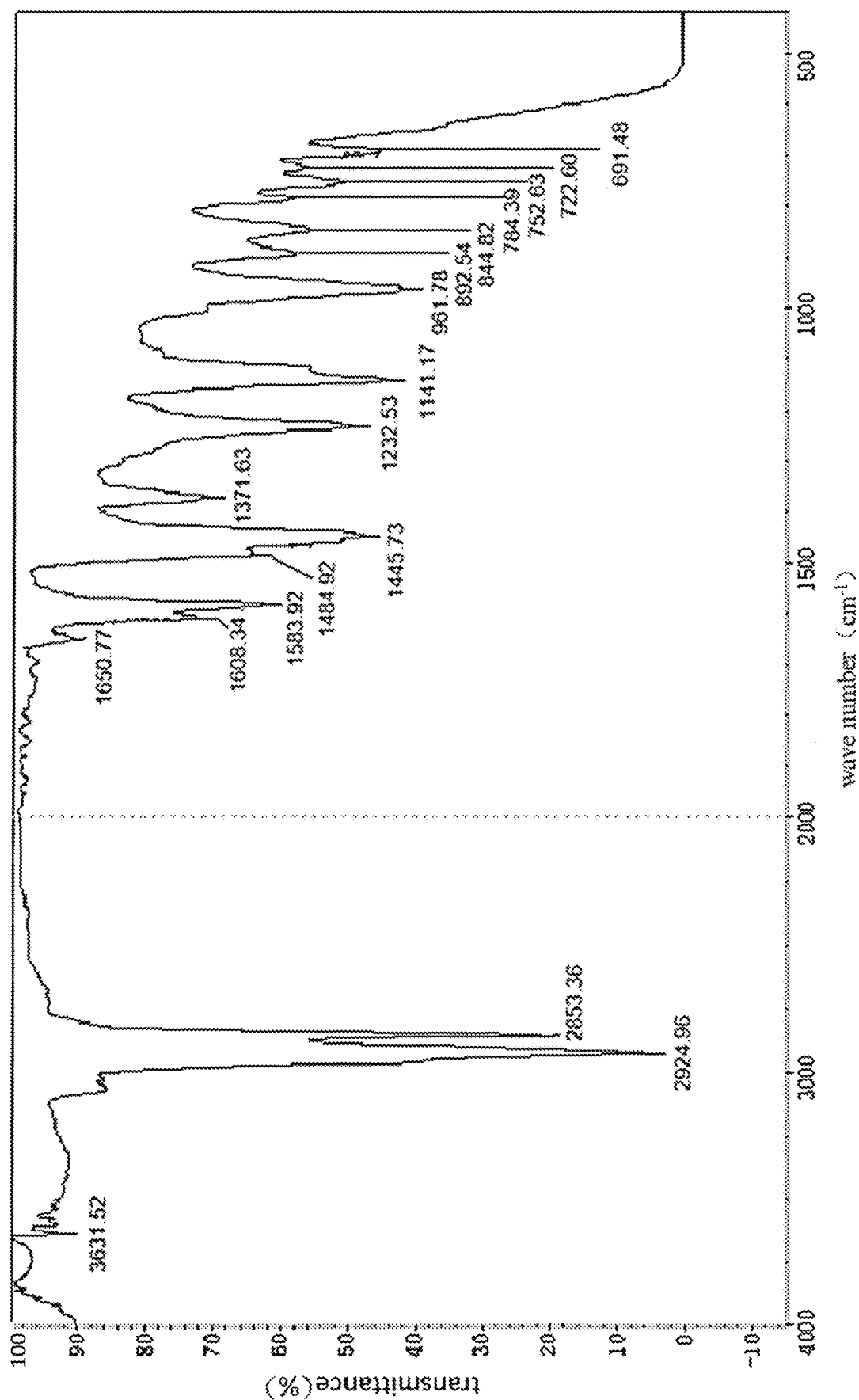
FIG. 2 is the infrared spectrum of the product of Example 2-3.

Example 2-3 Preparation of Phenylthiophosphonic Acid Disulfurized Cardanol Ester 25 g sulfurized cardanol obtained from Example 2-1, 8 g triethylamine and 50 g toluene were added to a reaction flask, heated and stirred. 5 g phenylthiophosphonic dichloride was added. The reaction temperature was maintained at 90° C., and the reaction was performed for 4 hours. After the completion of the reaction, the temperature was reduced to produce a red brown transparent liquid. The reaction product was washed with distilled water to neutrality. The organic phase was distilled under reduced pressure at 100 Pa and 150° C. for 1h to remove water and solvent to produce 28.5 g brown yellow transparent liquid. The reaction conversion rate was 95.1%. The prepared product was subjected to the infrared spectrum analysis. The spectrum was shown in FIG. 2, and the analysis result was shown in Table 2-1.

TABLE 2

Infrared analysis result of the product of Example 2-3

| characteristic absorption peak/cm$^{-1}$ | absorption peak attribution |
|---|---|
| 3060.19 | stretching vibration of =C—H on the benzene ring |
| 2924.96, 2833.36 | Stretching vibration of C—H in CH3 and CH2 |
| 1608.34, 1583.92, 1484.92 | Stretching vibration of benzene ring skeleton |
| 1232.53 | Stretching vibration of C—O—P |
| 1141.17 | Stretching vibration of O—C |
| 961.78 | Stretching vibration of O—P |
| 752.63 | Stretching vibration of P=S |
| 721.23 | In-plane swing of four or more successive-CH$_2$-groups |
| 691.48 | Stretching vibration of S—C |

Example 2-4 Preparation of Phenylthiophosphonic Acid Disulfurized Cardanol Ester 25 g sulfurized cardanol obtained from Example 2-1, 8 g triethylamine and 60 g toluene were added to a reaction flask, heated and stirred. 3.5 g phenylthiophosphonic dichloride was added. The reaction temperature was maintained at 80° C., and the reaction was performed for 5 hours. After the completion of the reaction, the temperature was reduced to produce a red brown transparent liquid. The reaction product was washed with distilled water to neutrality. The organic phase was distilled under reduced pressure at 100 Pa and 150° C. for 1h to remove water and solvent to produce 26.8 g brown yellow transparent liquid. The reaction conversion rate was 93.9%.

Example 2-5 Preparation of Phenylthiophosphonic Acid Disulfurized Cardanol Ester 65 g phenylthiophosphonic acid dicardanol ester obtained from Example 2-2 and 8.5 g sulphur powder were put in a 250 ml three-necked reaction flask, stirred, and heated. The reaction temperature was maintained at 190° C. and the reaction was performed for 3 hours. After the completion of the reaction, the temperature was reduced followed by the filtration to produce 66.6 g red brown thick liquid, namely phenylthiophosphonic acid disulfurized cardanol ester. The product conversion rate was 90.6%.

Comparative Example 2-1

Under the nitrogen gas protection, 70.8 g bis(2-ethylhexyl)dithiophosphoric acid and 7.08 g paratoluenesulfonic acid were poured into a flask. The flask was placed in a thermostated water bath (temperature controlled at 100° C.), and the stirring was initiated. A total amount of 31.2 g of itaconic acid methyl ester was added dropwise in 1.5 hours. Under the nitrogen gas protection, the reaction was performed for 8 hours with the continuous stirring. After the completion of the reaction, the reaction was extracted with 10% sodium bicarbonate solution and petroleum ether. the oil phase was dried, filtered and finally distilled under reduced pressure to produce diisooctyl dithiophosphoric acid-2-methyl-succinic acid dimethyl ester.

Example 2-6

The products of Examples 2-3, 2-4 and 2-5, T306, T307, IRGALUBE 353, IRGALUBE 349 and the product of Comparative Example 2-1 were dissolved in the mineral oil 150SN respectively to formulate the compositions having a mass fraction of 0.5%. These compositions were subjected to the antiwear performance test. The testing device was an SRV vibration and friction testing machine. The test conditions were: 100N, 200N, 300N, frequency 50 Hz, amplitude 1 mm, 30° C., 1h. The test results were shown in Table 2-2.

TABLE 2-2

| Antiwear additive in the composition | Ex. 2-2 | Ex. 2-3 | Ex. 2-4 | T306 | T307 | IRGALUBE 353 | IRGALUBE 349 | Comp. Ex. 2-1 |
|---|---|---|---|---|---|---|---|---|
| 100 N Friction coefficient f D, mm | 0.119 0.40 | 0.122 0.38 | 0.119 0.41 | 0.129 0.41 | 0.136 0.38 | 0.128 0.41 | 0.139 0.41 | 0.132 0.42 |
| 200 N Friction coefficient f D, mm | 0.106 0.46 | 0.105 0.45 | 0.109 0.45 | 0.113 0.52 | 0.117 0.45 | 0.109 0.51 | 0.124 0.49 | 0.115 0.51 |
| 300 N Friction coefficient f D, mm | 0.102 0.51 | 0.103 0.52 | 0.102 0.50 | 0.109 0.56 | 0.108 0.52 | 0.105 0.58 | 0.121 0.52 | 0.108 0.53 |
| extreme pressure/N | 2100 | 1900 | 2000 | 900 | 900 | 1800 | 1300 | 1400 |

It can be seen from Table 2-2 that the sulfurized thiophosphonate ester of the present invention had outstanding antiwear, anti-friction and extreme pressure properties compared with the extreme pressure antiwear additives having no structure of the present invention.

Example 3-1 Preparation of Meta Pentadecyl Phenol 100 g cardanol and 1.5 g palladium carbon catalyst were placed in a 200 ml high-pressure reactor, the reactor was closed, and hydrogen gas was introduced to 3.5 MPa. The stirring and heating was initiated, and the reaction was performed at a temperature of 200° C. for 4.5 hours. After the completion of the reaction, the temperature was reduced to 60° C., and the viscous reaction mixture was taken out, and distilled under reduced pressure at 100 Pa and 160° C. for 1h. After cooling, a milky white solid was obtained. It was dissolved in petroleum ether, and then purified by crystallization to produce 84.7 g meta pentadecyl phenol with a purity of greater than 98%, and the reaction conversion rate was 83.6%. The purity of the product was obtained by gas chromatographic analysis.

Example 3-2 Preparation of Phenylthiophosphonic Acid Dicardanol Ester 20 g cardanol, 4 g triethylamine and 20 g toluene were added to a reaction flask, heated and stirred. 7.5 g phenylthiophosphonic dichloride was added. The reaction temperature was maintained at 70° C., and the reaction was performed for 5 hours. After the completion of the reaction, the temperature was reduced to produce a red brown transparent liquid. The reaction product was washed with distilled water to neutrality. The organic phase was distilled under reduced pressure at 100 Pa and 150° C. for 1h to remove water and solvent to produce 26.6 g brown yellow transparent liquid, the conversion rate was 96.6%.

Figure 3:
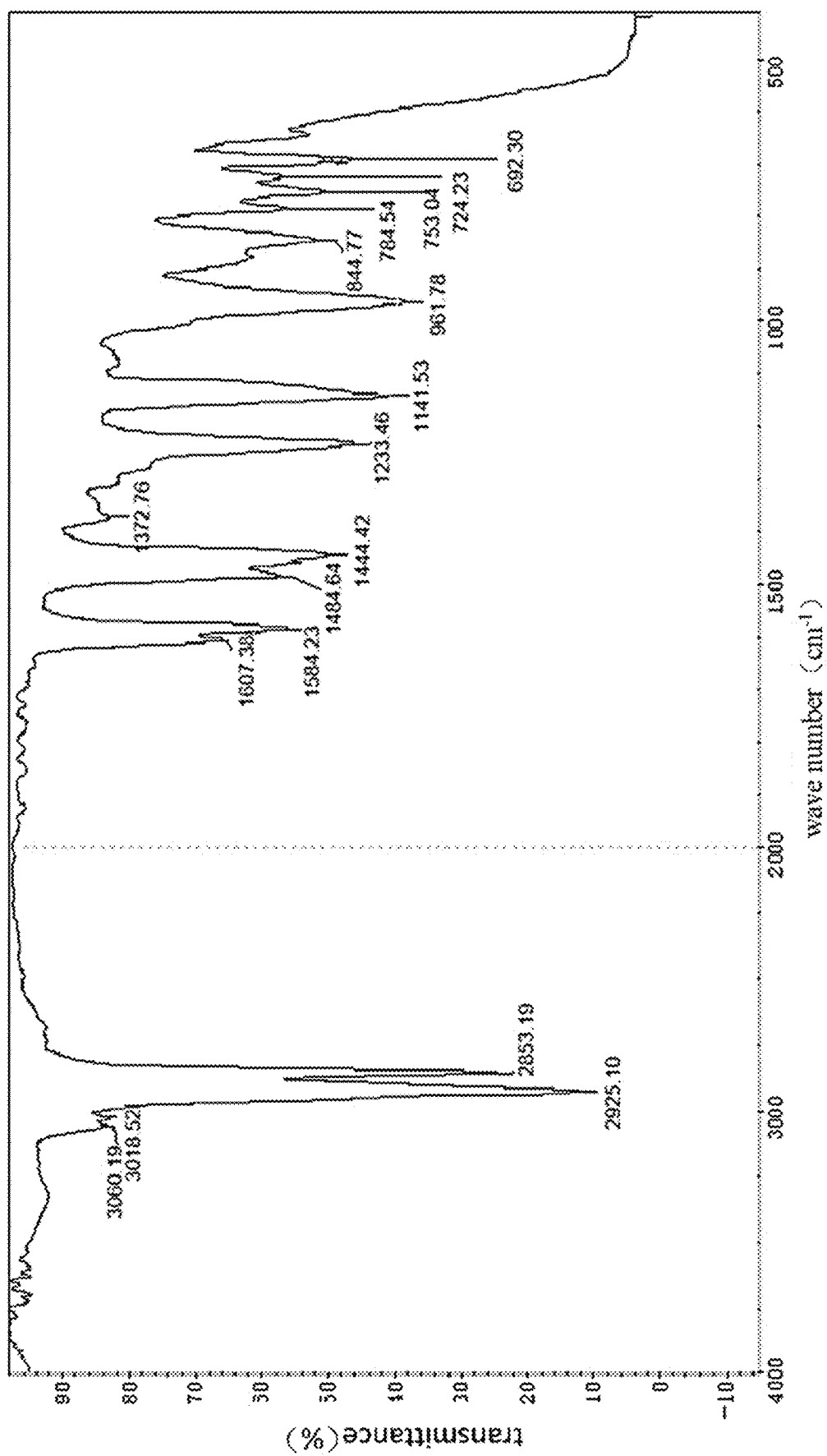
FIG. 3 is the infrared spectrum of the product of Example 3-3.

Example 3-3 Preparation of Phenylthiophosphonic Acid Di(3-Pentadecyl)Phenol Ester 20 g meta pentadecyl phenol obtained from Example 3-1, 8 g triethylamine and 50 g toluene were added to a reaction flask, heated and stirred. 5 g phenylthiophosphonic dichloride was added. The reaction temperature was maintained at 90° C., and the reaction was performed for 4 hours. The temperature was reduced to produce a red brown transparent liquid. The reaction product was water-washed to neutrality. The organic phase was distilled under reduced pressure at 100 Pa and 150° C. for 1h to remove water and solvent to produce 23.9 g brown yellow transparent liquid, the conversion rate was 95.8%. The prepared product was subjected to the infrared spectrum analysis. The spectrum was shown in FIG. 3, and the analysis result was shown in Table 3-1.

TABLE 3

Infrared analysis result of the product of Example 3-3

| characteristic absorption peak/cm$^{-1}$ | absorption peak attribution |
| --- | --- |
| 3060.19 | stretching vibration of =C—H on the benzene ring |
| 2925.1, 2833.19 | Stretching vibration of C—H in CH3 and CH2 |

TABLE 3-continued

Infrared analysis result of the product of Example 3-3

| characteristic absorption peak/cm$^{-1}$ | absorption peak attribution |
| --- | --- |
| 1607.38, 1581.23, 1481.61 | Stretching vibration of benzene ring skeleton |
| 1233.46 | Stretching vibration of C—O—P |
| 1141.53 | Stretching vibration of O—C |
| 961.78 | Stretching vibration of O—P |
| 753.04, 692.3 | Stretching vibration of P=S |
| 721.23 | In-plane swing of four or more successive-CH$_2$-groups |

Example 3-4 Preparation of Phenylthiophosphonic Acid Di(3-Pentadecyl)Phenol Ester 20 g meta pentadecyl phenol obtained from Example 3-1, 8 g triethylamine and 60 g toluene were added to a reaction flask, heated and stirred. 3.5 g phenylthiophosphonic dichloride was added. The reaction temperature was maintained at 80° C., and the reaction was performed for 5 hours. After the completion of the reaction, the temperature was reduced to produce a red brown transparent liquid. The reaction product was washed with distilled water to neutrality. The organic phase was distilled under reduced pressure at 100 Pa and 150° C. for 1h to remove water and solvent to produce 22 g brown yellow transparent liquid. The reaction conversion rate was 97.8%.

Comparative Example 3-1

Under the nitrogen gas protection, 70.8 g bis(2-ethylhexyl)dithiophosphoric acid and 7.08 g paratoluenesulfonic acid were poured into a flask. The flask was placed in a thermostated water bath (temperature controlled at 100° C.), and the stirring was initiated. A total amount of 31.2 g of itaconic acid methyl ester was added dropwise in 1.5 hours. Under the nitrogen gas protection, the reaction was performed for 8 hours with the continuous stirring. After the completion of the reaction, the reaction was extracted with 10% sodium bicarbonate solution and petroleum ether. the oil phase was dried, filtered and finally distillated under reduced pressure to produce diisooctyl dithiophosphoric acid-2-methyl-succinic acid dimethyl ester.

Example 3-5

The products of Examples 3-2, 3-3 and 3-4, T306, T307, IRGALUBE 353, IRGALUBE 349 and the product of Comparative Example 3-1 were dissolved in the mineral oil 150SN respectively to formulate the compositions having a mass fraction of 0.5%. These compositions were subjected to the antiwear performance test. The testing device was an SRV vibration and friction testing machine. The test conditions were: 100N, 200N, 300N, frequency 50 Hz, amplitude 1 mm, 30° C., 1h. The test results were shown in Table 3-2.

TABLE 3-2

| Antiwear additive in the composition | Ex. 3-2 | Ex. 3-3 | Ex. 3-4 | T306 | T307 | IRGALUBE 353 | IRGALUBE 349 | Comp. Ex. 3-1 |
| --- | --- | --- | --- | --- | --- | --- | --- | --- |
| 100 N Friction coefficient f D, mm | 0.126 0.40 | 0.132 0.38 | 0.129 0.40 | 0.129 0.41 | 0.136 0.38 | 0.128 0.41 | 0.139 0.41 | 0.132 0.42 |
| 200 N Friction coefficient f D, mm | 0.109 0.48 | 0.108 0.46 | 0.108 0.45 | 0.113 0.52 | 0.117 0.45 | 0.109 0.51 | 0.124 0.49 | 0.115 0.51 |

TABLE 3-2-continued

| Antiwear additive in the composition | Ex. 3-2 | Ex. 3-3 | Ex. 3-4 | T306 | T307 | IRGALUBE 353 | IRGALUBE 349 | Comp. Ex. 3-1 |
|---|---|---|---|---|---|---|---|---|
| 300 N | 0.104 | 0.105 | 0.105 | 0.109 | 0.108 | 0.105 | 0.121 | 0.108 |
| Friction coefficient f D, mm | 0.53 | 0.52 | 0.51 | 0.56 | 0.52 | 0.58 | 0.52 | 0.53 |
| extreme pressure/N | 1900 | 1600 | 1800 | 900 | 900 | 1800 | 1300 | 1400 |

It can be seen from Table 3-2 that the thiophosphonate ester of the present invention had outstanding antiwear, anti-friction and extreme pressure properties compared with the extreme pressure antiwear additives having no structure of the present invention.

Example 4-1 Preparation of Epoxidized Cardanol 100 g cardanol, 8 g formic acid, 0.3 g sulfuric acid, 200 g hydrogen peroxide were added to a three-necked flask equipped with mechanical stirring, reflux condenser and temperature controller, stirred, and heated. The reaction temperature was maintained at 70° C. and the reaction was performed for 3 hours. After the completion of the reaction, the temperature was reduced to produce a red brown transparent liquid. The reaction product was filtered and caustic-washed with 5% KOH solution, and then washed with distilled water to neutrality. The organic phase was distilled under reduced pressure at 100 Pa and 150° C. for 1h to remove water and unreacted raw materials to produce 91.4 g orange red transparent liquid. The product conversion rate was 96.2%, and the purity of the epoxidized cardanol with the gas chromatography analysis was greater than 98%.

Example 4-2 Preparation of Bis(Dimethylamino)Phosphoric Acid Epoxidized Cardanol Ester 22 g epoxidized cardanol obtained from Example 4-1, 4 g triethylamine and 20 g toluene were added to a reaction flask, heated and stirred. 12 g bis(dimethylamino)chlorophosphoric acid was added. The reaction temperature was maintained at 70° C., and the reaction was performed for 5 hours. After the completion of the reaction, the temperature was reduced to produce a red brown transparent liquid. The reaction product was washed with distilled water to neutrality. The organic phase was distilled under reduced pressure at 100 Pa and 150° C. for 1h to remove water and solvent to produce 31.5 g brown yellow product, the reaction conversion rate was 92.5%.

Example 4-3 Preparation of Bis(Dimethylamino)Phosphoric Acid Epoxidized Cardanol Ester 22 g epoxidized cardanol obtained from Example 4-1, 8 g triethylamine and 50 g toluene were added to a reaction flask, heated and stirred. 5.5 g bis(dimethylamino)chlorophosphoric acid was added. The reaction temperature was maintained at 90° C., and the reaction was performed for 4 hours. After the completion of the reaction, the temperature was reduced to produce a red brown transparent liquid. The reaction product was washed with distilled water to neutrality. The organic phase was distilled under reduced pressure at 100 Pa and 150° C. for 1h to remove water and solvent to produce 26.2 g brown yellow product, the reaction conversion rate was 95.3%.

Example 4-4 Preparation of Bis(Dimethylamino)Phosphoric Acid Epoxidized Cardanol Ester 22 g epoxidized cardanol obtained from Example 4-1, 8 g triethylamine and 60 g toluene were added to a reaction flask, heated and stirred. 4 g bis(dimethylamino)chlorophosphoric acid was added. The reaction temperature was maintained at 80° C., and the reaction was performed for 5 hours. After the completion of the reaction, the temperature was reduced to produce a red brown transparent liquid. The reaction product was washed with distilled water to neutrality. The organic phase was distilled under reduced pressure at 100 Pa and 150° C. for 1 h to remove water and solvent to produce 22.4 g brown yellow product, the reaction conversion rate was 93.5%.

Comparative Example 4-1

19.4 g dibutyl phosphite and 25.6 g N,N-dibutenylmethylenebenzotriazole were poured into a flask. The flask was placed in a thermostated water bath (temperature controlled at 80° C.), and the stirring was initiated. 1.35 g hydrochloric acid solution containing 0.5 g HCl was added dropwise. The reaction was warmed up to 120° C. The reaction was performed under the continuous stirring for 2 hours. After the completion of the reaction, the mixture was distilled under reduced pressure to produce (N-butyl-N-butenyl)methylenebenzotriazole dibutyl phosphite.

Example 4-5

The products of Examples 4-2, 4-3 and 4-4, T306, T307, IRGALUBE 349, and the product of Comparative Example 4-1 were dissolved in the mineral oil 150SN respectively to formulate the compositions having a mass fraction of 0.5%. These compositions were subjected to the antiwear performance test. The testing device was an SRV vibration and friction testing machine. The test conditions were: 100N, 200N, 300N, frequency 50 Hz, amplitude 1 mm, 30° C., 1h. The test results were shown in Table 4-1.

TABLE 4-1

| Antiwear additive in the composition | Ex. 4-2 | Ex. 4-3 | Ex. 4-4 | T306 | T307 | IRGALUBE 349 | Comp. Ex. 4-1 |
|---|---|---|---|---|---|---|---|
| 100 N | 0.127 | 0.128 | 0.128 | 0.129 | 0.136 | 0.139 | 0.138 |
| Friction coefficient f D, mm | 0.39 | 0.40 | 0.38 | 0.41 | 0.38 | 0.41 | 0.43 |
| 200 N | 0.113 | 0.112 | 0.112 | 0.113 | 0.117 | 0.124 | 0.126 |
| Friction coefficient f D, mm | 0.46 | 0.45 | 0.45 | 0.52 | 0.45 | 0.49 | 0.51 |
| 300 N | 0.109 | 0.110 | 0.109 | 0.109 | 0.108 | 0.121 | 0.119 |
| Friction coefficient f D, mm | 0.51 | 0.50 | 0.51 | 0.56 | 0.52 | 0.52 | 0.53 |
| extreme pressure/N | 1500 | 1550 | 1500 | 900 | 900 | 1300 | 1000 |

It can be seen from Table 4-1 that the organophosphorus compound of the present invention had outstanding anti-wear, anti-friction and extreme pressure properties compared with the extreme pressure antiwear additives having no structure of the present invention.

Example 5-1 Preparation of Sulfurized Cardanol 62 g cardanol (about 0.2 mol) and 12.8 g sulphur powder (0.4 mol) were put in a 250 ml three-necked reaction flask, stirred, and heated. The reaction temperature was maintained at 190° C. and the reaction was performed for 3 hours. After the completion of the reaction, the temperature was reduced followed by the filtration to produce 66.8 g dark red brown thick liquid, namely the sulfurized cardanol. The product conversion rate was 89.3%.

Example 5-2 Preparation of Bis(Dimethylamino)Phosphoric Acid Cardanol Ester 20 g cardanol, 4 g triethylamine and 20 g toluene were added to a reaction flask, heated and stirred. 12 g bis(dimethylamino)chlorophosphoric acid was added. The reaction temperature was maintained at 70° C., and the reaction was performed for 5 hours. After the completion of the reaction, the temperature was reduced to produce a red brown transparent liquid. The reaction product was water-washed to neutrality. The organic phase was distilled under reduced pressure at 100 Pa and 150° C. for 1h to remove water and solvent to produce 29.2 g red brown thick liquid, and the reaction conversion rate was 91.2%.

Example 5-3 Preparation of Bis(Dimethylamino)Phosphoric Acid Sulfurized Cardanol Ester 25 g sulfurized cardanol obtained from Example 5-1, 8 g triethylamine and 50 g toluene were added to a reaction flask, heated and stirred. 5.5 g bis(dimethylamino)chlorophosphoric acid was added. The reaction temperature was maintained at 90° C., and the reaction was performed for 4 hours. The temperature was reduced to produce a red brown transparent liquid. The reaction product was water washed to neutrality. The organic phase was distilled under reduced pressure at 100 Pa and 150° C. for 1h to remove water and solvent to produce 28.4 g dark red brown product, and the conversion rate was 93.1%.

Example 5-4 Preparation of Bis(Dimethylamino)Phosphoric Acid Sulfurized Cardanol Ester 25 g sulfurized cardanol obtained from Example 5-1, 8 g triethylamine and 60 g toluene were added to a reaction flask, heated and stirred. 4 g bis(dimethylamino)chlorophosphoric acid was added. The reaction temperature was maintained at 80° C., and the reaction was performed for 5 hours. The temperature was reduced to produce a red brown transparent liquid. The reaction product was water washed to neutrality. The organic phase was distilled under reduced pressure at 100 Pa and 150° C. for 1h to remove water and solvent to produce 27.4 g dark red brown product, and the conversion rate was 92.9%.

Example 5-5 Preparation of Bis(Dimethylamino)Phosphoric Acid Sulfurized Cardanol Ester 35 g bis(dimethylamino)phosphoric acid cardanol ester obtained from Example 5-2 and 8.5 g sulphur powder were put in a 250 ml three-necked reaction flask, stirred, and heated. The reaction temperature was maintained at 190° C. and the reaction was performed for 3 hours. After the completion of the reaction, the temperature was reduced. The reaction mixture was filtered to produce 31.2 g dark red brown product, the conversion rate was 90.1%.

Comparative Example 5-1

19.4 g dibutyl phosphite and 25.6 g N,N-dibutenylmethylenebenzotriazole were poured into a flask. The flask was placed in a thermostated water bath (temperature controlled at 80° C.), and the stirring was initiated. 1.35 g hydrochloric acid solution containing 0.5 g HCl was added dropwise. The reaction was warmed up to 120° C. The reaction was performed under the continuous stirring for 2 hours. After the completion of the reaction, the mixture was distilled under reduced pressure to produce (N-butyl-N-butenyl)methylenebenzotriazole dibutyl phosphite.

Example 5-6

The products of Examples 5-3, 5-4 and 5-5, T306, T307, IRGALUBE 349, and the product of Comparative Example 5-1 were dissolved in the mineral oil 150SN respectively to formulate the compositions having a mass fraction of 0.5%. These compositions were subjected to the antiwear performance test. The testing device was an SRV vibration and friction testing machine. The test conditions were: 100N, 200N, 300N, frequency 50 Hz, amplitude 1 mm, 30° C., 1h. The test results were shown in Table 5-1.

TABLE 5-1

| Antiwear additive in the composition | Ex. 5-3 | Ex. 5-4 | Ex. 5-5 | T306 | T307 | IRGALUBE 349 | Comp. Ex. 5-1 |
|---|---|---|---|---|---|---|---|
| 100 N Friction coefficient f D, mm | 0.125 0.39 | 0.125 0.38 | 0.126 0.39 | 0.129 0.41 | 0.136 0.38 | 0.139 0.41 | 0.138 0.43 |
| 200 N Friction coefficient f D, mm | 0.113 0.43 | 0.112 0.44 | 0.113 0.43 | 0.113 0.52 | 0.117 0.45 | 0.124 0.49 | 0.126 0.51 |
| 300 N Friction coefficient f D, mm | 0.108 0.50 | 0.108 0.52 | 0.107 0.51 | 0.109 0.56 | 0.108 0.52 | 0.121 0.52 | 0.119 0.53 |
| extreme pressure/N | 1800 | 1900 | 1800 | 900 | 900 | 1300 | 1000 |

It can be seen from Table 5-1 that the organophosphorus compound of the present invention had outstanding anti-wear, anti-friction and extreme pressure properties compared with the extreme pressure antiwear additives having no structure of the present invention.

Example 6-1 Preparation of Meta Pentadecyl Phenol 100 g cardanol and 1.5 g palladium carbon catalyst were placed in a 200 ml high-pressure reactor, the reactor was closed, and hydrogen gas was introduced to 3.5 MPa. The stirring and heating was initiated, and the reaction was performed at a temperature of 200° C. for 4.5 hours. After the completion of the reaction, the temperature was reduced to 60° C., and the viscous reaction mixture was taken out, and distilled under reduced pressure at 100 Pa and 160° C. for 1h. After cooling, a milky white solid was obtained. It was dissolved in petroleum ether, and then purified by crystallization to produce 84.7 g meta pentadecyl phenol with a purity of greater than 98%, and the reaction conversion rate was 83.6%. The purity of the product was obtained by gas chromatographic analysis.

Example 6-2 Preparation of Bis(Dimethylamino)Phosphoric Acid Cardanol Ester 20 g cardanol, 4 g triethylamine and 20 g toluene were added to a reaction flask, heated and stirred. 12 g bis(dimethylamino)chlorophosphoric acid was added. The reaction temperature was maintained at 70° C., and the reaction was performed for 5 hours. After the completion of the reaction, the temperature was reduced to produce a redbrown transparent liquid. The reaction product was washed with distilled water to neutrality. The organic phase was distilled under reduced pressure at 100 Pa and 150° C. for 1h to remove water and solvent to produce 29.2 g red brown thick liquid, the reaction conversion rate was 91.2%.

Figure 4:
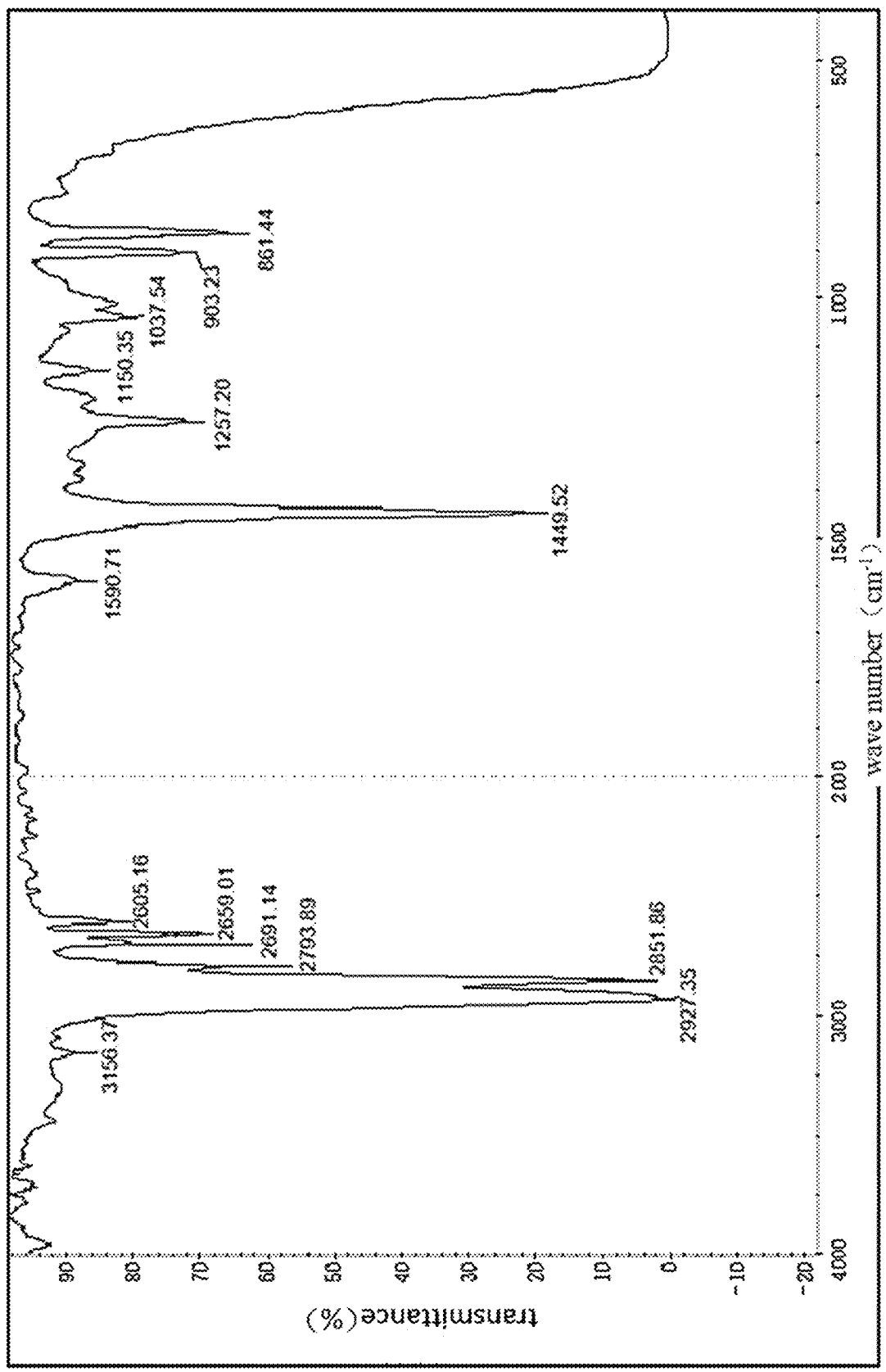
FIG. 4 is the infrared spectrum of the product of Example 6-3.

Example 6-3 Preparation of Bis(Dimethylamino)Phosphoric Acid (3-Pentadecyl)Phenol Ester 20 g meta pentadecyl phenol obtained from Example 6-1, 8 g triethylamine and 50 g toluene were added to a reaction flask, heated and stirred. 5.5 g bis(dimethylamino)chlorophosphoric acid was added. The reaction temperature was maintained at 90° C., and the reaction was performed for 4 hours. After the completion of the reaction, the temperature was reduced to produce a red brown transparent liquid. The reaction product was washed with distilled water to neutrality. The organic phase was distilled under reduced pressure at 100 Pa and 150° C. for 1h to remove water and solvent to produce 23.7 g brown yellow product, the reaction conversion rate was 92.8%. The prepared product was subjected to the infrared spectrum analysis. The spectrum was shown in FIG. 4, and the analysis result was shown in Table 6-1.

TABLE 4

Infrared analysis result of the product of Example 6-3

| characteristic absorption peak/cm$^{-1}$ | absorption peak attribution |
|---|---|
| 2927.35, 2851.86 | Stretching vibration of C—H in $CH_3$ and $CH_2$ |
| 1590.71 | Stretching vibration of benzene ring skeleton |
| 1257.20 | Stretching vibration of P=O |
| 1150.35 | Stretching vibration of O—C |
| 1037.54 | Stretching vibration of P—N |
| 903.23, 861.44 | P—Stretching vibration of O—C |

Example 6-4 Preparation of Bis(Dimethylamino)Phosphoric Acid (3-Pentadecyl)Phenol Ester 20 g meta pentadecyl phenol obtained from Example 6-1, 8 g triethylamine and 60 g toluene were added to a reaction flask, heated and stirred. 4 g bis(dimethylamino)chlorophosphoric acid was added. The reaction temperature was maintained at 80° C., and the reaction was performed for 5 hours. After the completion of the reaction, the temperature was reduced to produce a red brown transparent liquid. The reaction product was washed with distilled water to neutrality. The organic phase was distilled under reduced pressure at 100 Pa and 150° C. for 1h to remove water and solvent to produce 22.1 g brown yellow product, the reaction conversion rate was 91.9%.

Example 6-5 Preparation of Bis(Dimethylamino)Phosphoric Acid (4-Dodecyl)Phenol Ester 20 g paradodecylbenzene phenol, 8 g triethylamine and 60 g toluene were added to a reaction flask, heated and stirred. 4 g bis(dimethylamino)chlorophosphoric acid was added. The reaction temperature was maintained at 80° C., and the reaction was performed for 5 hours. After the completion of the reaction, the temperature was reduced to produce a red brown transparent liquid. The reaction product was washed with distilled water to neutrality. The organic phase was distilled under reduced pressure at 100 Pa and 150° C. for 1h to remove water and solvent to produce 22.8 g brown yellow product, the reaction conversion rate was 94.8%.

Comparative Example 6-1

19.4 g dibutyl phosphite and 25.6 g N,N-dibutenylmethylenebenzotriazole were poured into a flask. The flask was placed in a thermostated water bath (temperature controlled at 80° C.), and the stirring was initiated. 1.35 g hydrochloric acid solution containing 0.5 g HCl was added dropwise. The reaction was warmed up to 120° C. The reaction was performed under the continuous stirring for 2 hours. After the completion of the reaction, the mixture was distilled under reduced pressure to produce (N-butyl-N-butenyl) methylenebenzotriazole dibutyl phosphite.

Example 6-6

The products of Examples 6-2, 6-3, 6-4 and 6-5, T306, T307, IRGALUBE 349, and the product of Comparative Example 6-1 were dissolved in the mineral oil 150SN respectively to formulate the compositions having a mass fraction of 0.5%. These compositions were subjected to the antiwear performance test. The testing device was an SRV vibration and friction testing machine. The test conditions were: 100N, 200N, 300N, frequency 50 Hz, amplitude 1 mm, 30° C., 1h. The test results were shown in Table 6-2.

TABLE 6-2

| Antiwear additive in the composition | Ex. 6-2 | Ex. 6-3 | Ex. 6-4 | Ex. 6-5 | T306 | T307 | IRGALUBE 349 | Comp. Ex. 6-1 |
|---|---|---|---|---|---|---|---|---|
| 100 N Friction coefficient | 0.126 | 0.127 | 0.128 | 0.129 | 0.129 | 0.136 | 0.139 | 0.138 |
| f D, mm | 0.40 | 0.38 | 0.40 | 0.40 | 0.41 | 0.38 | 0.41 | 0.43 |
| 200 N Friction coefficient | 0.113 | 0.113 | 0.114 | 0.115 | 0.113 | 0.117 | 0.124 | 0.126 |
| f D, mm | 0.45 | 0.44 | 0.44 | 0.45 | 0.52 | 0.45 | 0.49 | 0.51 |
| 300 N Friction coefficient | 0.106 | 0.107 | 0.106 | 0.108 | 0.109 | 0.108 | 0.121 | 0.119 |
| f D, mm | 0.49 | 0.50 | 0.49 | 0.51 | 0.56 | 0.52 | 0.52 | 0.53 |
| extreme pressure/N | 1500 | 1500 | 1500 | 1300 | 900 | 900 | 1300 | 1000 |

It can be seen from Table 6-2 that the aminophosphate ester of the present invention had outstanding antiwear, anti-friction and extreme pressure properties compared with the extreme pressure antiwear additives having no structure of the present invention.

Although the embodiments of the present invention have been described in detail with reference to the examples, it should be noted that the scope of the present invention is not limited by the embodiments. Those skilled in the art can appropriately modify the embodiments without departing from the technical spirit and scope of the present invention, and it is obvious that the modified embodiments are also included in the scope of the present invention.

INDUSTRIAL APPLICABILITY

The invention provides an organophosphorus compound with a specific structure, the organophosphorus compound of the present invention can be used as extreme pressure antiwear additive and shows excellent antiwear, antifriction and extreme pressure performances. Also, the organophosphorus compound of the present invention can be obtained from cardanol which is an agricultural by-product, and therefore, the organophosphorus compound of the present invention can be produced in an environmentally friendly and low-cost manner.

The invention claimed is:

1. An organophosphorus compound having a structure represented by formula (I):

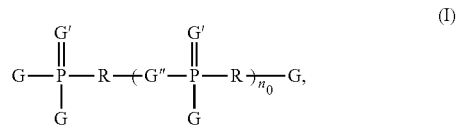

in formula (I), groups G are, identical to or different from each other, each independently selected from H, $C_1$-$C_{10}$ linear or branched alkyl, $C_1$-$C_{10}$ linear or branched alkoxyl, $C_6$-$C_{10}$ aryl, $C_1$-$C_{14}$ alkyl phenyl, a group represented by formula (II), and a group represented by formula (III), wherein at least one of the G groups is a group represented by formula (II);

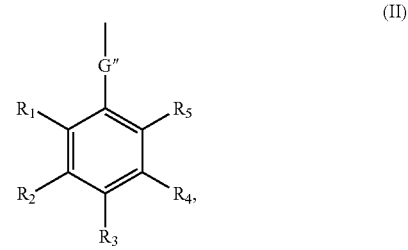

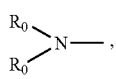
(III)

in formula (II), groups $R_1$, $R_2$, $R_3$, $R_4$ and $R_5$ are, identical to or different from each other, each independently selected from H, a group represented by formula (II-I), a group represented by formula (II-II), and a group represented by formula (II-III), at least one of $R_1$, $R_2$, $R_3$, $R_4$, and $R_5$ is selected from a group represented by formula (II-I), a group represented by formula (II-II), and a group represented by formula (II-III);

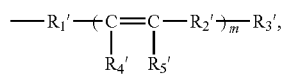
(II-I)

in formula (II-I), group $R_1'$ is selected from single bond and $C_1$-$C_{20}$ linear or branched alkylene; groups $R_2'$ in the m repeating units are, identical to or different from each other, each independently a single bond or a $C_1$-$C_4$ linear or branched alkylene; group $R_3'$ is selected from hydrogen and $C_1$-$C_{20}$ linear or branched alkyl; groups $R_4'$ in the m repeating units are hydrogen; groups $R_5'$ in the m repeating units are hydrogen; m is 1, 2, or 3; and the total carbon number in formula (II-I) is 10-20,

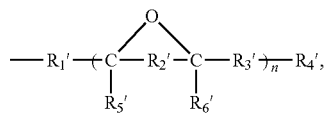
(II-II)

in formula (II-II), group $R_1'$ is selected from single bond and $C_1$-$C_{20}$ linear or branched alkylene; groups $R_2'$ in the n repeating units are, identical to or different from each other, each independently a single bond, or a $C_1$-$C_4$ linear or branched alkylene; groups $R_3'$ in the n repeating units are, identical to or different from each other, each independently a single bond, or a $C_1$-$C_{20}$ linear or branched alkylene; group $R_4'$ is selected from hydrogen and $C_1$-$C_{20}$ linear or branched alkyl; groups $R_5'$ the in n repeating units is hydrogen; groups $R_6'$ in n repeating units is hydrogen; n is 1, 2, or 3; and the total carbon number of the group represented by formula (II-II) is 10-20;

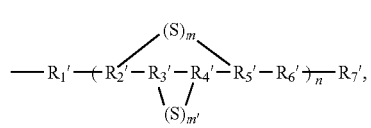
(II-III)

in formula (II-III), group $R_1'$ is selected from single bond and $C_1$-$C_{20}$ linear or branched alkylene; groups $R_2'$ in the n repeating units are, identical to or different from each other, each independently a 2 valent, 3 valent, or 4 valent $C_1$-$C_4$ linear or branched alkyl; groups $R_3'$ in the n repeating units are, identical to or different from each other, each independently a single bond, or a 2 valent or 3 valent $C_1$-$C_4$ linear or branched alkyl; $R_4'$ in the n repeating units are, identical to or different from each other, each independently a single bond, or a 2 valent or 3 valent $C_1$-$C_4$ linear or branched alkyl; groups $R_5'$ the in n repeating units are, identical to or different from each other, each independently a 2 valent, 3 valent or 4 valent $C_1$-$C_4$ linear or branched alkyl; groups $R_6'$ in the n repeating units are, identical to or different from each other, each independently a single bond, or a $C_1$-$C_4$ linear or branched alkylene; group $R_7'$ is selected from hydrogen and $C_1$-$C_{20}$ linear or branched alkyl; n is 1, 2, or 3; the numbers m in the n repeating units are, identical to or different from each other, each independently 0, 1, 2, 3, 4, or 5; the numbers m' in the n repeating units are, identical to or different from each other, each independently 0, 1, 2, 3, 4, or 5; in each repeating unit of formula (II-III), when m is greater than 0, the linking group formed by m sulfur atoms is bonded to groups $R_2'$ and $R_5'$; when m' is greater than 0, the linking group formed by m' sulfur atoms is bonded to groups $R_3'$ and $R_4'$; in each repeating unit of formula (II-III), when group $R_3'$ is a single bond, the end of the linking group formed by m' sulfur atoms, which is connected to group $R_3'$, is bonded to group $R_2'$, when group $R_4'$ is a single bond, the end of the linking group formed by m' sulfur atoms, which is connected to group $R_4'$, is bonded to group $R_5'$; and the total carbon number of the group represented by formula (II-III) is 10-20;

in formula (III), groups $R_0$ are each independently selected from phenyl, $C_1$-$C_{14}$ alkyl phenyl, and $C_1$-$C_{20}$ linear or branched alkyl;

groups G' present in formula (I) are, identical to or different from each other, each independently O or S;

groups G'' present in formula (I) and formula (II) are O;

in formula (I), groups R are independently selected from single bond, $C_1$-$C_{10}$ linear or branched alkylene, and $C_6$-$C_{10}$ arylene; and $n_0$ in formula (I) is 0.

2. The organophosphorus compound according to claim 1, wherein the total carbon number of the group represented by formula (II-I) is 10-18; the total carbon number of the group represented by formula (II-II) is 10-18; and the total carbon number of the group represented by formula (II-III) is 10-18.

3. The organophosphorus compound according to claim 1, wherein the organophosphorus compound is selected from compounds listed below and mixtures thereof in any proportion:

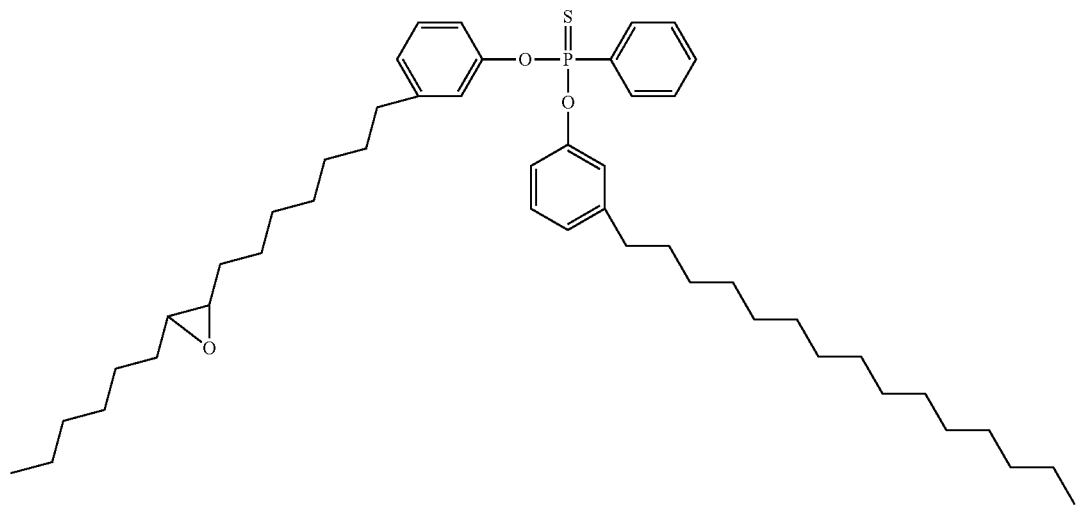
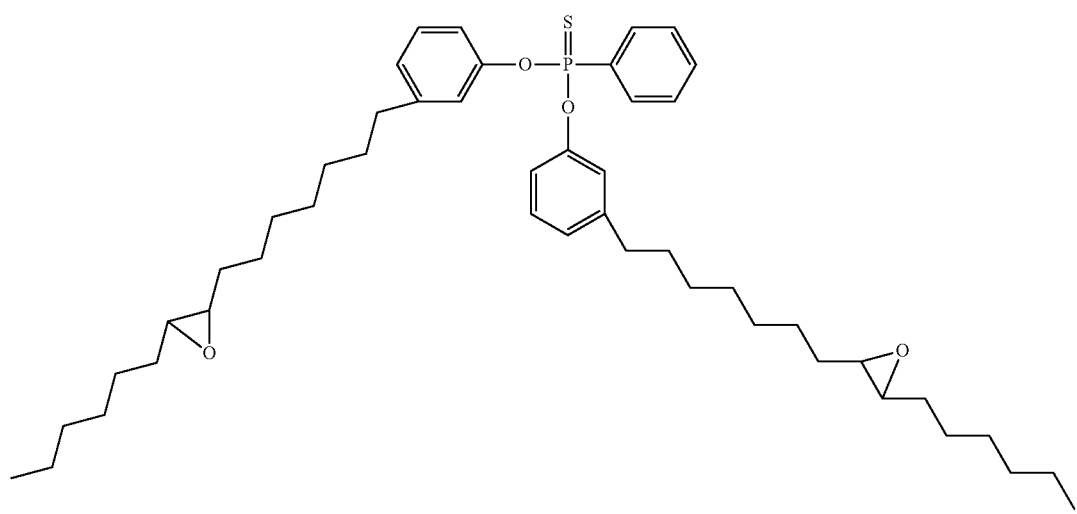
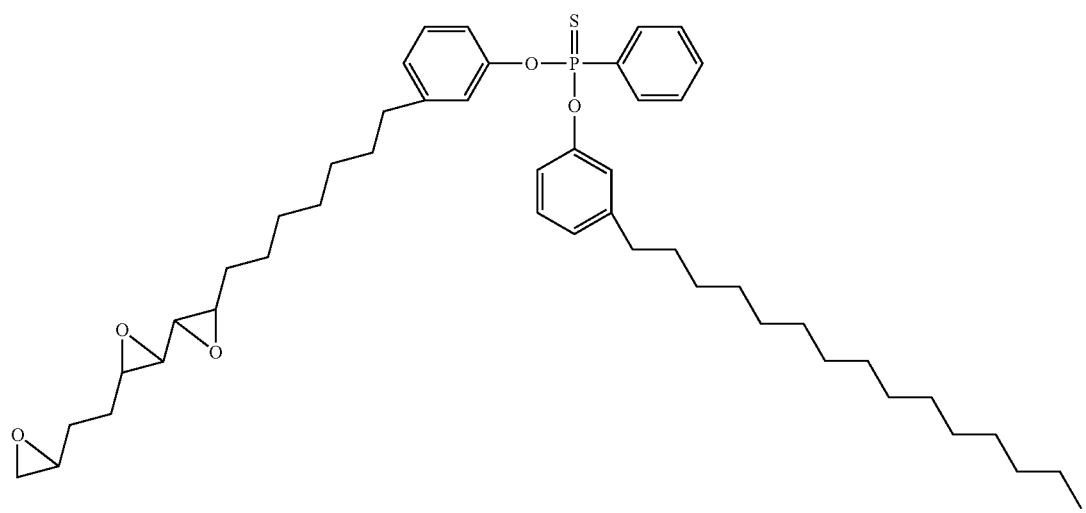

-continued
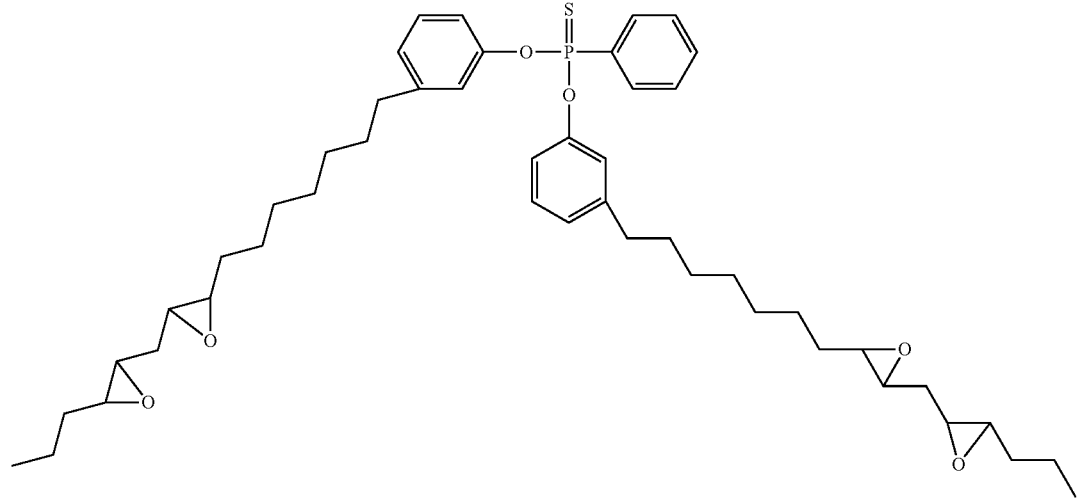
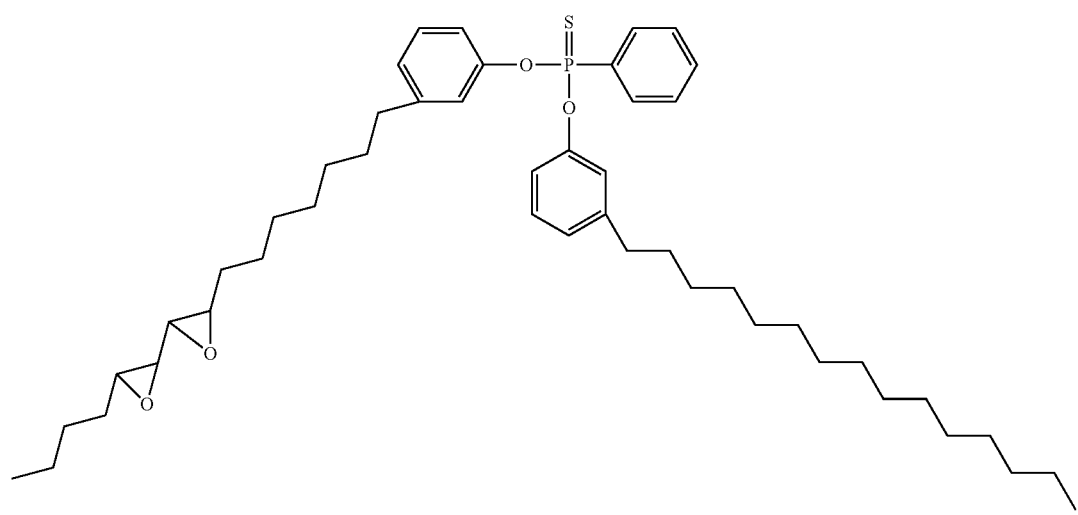
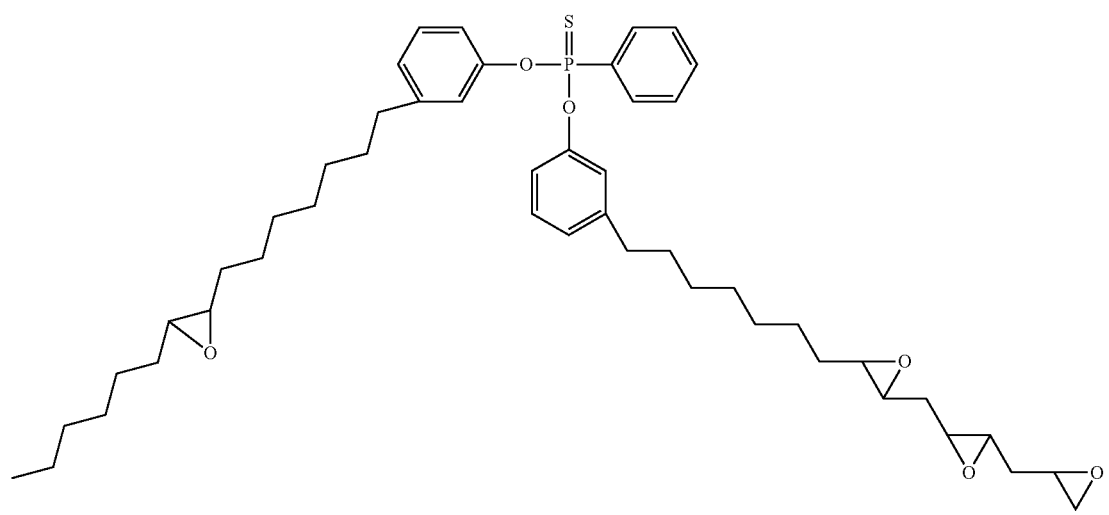

-continued
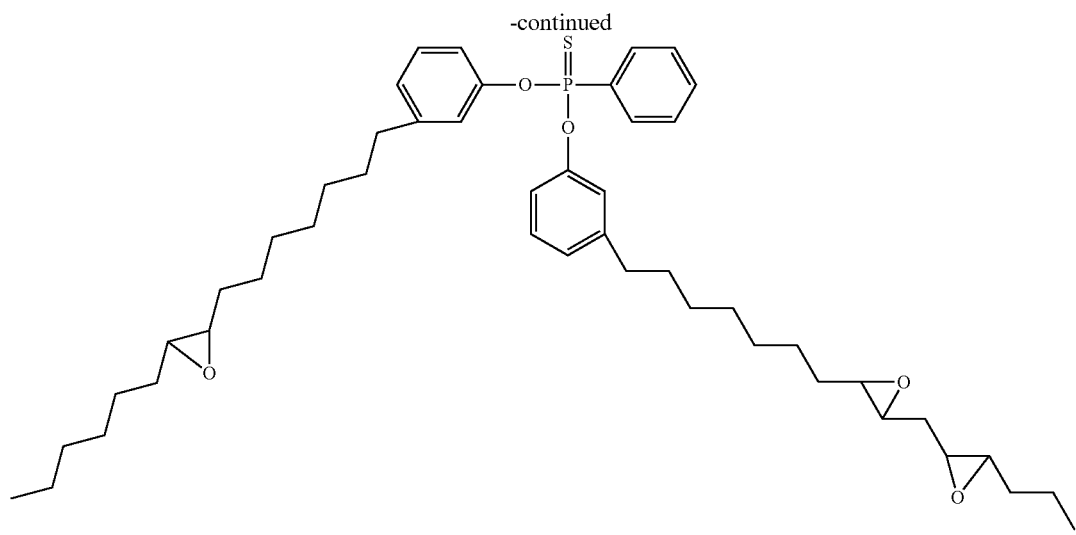
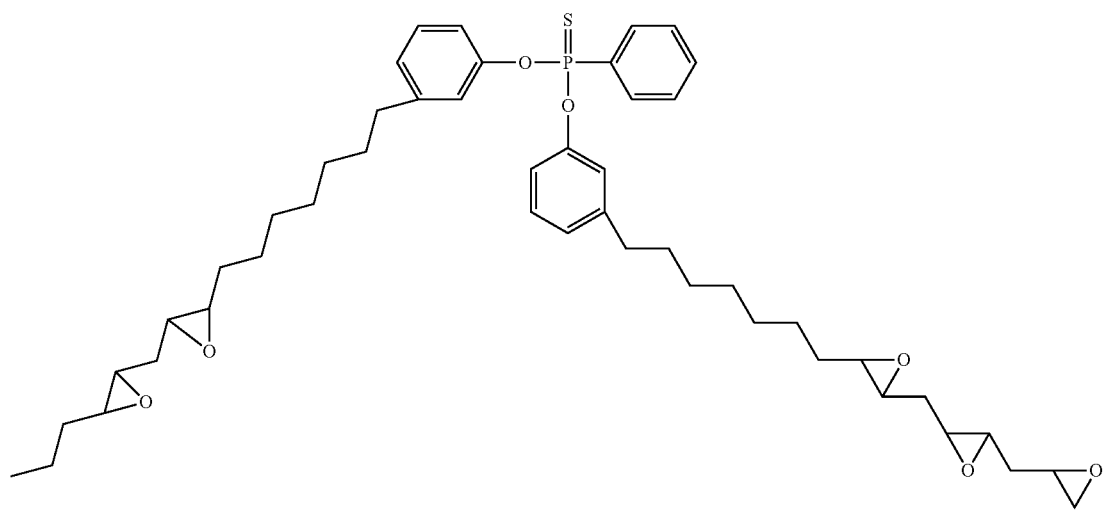
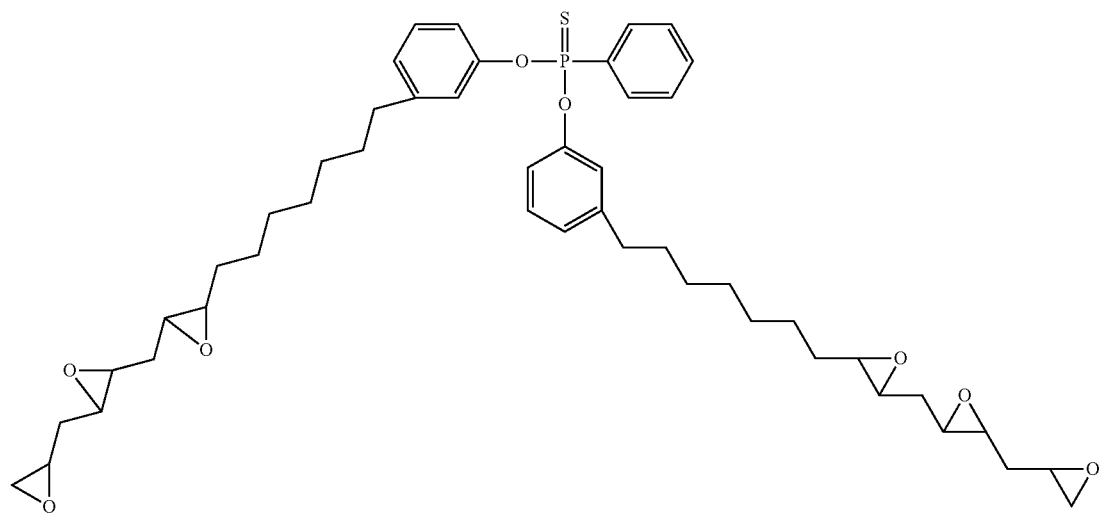

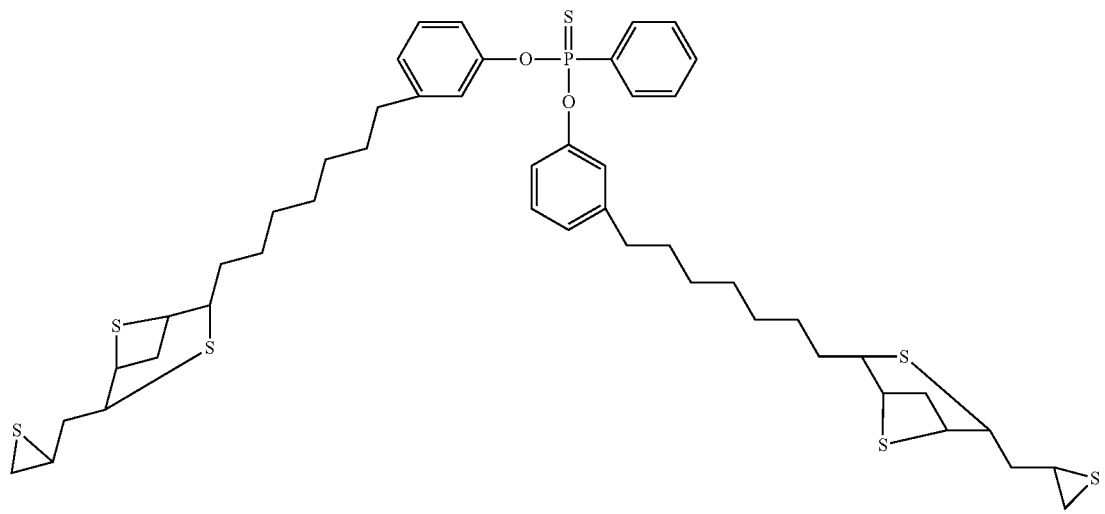
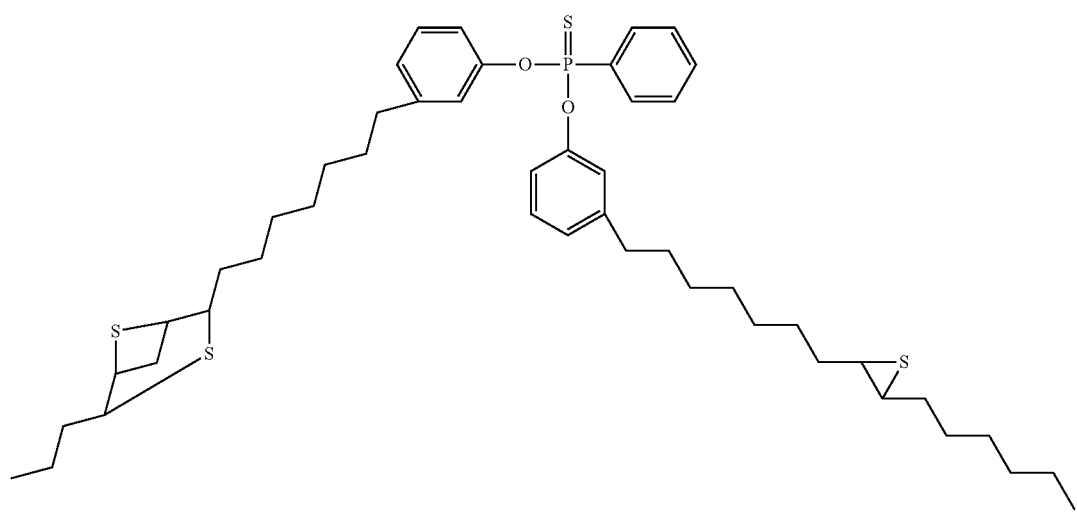
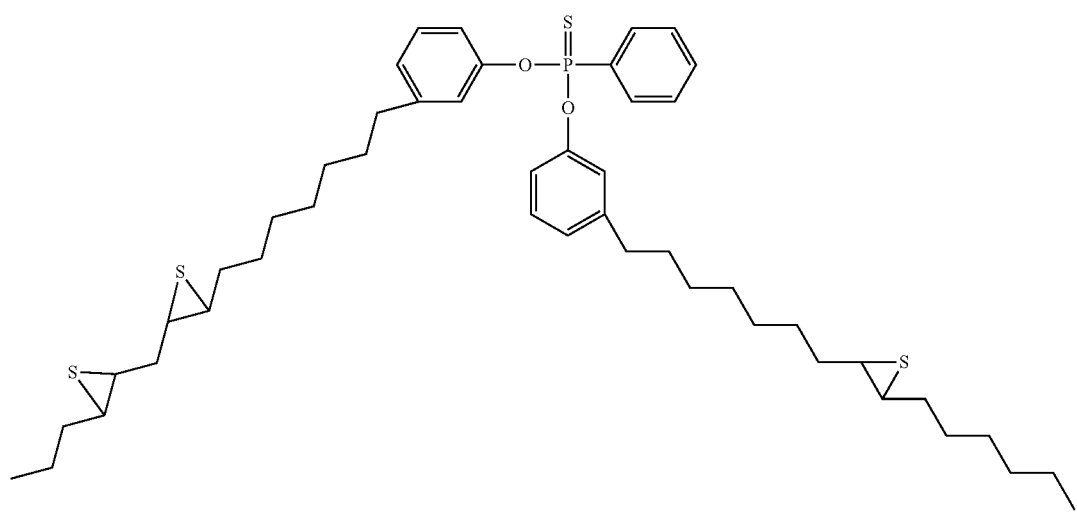

-continued
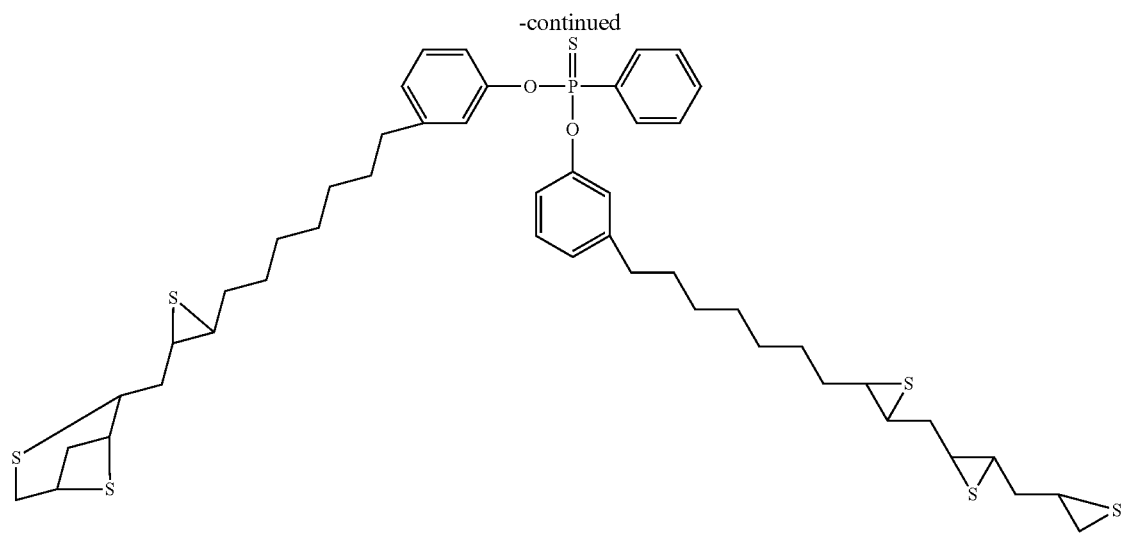
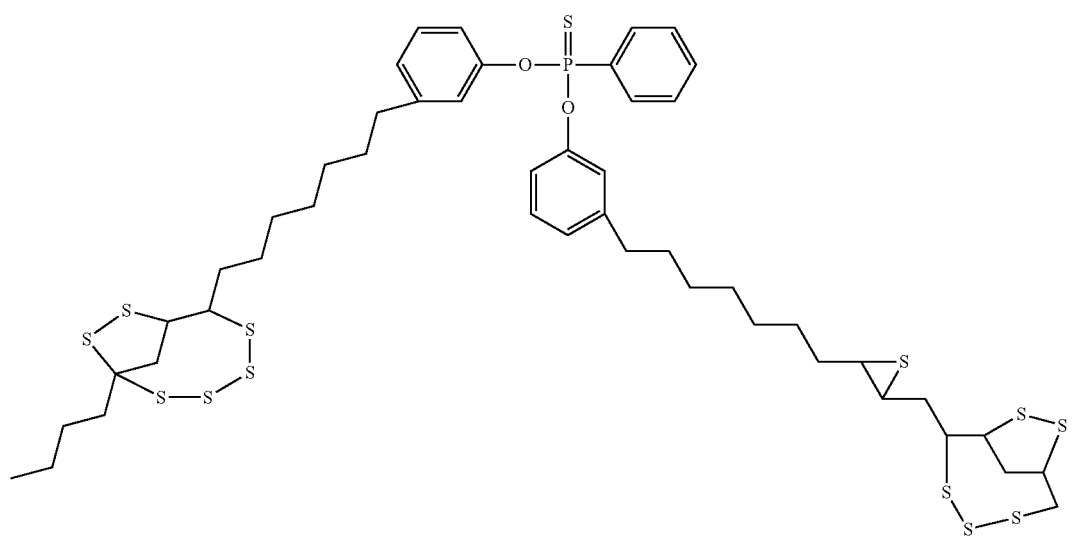
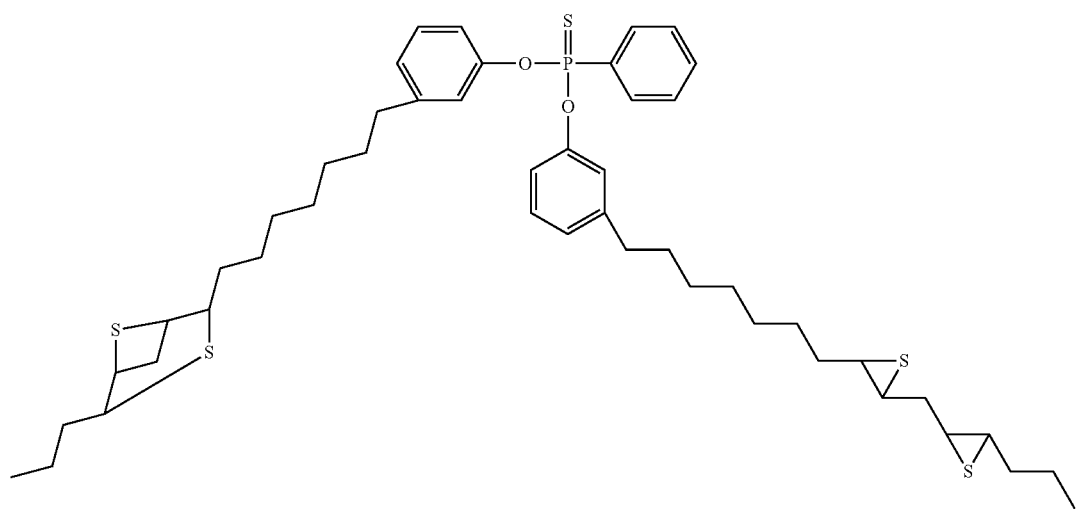

-continued
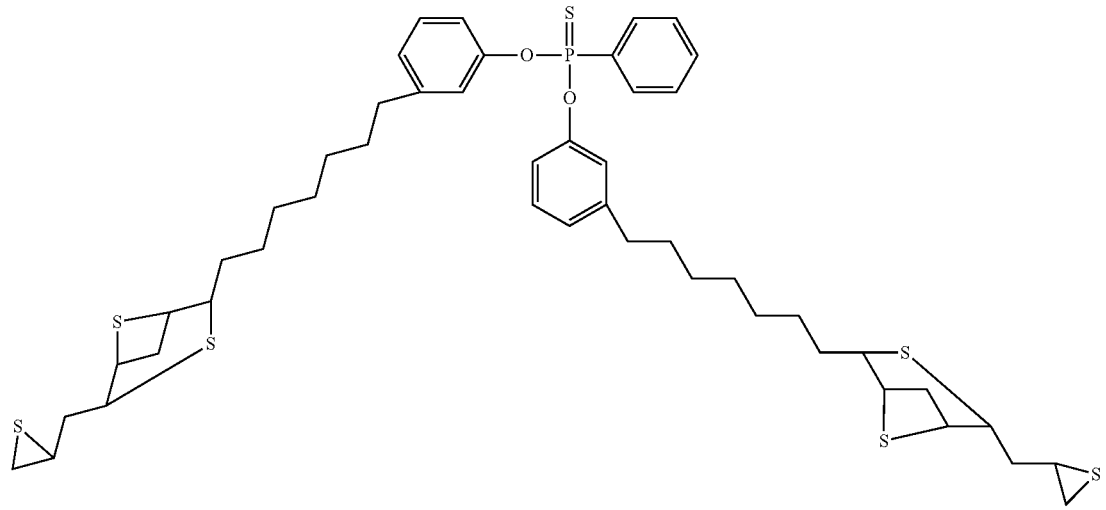
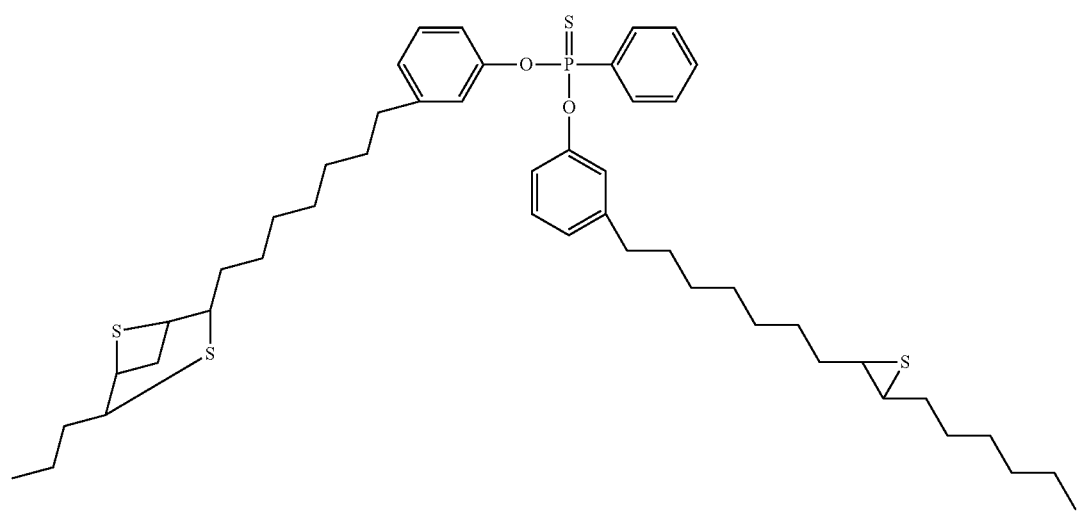
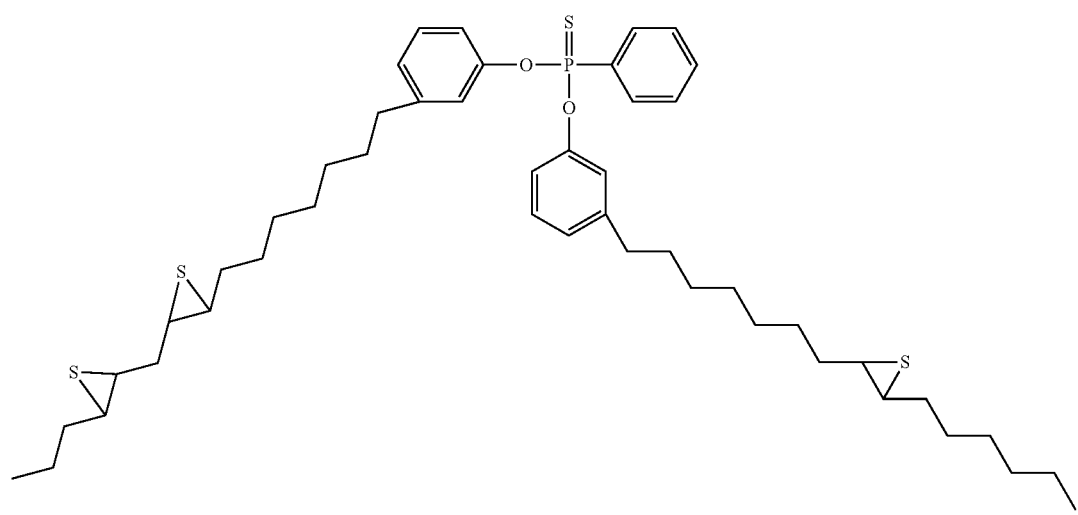

-continued
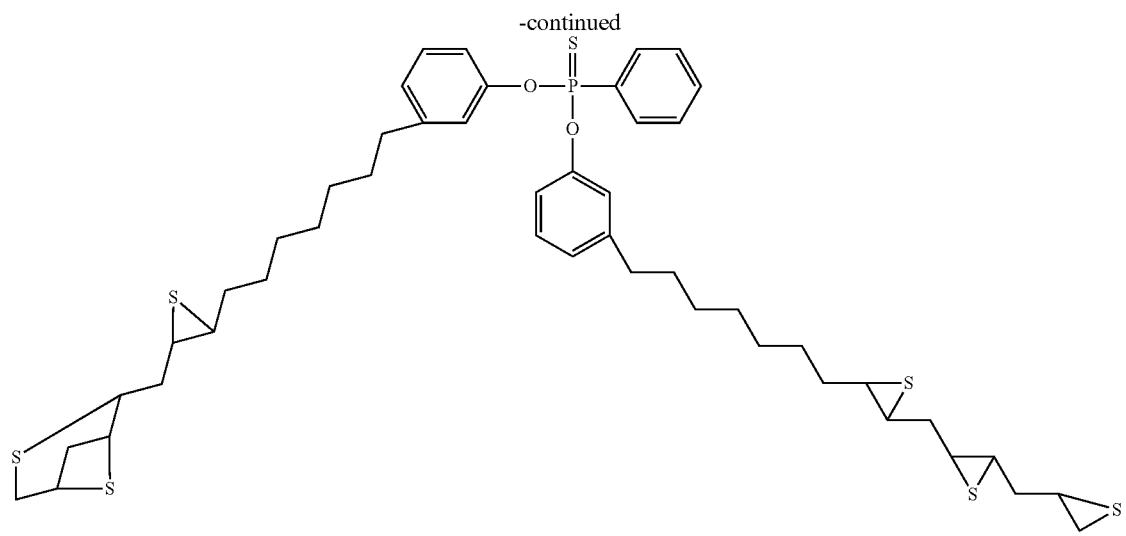
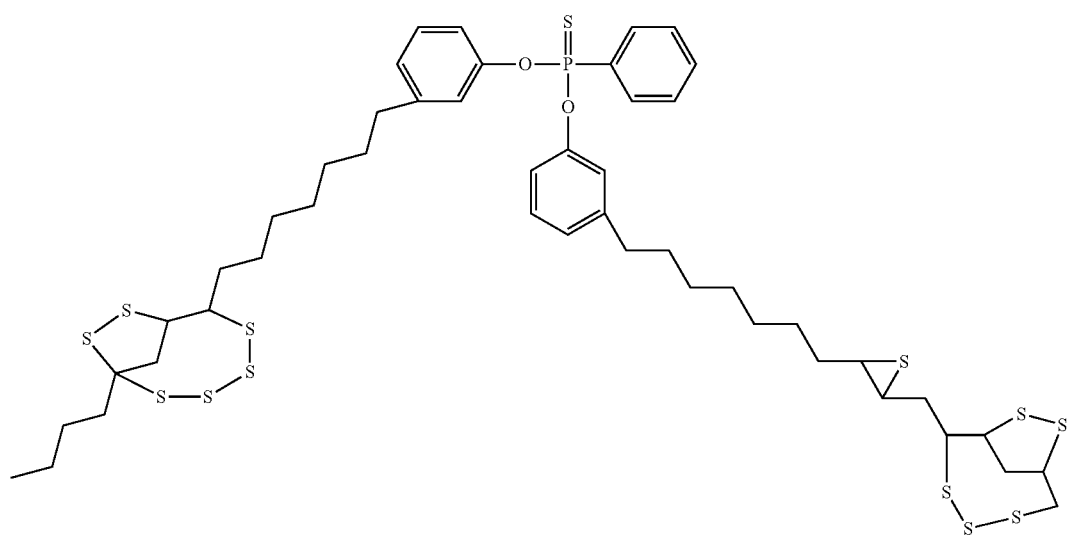
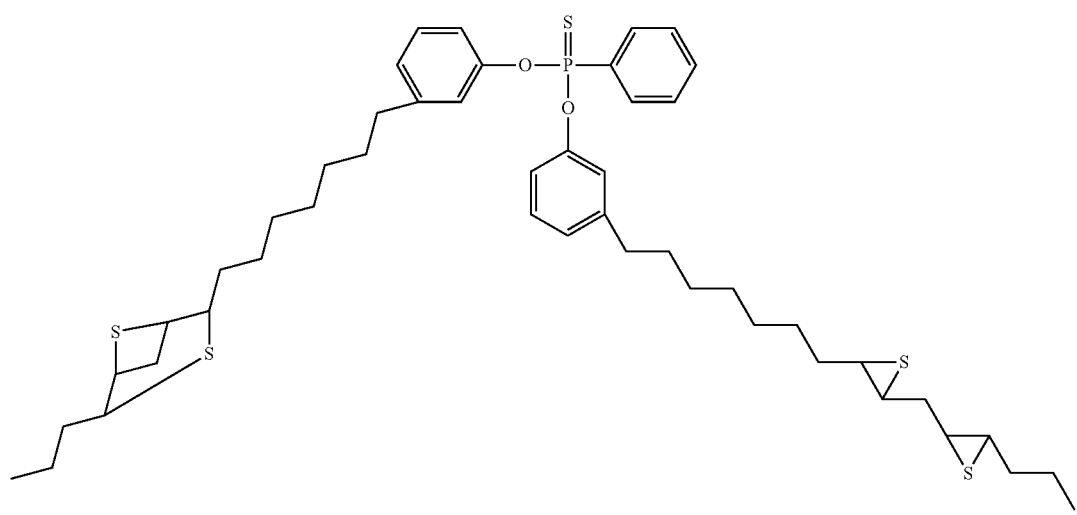

-continued
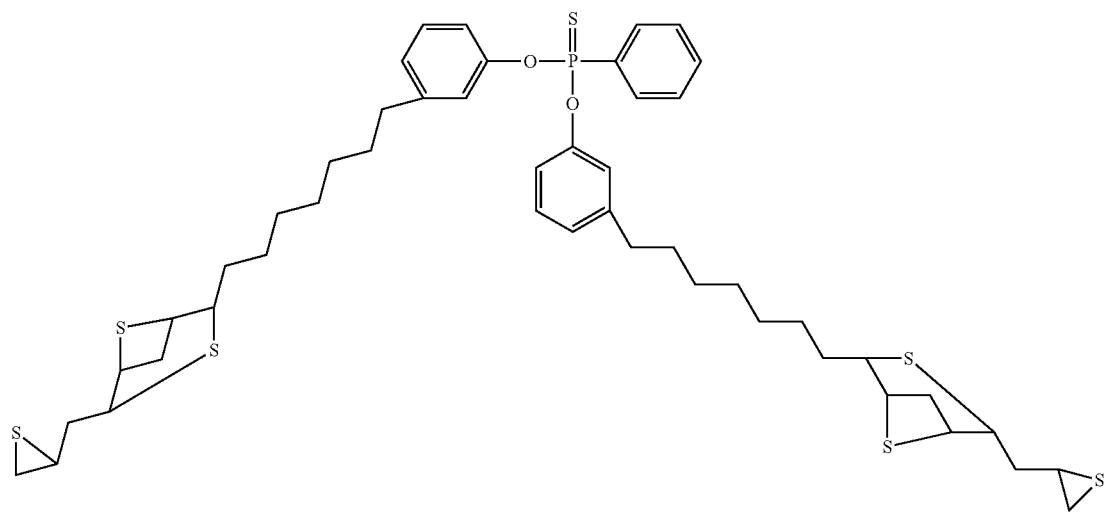
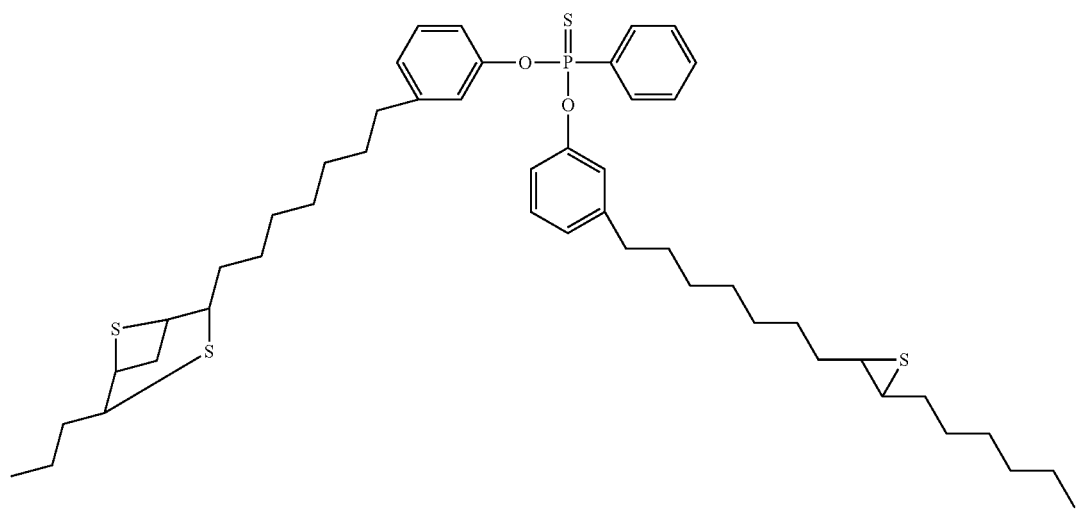
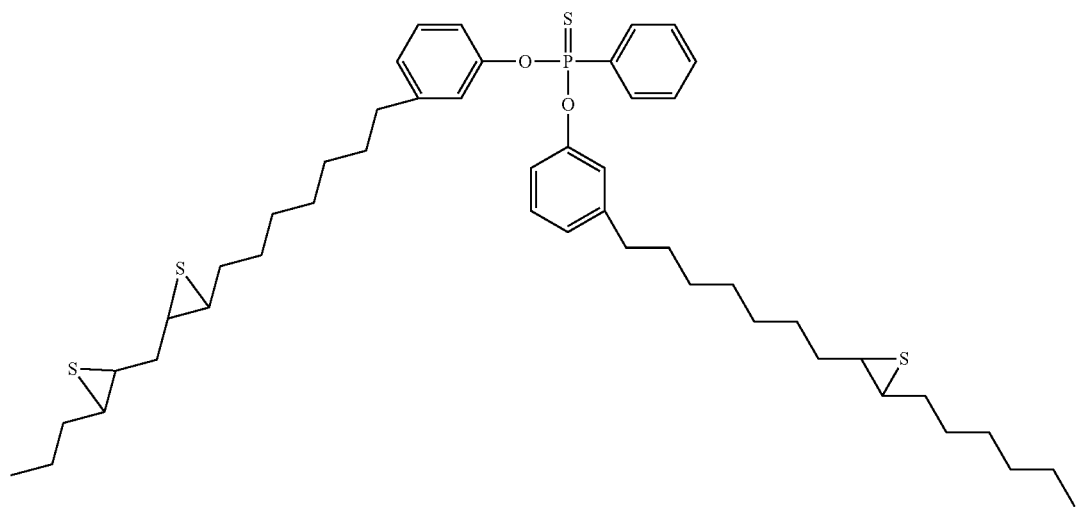

-continued
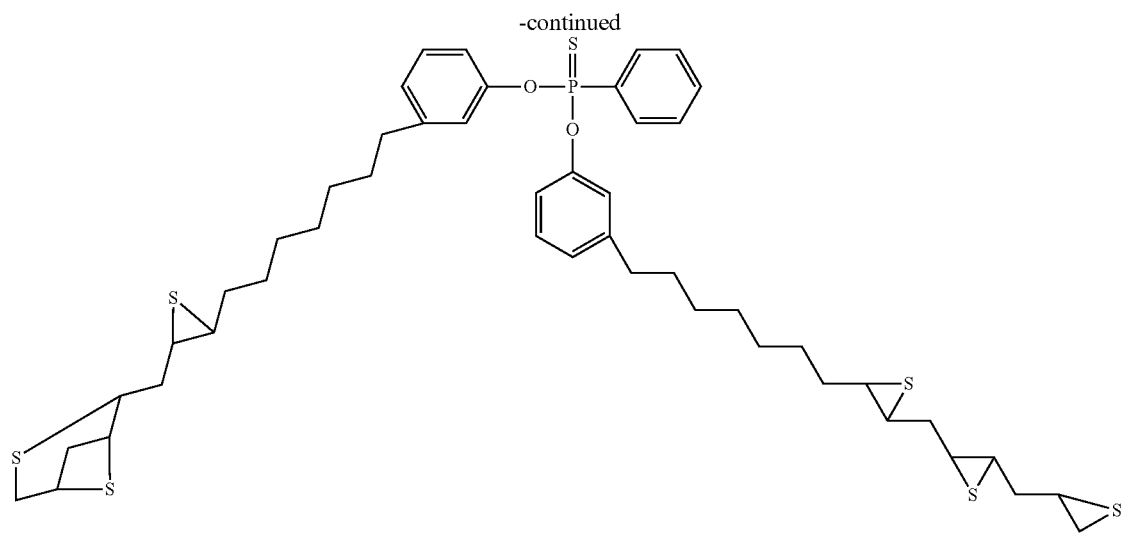
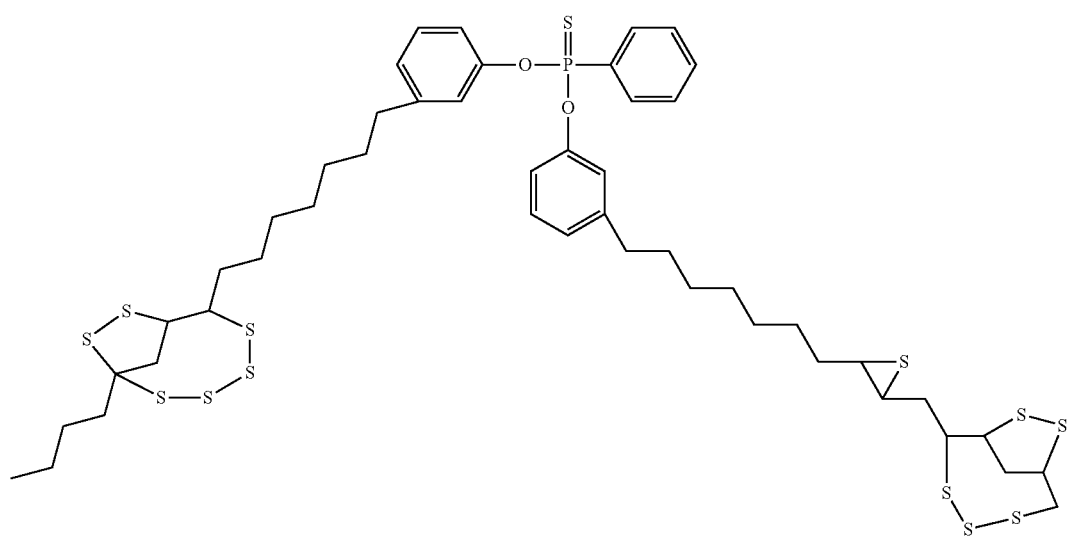
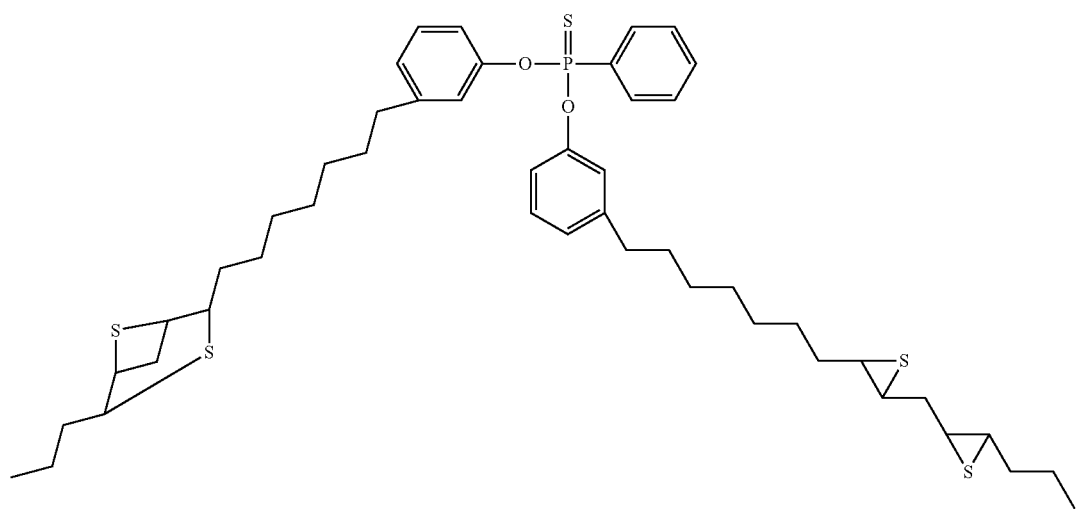

-continued
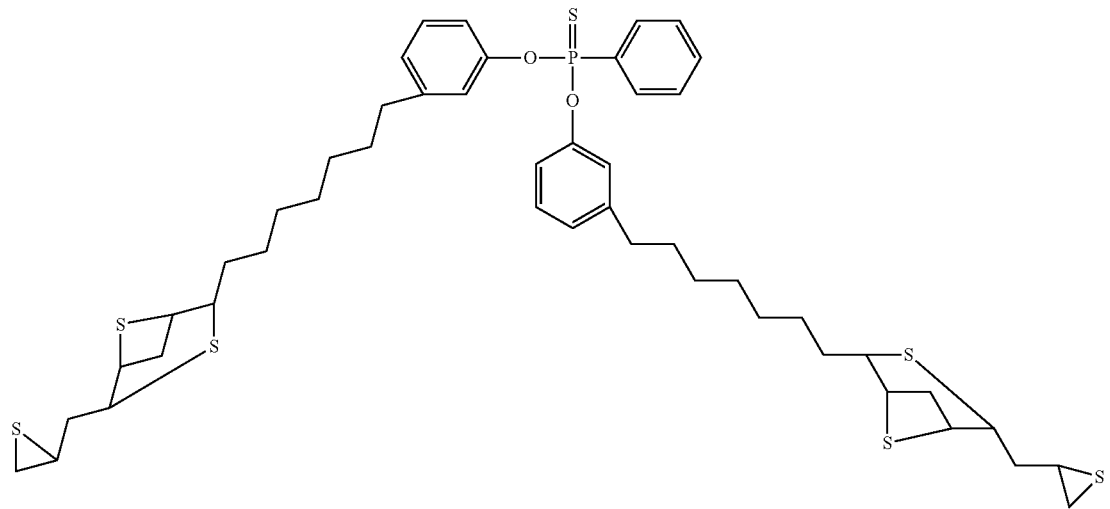
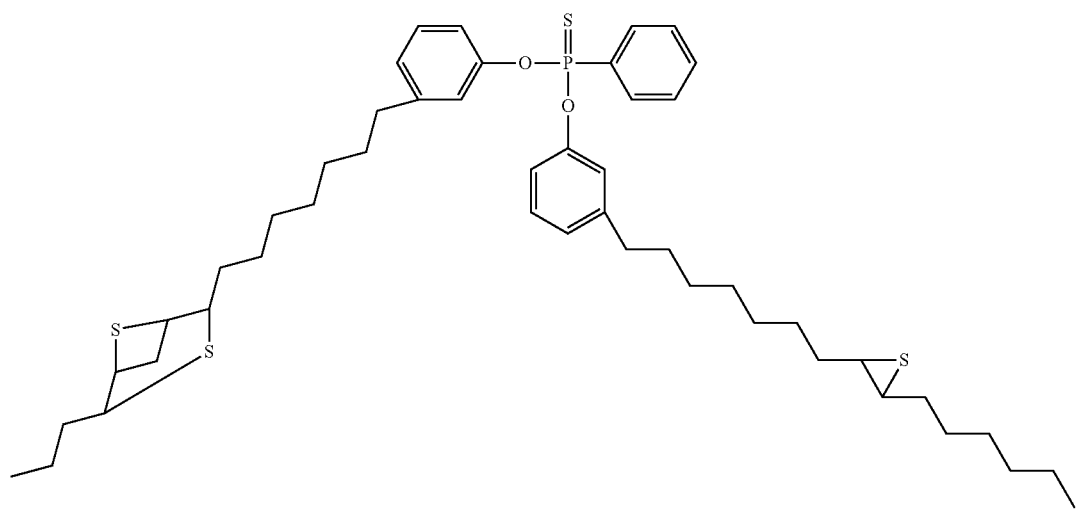
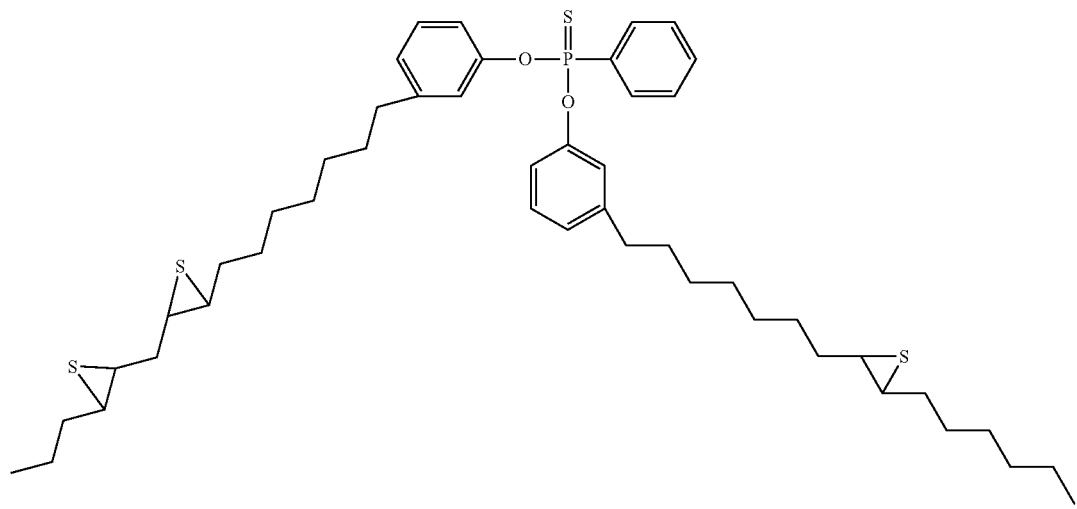

-continued
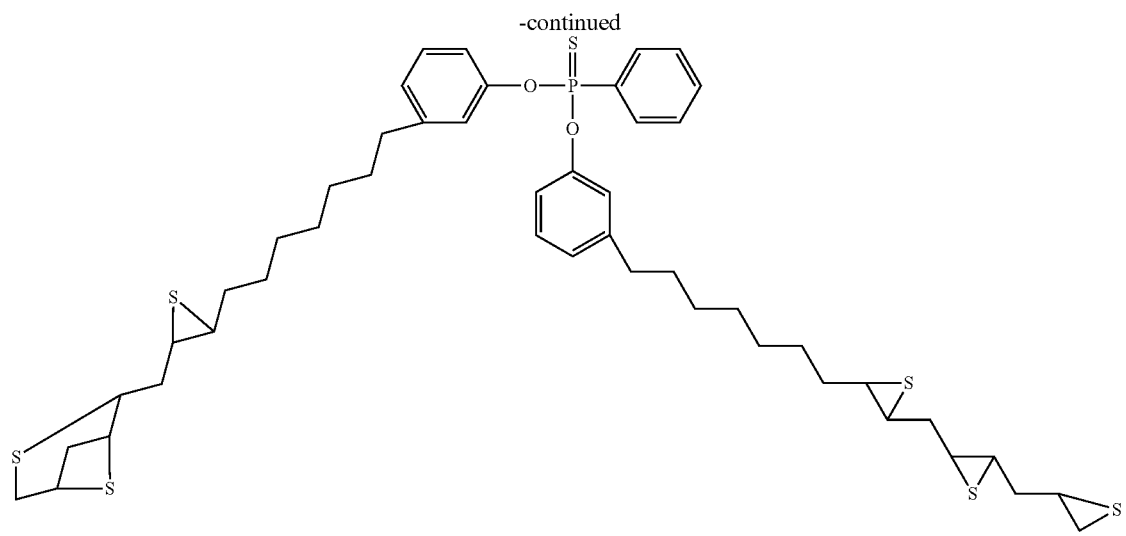
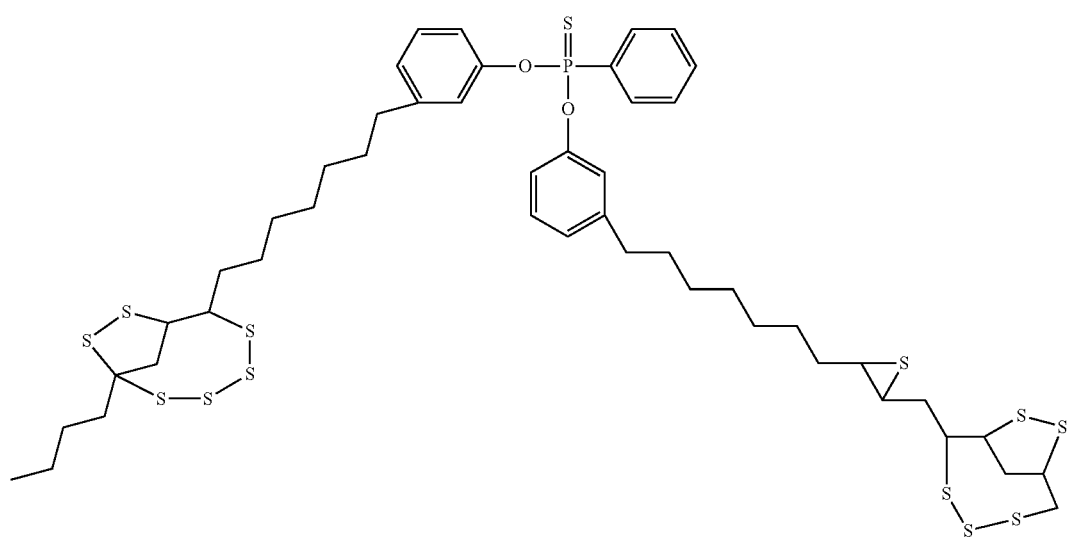
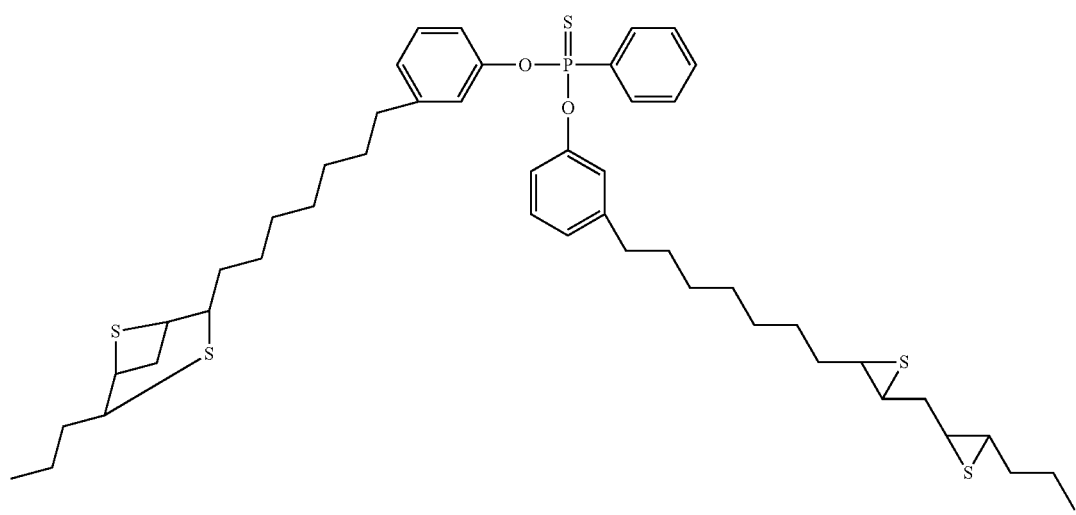

-continued
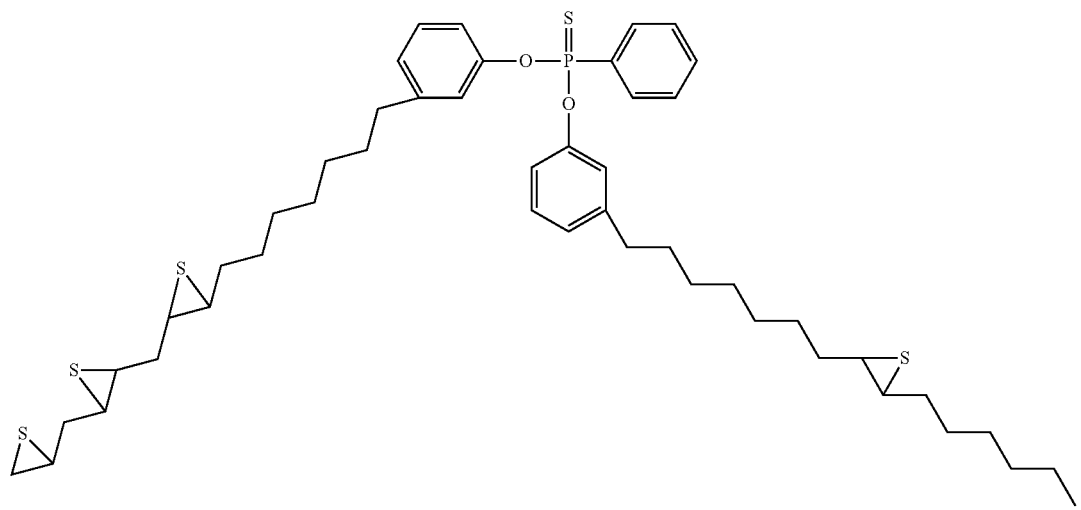
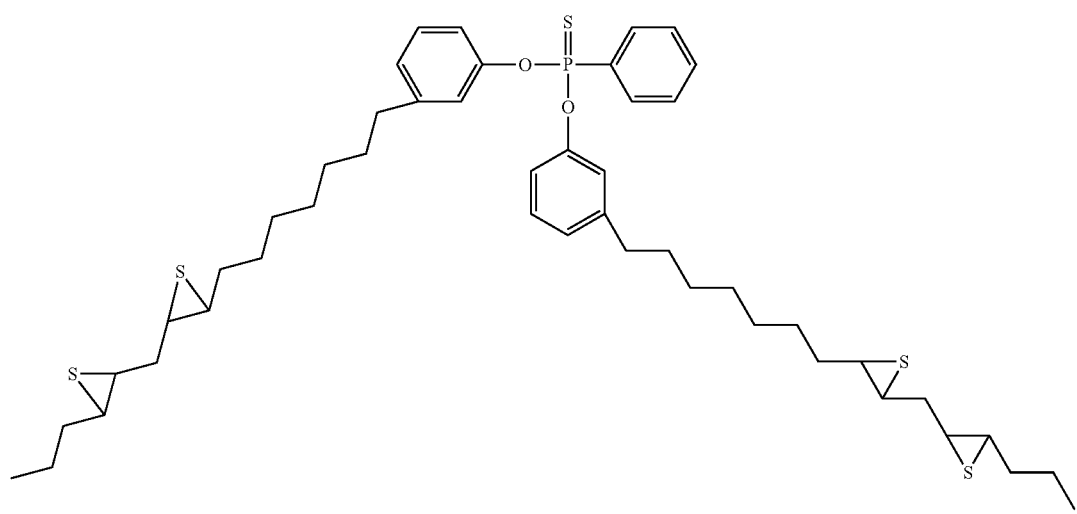
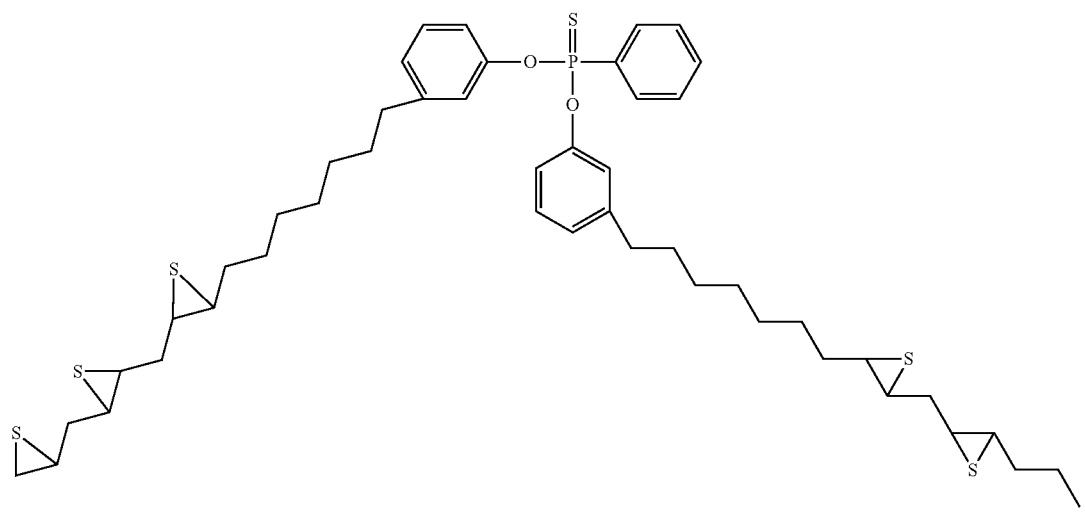

-continued
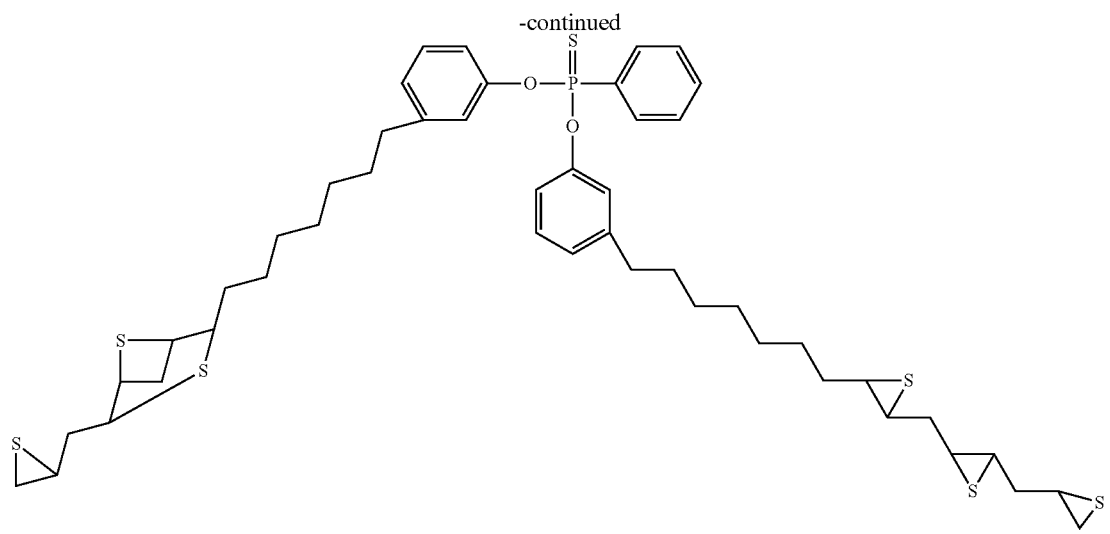
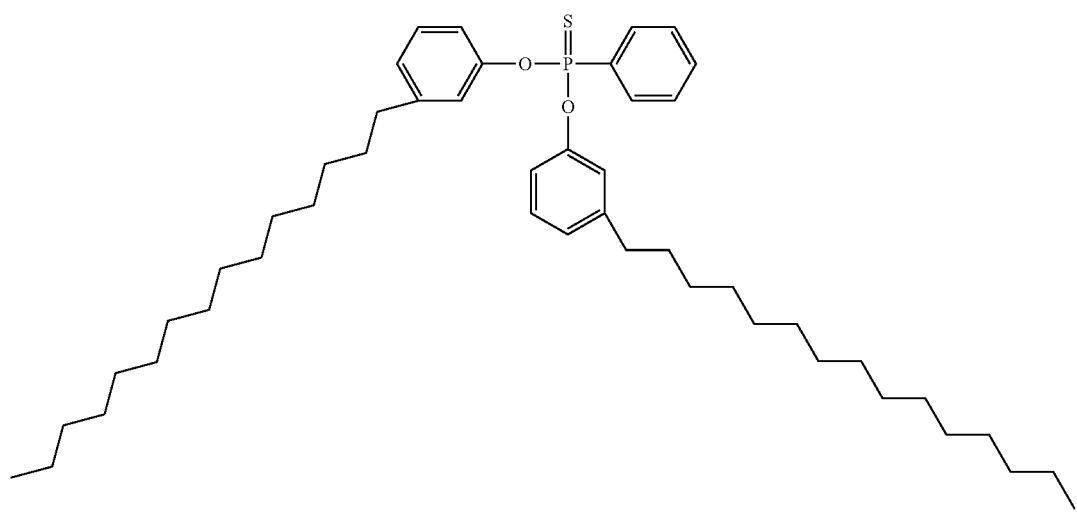
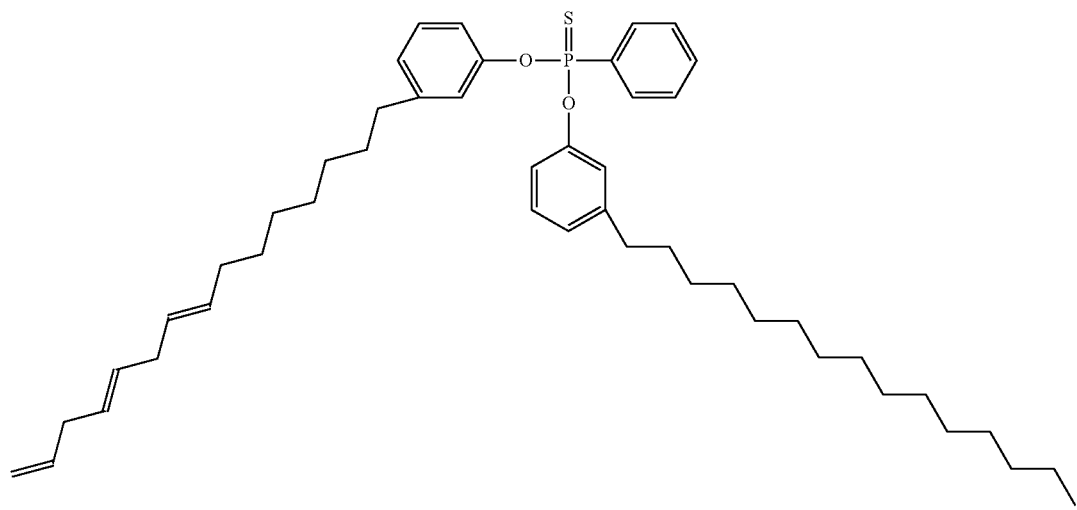

-continued
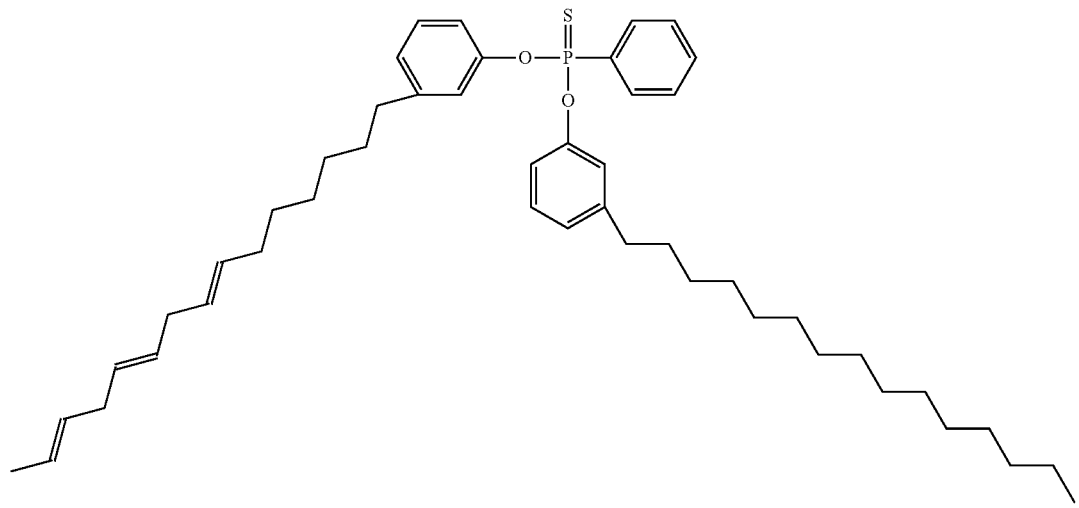
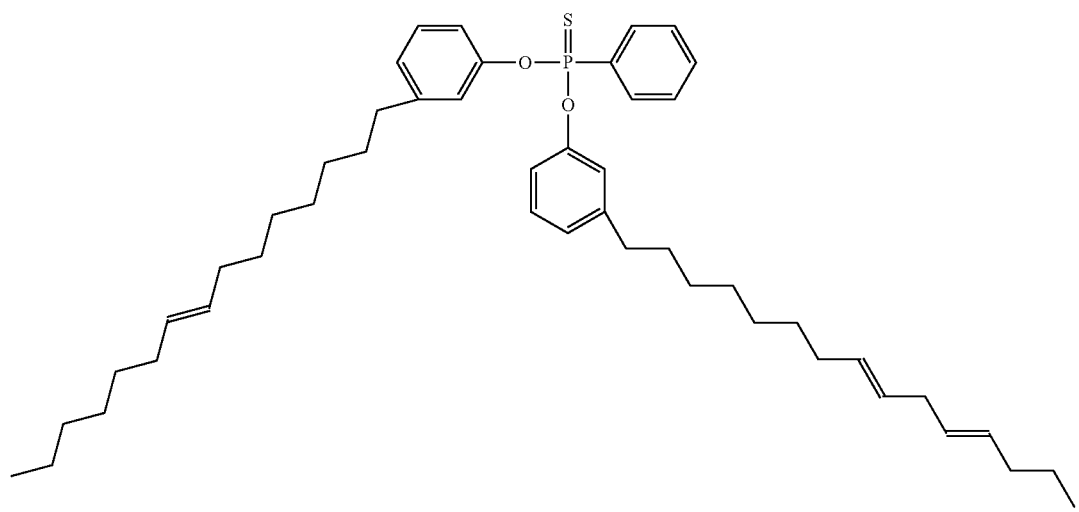
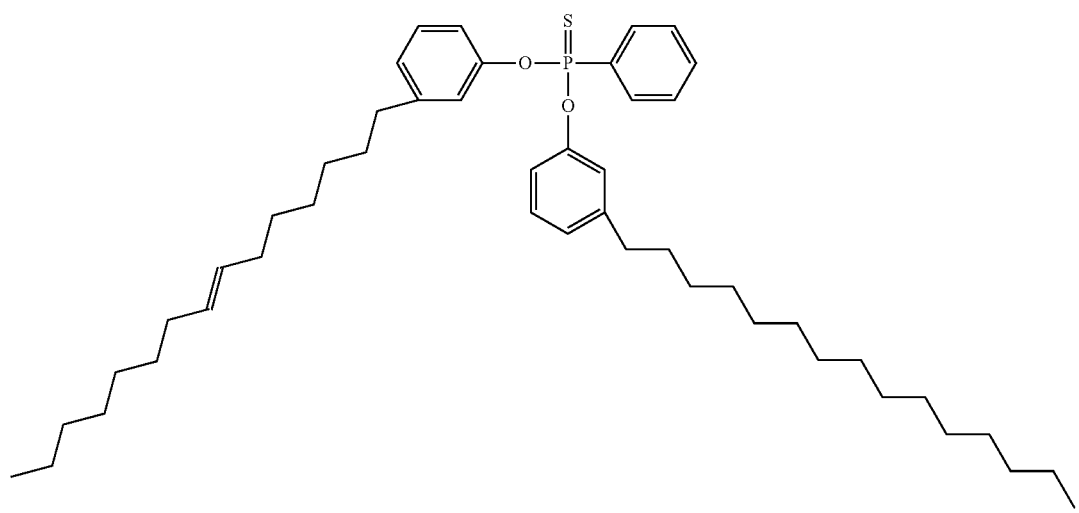

-continued
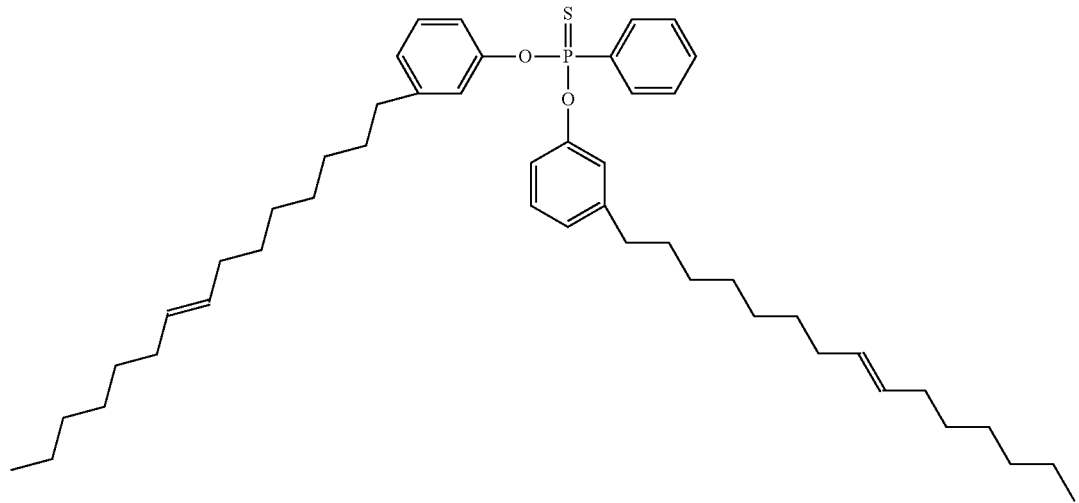
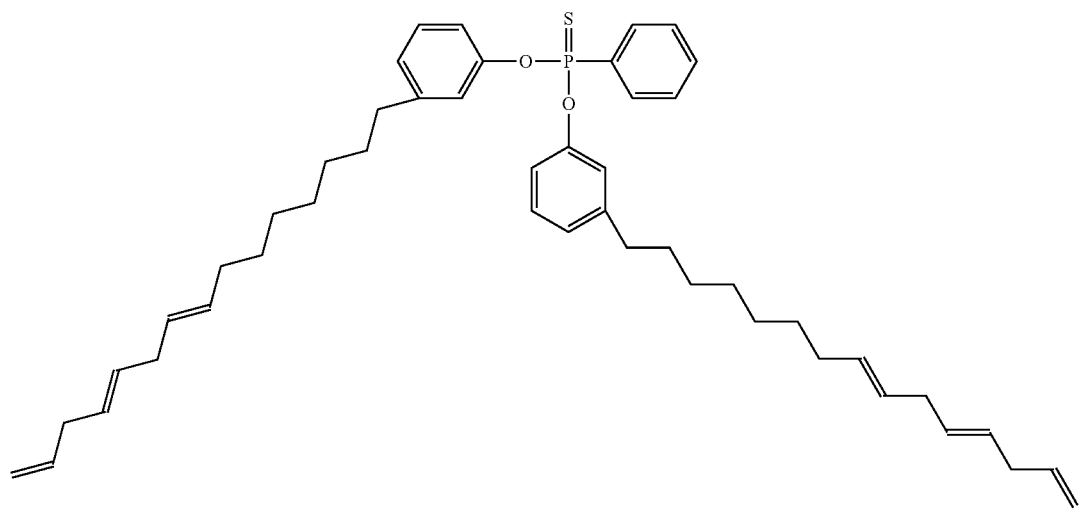
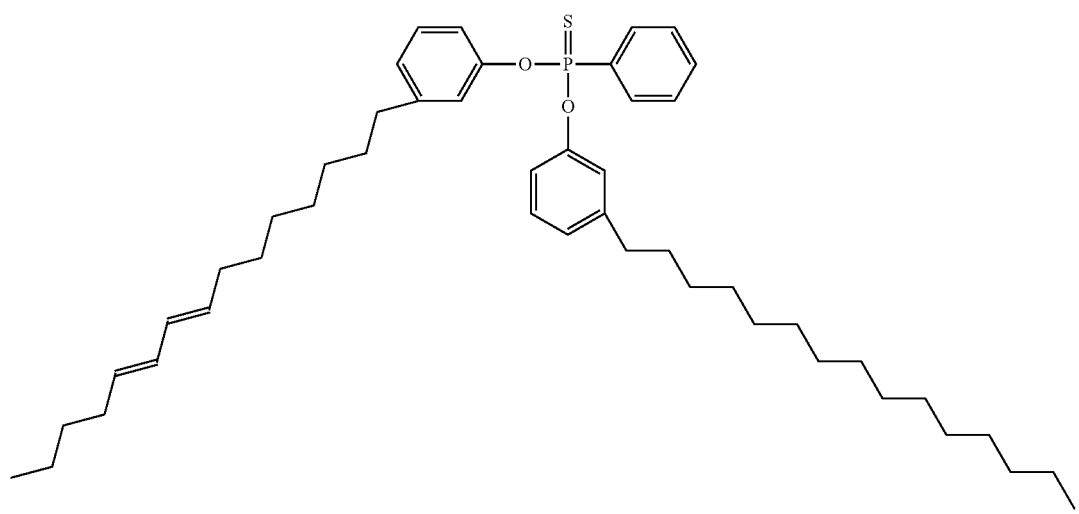

-continued
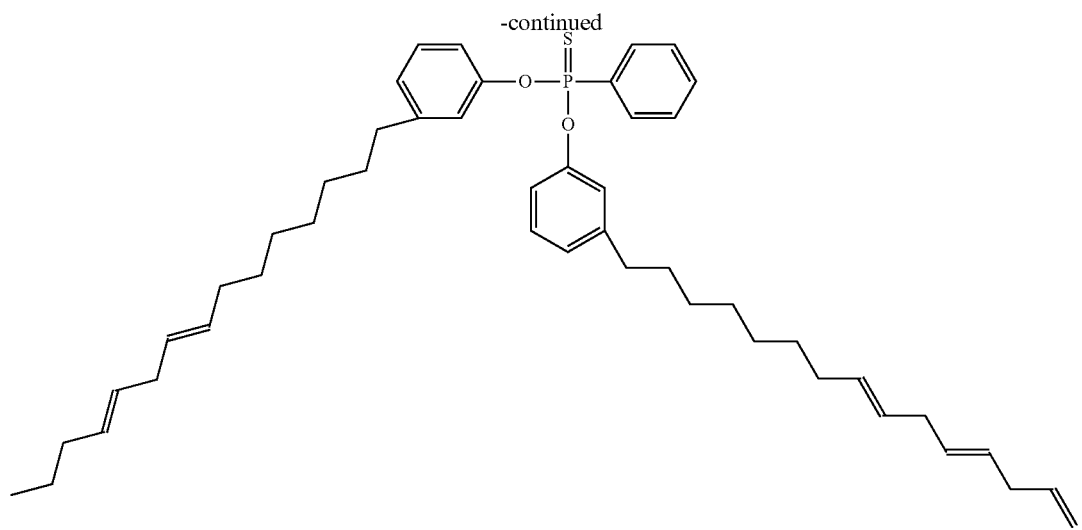
-continued
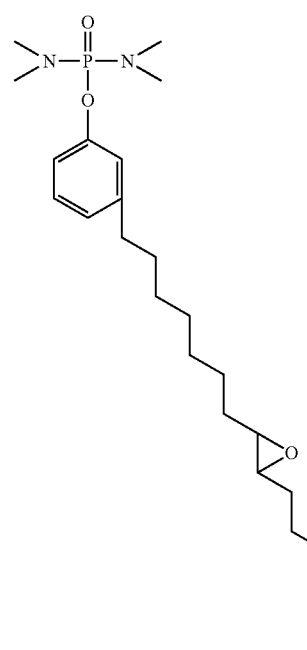
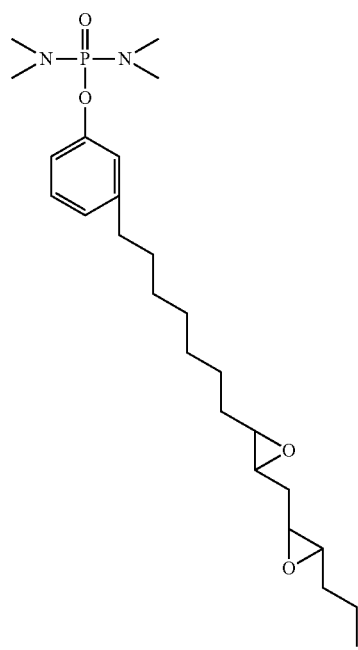

163
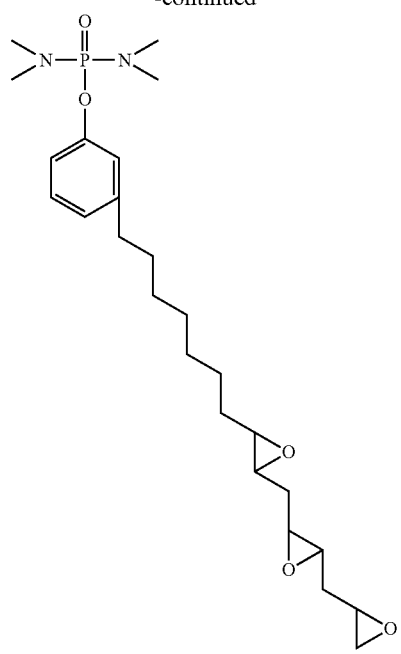
164
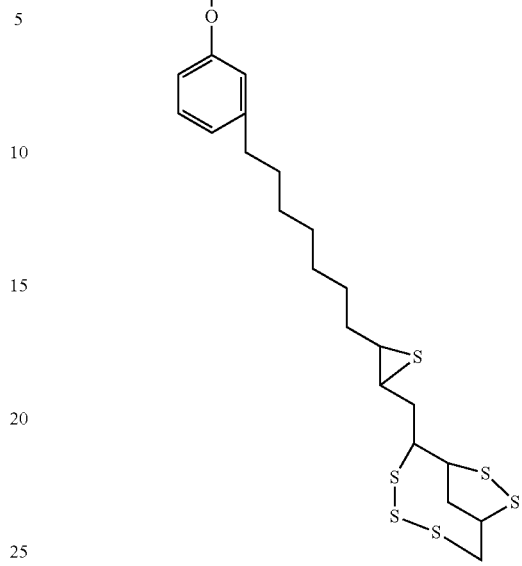
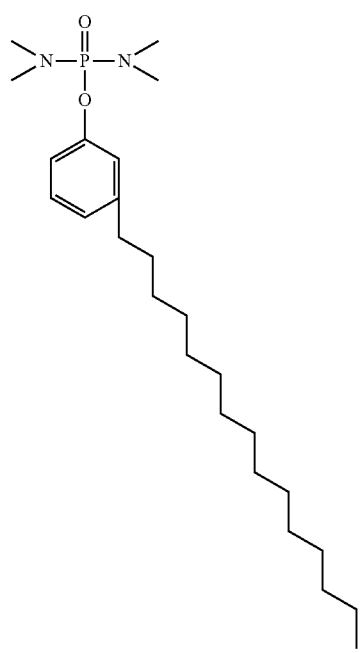
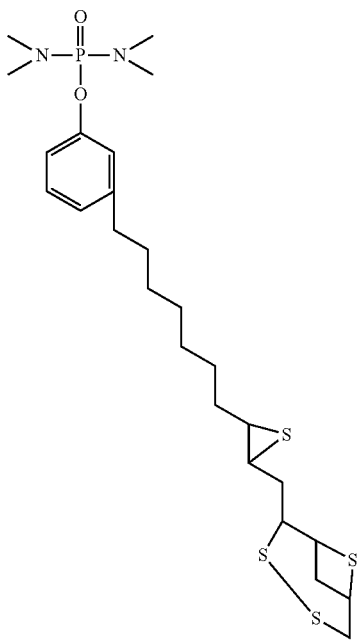

165
-continued
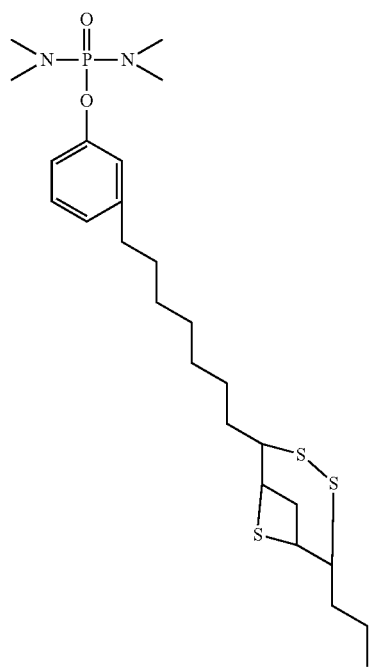
166
-continued
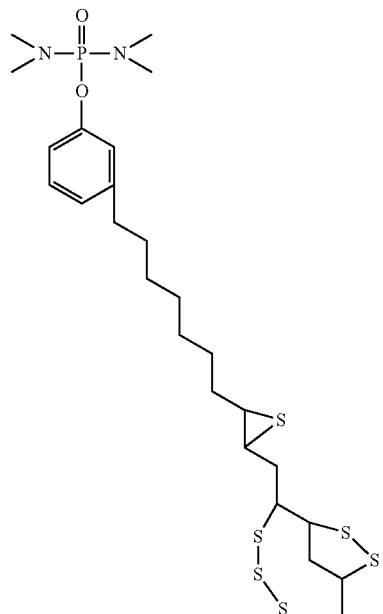
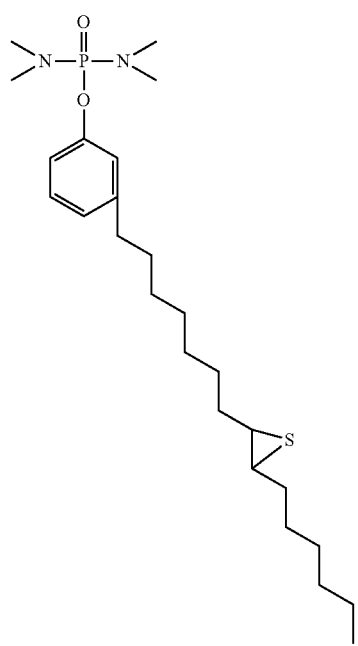
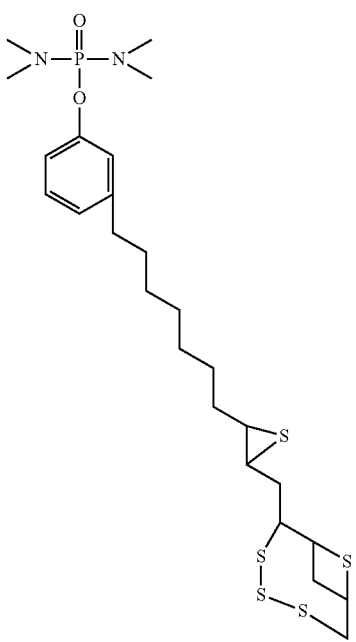

167
-continued
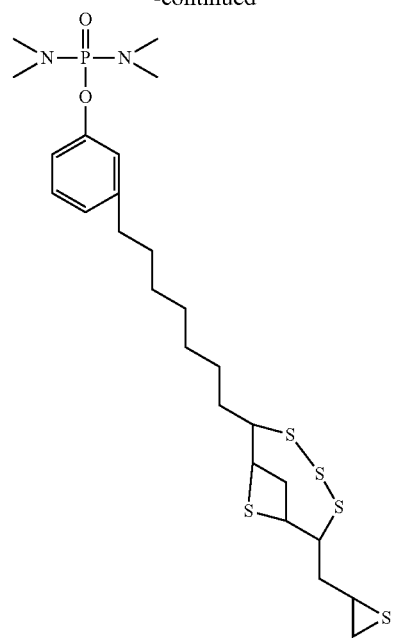
168
-continued
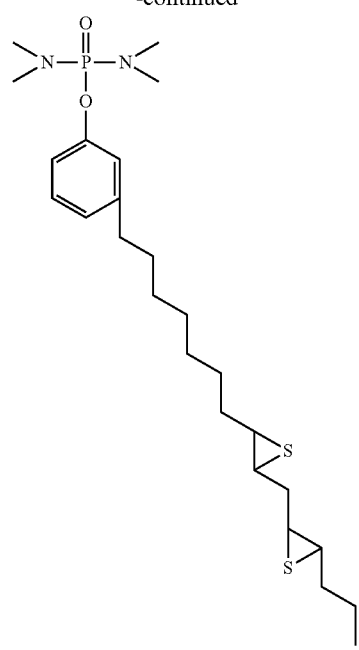
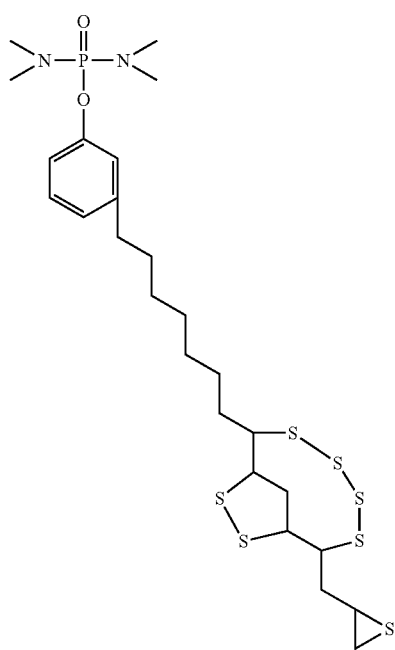

169
-continued
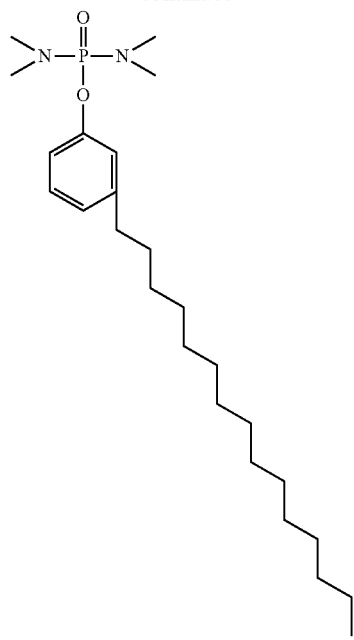
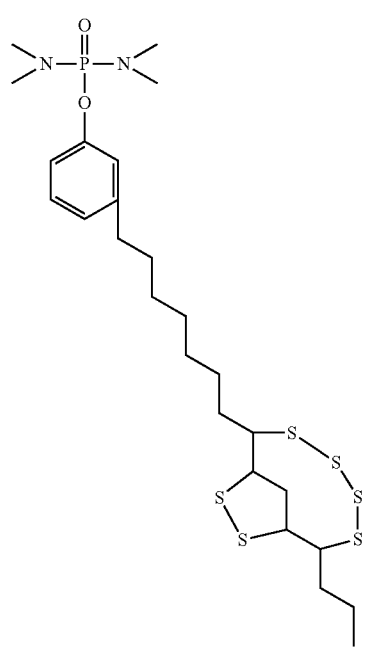
170
-continued
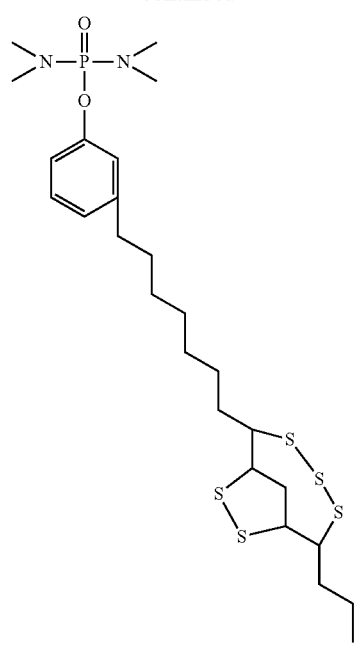
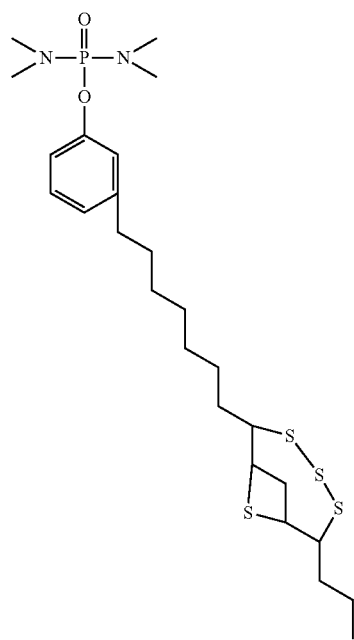

171
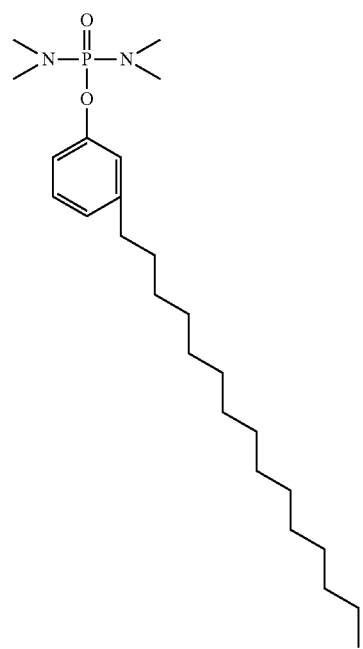
172
-continued
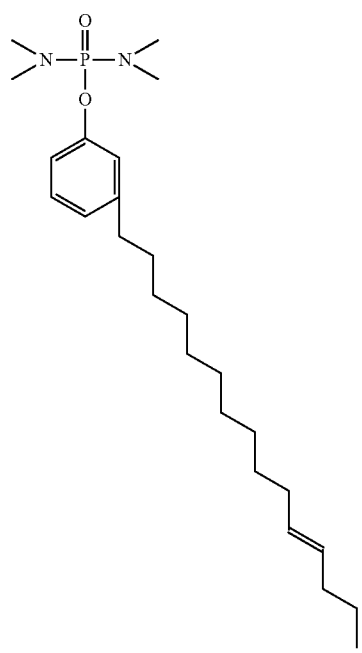
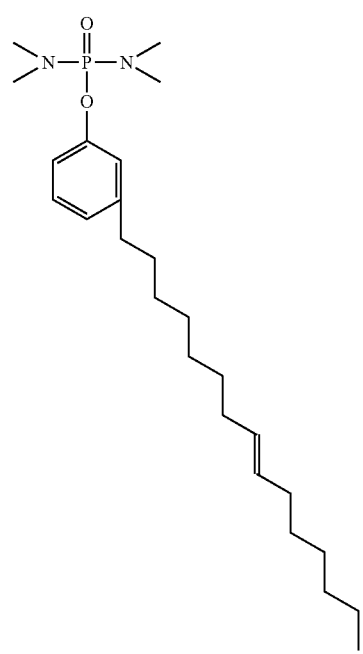
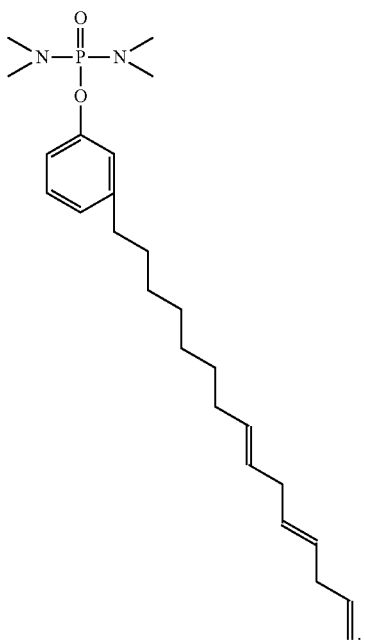
4. The organophosphorus compound according to claim 1 having a structure of formula (I-1):

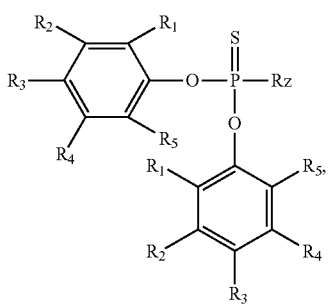

(I-1)

wherein, in formula (I-1), group $R_Z$ is selected from H, $C_1$-$C_{30}$ linear or branched alkyl, $C_1$-$C_{30}$ linear or branched alkoxyl, $C_6$-$C_{20}$ aryl, $C_1$-$C_{20}$ linear or branched alkyl $C_6$-$C_{20}$ aryl; groups $R_1$, $R_2$, $R_3$, $R_4$ and $R_5$ are, identical to or different from each other, each independently selected from H, and a group of formula (II-II), at least one group of groups $R_1$, $R_2$, $R_3$, $R_4$ and $R_5$ is a group represented by formula (II-II);

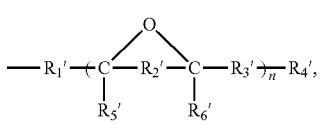

(II-II)

wherein, in formula (II-II), group $R_1'$ is selected from single bond, and $C_1$-$C_{20}$ linear or branched alkylene; groups $R_2'$ in the n repeating units are, identical to or different from each other, each independently a single bond, or a $C_1$-$C_{20}$ linear or branched alkylene; groups $R_3'$ in the n repeating units are, identical to or different from each other, each independently a single bond, or a $C_1$-$C_{20}$ linear or branched alkylene; group $R_4'$ is selected from hydrogen and $C_1$-$C_{20}$ linear or branched alkyl; groups $R_5'$ in the n repeating units are, identical to or different from each other, each independently hydrogen or a $C_1$-$C_{20}$ linear or branched alkyl; groups $R_6'$ in the n repeating units are, identical to or different from each other, each independently hydrogen or a $C_1$-$C_{20}$ linear or branched alkyl; n is a positive integral number.

5. The organophosphorus compound according to claim 1 having a structure of formula (I-2):

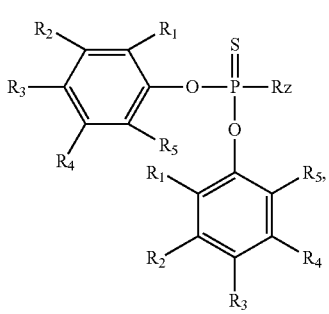

(I-2)

wherein, in formula (I-2), the group Rz is selected from H, $C_1$-$C_{10}$ linear or branched alkyl, $C_1$-$C_{10}$ linear or branched alkoxyl, $C_6$-$C_{10}$ aryl, $C_1$-$C_{14}$ alkyl phenyl; groups $R_1$, $R_2$, $R_3$, $R_4$ and $R_5$ are, identical to or different from each other, each independently selected from H, and a group represented by the formula (II-III), at least one group of groups $R_1$, $R_2$, $R_3$, $R_4$ and $R_5$ is a group represented by the formula (II-III);

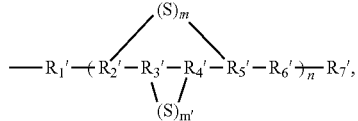

(II-III)

in formula (II-III), group $R_1'$ is selected from single bond, $C_1$-$C_{20}$ linear or branched alkylene; groups $R_2'$ in the n repeating units are, identical to or different from each other, each independently a divalent, tervalent or tetravalent $C_1$-$C_4$ linear or branched alkyl; groups $R_3'$ in the n repeating units are, identical to or different from each other, each independently a single bond, or a divalent or tervalent $C_1$-$C_4$ linear or branched alkyl; groups $R_4'$ in the n repeating units are, identical to or different from each other, each independently a single bond, or a divalent or tervalent $C_1$-$C_4$ linear or branched alkyl; groups $R_5'$ in the n repeating units are, identical to or different from each other, each independently a divalent, tervalent or tetravalent $C_1$-$C_4$ linear or branched alkyl); groups $R_6'$ in the n repeating units are, identical to or different from each other, each independently a single bond, or a $C_1$-$C_4$ linear or branched alkylene; group $R_7'$ is selected from hydrogen and $C_1$-$C_{20}$ linear or branched alkyl; n is 1, 2, or 3; the numbers m in the n repeating units are, identical to or different from each other, each 0, 1, 2, 3, 4, or 5; the numbers m' in the n repeating units are, identical to or different from each other, each 0, 1, 2, 3, 4, or 5; in each repeating unit of formula (II-III), when m is greater than 0, m sulfur atoms are bonded to groups $R_2'$ and $R_5'$; when m' is greater than 0, m' sulfur atoms are bonded to groups $R_3'$ and $R_4'$; in each repeating unit of formula (II-III), when group $R_3'$ is a single bond, m' sulfur atoms are bonded to group $R_2'$, when group $R_4'$ is a single bond, m' sulfur atoms are bonded to group $R_5'$; and the total carbon number of the group represented by formula (II-II) is 10-20.

6. The organophosphorus compound according to claim 1 having a structure of formula (I-3):

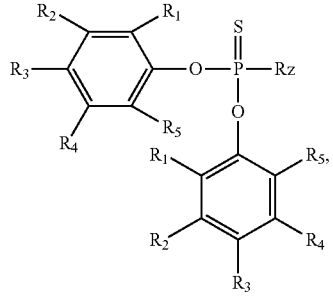

(I-3)

wherein, in formula (I-3), group Rz is selected from H, $C_1$-$C_{10}$ linear or branched alkyl, $C_1$-$C_{10}$ linear or branched alkoxyl, $C_6$-$C_{10}$ aryl, $C_1$-$C_{14}$ alkyl phenyl; groups $R_1$, $R_2$, $R_3$, $R_4$ and $R_5$ are, identical to or different from each other, each independently selected from H, and a group represented by the formula (II-I), at least one group of groups $R_1$, $R_2$, $R_3$, $R_4$ and $R_5$ is a group represented by the formula (II-I);

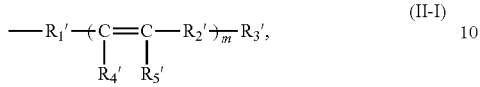

(II-I)

in formula (II-I), group $R_1'$ is selected from single bond, $C_1$-$C_{20}$ linear or branched alkylene; groups $R_2'$ in the m repeating units are, identical to or different from each other, each independently a single bond, or a $C_1$-$C_4$ linear or branched alkylene; group $R_3'$ is selected from hydrogen and $C_1$-$C_4$ linear or branched alkyl; groups $R_4'$ in the m repeating units are, hydrogen; groups $R_5'$ in the m repeating units are, hydrogen; m is 1, 2, or 3; and the total carbon number of the group represented by the formula (II-I) is 10-20.

7. The organophosphorus compound according to claim 1 having a structure of formula (I-4):

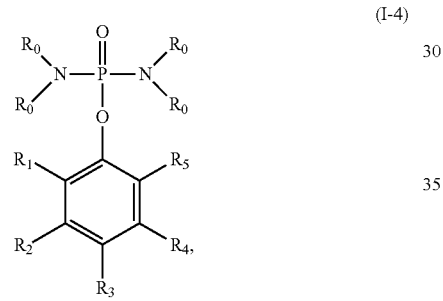

(I-4)

wherein, formula (I-4), groups $R_0$ are each independently selected from phenyl, $C_1$-$C_{14}$ alkyl phenyl, and $C_1$-$C_{20}$ linear or branched alkyl; groups $R_1$, $R_2$, $R_3$, $R_4$ and $R_5$ are, identical to or different from each other, each independently selected from H, and a group represented by the formula (II-II), at least one group of groups $R_1$, $R_2$, $R_3$, $R_4$ and $R_5$ is a group represented by the formula (II-II);

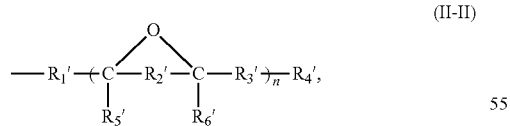

(II-II)

in formula (II-II), group $R_1'$ is selected from single bond, $C_1$-$C_{20}$ linear or branched alkylene; groups $R_2'$ in the n repeating units are, identical to or different from each other, each independently a single bond, or $C_1$-$C_4$ linear or branched alkylene; groups $R_3'$ in the n repeating units are, identical to or different from each other, each independently a single bond, or a $C_1$-$C_4$ linear or branched alkylene; group $R_4'$ is selected from hydrogen and $C_1$-$C_4$ linear or branched alkyl; groups $R_5'$ in the n repeating units are hydrogen; groups $R_6'$ in the n repeating units are hydrogen; n is 1, 2, or 3; and the total carbon number of the group represented by formula (II-II) is 10-20.

8. The organophosphorus compound according to claim 1 having a structure of formula (I-5):

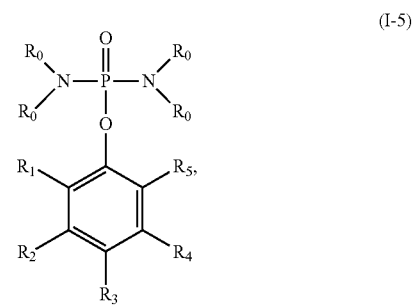

(I-5)

wherein, in formula (I-5), groups $R_0$ are each independently selected from phenyl, $C_1$-$C_{14}$ alkyl phenyl, and $C_1$-$C_{20}$ linear or branched alkyl; groups $R_1$, $R_2$, $R_3$, $R_4$ and $R_5$ are, identical to or different from each other, each independently selected from H, and a group represented by formula (II-III), at least one group of groups $R_1$, $R_2$, $R_3$, $R_4$ and $R_5$ is a group represented by formula (II-III);

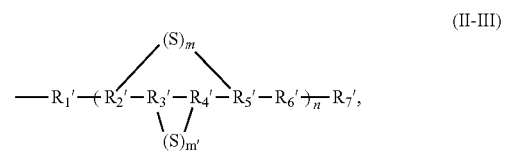

(II-III)

in formula (II-III), group $R_1'$ is selected from single bond, $C_1$-$C_{20}$ linear or branched alkylene; groups $R_2'$ in the n repeating units are, identical to or different from each other, each independently a divalent, tervalent or tetravalent $C_1$-$C_4$ linear or branched alkyl; groups $R_3'$ in the n repeating units are, identical to or different from each other, each independently a single bond or a divalent or tervalent $C_1$-$C_4$ linear or branched alkyl; groups $R_4'$ in the n repeating units are, identical to or different from each other, each independently a single bond, or a divalent or tervalent $C_1$-$C_4$ linear or branched alkyl; groups $R_5'$ in the n repeating units are, identical to or different from each other, each independently a divalent, tervalent or tetravalent $C_1$-$C_4$ linear or branched alkyl; groups $R_6'$ in n repeating units are, identical to or different from each other, each independently a single bond, or a $C_1$-$C_4$ linear or branched alkylene; group $R_7'$ is selected from hydrogen and $C_1$-$C_{20}$ linear or branched alkyl; n is 1, 2, or 3; the numbers m in the n repeating units are, identical to or different from each other, each independently 0, 1, 2, 3, 4, or 5; the numbers m' in the n repeating units are, identical to or different from each other, each independently 0, 1, 2, 3, 4, or 5; in each repeating unit of the formula (II-III), when m is greater than 0, m sulfur atoms are bonded to groups $R_2'$ and $R_5'$; when m' is greater than 0, m' sulfur atoms are bonded to groups $R_3'$ and $R_4'$; in each repeating unit of the formula (II-III), when group $R_3'$ is a single bond, m' sulfur atoms are bonded to group $R_2'$, when group $R_4'$ is a single bond, m' sulfur atoms are bonded to group $R_5'$; and the total carbon number of the group represented by formula (II-II) is 10-20.

9. The organophosphorus compound according to claim 1, which has a structure as represented by the general formula (I-6):

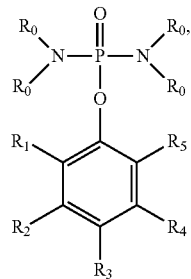
(I-6)

in formula (I-6), groups $R_0$ are each independently selected from phenyl, $C_1$-$C_{14}$ alkyl phenyl, and $C_1$-$C_{20}$ linear or branched alkyl; groups $R_1$, $R_2$, $R_3$, $R_4$ and $R_5$ are, identical to or different from each other, each independently selected from H, and a group represented by the formula (II-I), at least one group of groups $R_1$, $R_2$, $R_3$, $R_4$ and $R_5$ is a group represented by the formula (II-I);

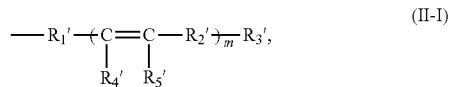
(II-I)

in formula (II-I), group $R_1'$ is selected from single bond and $C_1$-$C_{20}$ linear or branched alkylene; groups $R_2'$ in the m repeating units are, identical to or different from each other, each independently a single bond, or a $C_1$-$C_4$ linear or branched alkylene; group $R_3'$ is selected from hydrogen and $C_1$-$C_4$ linear or branched alkyl; groups $R_4'$ in m repeating units are, hydrogen; groups $R_5'$ in m repeating units are, hydrogen; m is 1, 2, or 3; and the total carbon number of the group represented by the formula (II-I) is 10-20.

10. A composition comprising the organophosphorus compound according to claim 1.

11. A lubricating oil comprising a base oil and the organophosphorus compound according to claim 1.

12. A lubricating grease comprising a base oil and the organophosphorus compound according to claim 1.

* * * * *